US012716249B2

(12) United States Patent
Nagaoka et al.

(10) Patent No.: US 12,716,249 B2
(45) **Date of Patent: *Aug. 25, 2026**

(54) BINDING MACHINE

(71) Applicant: Max Co., Ltd., Tokyo (JP)

(72) Inventors: Takahiro Nagaoka, Tokyo (JP); Akira Kasahara, Tokyo (JP)

(73) Assignee: Max Co., Ltd., Tokyo (JP)

( * ) Notice: Subject to any disclaimer, the term of this patent is extended or adjusted under 35 U.S.C. 154(b) by 313 days.

This patent is subject to a terminal disclaimer.

(21) Appl. No.: 18/628,017

(22) Filed: Apr. 5, 2024

(65) Prior Publication Data

US 2024/0337120 A1 Oct. 10, 2024

Related U.S. Application Data

(63) Continuation of application No. 17/940,916, filed on Sep. 8, 2022, now Pat. No. 11,976,480, which is a (Continued)

(30) Foreign Application Priority Data

| | | | |
|---|---|---|---|
| Jul. 22, 2015 | (JP) | ................................ | 2015-145263 |
| Jul. 8, 2016 | (JP) | ................................ | 2016-135748 |
| Jul. 8, 2016 | (JP) | ................................ | 2016-136070 |

(51) Int. Cl.

*E04G 21/12* (2006.01)
*B21F 7/00* (2006.01)
(Continued)

(52) U.S. Cl.

CPC .............. *E04G 21/123* (2013.01); *B21F 7/00* (2013.01); *B21F 15/04* (2013.01); *B25B 25/00* (2013.01); *B65B 13/28* (2013.01)

(58) Field of Classification Search

CPC .......... B21F 15/00; B21F 15/02; B21F 15/04; B21F 7/00; B65B 13/22; B65B 13/28;
(Continued)

(56) References Cited

U.S. PATENT DOCUMENTS 3,249,319 A 5/1966 Wasson
3,313,498 A 4/1967 Wasson
(Continued)

FOREIGN PATENT DOCUMENTS

CL 2009001205 A1 6/2010
CL 2009001207 A1 9/2010
(Continued)

OTHER PUBLICATIONS

Aug. 20, 2025—(CN) Notification of First Office Action—App No. 202310845088.6, Eng Tran.
(Continued)

*Primary Examiner* — Bobby Yeonjin Kim
(74) *Attorney, Agent, or Firm* — Banner & Witcoff, Ltd.

(57) ABSTRACT

A reinforcing bar binding machine capable of reliably performing a wire gripping operation includes a first movable gripping member that is displaced in a direction to contact with and separate from one side of a fixed gripping member and a second movable gripping member that is displaced in a direction to contact with and separate from the other side of the fixed gripping member. A bending portion brings the first movable gripping member and the second movable gripping member into and out of contact with the fixed gripping member. The fixed gripping member includes a shaft that rotatably supports the first movable gripping member and the second movable gripping member. Further, the bending portion includes an opening and closing pin that pushes an opening and closing guide hole provided in the first movable gripping member, and an opening and closing
(Continued)

guide hole provided in the second movable gripping member.

21 Claims, 83 Drawing Sheets

Related U.S. Application Data continuation of application No. 16/916,957, filed on Jun. 30, 2020, now Pat. No. 11,459,778, which is a continuation of application No. 15/577,323, filed as application No. PCT/JP2016/071441 on Jul. 21, 2016, now Pat. No. 10,738,489.

(51) Int. Cl.
*B21F 15/04* (2006.01)
*B25B 25/00* (2006.01)
*B65B 13/28* (2006.01)

(58) Field of Classification Search
CPC ..... B65B 13/285; B65B 13/025; B65B 13/04; B65B 13/06; B65B 27/10; B25B 25/00; E04G 21/123; E04G 21/122
See application file for complete search history.

(56) References Cited

U.S. PATENT DOCUMENTS

| | | | | |
|---|---|---|---|---|
| 4,834,148 | A | 5/1989 | Muguruma et al. | |
| 5,178,195 | A | 1/1993 | Glaus et al. | |
| 5,279,336 | A | 1/1994 | Kusakari et al. | |
| 5,558,012 | A | 9/1996 | Yamashima et al. | |
| 5,871,036 | A | 2/1999 | Murayama et al. | |
| 5,944,064 | A | 8/1999 | Saito et al. | |
| 5,956,989 | A | 9/1999 | Kusakari | |
| 7,255,135 | B2 | 8/2007 | Ishikawa et al. | |
| D619,437 | S | 7/2010 | Hattori | |
| 8,281,712 | B1 * | 10/2012 | Hoffa | B21F 15/04 100/31 |
| 10,787,828 | B2 * | 9/2020 | Itagaki | E04G 21/122 |
| 2005/0005991 | A1 | 1/2005 | Ishikawa et al. | |
| 2005/0005992 | A1 | 1/2005 | Kusakari et al. | |
| 2005/0061389 | A1 | 3/2005 | Nakagawa et al. | |
| 2005/0077413 | A1 | 4/2005 | Nakagawa et al. | |
| 2006/0157139 | A1 | 7/2006 | Hoyaukin | |
| 2008/0134908 | A1 | 6/2008 | Nagaoka et al. | |
| 2009/0126824 | A1 | 5/2009 | Nakagawa et al. | |
| 2009/0283167 | A1 | 11/2009 | Nakagawa et al. | |
| 2009/0283168 | A1 * | 11/2009 | Kusakari | E04G 21/122 29/33.52 |
| 2009/0283169 | A1 | 11/2009 | Itagaki et al. | |
| 2009/0283170 | A1 | 11/2009 | Nagaoka | |
| 2009/0283171 | A1 | 11/2009 | Nagaoka et al. | |
| 2009/0283172 | A1 | 11/2009 | Itagaki | |
| 2010/0147411 | A1 | 6/2010 | Kusakari et al. | |
| 2011/0030836 | A1 | 2/2011 | Nagaoka et al. | |
| 2011/0049230 | A1 | 3/2011 | Nagaoka et al. | |
| 2012/0055577 | A1 | 3/2012 | Barnes et al. | |
| 2014/0091171 | A1 | 4/2014 | Nakagawa et al. | |
| 2014/0246114 | A1 | 9/2014 | Kusakari et al. | |
| 2014/0246115 | A1 | 9/2014 | Itagaki | |
| 2015/0048194 | A1 | 2/2015 | Itagaki | |
| 2015/0232212 | A1 | 8/2015 | Itagaki | |
| 2015/0266082 | A1 | 9/2015 | Horn | |
| 2015/0267423 | A1 | 9/2015 | Kusakari et al. | |
| 2016/0108632 | A1 | 4/2016 | Lu | |
| 2016/0186451 | A1 | 6/2016 | Itagaki | |
| 2016/0222683 | A1 | 8/2016 | Kusakari et al. | |
| 2016/0297555 | A1 | 10/2016 | Itagaki | |
| 2017/0305584 | A1 | 10/2017 | Itagaki | |
| 2018/0148943 | A1 | 5/2018 | Itagaki et al. | |
| 2018/0161848 | A1 | 6/2018 | Itagaki et al. | |
| 2018/0363309 | A1 | 12/2018 | Kusakari et al. | |
| 2019/0002139 | A1 | 1/2019 | Itagaki | |

FOREIGN PATENT DOCUMENTS

| | | | |
|---|---|---|---|
| CL | 2015000677 | A1 | 7/2015 |
| CL | 2017003252 | A1 | 6/2018 |
| CN | 87103540 | A | 1/1988 |
| CN | 1175929 | A | 3/1998 |
| CN | 1561271 | A | 1/2005 |
| CN | 1761796 | A | 4/2006 |
| CN | 201110004 | Y | 9/2008 |
| CN | 100445507 | C | 12/2008 |
| CN | 101353088 | A | 1/2009 |
| CN | 201178909 | Y | 1/2009 |
| CN | 101585421 | A | 11/2009 |
| CN | 201671348 | U | 12/2010 |
| CN | 201693447 | U | 1/2011 |
| CN | 102395737 | A | 3/2012 |
| CN | 102556393 | A | 7/2012 |
| CN | 203271154 | U | 11/2013 |
| CN | 203528856 | U | 4/2014 |
| DE | 2804300 | A1 | 8/1979 |
| DE | 4319349 | A1 | 12/1994 |
| EP | 0295224 | A2 | 12/1988 |
| EP | 0391013 | B1 | 12/1993 |
| EP | 751269 | A1 | 1/1997 |
| EP | 0757143 | A1 | 2/1997 |
| EP | 2029834 | B1 | 7/2010 |
| JP | 57-125111 | A | 8/1982 |
| JP | 10-250703 | A | 9/1998 |
| JP | 11-6299 | A | 1/1999 |
| JP | 2003-175904 | A | 6/2003 |
| JP | 2003175905 | A | 6/2003 |
| JP | 4747455 | B2 | 8/2011 |
| KR | 20050078786 | A | 8/2005 |
| KR | 20100114755 | A | 10/2010 |
| RU | 2490407 | C2 | 8/2013 |
| RU | 2518167 | C2 | 6/2014 |
| TW | 200300120 | A | 5/2003 |
| WO | 2005037490 | A1 | 4/2005 |
| WO | 2007-141822 | A1 | 12/2007 |
| WO | 2008050143 | A1 | 5/2008 |
| WO | 2009/152707 | A1 | 12/2009 |
| WO | 2010136530 | A2 | 12/2010 |
| WO | 2014186927 | A1 | 11/2014 |

OTHER PUBLICATIONS

Jan. 4, 2024—(US)—Notice of Allowance—U.S. Appl. No. 17/940,916.
Chinese Office Action for CN Application No. 202010483999.1 issued Nov. 15, 2022 (9 pp.) with English Translation.
Office Action issued for corresponding Tiawanese Patent Application No. 109121610 dated Sep. 24, 2020. (4 pages).
Partial Search Report for EP 20203839.4 dated Jan. 25, 2021. (14 pages).
Chinese Office Action dated May 7, 2022, issued by the Chinese Patent Office in the corresponding Chinese Patent Application No. 202010483499.1 (6 pages).
Chinese Office Action for Chinese Application No. 202010483499.1 dated Jan. 21, 2022, with English Translation. (15 pp).
International Search Report mailed Sep. 27, 2016 in PCT/JP2016/071441 (4 pages) and Written Opinion of International Search Authority (3 pages).
Search Report mailed Oct. 8, 2018 in corresponding Russian Patent Application No. 2017144210 (2 pages).
Further Examination Report mailed Oct. 12, 2018 in corresponding New Zealand Patent Application No. 738523 (2 pages).
The extended European search report mailed Nov. 28, 2018 in corresponding EP Patent Application No. 16827840.6 (8 pages).
Supplementary European Search Report issued in U.S. Appl. No. 02/747,688, dated Apr. 9, 2009, 4 pages.
Chinese Office Action issued in Application No. 201680036175.5, dated May 5, 2019 with English Translation, 12 pages.
Extended European Search Report in Application No. 20203839.4 mailed May 11, 2021, 20 pages.
Chinese Office Action issued in Application No. 202010483499.1 mailed on Jun. 10, 2021, 10 pages.
Translation of WO-2014186927 (Year: 2014).

(56) References Cited

OTHER PUBLICATIONS

Translation of CN-101353088 (Year: 2009).
Translation of JP-2003175905 (Year: 2003).

* cited by examiner

BINDING MACHINE

CROSS REFERENCE TO RELATED APPLICATION

This application is a continuation Application of U.S. application Ser. No. 17/940,916 filed on Sep. 8, 2022, which is a continuation Application of U.S. application Ser. No. 16/916,957 filed on Jun. 30, 2020, now U.S. Pat. No. 11,459,778 issued on Oct. 4, 2022, which is a continuation of U.S. patent application Ser. No. 15/577,323 filed on Nov. 27, 2017, now U.S. Pat. No. 10,738,489 issued Aug. 11, 2020, which is a 35 U.S.C. 371 National Phase Entry Application from PCT/JP2016/071441 filed Jul. 21, 2016, which claims priority to Japanese Patent Application Nos. 2015-145263 filed Jul. 22, 2015, 2016-135748 filed Jul. 8, 2016, and 2016-136070 filed Jul. 8, 2016, priority is claimed to each of the foregoing and the disclosures of which are incorporated herein in their entirety by reference.

TECHNICAL FIELD

The present invention relates to a binding machine for binding a binding object such as reinforcing bars with a wire.

BACKGROUND ART

In the related art, there has been suggested a binding machine called a reinforcing bar binding machine which winds a wire around two or more reinforcing bars and twists the wound wire to bind the two or more reinforcing bars.

A reinforcing bar binding machine according to the related art has a configuration in which wires are fed and wound around a reinforcing bar, and then are twisted and bound. For such a reinforcing bar binding machine, there has been proposed a reinforcing bar binding machine in which after wires are wound around a reinforcing bar, the wires are cut in a state of being wound around the reinforcing bar in close contact with each other, and the reinforcing bar is wound with the wires by twisting crossing points of one end of the wire and the other end.

In the reinforcing bar binding machine in which the wires wound around the reinforcing bar are wound around the reinforcing bar, when one side of the wire wound around the reinforcing bar is gripped between a first movable gripping member and a fixed gripping member and the other side of the wire is gripped between a second movable gripping member and the fixed gripping member, an operation of winding the wire around the reinforcing bar and an operation of twisting the wire are performed.

From the related art, a configuration has been proposed in which a first movable gripping member and a second movable gripping member are opened and closed by parallel movement (for example, see Patent Literature 1). A configuration has also been proposed in which a first movable gripping member and a second movable gripping member are opened and closed by a rotating operation with a shaft as a fulcrum (for example, see Patent Literature 2).

CITATION LIST

Patent Literature

[Patent Literature 1]: Japanese Patent No. 4747455

[Patent Literature 2]: Japanese Unexamined Patent Application Publication No. S57-12511

SUMMARY

Technical Problem

In the configuration according to the related art in which the first movable gripping member and the second movable gripping member are opened and closed by the parallel movement, the movement of the first movable gripping member and the second movable gripping member is guided by members such as grooves or pins. Since the first movable gripping member and the second movable gripping member move in parallel, a dimension increases in a lateral direction. For this reason, miniaturization is difficult. Further, in the configuration according to the related art in which the first movable gripping member and the second movable gripping member are opened and closed by the rotating operation with the shaft as a fulcrum, a mechanism for rotating the first movable gripping member and the second movable gripping member is required, and the structure is complicated.

The present invention has been made to solve such problems, and an object thereof is to provide a binding machine that can be miniaturized and has a simple structure.

Solution to Problem

In order to solve the problems, the present invention provides a binding machine including: a feeding unit that is capable of feeding a wire and winding the wire around a binding target; and a binding unit that grips and twists the wire, wherein the binding unit includes: a pair of gripping members in which the other end side is rotatably supported by a shaft extending in a first direction such that one end side is movable toward and away from each other; and a moving member that extends in the first direction and that is movable in a second direction orthogonal to the first direction; and at least one of the pair of gripping members is a movable gripping member having a fitting portion such that the moving member is fitted into the fitting portion and the fitted moving member is movable in the second direction.

In addition, the present invention provides a binding machine including: a feeding unit that is capable of feeding a wire and winding the wire around a binding target; and a binding unit that grips and twists the wire, wherein the binding unit includes: a pair of gripping members in which the other end side is rotatably supported by a shaft extending in a first direction such that one end side is movable toward and away from each other; and a movable member that is movable in a second direction orthogonal to the first direction, at least one of the pair of gripping members has an opening and closing shaft portion which extend in the first direction, the movable member has a fitting portion into which the opening and closing shaft portion is fitted, and the fitting portion is configured to be capable of moving the movable member in the second direction in a state in which the opening and closing shaft portion is fitted.

In the present invention, the other end of the pair of gripping members is rotatably supported by the shaft such that one end of the pair of gripping members is movable relatively toward and away from the other end thereof. The pair of gripping members rotates about the shaft as a fulcrum by the operation in which the fitting portion and the moving member fitted in the fitting portion or the fitting portion and the opening and closing shaft portion fitted in the fitting portion relatively move in the second direction orthogonal to the first direction in which the shaft extends. The wire can be gripped when one end of the pair of gripping members is moved toward the other end, and the gripped wire can be released when one end of the pair of gripping members is moved away from the other end.

Advantageous Effects of the Invention

According to the present invention, it is possible to move one end of the gripping member toward and away from the other end thereof only by the rotation of the other end of the pair of gripping members about the shaft as a fulcrum, and thus miniaturization can be achieved. In addition, it is possible to rotate the pair of gripping members only by the movement of the moving member or the movable member, and thus the structure is simple.

DESCRIPTION

BRIEF DESCRIPTION OF THE DRAWINGS

FIG. 82 is an overall side view of a binding machine according to another embodiment, a part of which is broken.

FIG. 83 is a front view of the binding machine of FIG. 82 (a view seen from the left side of FIG. 1).

FIG. 84 is an internal structural view of the binding machine of FIG. 82.

FIG. 85 is a front view illustrating the periphery of a wire feeding unit of FIG. 84 (a cross sectional view taken along line A-A of FIG. 84).

FIG. 86 is a cross sectional view illustrating a feed gear of FIG. 85 as viewed from the top (a cross sectional view taken along line B-B of FIG. 85).

FIG. 87 is a side view illustrating a twisting unit and its periphery of FIG. 84.

FIG. 88 is a cross sectional view illustrating the twisted portion of FIG. 87 as viewed from the top (a cross sectional view taken along line C-C of FIG. 87).

FIG. 89 is a cross sectional view illustrating the twisted portion of FIG. 87 as viewed from the top (a cross sectional view taken along line D-D of FIG. 87).

FIG. 90 is a longitudinal sectional view of a reel portion of FIG. 82 as viewed from the front when broken in a vertical direction at a center position.

FIG. 91 illustrates a restriction portion (protrusion) (provided on a cover), and a front view illustrating a part of the housing unit which is broken (or a partially enlarged view of a lower part in FIG. 2).

FIG. 92 illustrates a restriction portion (protrusion) provided on a cover, and a front view illustrating a part of the housing unit which is broken.

FIG. 93A illustrates an oblique portion, and a front view illustrating a part of the housing unit which is broken.

Figure 93A:
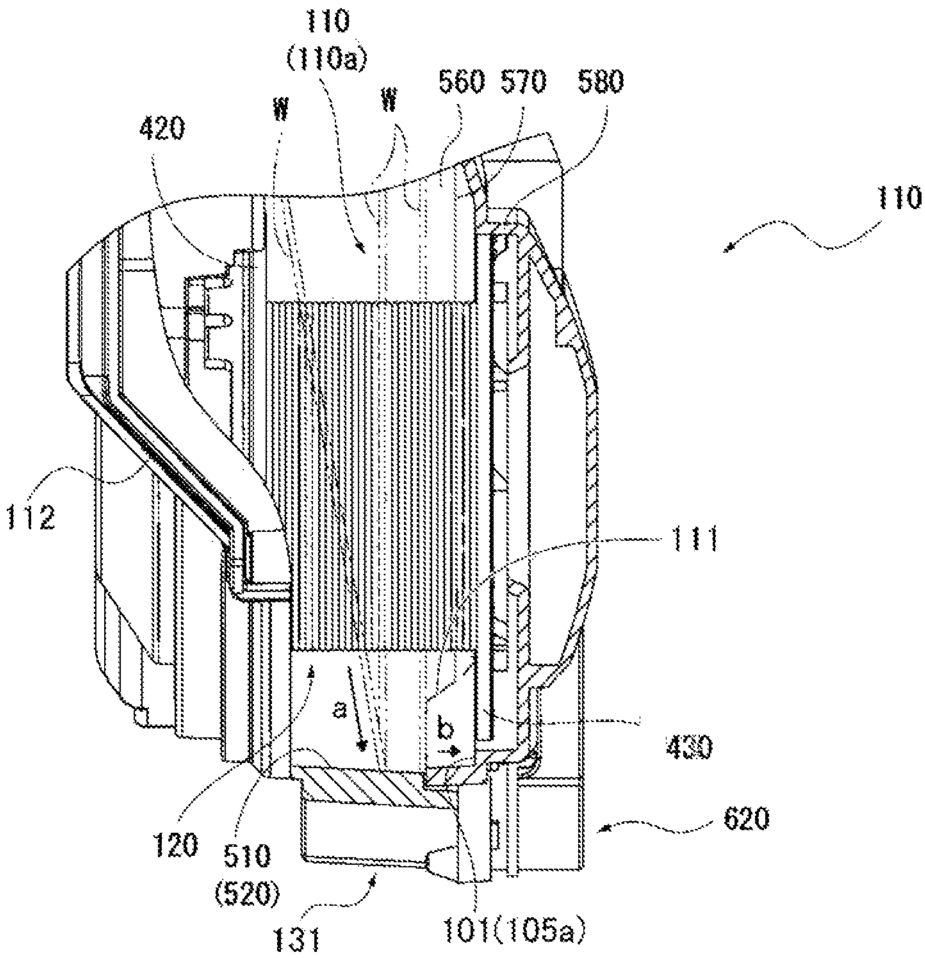
Figure 93B:
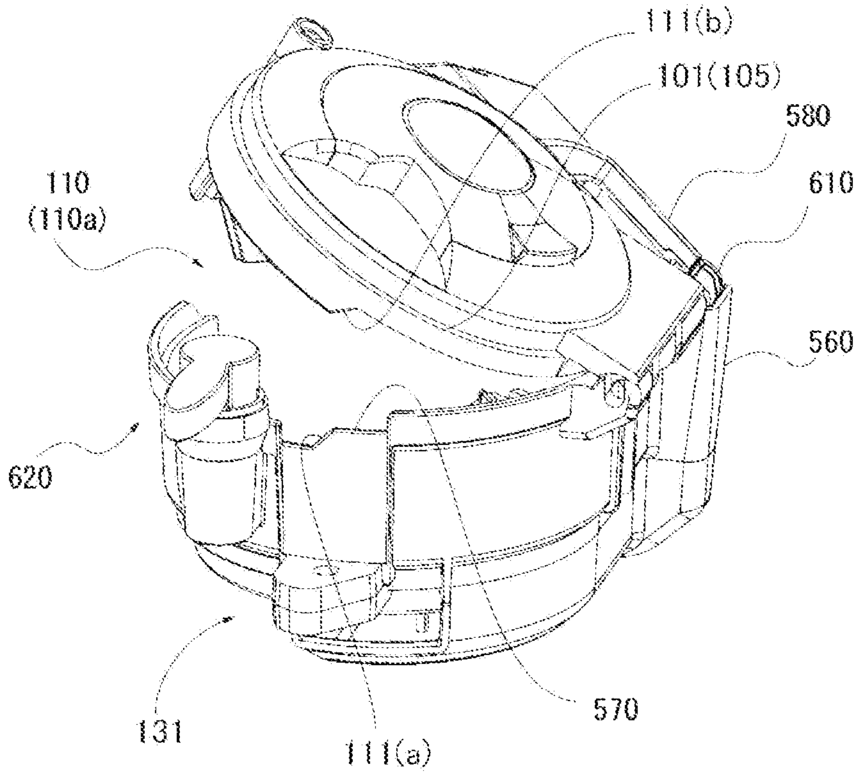

FIG. 93B illustrates an oblique portion, and a perspective view illustrating the housing unit as viewed from the bottom.

Figure 93C:
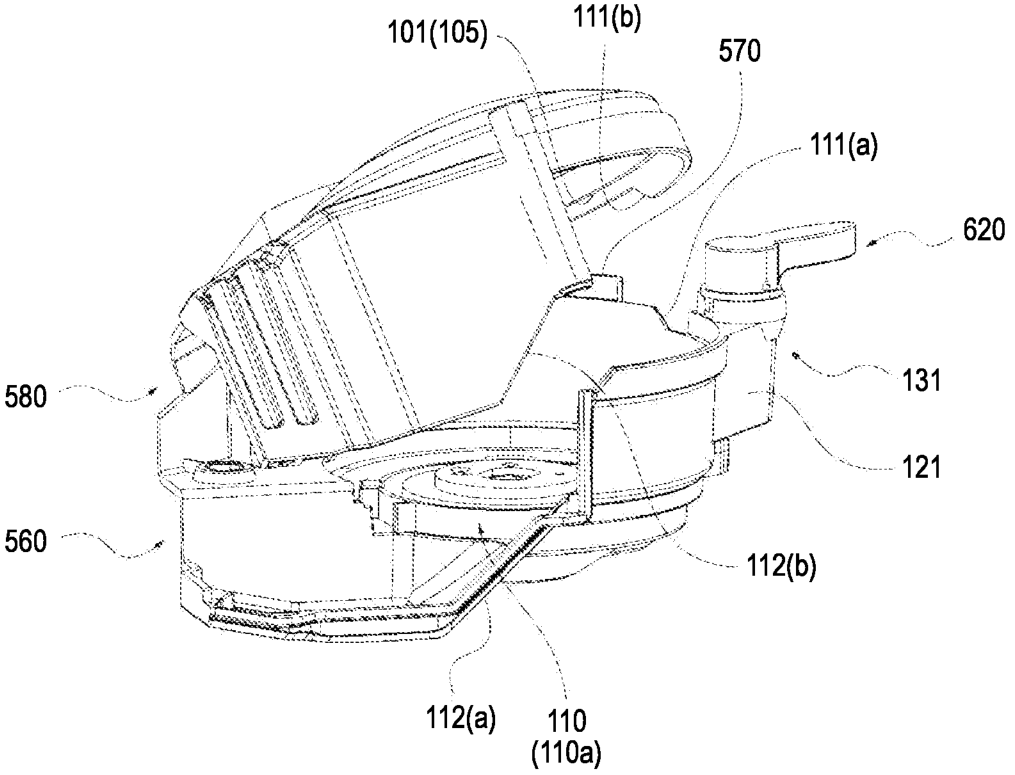

FIG. 93C illustrates an oblique portion, and a perspective view illustrating the housing unit as viewed from the top.

Figure 94A:
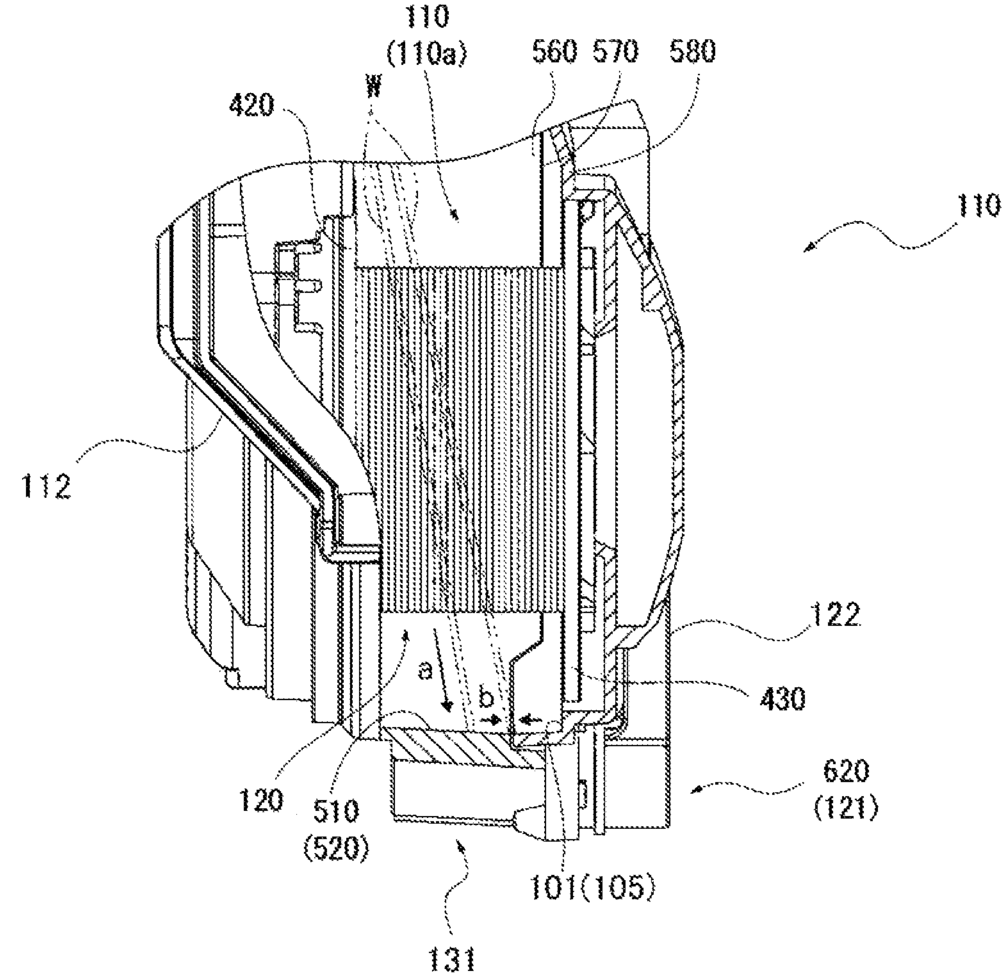

FIG. 94A is a view illustrating a pressing mechanism.

Figure 94B:
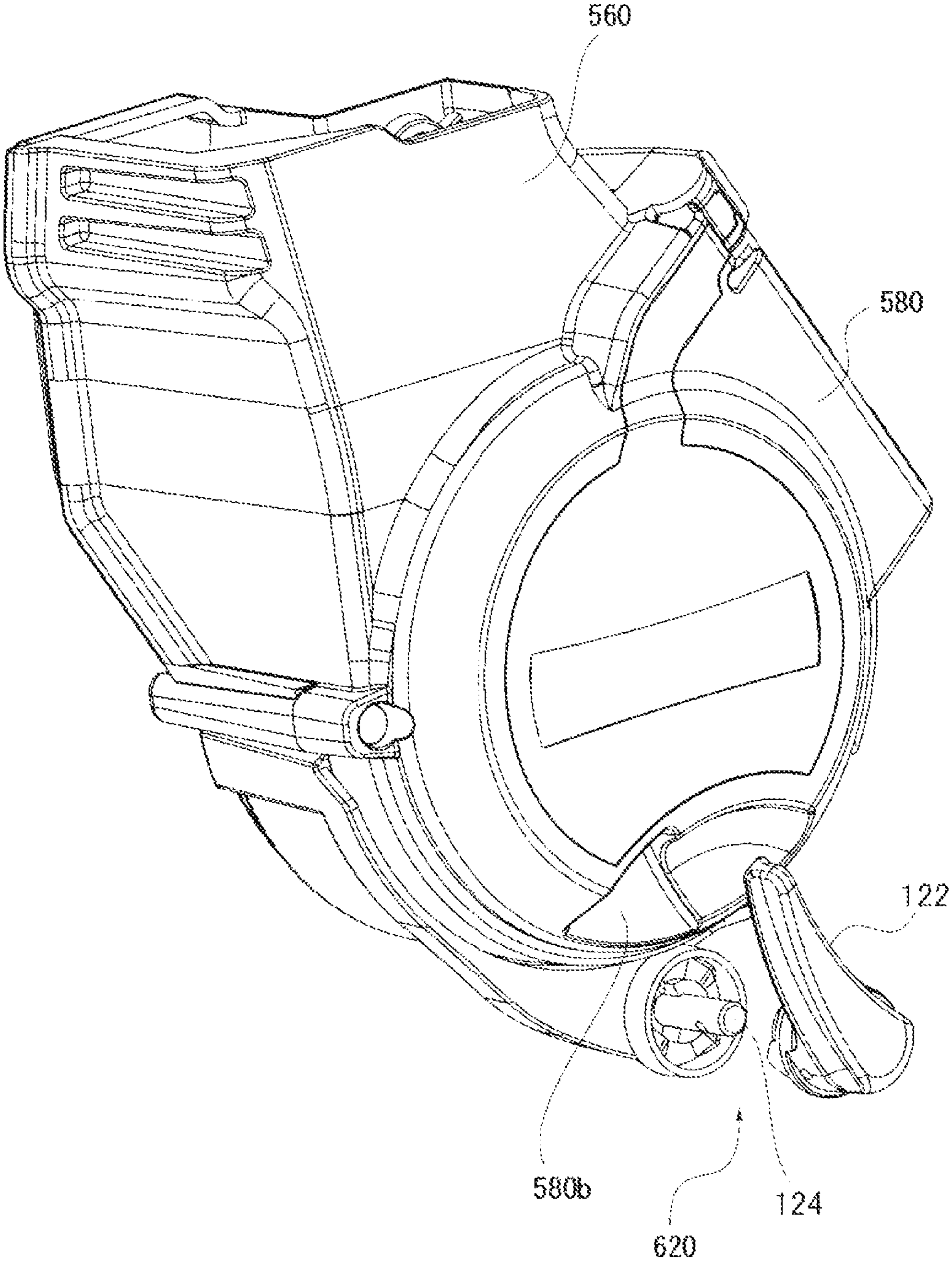

FIG. 94B is an exploded perspective view illustrating a structure of a lock device.

Figure 84:
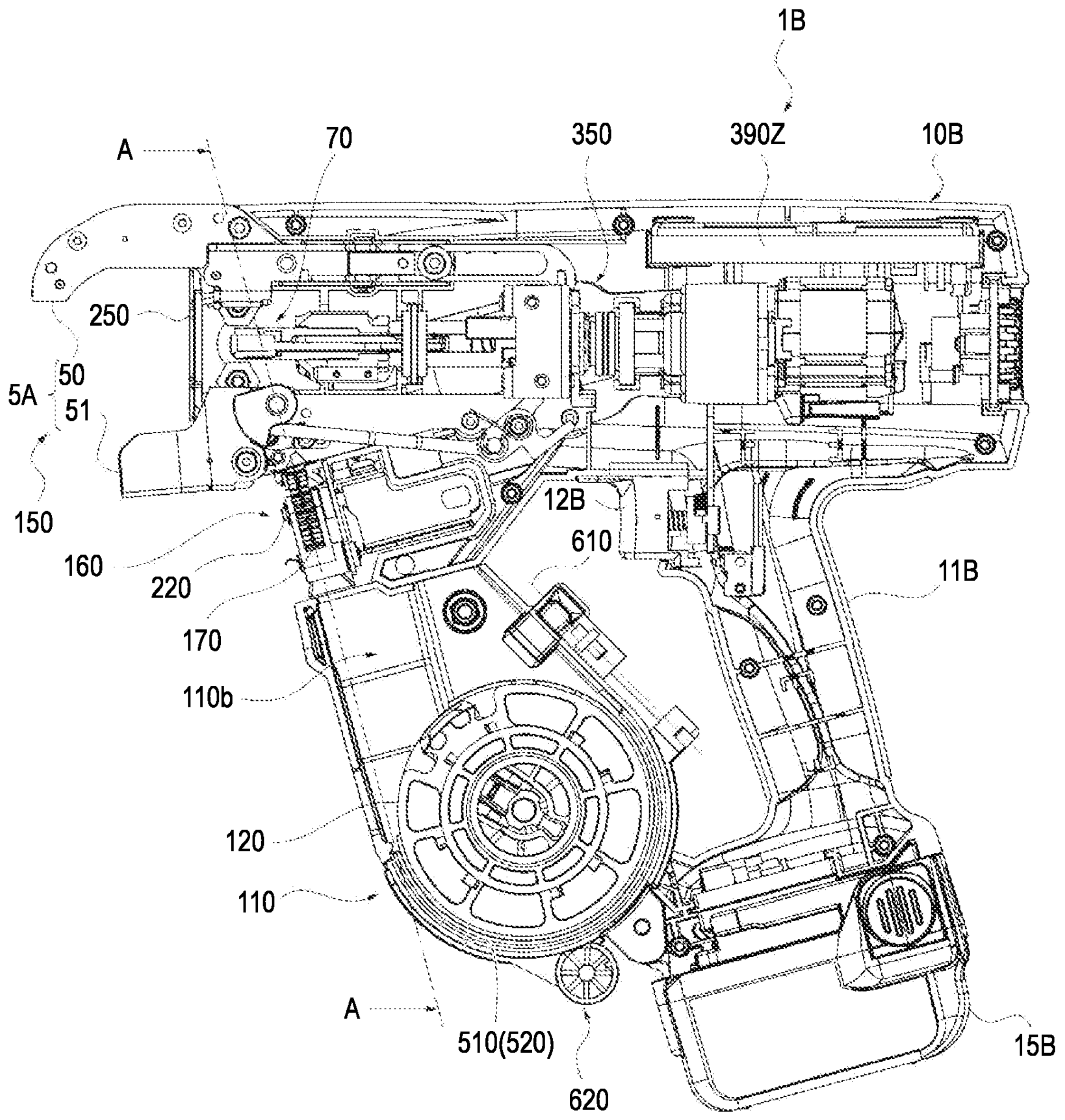
Figure 94C:
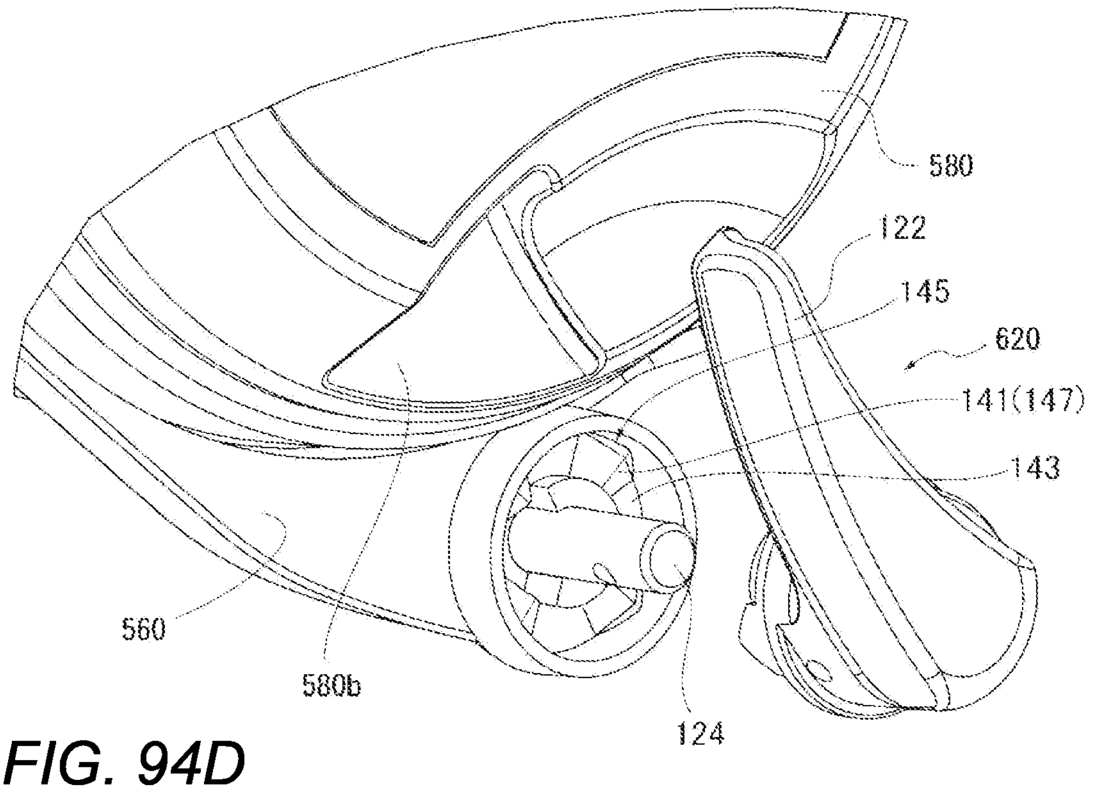

FIG. 94C is a partially enlarged perspective view of FIG. 84.

Figure 94D:
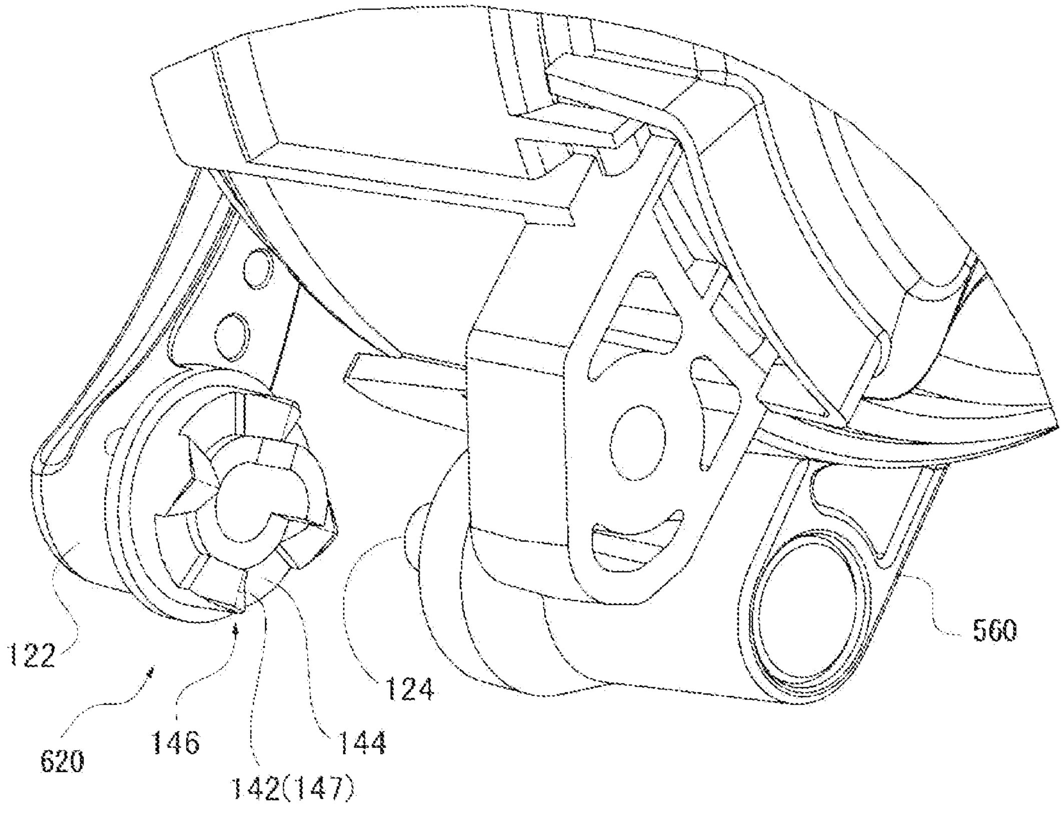

FIG. 94D is a partially enlarged perspective view of FIG. 84 as viewed from the opposite side.

Figure 94E:
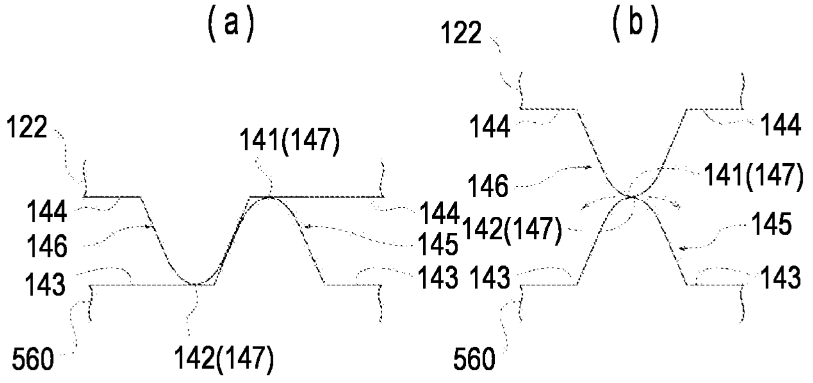

FIG. 94E is an enlarged view of a guide portion of a lock lever including a stop position restricting portion.

Figure 94F:
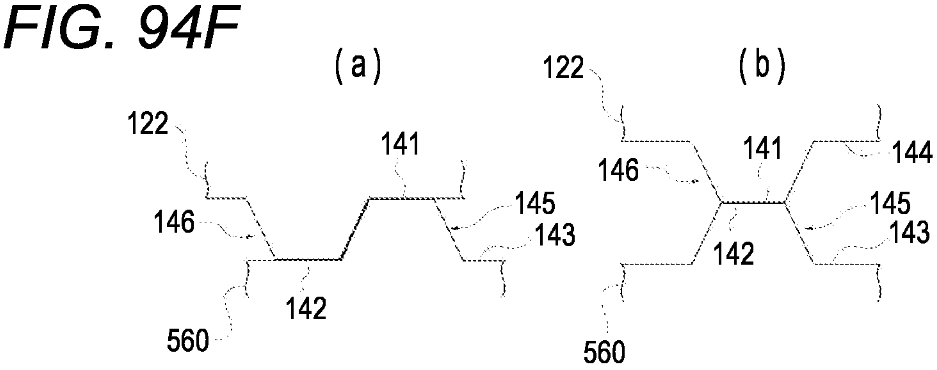

FIG. 94F is an enlarged view of a guide portion of a lock lever not including a stop position restricting portion.

Figure 95:
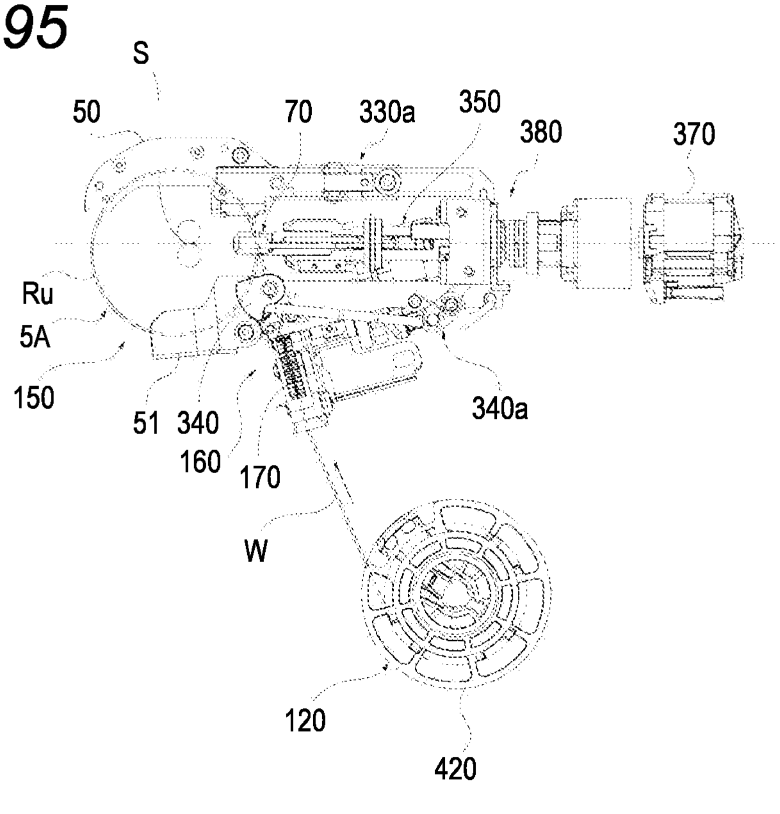

FIG. 95 illustrates a wire feeding process, and a front view illustrating a part of the housing unit which is broken.

Figure 87:
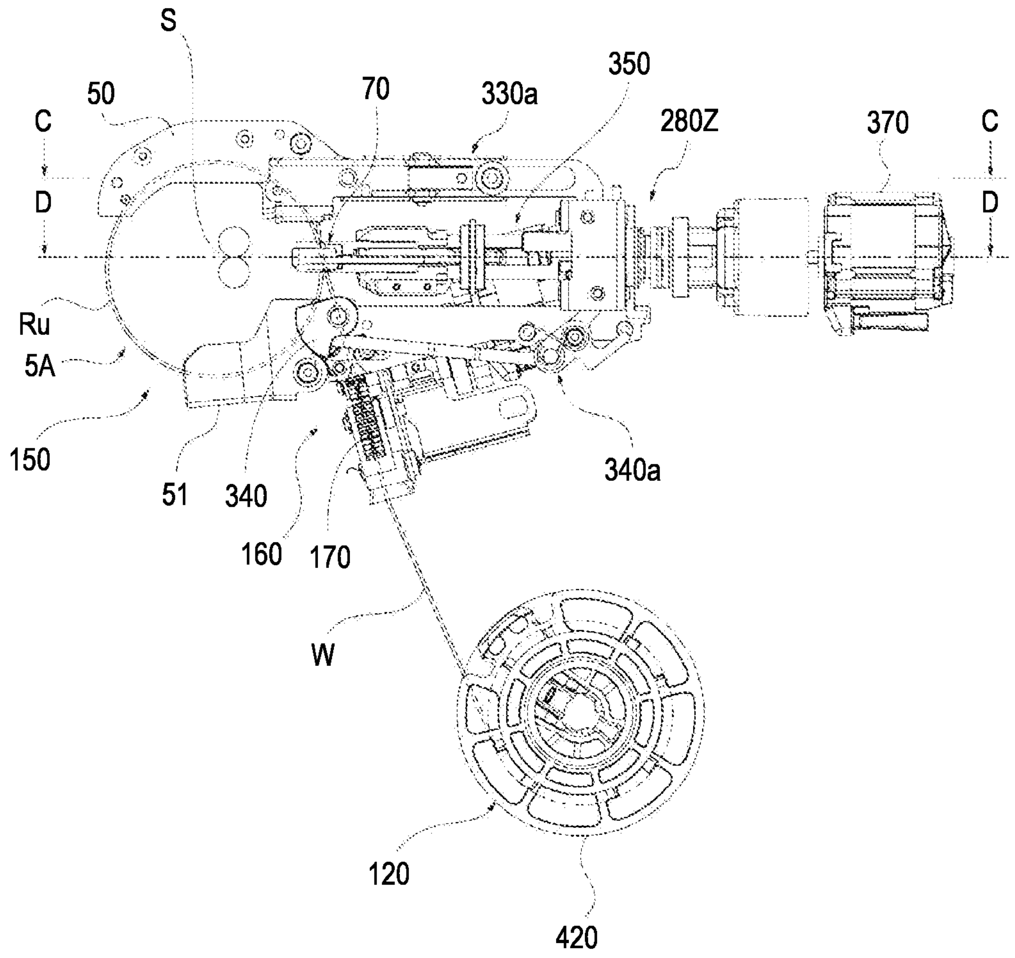
Figure 88:
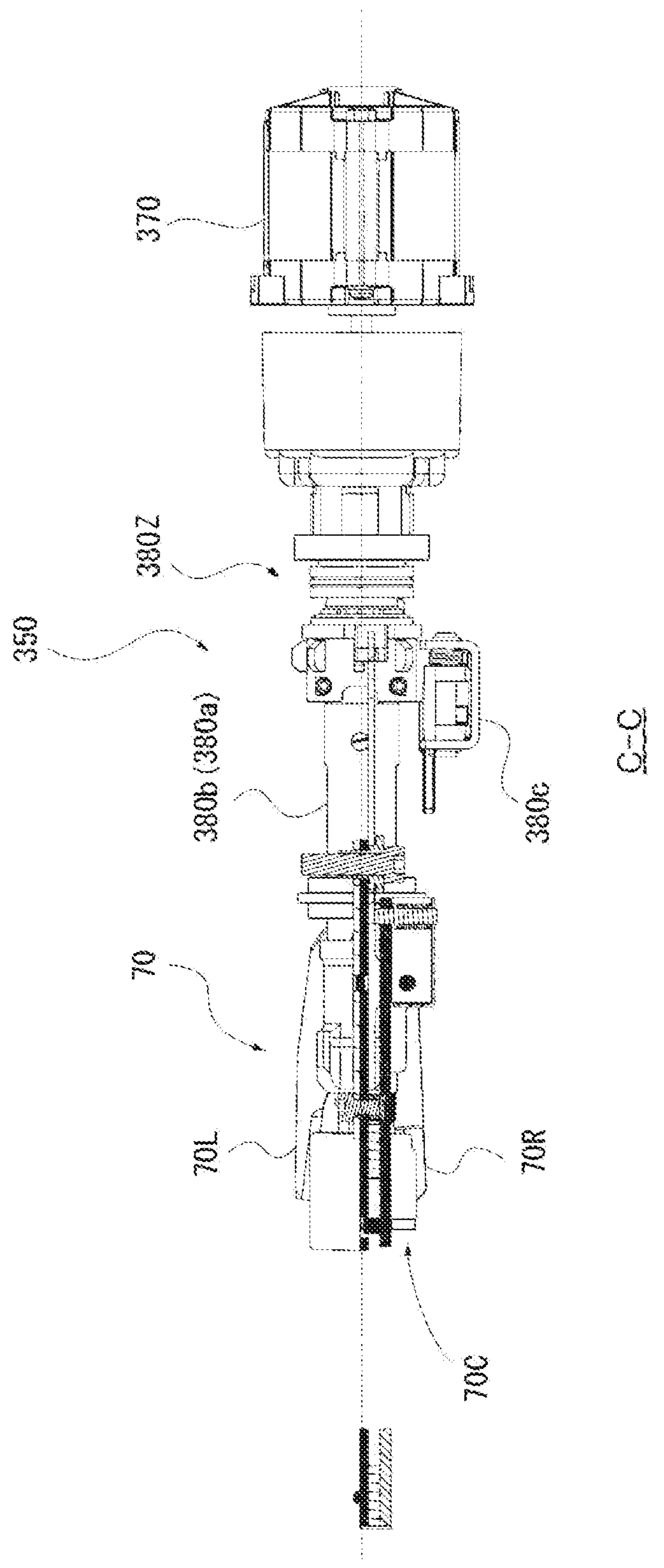
Figure 96:
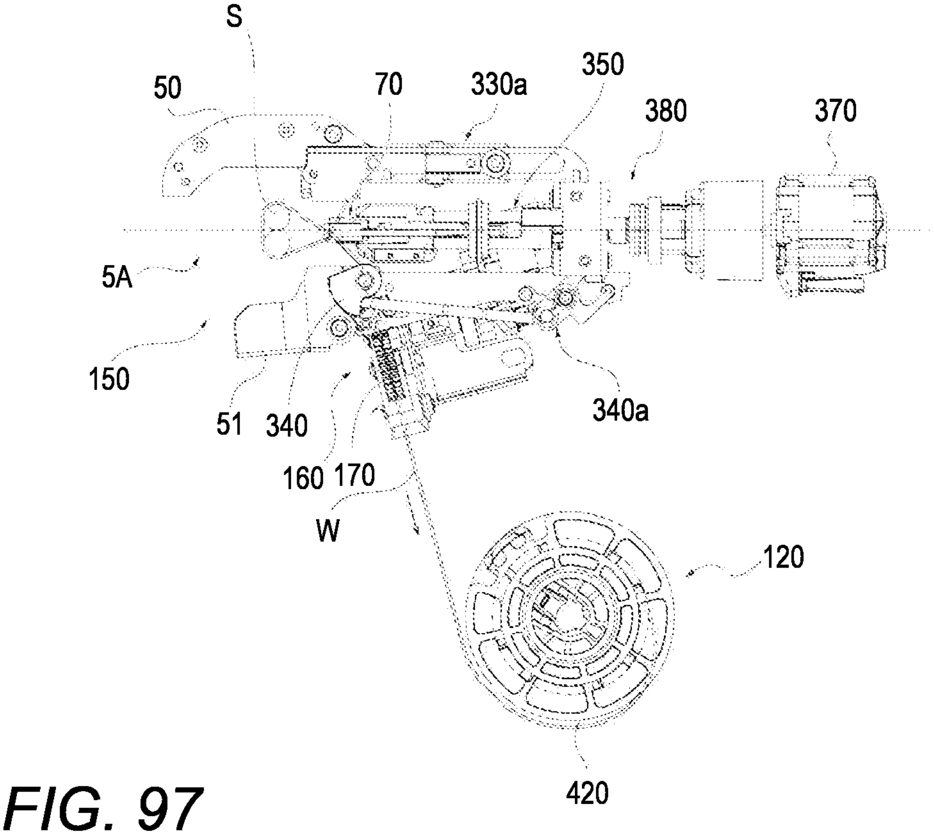

FIG. 96 illustrates a wire returning process, and a side view of a twisted portion or the like similar to FIG. 87.

Figure 97:
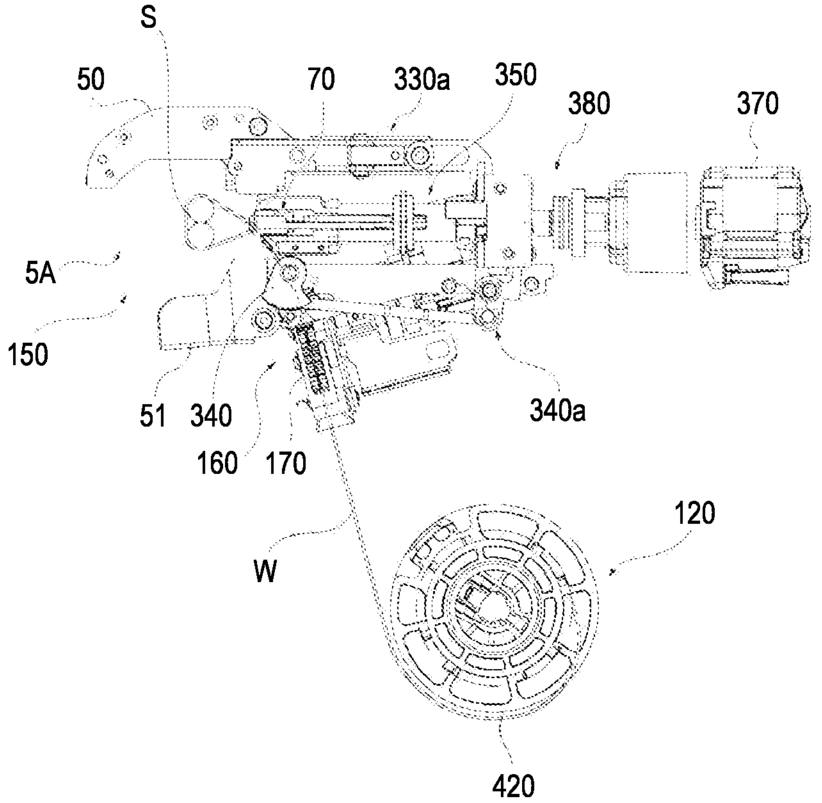

FIG. 97 illustrates a wire cutting process, and a side view of the twisted portion or the like similar to FIG. 87.

Figure 98:
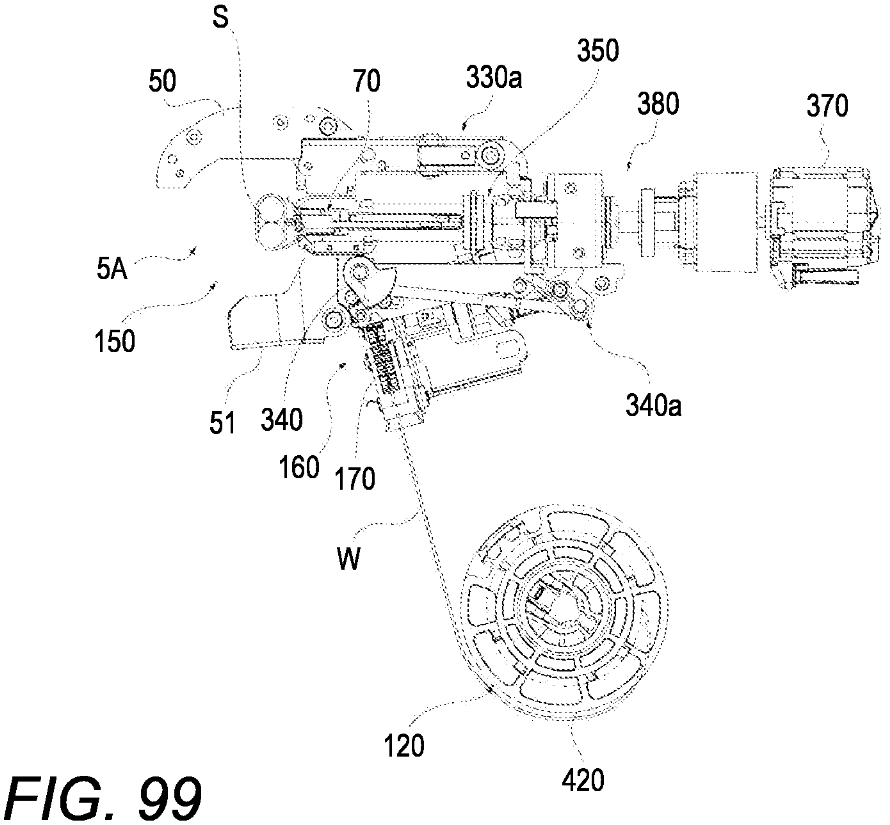

FIG. 98 illustrates a wire twisting process, and a side view of the twisted portion or the like similar to FIG. 87.

Figure 99:
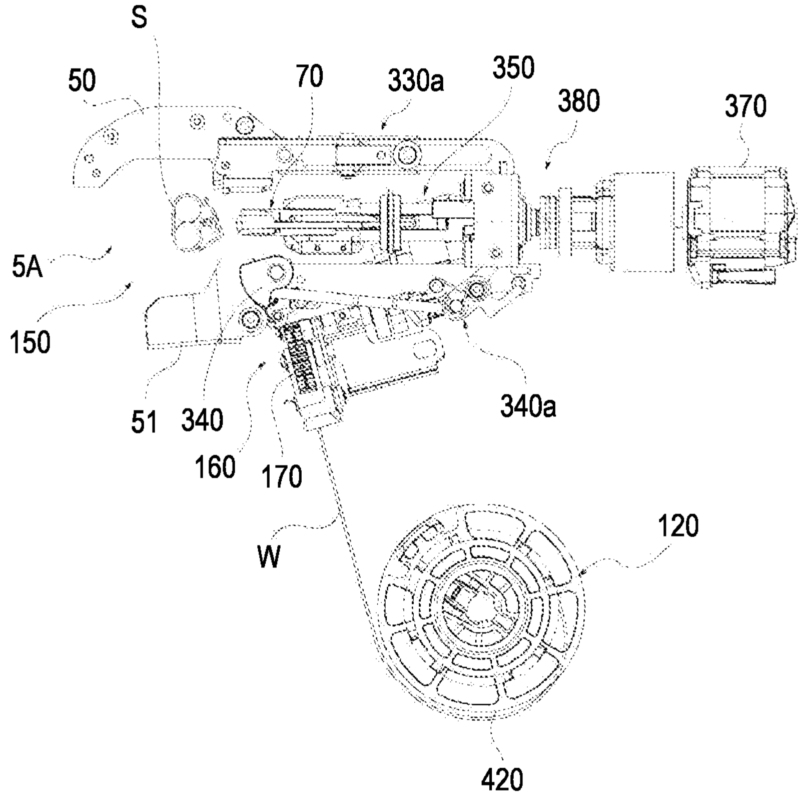

FIG. 99 illustrates a wire releasing process, and a side view of the twisted portion or the like similar to FIG. 87.

Figure 100:
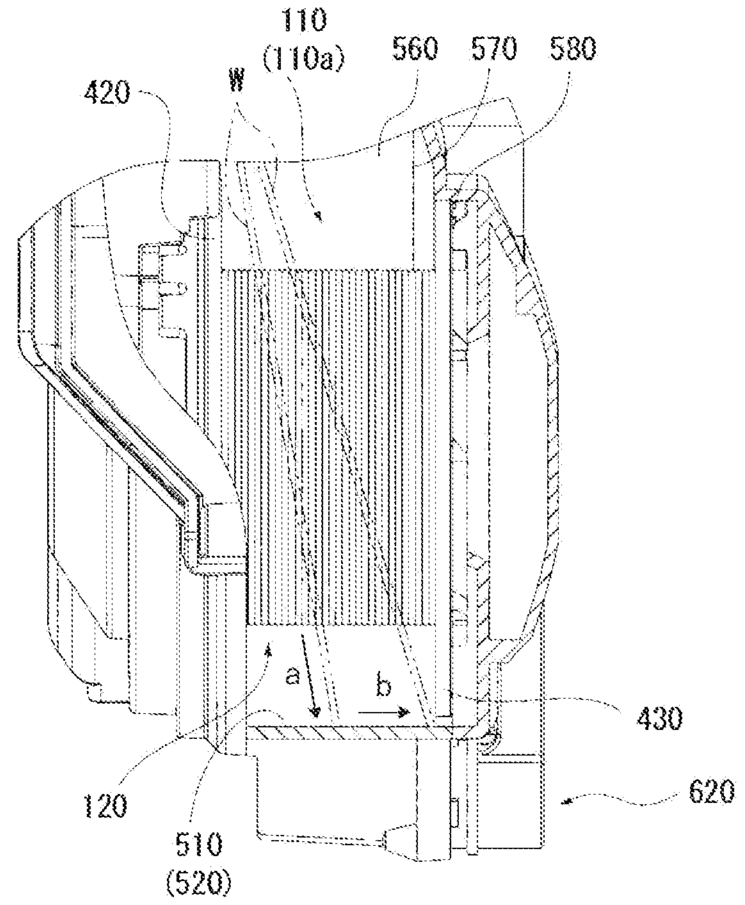

FIG. 100 illustrates a first example of a fault, and a view of a part of the housing unit which is broken.

Figure 101:
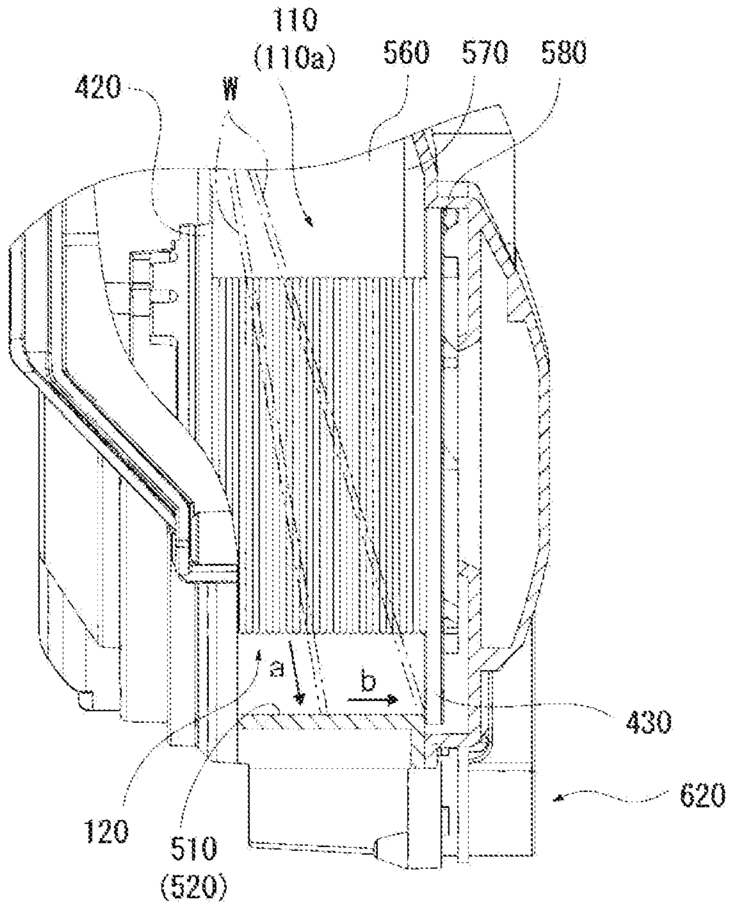

FIG. 101 illustrates a second example of a fault, and a view of a part of the housing unit which is broken.

Figure 102:
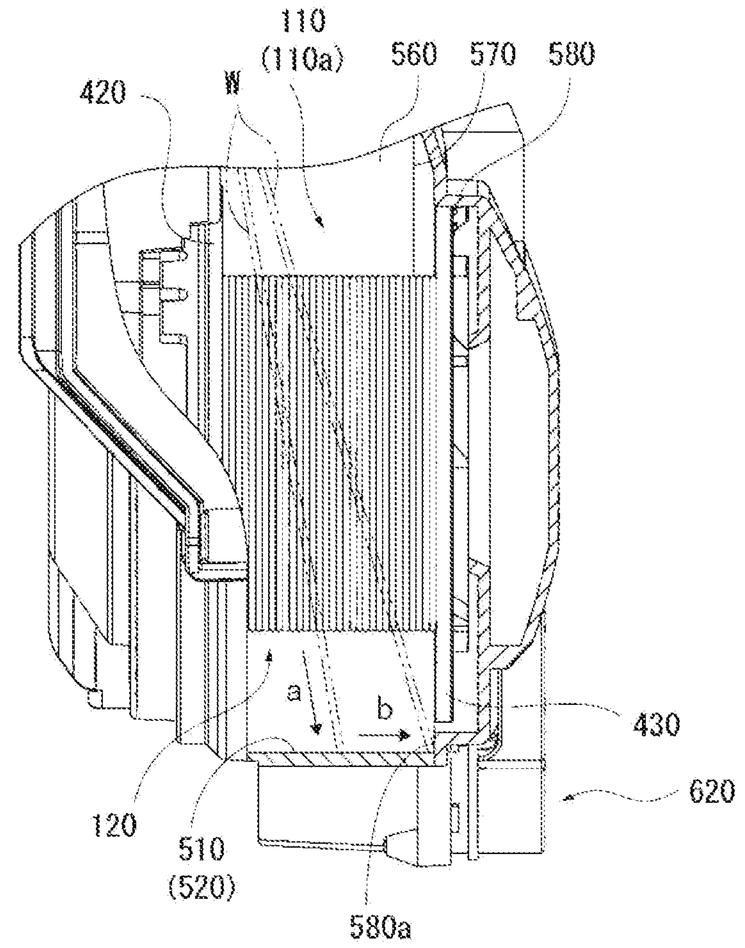

FIG. 102 illustrates a third example of a fault, and a view of a part of the housing unit which is broken.

Figure 103:
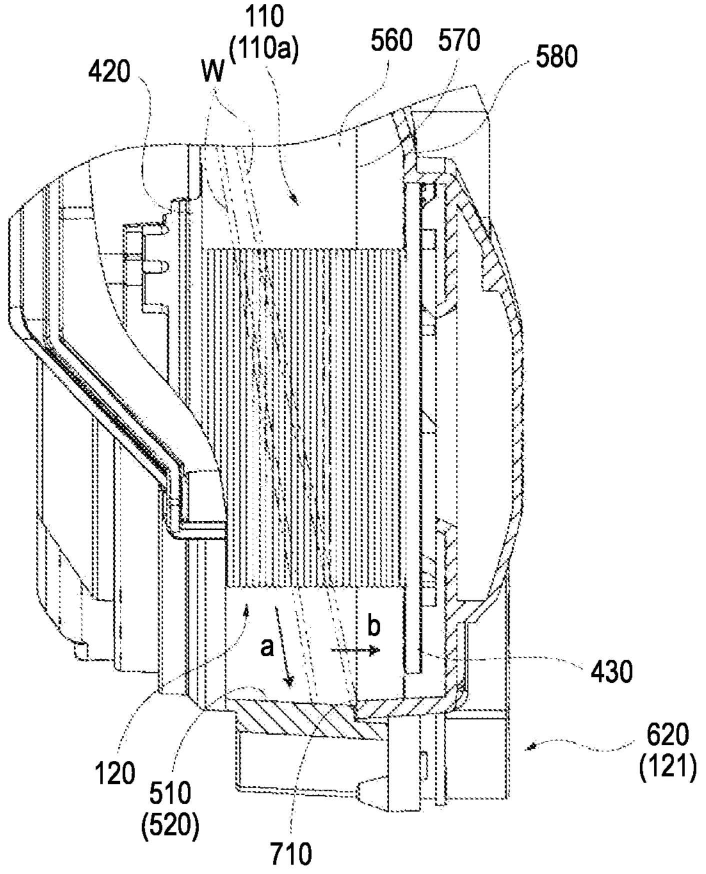

FIG. 103 illustrates a third example of a fault, and a view of a part of the housing unit which is broken.

Figure 104:
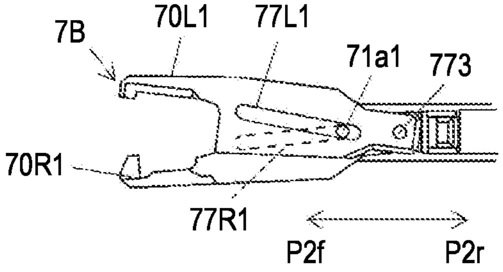

FIG. 104 is a view illustrating an example of a binding unit described in Additional Note 1.

Figure 105:
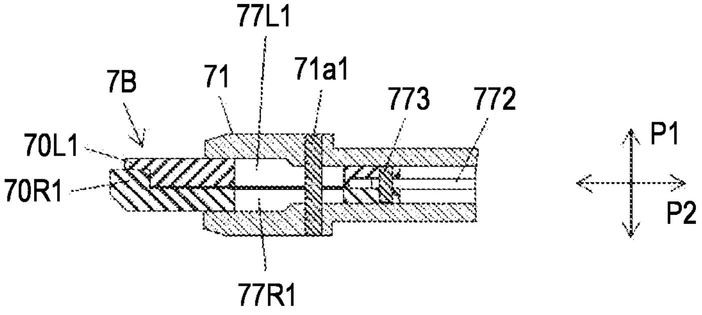

FIG. 105 is a view illustrating an example of a binding unit including a fitting portion described in Additional Note 5.

Figure 106:
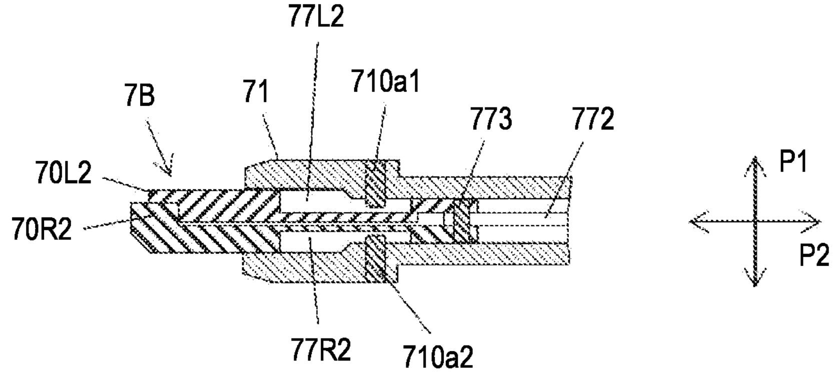

FIG. 106 is a view illustrating an example of a binding unit including a fitting portion described in Additional Note 4.

Figure 107:
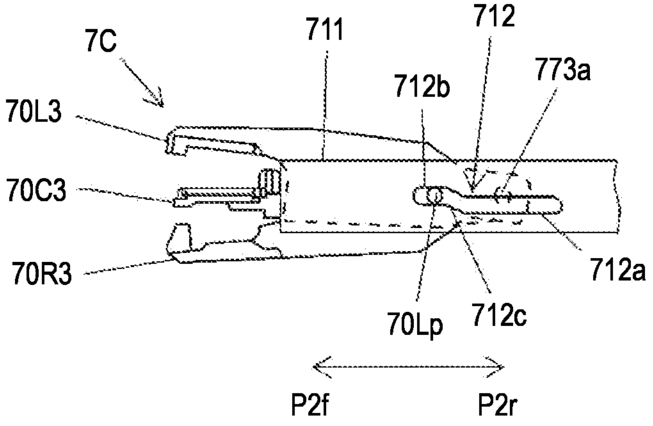

FIG. 107 is a view illustrating an example of a binding unit described in Additional Note 11.

Figure 108:
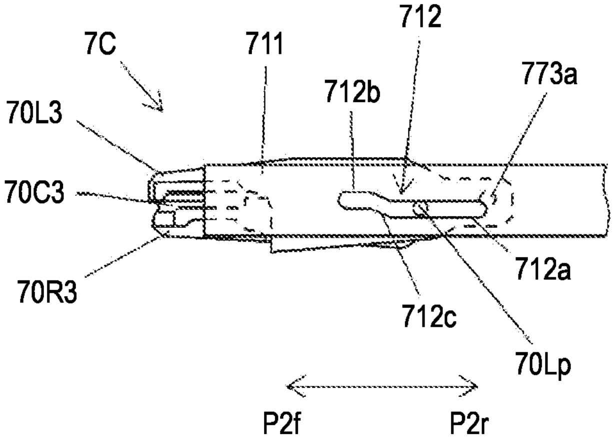

FIG. 108 is a view illustrating an example of the binding unit described in Additional Note 11.

Figure 109:
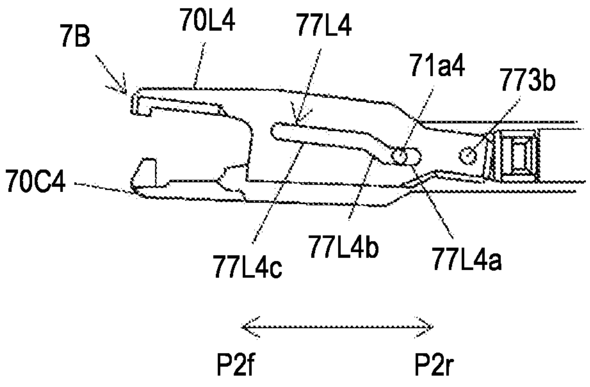

FIG. 109 is a view illustrating an example of a binding unit described in Additional Note 12.

Figure 110:
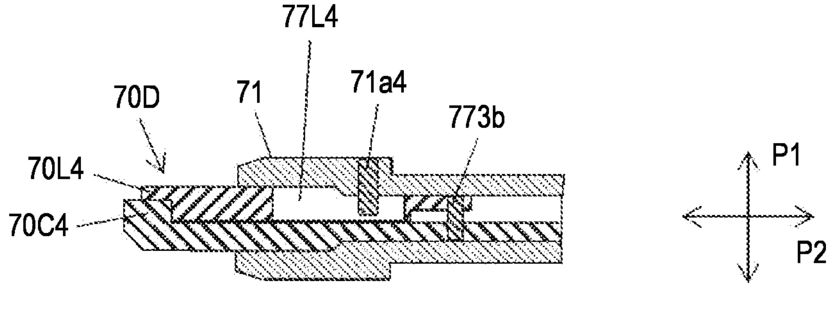

FIG. 110 is a view illustrating an example of the binding unit described in Additional Note 11.

DETAILED DESCRIPTION

Hereinafter, an example of a reinforcing bar binding machine as an embodiment of a binding machine of the present invention will be described with reference to the drawings.

<Example of Configuration of Reinforcing Bar Binding Machine of the Embodiment>

Figure 1:
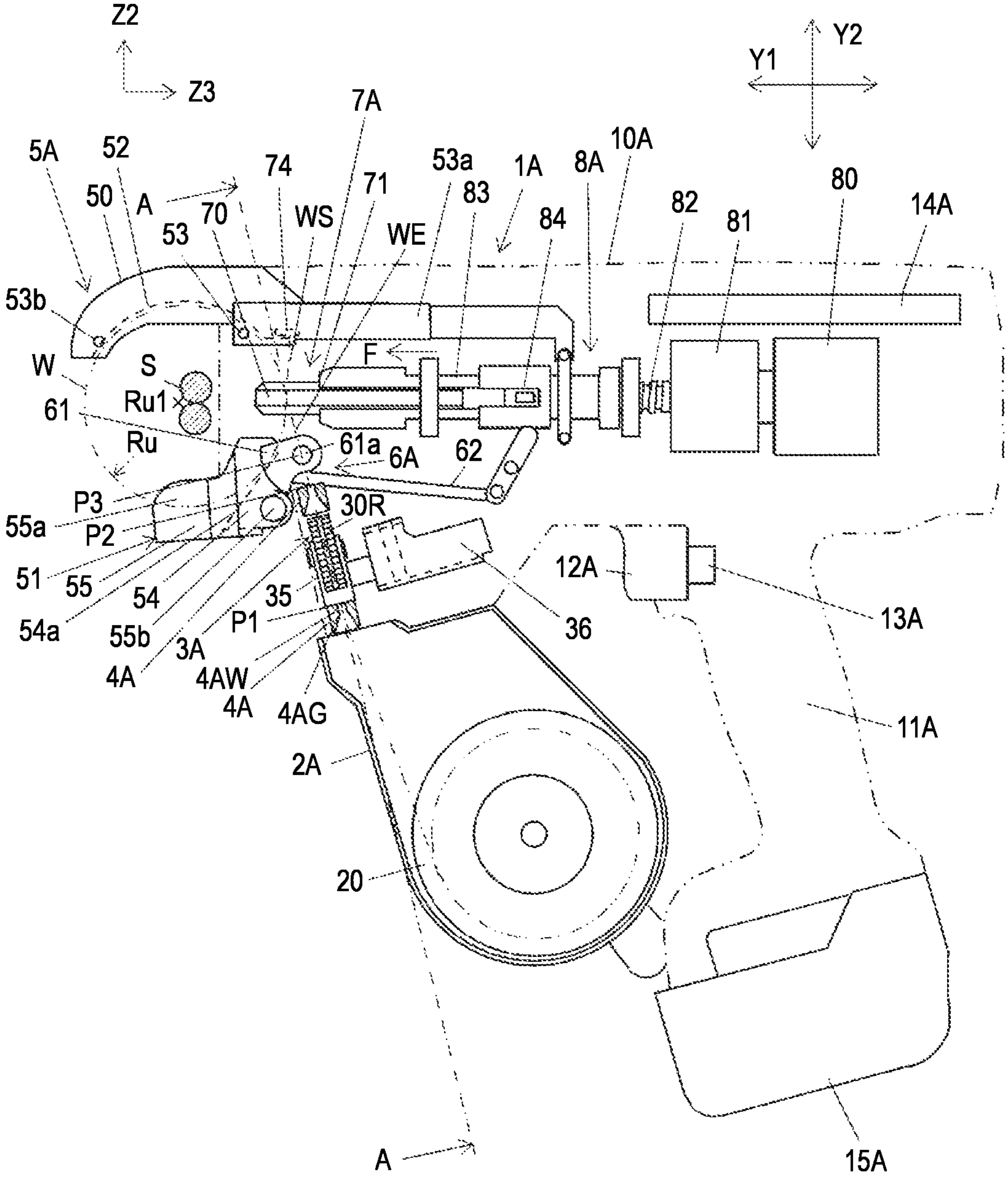
FIG. 1 is a view of an example of an overall configuration of a reinforcing bar binding machine of the present embodiment as viewed from the side.
Figure 2:
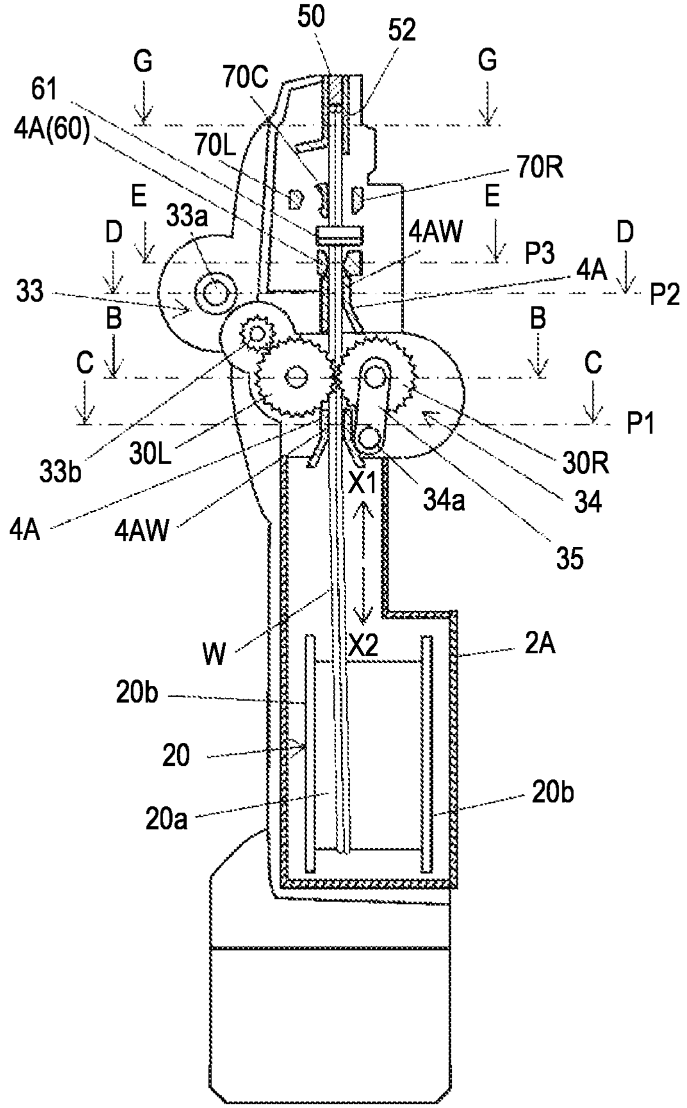
FIG. 2 is a front view illustrating an example of the overall configuration of the reinforcing bar binding machine of the present embodiment as viewed from the front.

FIG. 1 is a view of an example of the overall configuration of a reinforcing bar binding machine according to the present embodiment as seen from a side, and FIG. 2 is a view illustrating an example of the overall configuration of the reinforcing bar binding machine of the present embodiment as seen from a front. Here, FIG. 2 schematically illustrates the internal configuration of the line A-A in FIG. 1.

The reinforcing bar binding machine 1A of the present embodiment binds the reinforcing bar S, which is a binding object, by using two or more wires W having a diameter smaller compared to a conventional wire having a large diameter. In the reinforcing bar binding machine 1A, as will be described later, by the operation of winding the wire W around the reinforcing bar S, the operation of winding the wire W wound around the reinforcing bar S in close contact with the reinforcing bar S, and the operation of twisting the wire wound around the reinforcing bar S, the reinforcing bar S is bound with the wire W. In the reinforcing bar binding machine 1A, since the wire W is bent in any of the operations described above, by using the wire W having a smaller diameter than the conventional wire, the wire is wound on the reinforcing bar S with less force, it is possible to twist the wire W with less force. Further, by using two or more wires, it is possible to secure the binding strength of the reinforcing bar S by the wire W. Further, by arranging two or more wires W to be fed in parallel, the time required for winding the wire W can be shortened compared with the operation of winding the reinforcing bar twice or more with one wire. It should also be noted that winding the wire W around the reinforcing bar S and winding the wire W wound around the reinforcing bar S in close contact with the reinforcing bar S is collectively referred to as winding the wire W. The wire W may be wound in a binding object other than the reinforcing bar S. Here, as the wire W, a single wire or a twisted wire made of a metal that can be plastically deformed is used.

The reinforcing bar binding machine 1A includes a magazine 2A that is a housing unit that houses the wire W, a wire feeding unit 3A that feeds the wire W housed in the magazine 2A, a parallel guide 4A for arranging the wires W fed to the wire feeding unit 3A and the wires W fed out from the wire feeding unit 3A in parallel. The reinforcing bar binding machine 1A further includes a curl guide unit 5A that winds the wires W fed out in parallel around the reinforcing bar S, and a cutting unit 6A that cuts the wire W wound around the reinforcing bar S. Further, the reinforcing bar binding machine 1A includes a binding unit 7A that grips and twists the wire W wound around the reinforcing bar S.

The magazine 2A is an example of a housing unit. In the embodiment, a reel 20 in which two long wires W are wound in a drawable manner is detachably housed in the magazine. The reel 20 is provided with a tubular hub portion 20*a* that can wind the wires W and a pair of flanges 20*b* that are provided at opposite end sides of the hub portion 20*a* in an axial direction. The flanges 20*b* have a larger diameter than the hub portion 20*a*, and protrudes beyond the opposite end sides of the hub portion 20*a* in the axial direction. Two or more wires W, in this example, two wires W are wound around the hub portion 20*a*. In the reinforcing bar binding machine 1A, while the reel 20 housed in the magazine 2A rotates, the two wires W are fed out from the reel 20 through the operation of feeding the two wires W by the wire feeding unit 3A and the operation of feeding the two wires W manually. At this time, the two wires W are wound around the hub portion 20*a* so that the two wires W are fed out without being twisted.

The wire feeding unit 3A is an example of a wire feeding unit constituting a feeding unit and includes a first feed gear 30L and a second feed gear 30R as a pair of feeding members for feeding the parallel wires W, the first feed gear 30L has a spur gear shape which feeds the wire W by a rotation operation, and a second feed gear 30R also has a spur gear shape which sandwiches the wire W with the first feed gear 30L. Although the details of the first feed gear 30L and the second feed gear 30R will be described later, the first feed gear 30L and the second feed gear 30R are in the form of a spur gear in which teeth are formed on the outer peripheral surface of a disk-like member. The first feed gear 30L and the second feed gear 30R are meshed with each other, and the driving force is transmitted from one feed gear to the other feed gear, so that the two wires W can be appropriately fed. Other drive arrangements can be used and the arrangement is not limited to use of a spur gear.

The first feed gear 30L and the second feed gear 30R are each formed of a disk-shaped member. In the wire feeding unit 3A, the first feed gear 30L and the second feed gear 30R are provided so as to sandwich the feed path of the wire W, so that the outer peripheral surfaces of the first feed gear 30L and the second feed gear 30R face each other. The first feed gear 30L and the second feed gear 30R sandwich the two parallel wires W between portions opposing to the outer peripheral surface. The first feed gear 30L and the second feed gear 30R feed two wires W along the extending direction of the wire W in a state where the two wires W are arranged in parallel with each other.

Figure 3:
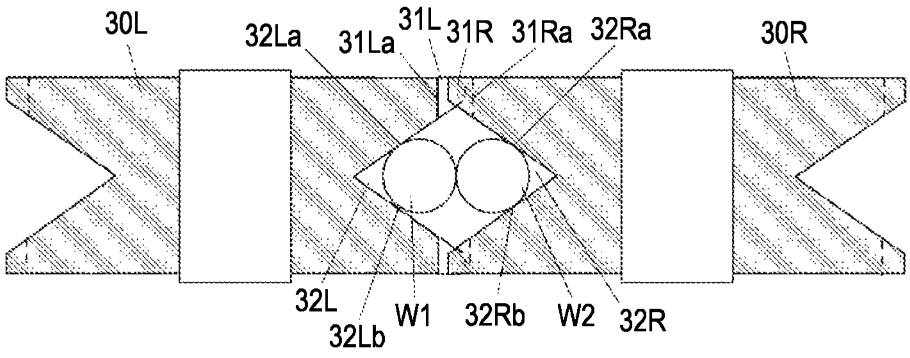
FIG. 3 is a view illustrating an example of a feed gear according to the present embodiment.

FIG. 3 is an assembly or operational view illustrating an example of the feed gear of this embodiment. FIG. 4 is a sectional view taken along the line B-B of FIG. 2. The first feed gear 30L includes a tooth portion 31L on its outer peripheral surface. The second feed gear 30R includes a tooth portion 31R on its outer peripheral surface.

The first feed gear 30L and the second feed gear 30R are arranged in parallel with each other so that the teeth portions 31L and 31R face each other. In other words, the first feed gear 30L and the second feed gear 30R are arranged in parallel in a direction along the axial direction Ru1 of a loop Ru formed by the wire W wound by the curl guide unit 5A, that is, along the axial direction of the virtual circle in which the loop Ru formed by the wire W is regarded as a circle. In the following description, the axial direction Ru1 of the loop Ru formed by the wire W wound by the curl guide unit 5A is also referred to as the axial direction Ru1 of the loop of wire W.

The first feed gear 30L includes a first feed groove 32L on its outer peripheral surface. The second feed gear 30R includes a second feed groove 32R on its outer peripheral surface. The first feed gear 30L and the second feed gear 30R are arranged such that the first feed groove 32L and the second feed groove 32R face each other.

The first feed groove 32L is formed in a V-groove shape on the outer peripheral surface of the first feed gear 30L along the direction of rotation of the first feed gear 30L. The first feed groove 32L has a first inclined surface 32La and a second inclined surface 32Lb forming a V-shaped groove. The first feed groove 32L has a V-shaped cross section so that the first inclined surface 32La and the second inclined surface 32Lb face each other at a predetermined angle.

When the wires W are held between the first feed gear 30L and the second feed gear 30R in parallel, the first feed groove 32L is configured such that one wire among the outermost wires of the wires W arranged in parallel, in this example, a part of the outer peripheral surface of one wire W1 of the two wires W arranged in parallel is in contact with the first inclined surface 32La and the second inclined surface 32Lb.

The second feed groove 32R is formed in a V-groove shape on the outer peripheral surface of the second feed gear 30R along the rotation direction of the second feed gear 30R. The second feed groove 32R has a first inclined surface 32Ra and a second inclined surface 32Rb that form a V-shaped groove. Similarly to the first feed groove 32L, the second feed groove 32R has a V-shaped cross-sectional shape, and the first inclined surface 32Ra and the second inclined surface 32Rb face each other at a predetermined angle. When the wire W is held between the first feed gear 30L and the second feed gear 30R in parallel, the second feed groove 32R is configured such that, the other wire among the outermost wires of the wires W arranged in parallel, in this example, a part of the outer peripheral surface of the other wire W2 of the two wires W arranged in parallel is in contact with the first inclined surface 32Ra and the second inclined surface 32Rb.

When the wire W is pinched between the first feed gear 30L and the second feed gear 30R, the first feed groove 32L is configured with a depth and an angle (between the first inclined surface 32La and the second inclined surface 32Lb) such that a part, on the side facing the second feed gear 30R, of one wire W1 in contact with the first inclined surface 32La and the second inclined surface 32Lb protrudes from the tooth bottom circle 31La of the first feed gear 30L.

When the wire W is pinched between the first feed gear 30L and the second feed gear 30R, the second feed groove 32R is configured with a depth and an angle (between the first inclined surface 32Ra and the second inclined surface 32Rb) such that a part, on the side facing the first feed gear 30L, of the other wire W2 in contact with the first inclined surface 32Ra and the second inclined surface 32Rb protrudes from the tooth bottom circle 31Ra of the second feed gear 30R.

As a result, the two wires W pinched between the first feed gear 30L and the second feed gear 30R are arranged such that one wire W1 is pressed against the first inclined surface 32La and the second inclined surface 32Lb of the first feed groove 32L, and the other wire W2 is pressed against the first inclined surface 32Ra and the second inclined surface 32Rb of the second feeding groove 32R. Then, one wire W1 and the other wire W2 are pressed against each other. Therefore, by rotation of the first feed gear 30L and the second feed gear 30R, the two wires W (one wire W1 and the other wire W2) are simultaneously fed between the first feed gear 30L and the second feed gear 30R while being in contact with each other. In this example, the first feed groove 32L and the second feed groove 32R have a V-shaped cross-sectional shape, but it is not necessarily limited to the V-groove shape, and it may be, for example, a trapezoidal shape or an arcuate shape. Further, in order to transmit the rotation of the first feed gear 30L to the second feed gear 30R, between the first feed gear 30L and the second feed gear 30R, a transmission mechanism including an even number of gears or the like for rotating the first feed gear 30L and the second feed gear 30R in opposite directions to each other may be provided.

The wire feeding unit 3A includes a driving unit 33 for driving the first feed gear 30L and a displacement unit 34 for pressing and separating the second feed gear 30R against the first feed gear 30L.

The driving unit 33 includes a feed motor 33*a* for driving the first feed gear 30L and a transmission mechanism 33*b* including a combination of a gear and the like for transmitting the driving force of the feed motor 33*a* to the first feed gear 30L.

In the first feed gear 30L, the rotation operation of the feed motor 33*a* is transmitted via the transmission mechanism 33*b* and the first feed gear 30L rotates. In the second feed gear 30R, the rotation operation of the first feed gear 30L is transmitted to the tooth portion 31R via the tooth portion 31L and the second feed gear 30R rotates in accordance with the first feed gear 30L.

As a result, by the rotation of the first feed gear 30L and the second feed gear 30R, due to the frictional force generated between the first feed gear 30L and the one wire W1, the friction force generated between the second feed gear 30R and the other wire W2, and the frictional force generated between the one wire W1 and the other wire W2, the two wires W are fed in a state of being arranged in parallel with each other.

By switching the forward and backward directions of the rotation direction of the feed motor 33*a*, the wire feeding unit 3A switches the direction of rotation of the first feed gear 30L and the direction of rotation of the second feed gear 30R, and the forward and reverse of the feeding direction of the wire W are switched.

In the reinforcing bar binding machine 1A, by forward rotation of the first feed gear 30L and the second feed gear 30R in the wire feeding unit 3A, the wire W is fed in the forward direction indicated by the arrow X1, that is, in the direction of the curl guide unit 5A and is wound around the reinforcing bar S at the curl guide unit 5A. Further, after the wire W is wound around the reinforcing bar S, the first feed gear 30L and the second feed gear 30R are reversely rotated, whereby the wire W is fed in the backward direction indicated by the arrow X2, that is, in the direction of the magazine 2A (pulled back). The wire W is wound around the reinforcing bar S and then pulled back, whereby the wire W is brought into close contact with the reinforcing bar S.

FIGS. 4A, 4B, 4C, and 4D are views illustrating an example of the displacement unit of the present embodiment. The displacement unit 34 is an example of a displacement unit, and includes a first displacement member 35 that displaces the second feed gear 30R in a direction in which the second feed gear 30R is brought into close contact and separated with/from the first feed gear 30L in the rotation operation with the shaft 34*a* illustrated in FIG. 2 as a fulcrum and a second displacement member 36 that displaces the first displacement member 35. The second feed gear 30R is pressed in the direction of the first feed gear 30L by a spring 37 that biases the second displacement member 36 that is displaced by a rotational operation with the shaft 36*a* as a fulcrum. Thus, in this example, the two wires W are held between the first feed groove 32L of the first feed gear 30L and the second feed groove 32R of the second feed gear 30R. Further, the tooth portion 31L of the first feed gear 30L and the tooth portion 31R of the second feed gear 30R mesh with each other. Here, in the relationship between the first displacement member 35 and the second displacement member 36, by displacing the second displacement member 36 to bring the first displacement member 35 into a free state, the second feed gear 30R can be separated from the first feed gear 30L. However, the first displacement member 35 and the second displacement member 36 may be interlocked with each other.

The displacement unit 34 includes an operation button 38 for pressing the second displacement member 36 and a release lever 39 for locking and unlocking the operation button 38. The operation button 38 is an example of an operation member, protrudes outward from the main body 10A, and is supported so as to be movable in directions indicated by arrows T1 and T2.

The operation button 38 has a first locking recess 38*a* and a second locking recess 38*b*. The release lever 39 is locked to the first locking recess 38*a* at a wire feed position where the wire W can be fed by the first feed gear 30L and the second feed gear 30R. The release lever 39 is locked to the second locking recess 38*b* at a wire loading position where the wire W can be loaded by separating the first feed gear 30L and the second feed gear 30R.

The release lever 39 is an example of a release member and is supported so as to be movable in directions indicated by arrows U1 and U2 intersecting the movement direction of the operation button 38. The release lever 39 includes a locking protrusion 39*a* to be locked to the first locking recess 38*a* and the second locking recess 38*b* of the operation button 38.

Figure 4A:
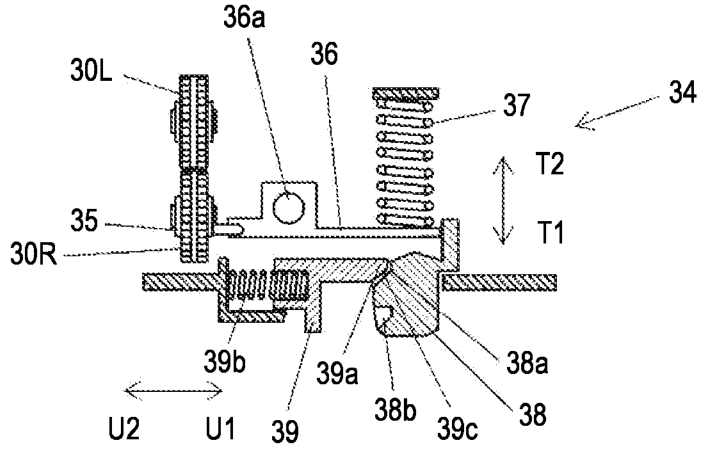
FIG. 4A is a view illustrating an example of a displacement unit of the present embodiment.
Figure 4B:
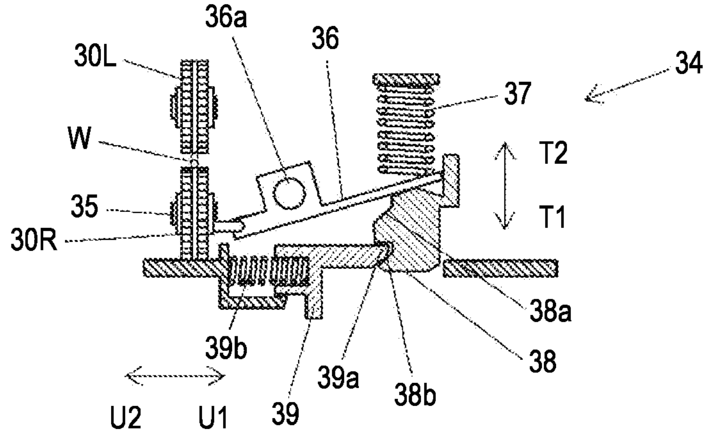
FIG. 4B is a view illustrating an example of a displacement unit of the present embodiment.

The release lever 39 is biased by a spring 39*b* in the direction of the arrow U1 approaching the operation button 38 and is locked such that the locking protrusion 39*a* enters the first locking recess 38*a* of the operation button 38 in the wire feed position shown in FIG. 4A, or the locking protrusion 39*a* enters the second locking recess 38*b* of the operation button 38 in the wire loading position shown in FIG. 4B.

A guide slope 39*c* along the movement direction of the operation button 38 is formed on the locking protrusion 39*a*. In the release lever 39, the guide slope 39*c* is pushed by the operation in which the operation button 38 at the wire feed position is pushed in the direction of the arrow T2, and the locking protrusion 39*a* disengages from the first locking recess 38*a*, whereby the release lever 39 is displaced in a direction of the arrow U2.

The displacement unit 34 includes the second displacement member 36 in a direction substantially orthogonal to the feeding direction of the wire W fed by the first feed gear 30L and the second feed gear 30R in the wire feeding unit 3A, behind the first feed gear 30L and the second feed gear 30R, that is, on the side of the handle unit 11A with respect to the wire feeding unit 3A in the main body 10A. Also, the operation button 38 and the release lever 39 are provided behind the first feed gear 30L and the second feed gear 30R, that is, on the handle unit 11A side with respect to the wire feeding unit 3A in the main body 10A.

Displacement Unit

As illustrated in FIG. 4A, when the operation button 38 is in the wire feed position, the locking protrusion 39*a* of the release lever 39 is locked to the first locking recess 38*a* of the operation button 38, and the operation button 38 is held at the wire feed position.

As illustrated in FIG. 4A, in the displacement unit 34, when the operation button 38 is in the wire feed position, the second displacement member 36 is pressed by the spring 37, and the second displacement member 36 rotates about the shaft 36*a* as a fulcrum, and is displaced in a direction where the second feed gear 30R presses against the first feed gear 30L.

As illustrated in FIG. 4B, in the displacement unit 34, when the operation button 38 is in the wire loading position, the locking protrusion 39*a* of the release lever 39 is locked to the second locking recess 38*b* of the operation button 38 and the operation button 38 is held at the wire loading position.

As illustrated in FIG. 4B, in the displacement unit 34, when the operation button 38 is in the wire loading position, the second displacement member 36 is pressed by the operation button 38 and the second displacement member 36 displaces the second feed gear 30R in a direction away from the first feed gear 30L with the shaft 36*a* as a fulcrum.

Figure 5A:
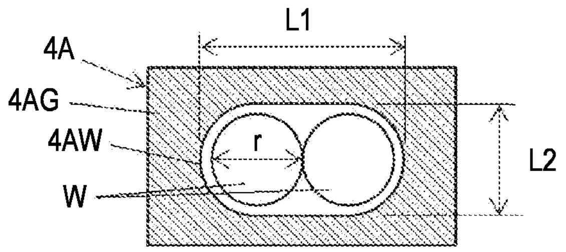
FIG. 5A is a view illustrating an example of a parallel guide of the present embodiment.
Figure 5B:
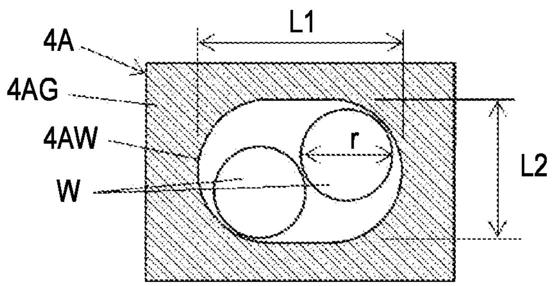
FIG. 5B is a view illustrating an example of a parallel guide of the present embodiment.
Figure 5C:
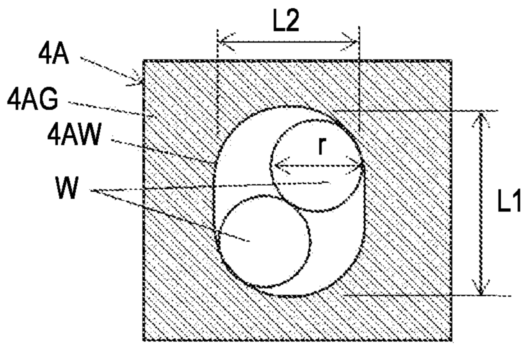
FIG. 5C is a view illustrating an example of a parallel guide of the present embodiment.
Figure 5D:
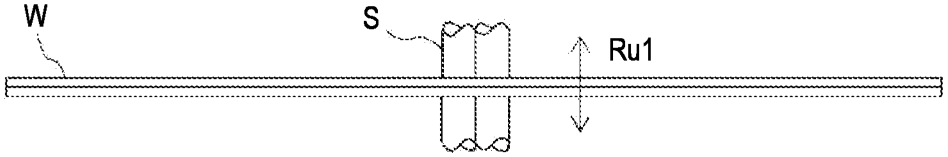
FIG. 5D is a view illustrating an example of parallel wires.
Figure 5E:
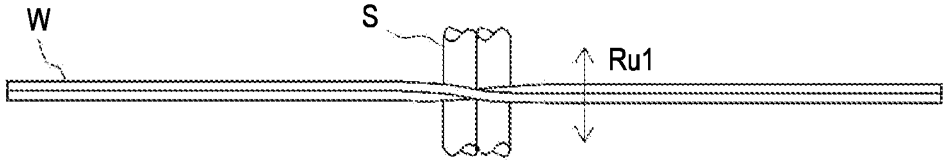
FIG. 5E is a view illustrating an example of intersecting twisted wires.

FIGS. 5A, 5B, and 5C are views illustrating an example of a parallel guide according to the present embodiment. Here, FIGS. 5A, 5B, and 5C are cross-sectional views taken along a line C-C of FIG. 2 and show the cross sectional shape of the parallel guide 4A provided at the introduction position P1. Further, the cross-sectional view taken along a line D-D of FIG. 2 illustrating the sectional shape of the parallel guide 4A provided at the intermediate position P2, and the cross-sectional view taken along a line E-E of FIG. 2 illustrating the sectional shape of the parallel guide 4A provided at the cutting discharge position P3 show the same shape. Further, FIG. 5D is a view illustrating an example of parallel wires, and FIG. 5E is a view illustrating an example of twisted wires intersecting each other.

The parallel guide 4A restricts the direction of a plurality of (two or more) wires W that have been sent. Two or more wires W enter and the parallel guide 4A feeds the two or more wires W in parallel. In the parallel guide 4A, two or more wires are arranged in parallel along the feed direction, and are offset from one another in a direction orthogonal to the feeding direction of the wire W, with the guide limiting relative movement of the wires with respect to each other, and the guide can also control the relative positions of the wires. Specifically, preferably the two or more wires W are arranged so that the direction an axis of one wire is offset from the axis of the other wire is in parallel with the axial direction Ru1 of the loop-like wire W wound around the reinforcing bar S by the curl guide unit 5A. The parallel guide 4A has a wire restricting unit (for example, an opening 4AW described later) that restricts the directions of the two or more wires W and makes or maintains them in parallel. In this example, the parallel guide 4A has a guide main body 4AG, and the guide main body 4AG is formed with an opening 4AW which is the wire restricting unit for passing (inserting) a plurality of wires W. The opening 4AW penetrates the guide main body 4AG along the feeding direction of the wire W. When the plurality of wires W pass through the opening 4AW and after passing through the opening 4AW, the orientation thereof is determined so that the plurality of wires W are arranged in parallel (that is, the axes of the plurality of wires W are offset in a direction (radial direction) orthogonal to the feeding direction of the wire W (axial direction) and the axis of each of the plurality of wires W is substantially parallel to each other in the feed direction). Therefore, the plurality of wires W that have passed through the parallel guide 4A go out from the parallel guide 4A in a state of being arranged in parallel. In this way, the parallel guide 4A restricts the direction in which the two wires W are aligned in the radial direction so that the two wires W are arranged in parallel. Therefore, in the opening 4AW, one direction orthogonal to the feeding direction of the wire W is longer than the other direction which is orthogonal to the feeding direction of the wire W orthogonal to the one direction. The opening 4AW has a longitudinal direction (in which two or more wires W can be juxtaposed) disposed along a direction orthogonal to the feeding direction of the wire W, more specifically, along the axial direction Ru1 of the loop of wire W formed by the curl guide unit 5A. As a result, two or more wires W inserted through the opening 4AW are fed in parallel in a direction orthogonal to the feeding direction of the wire W, that is, in the axial direction of the loop of wire W. Therefore, the pinching portion controls a direction of movement of the two or more wires.

In the following description, when describing the shape of the opening 4AW, a cross-sectional shape in a direction orthogonal to the feeding direction of the wire W will be described. The cross-sectional shape in the direction along the feeding direction of the wire W will be described in each case.

For example, when the opening 4AW (the cross section thereof) is a circle having a diameter equal to or more than twice of the diameter of the wire W, or the length of one side is substantially a square which is twice or more the diameter of the wire W, the two wires W passing through the opening 4AW are in a state where they can freely move in the radial direction.

If the two wires W passing through the opening 4AW can freely move in the radial direction within the opening 4AW, the direction in which the two wires W are arranged in the radial direction cannot be restricted, whereby the two wires W coming out from the opening 4AW might not be in parallel, and could become twisted or interfere with each other.

In view of this, the opening 4AW is formed such that the length in the one direction, that is, the length L1 in the longitudinal direction is set to be slightly (n) times longer than the diameter r of the wire W in the form in which the plurality (n) of wires W are arranged along the radial direction, and the length in the other direction, that is, the length L2 in the lateral direction is set to be slightly (n) times longer than the diameter r of one wire W. In the present example, the opening 4AW has a length L1 in the longitudinal direction slightly twice longer than a diameter r of the wires W, and a length L2 in the lateral direction slightly longer than a diameter r of one wire W. In the present embodiment, the parallel guide 4A is configured such that the longitudinal direction of the opening 4AW is linear and the lateral direction is arcuate, but the configuration is not limited thereto.

In the example illustrated in FIG. 5A, the length L2 in the lateral direction of the parallel guide 4A is set to a length slightly longer than the diameter r of one wire W as a preferable length. However, since it is sufficient that the wire W exits from the opening 4AW in a parallel state without intersecting or being twisted, in the configuration in which the longitudinal direction of the parallel guide 4A is oriented along the axial direction Ru1 of the loop of the wire W wound around the reinforcing bar S at the curl guide unit 5A, the length L2 of the parallel guide 4A in the lateral direction, as illustrated in FIG. 5B, may be within a range from a length slightly longer than the diameter r of one wire W to a length slightly shorter than the diameter r of two wires W.

Further, in the configuration in which the longitudinal direction (or larger dimension) of the parallel guide 4A is oriented in a direction orthogonal to the axial direction Ru1 of the loop of the wire W wound around the reinforcing bar S as illustrated in FIG. 5C, the length L2 in the lateral direction (or shorter dimension) of the parallel guide 4A may be within a range from a length slightly longer than the diameter r of one wire W to a length shorter than the diameter r of two wires W.

In the parallel guide 4A, the longitudinal direction of the opening 4AW is oriented along a direction orthogonal to the feeding direction of the wire W, in this example, along the axial direction Ru1 of the loop of the wire W wound around the reinforcing bar S in the curl guide unit 5A.

As a result, the parallel guide 4A can pass two wires in parallel along the axial direction Ru1 of the loop of the wire W.

In the parallel guide 4A, when the length L2 in the lateral direction of the opening 4AW is shorter than twice the diameter r of the wire W and slightly longer than the diameter r of the wire W, even if the length L1 in the longitudinal direction of the opening 4AW is sufficiently twice or more times longer than the diameter r of the wire W, it is possible to feed or maintain the wires Win parallel.

However, the longer the length L2 in the lateral direction (for example, the length close to twice the diameter r of the wire W) and the longer the length L1 in the longitudinal direction, the wire W can further freely move in the opening 4AW and relative to each other. Then, the respective axes of the two wires W are not maintained in parallel in the opening 4AW, and there is a high possibility that the wires W are twisted, intersect or interfere each other after passing through the opening 4AW.

Therefore, it is preferable that the longitudinal length L1 of the opening 4AW is slightly longer than twice the diameter r of the wire W, and the length L2 in the lateral direction is also slightly longer than the diameter r of the wire W so that the two wires W are arranged in parallel along the feed direction and relative movement between the wires is limited in the radial direction.

The parallel guide 4A is provided at predetermined positions on the upstream side and the downstream side of the first feed gear 30L and the second feed gear 30R (the wire feeding unit 3A) with respect to the feeding direction for feeding the wire W in the forward direction. By providing the parallel guide 4A on the upstream side of the first feed gear 30L and the second feed gear 30R, the two wires W in a parallel state enter the wire feeding unit 3A. Therefore, the wire feeding unit 3A can feed the wire W appropriately (in parallel). Furthermore, by providing the parallel guide 4A also on the downstream side of the first feed gear 30L and the second feed gear 30R, while maintaining the parallel state of the two wires W sent from the wire feeding unit 3A, the wire W can be further sent to the downstream side.

The parallel guides 4A provided on the upstream side of the first feed gear 30L and the second feed gear 30R are provided at the introduction position P1 between the first feed gear 30L and the second feed gear 30R and the magazine 2A such that the wires W fed to the wire feeding unit 3A are arranged in parallel in a predetermined direction.

One of the parallel guides 4A provided on the downstream side of the first feed gear 30L and the second feed gear 30R is provided at the intermediate position P2 between the first feed gear 30L and the second feed gear 30R and the cutting unit 6A such that the wires W fed to the cutting unit 6A are arranged in parallel in the predetermined direction.

Further, the other one of the parallel guides 4A provided on the downstream side of the first feed gear 30L and the second feed gear 30R is provided at the cutting discharge position P3 where the cutting unit 6A is disposed such that the wires W fed to the curl guide unit 5A are arranged in parallel in the predetermined direction.

The parallel guide 4A provided at the introduction position P1 has the above-described shape in which at least the downstream side of the opening 4AW restricts the radial direction of the wire W with respect to the feeding direction of the wire W sent in the forward direction. On the other hand, the opening area of the side facing the magazine 2A (the wire introducing unit), which is the upstream side of the opening 4AW with respect to the feeding direction of the wire W sent in the forward direction, has a larger opening area than the downstream side. Specifically, the opening 4AW has a tube-shaped hole portion that restricts the direction of the wire W and a conical (funnel-shaped, tapered) hole portion in which an opening area gradually increases from the upstream side end of the tube-shaped hole portion to the inlet portion of the opening 4AW as the wire introducing portion. By making the opening area of the wire introducing portion the largest and gradually reducing the opening area therefrom, it is easy to allow the wire W to enter the parallel guide 4. Therefore, the work of introducing the wire W into the opening 4AW can be performed easily.

The other parallel guide 4A also has the same configuration, and the downstream opening 4AW with respect to the feeding direction of the wire W sent in the forward direction has the above-described shape that restricts the direction of the wire W in the radial direction. Further, with regard to the other parallel guide 4, the opening area of the opening on the upstream side with respect to the feeding direction of the wire W sent in the forward direction may be made larger than the opening area of the opening on the downstream side.

The parallel guide 4A provided at the introduction position P1, the parallel guide 4A provided at the intermediate position P2, and the parallel guide 4A provided at the cutting discharge position P3 are arranged such that the longitudinal direction of the opening 4AW orthogonal to the feeding direction of the wire W is in the direction along the axial direction Ru1 of the loop formed by the wire W wound around the reinforcing bar S.

As a result, as illustrated in FIG. 5D, the two wires W sent by the first feed gear 30L and the second feed gear 30R are sent while maintaining a state of being arranged in parallel in the axial direction Ru1 of the loop of the wire W wound around the reinforcing bar S, and, as illustrated in FIG. 5E, the two wires W are prevented from intersecting and being twisted during feeding.

In the present example, the opening 4AW is a tube-shaped hole having a predetermined depth (a predetermined distance or depth from the inlet to the outlet of the opening 4AW) from the inlet to the outlet of the opening 4AW (in the feeding direction of the wire W), but the shape of the opening 4AW is not limited to this. For example, the opening 4AW may be a planar hole having almost no depth with which the plate-like guide main body 4AG is opened. Further, the opening 4AW may be a groove-shaped guide (for example, a U-shaped guide groove with an opened upper portion) instead of the hole portion penetrating through the guide main body 4AG. Furthermore, in the present example, the opening area of the inlet portion of the opening 4AW as the wire introducing portion is made larger than the other portion, but it need not necessarily be larger than the other portion. The shape of the opening 4AW is not limited to a specific shape as long as the plurality of wires that have passed through the opening 4AW and come out of the parallel guide 4A are in a parallel state.

Hitherto, an example in which the parallel guide 4A is provided at the upstream side (introduction position P1) and a predetermined position (intermediate position P2 and cutting discharge position P3) on the downstream side of the first feed gear 30L and the second feed gear 30R is described. However, the position where the parallel guide 4A is installed is not necessarily limited to these three positions. That is, the parallel guide 4A may be installed only in the introduction position P1, only in the intermediate position P2, or only in the cutting discharge position P3, and only in the introduction position P1 and the intermediate position P2, only in the introduction position P1 and the cutting discharge position P3, or only in the intermediate position P2 and the cutting discharge position P3. Further, four or more parallel guides 4A may be provided at any position between the introduction position P1 and the curl guide unit 5A on the downstream side of the cutting position P3. The introduction position P1 also includes the inside of the magazine 2A. That is, the parallel guide 4A may be arranged in the vicinity of the outlet from which the wire W is drawn inside the magazine 2A.

The curl guide unit 5A forms a feeding unit and forms a conveying path for winding the two wires W around the reinforcing bars S in a loop shape. The curl guide unit 5A includes a first guide unit 50 for curling the wire W sent by the first feed gear 30L and the second feed gear 30R and a second guide unit 51 for guiding the wire W fed from the first guide unit 50 to the binding unit 7A.

Figure 6:
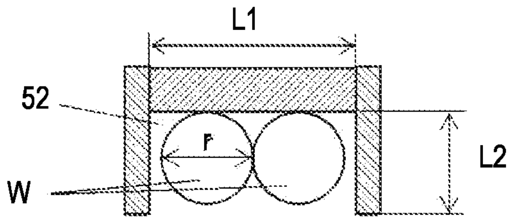
FIG. 6 is a view illustrating an example of a guide groove of the present embodiment.

The first guide unit 50 includes guide grooves 52 constituting a feed path of the wire W and guide pins 53 and 53*b* as a guide member for curling the wire W in cooperation with the guide groove 52. FIG. 6 is a view illustrating an example of the guide groove of the present embodiment. Here, FIG. 6 is a sectional view taken along the line G-G of FIG. 2.

The guide groove 52 forms a guide unit and restricts a direction in the radial direction of the wire W orthogonal to the feeding direction of the wire W together with the parallel guide 4A. Therefore, in this example, the guide groove 52 is configured by an opening with a long shape in which one direction orthogonal to the feeding direction of the wire W is longer than the other direction orthogonal to the feeding direction of the wire W similarly and orthogonal to the one direction.

The guide groove 52 has a longitudinal length L1, that is, a length in a width direction of the groove that is slightly twice or more times longer than the diameter r of one wire W in a form in which the wires W are arranged along the radial direction and a lateral length L2 slightly longer than the diameter r of one wire W. In the present embodiment, the length L1 in the longitudinal direction is slightly twice longer than the diameter r of the wire W. In the guide groove 52, the longitudinal direction of the opening is arranged in the direction along the axial direction Ru1 of the loop of the wire W. It should be noted that the guide groove 52 may not necessarily have the function of restricting the direction of the wire W in the radial direction. In that case, the dimension (length) in the longitudinal direction and in the lateral direction of the guide groove 52 is not limited to the above-described size.

The guide pin 53 is provided on the side of the introducing portion of the wire W that is fed by the first feed gear 30L and the second feed gear 30R in the first guide unit 50 and is arranged inside the loop Ru formed by the wire Win the radial direction with respect to the feed path of the wire W by the guide groove 52. The guide pin 53 restricts the feed path of the wire W so that the wire W fed along the guide groove 52 does not enter the inside of the loop Ru formed by the wire Win the radial direction.

The guide pin 53*b* is provided on the side of the discharge portion of the wire W which is fed by the first feed gear 30L and the second feed gear 30R in the first guide unit 50 and is arranged on the outer side in the radial direction of the loop Ru formed by the wire W with respect to the feed path of the wire W by the guide groove 52.

In the wire W sent by the first feed gear 30L and the second feed gear 30R, the radial position of the loop Ru formed by the wire W is restricted at least at three points including two points on the outer side in the radial direction of the loop Ru formed by the wire W and at least one point on the inner side between the two points, so that the wire W is curled.

In this example, the radially outer position of the loop Ru formed by the wire W is restricted at two points of the parallel guide 4A at the cutting discharge position P3 provided on the upstream side of the guide pin 53 with respect to the feeding direction of the wire W sent in the forward direction and the guide pin 53*b* provided on the downstream side of the guide pin 53. Further, the radially inner position of the loop Ru formed by the wire W is restricted by the guide pin 53.

The curl guide unit 5A includes a retreat mechanism 53*a* for allowing the guide pin 53 to retreat from a path through which the wire W moves by an operation of winding the wire W around the reinforcing bar S. After the wire W is wound around the reinforcing bar S, the retreat mechanism 53*a* is displaced in conjunction with the operation of the binding unit 7A, and retreats the guide pin 53 from the path where the wire W moves before the timing of winding the wire W around the reinforcing bar S.

The second guide unit 51 includes a fixed guide unit 54 as a third guide unit for restricting the radial position of the loop Ru (movement of the wire W in the radial direction of the loop Ru) formed by the wire W wound around the reinforcing bar S and a movable guide unit 55 serving as a fourth guide unit for restricting the position along the axial direction Ru1 of the loop Ru formed by the wire W wound around the reinforcing bar S (movement of the wire W in the axial direction Ru1 of the loop Ru).

Figure 7:
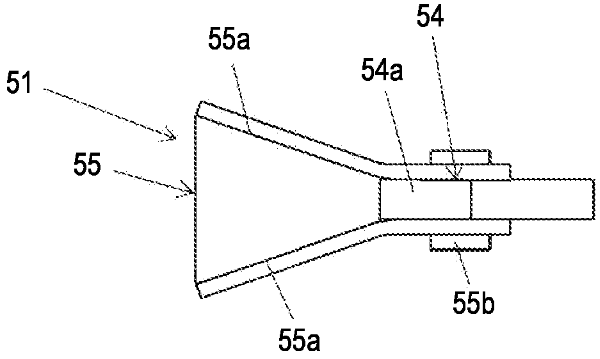
FIG. 7 is a view illustrating an example of a second guide unit of the present embodiment.
Figure 8A:
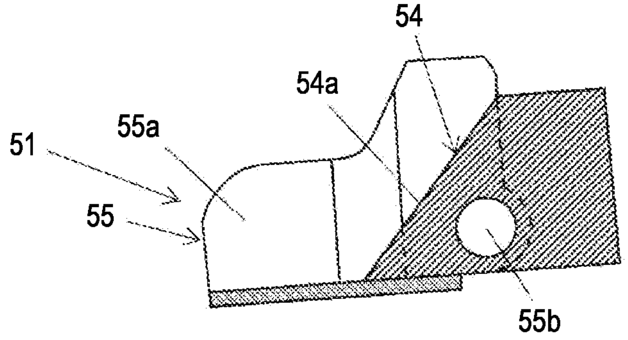
FIG. 8A is a view illustrating an example of a second guide unit of the present embodiment.
Figure 8B:
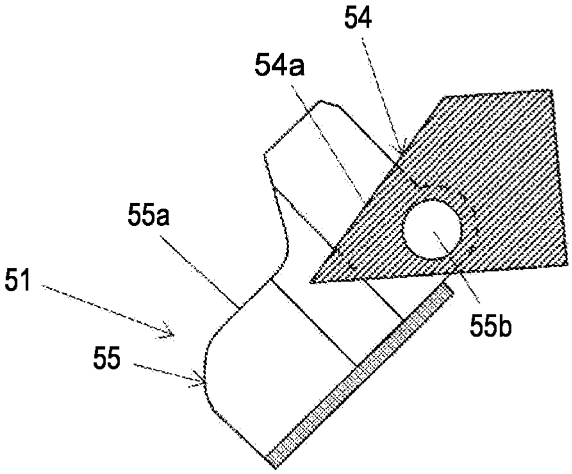
FIG. 8B is a view illustrating an example of a second guide unit of the present embodiment.
Figure 9A:
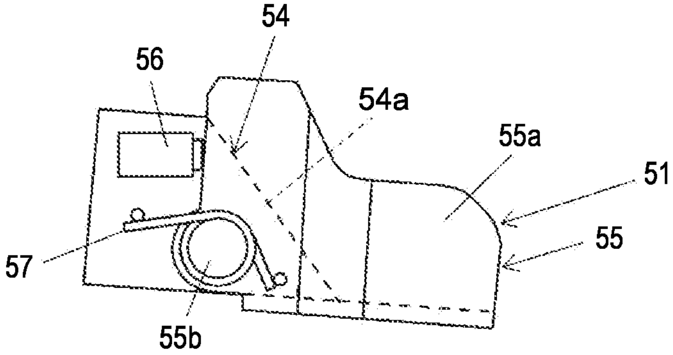
FIG. 9A is a view illustrating an example of a second guide unit of the present embodiment.
Figure 9B:
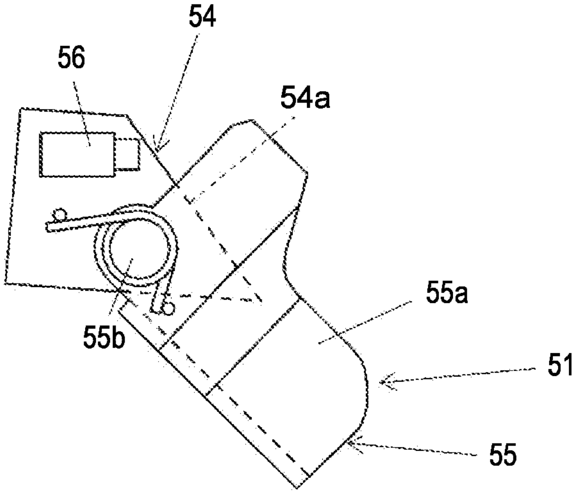
FIG. 9B is a view illustrating an example of a second guide unit of the present embodiment.

FIGS. 7, 8A, 8B, 9A, and 9B are views illustrating an example of a second guide unit, FIG. 7 is a plan view of the second guide unit 51 as viewed from above, FIGS. 8A and 8B are side views of the second guide unit 51 as viewed from one side, and FIGS. 9A and 9B are side views of the second guide unit 51 as viewed from the other side.

The fixed guide unit 54 is provided with a wall surface 54*a* as a surface extending along the feeding direction of the wire W on the outer side in the radial direction of the loop Ru formed by the wire W wound around the reinforcing bar S. When the wire W is wound around the reinforcing bar S, the wall surface 54*a* of the fixed guide unit 54 restricts the radial position of the loop Ru formed by the wire W wound around the reinforcing bar S. The fixed guide unit 54 is fixed to the main body 10A of the reinforcing bar binding machine 1A, and the position thereof is fixed with respect to the first guide unit 50. The fixed guide unit 54 may be integrally formed with the main body 10A. In addition, in the configuration in which the fixed guide unit 54, which is a separate component, is attached to the main body 10A, the fixed guide unit 54 is not perfectly fixed to the main body 10A, but in the operation of forming the loop Ru may be movable to such an extent that movement of the wire W can be restricted.

The movable guide unit 55 is provided on the distal end side of the second guide unit 51 and includes a wall surface 55*a* that is provided on both sides along the axial direction Ru1 of the loop Ru formed by the wire W wound around the reinforcing bar S and is erected inward in the radial direction of the loop Ru from the wall surface 54*a*. When the wire W is wound around the reinforcing bar S, the movable guide unit 55 restricts the position along the axial direction Ru1 of the loop Ru formed by the wire W wound around the reinforcing bar S using the wall surface 55*a*. The wall surface 55*a* of the movable guide unit 55 has a tapered shape in which the gap of the wall surfaces 55*a* is spread at the tip side where the wire W sent from the first guide unit 50 enters and narrows toward the fixed guide unit 54*b*. As a result, the position of the wire W sent from the first guide unit 50 in the axial direction Rut of the loop Ru formed by the wire W wound around the reinforcing bar S is restricted by the wall surface 55*a* of the movable guide unit 55, and guided to the fixed guide unit 54 by the movable guide unit 55.

The movable guide unit 55 is supported on the fixed guide unit 54 by a shaft 55*b* on the side opposite to the tip side into which the wire W sent from the first guide unit 50 enters. In the movable guide unit 55, the distal end side thereof into which the wire W fed from the first guide unit 50 enters is opened and closed in the direction to come into contact with and separate from the first guide unit 50 by the rotation operation of the loop Ru formed by the wire W wound around the reinforcing bar S along the axial direction Ru1 with the shaft 55*b* as a fulcrum.

In the reinforcing bar binding machine, when binding the reinforcing bar S, between a pair of guide members provided for winding the wire W around the reinforcing bar S, in this example, between the first guide unit 50 and the second guide unit 51, a reinforcing bar is inserted (set) and then the binding work is performed. When the binding work is completed, in order to perform the next binding work, the first guide unit 50 and the second guide unit 51 are pulled out from the reinforcing bar S after the completion of the binding. In the case of pulling out the first guide unit 50 and the second guide unit 51 from the reinforcing bar S, if the reinforcing bar binding machine 1A is moved in the direction of the arrow Z3 (see FIG. 1) which is one direction separating from the reinforcing bar S, the reinforcing bar S can be pulled out from the first guide unit 50 and the second guide unit 51 without any problem. However, for example, when the reinforcing bar S is arranged at a predetermined interval along the arrow Y2 and these reinforcing bars S are sequentially bound, moving the reinforcing bar binding machine 1A in the direction of the arrow Z3 every time of binding is troublesome, and if it can be moved in the direction of arrow Z2, the binding work can be performed quickly. However, in the conventional reinforcing bar binding machine disclosed in, for example, Japanese Patent No. 4747456, since the guide member corresponding to the second guide member 51 in the present example is fixed to the binding machine body, when trying to move the reinforcing bar binding machine in the direction of the arrow Z2, the guide member is caught on the reinforcing bar S. Therefore, in the reinforcing bar binding machine 1A, the second guide unit 51 (the movable guide unit 55) is made movable as described above and the reinforcing bar binding machine 1A is moved in the direction of the arrow Z2 so that the reinforcing bar S can be pulled out from between the first guide unit 50 and the second guide unit 51.

Therefore, the movable guide unit 55 rotates about the shaft 55*b* as a fulcrum, and thus opened and closed between a guide position at which the wire W sent out from the first guide unit 50 can be guided to the second guide unit 51 and a retreat position at which the reinforcing bar binding machine 1A moves in the direction of the arrow Z2 and then is retreated in the operation of pulling out the reinforcing bar binding machine 1A from the reinforcing bar S.

The movable guide unit 55 is urged in a direction in which the distance between the tip side of the first guide unit 50 and the tip side of the second guide unit 51 is reduced by the urging unit (biasing unit) such as a torsion coil spring 57, and is held in the guide position illustrated in FIGS. 8A and 9A by the force of the torsion coil spring 57. In addition, when the movable guide unit 55 is pushed to the reinforcing bar S by the operation of pulling out the reinforcing bar binding machine 1A from the reinforcing bar S, the movable guide unit 55 is opened from the guide position to the retreat position illustrated in FIGS. 8B and 9B. The guide position is a position where the wall surface 55*a* of the movable guide unit 55 exists at a position where the wire W forming the loop Ru passes. The retreat position is a position at which at which the reinforcing bar S presses the movable guide unit 55 by the movement of the reinforcing bar binding machine 1A, and the reinforcing bar S can be pulled out from between the first guide unit 50 and the second guide unit 51. Here, the direction in which the reinforcing bar binding machine 1A is moved is not uniform, and even if the movable guide unit 55 slightly moves from the guide position, the reinforcing bar S can be pulled out from between the first guide unit 50 and the second guide unit 51, and thus a position slightly moved from the guide position is also included in the retreat position.

The reinforcing bar binding machine 1A includes a guide opening/closing sensor 56 that detects opening and closing of the movable guide unit 55. The guide opening/closing sensor 56 detects the closed state and the open state of the movable guide unit 55, and outputs a predetermined detection signal.

The cutting unit 6A includes a fixed blade unit 60, a rotary blade unit 61 for cutting the wire W in cooperation with the fixed blade unit 60, and a transmission mechanism 62 which transmits the operation of the binding unit 7A, in this example, the operation of a movable member 83 (to be described later) moving in a liner direction to the rotary blade unit 61 and rotates the rotary blade unit 61. The fixed blade unit 60 is configured by providing an edge portion capable of cutting the wire W in the opening through which the wire W passes. In the present example, the fixed blade unit 60 includes a parallel guide 4A arranged at the cutting discharge position P3.

The rotary blade unit 61 cuts the wire W passing through the parallel guide 4A of the fixed blade unit 60 by the rotation operation with the shaft 61*a* as a fulcrum. The transmission mechanism 62 is displaced in conjunction with the operation of the binding unit 7A, and after the wire W is wound around the reinforcing bar S, the rotary blade unit 61 is rotated according to the timing of twisting the wire W to cut the wire W.

Figure 10:
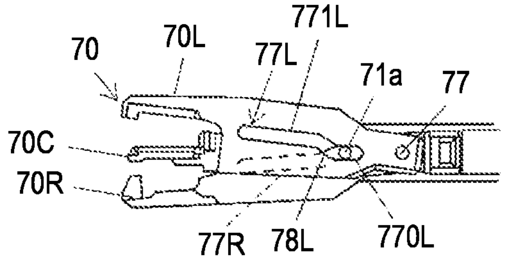
FIG. 10 is a view of a gripping portion according to the present embodiment.
Figure 11:
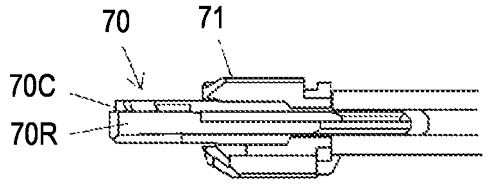
FIG. 11 is a view of a gripping portion according to the present embodiment.
Figure 12:
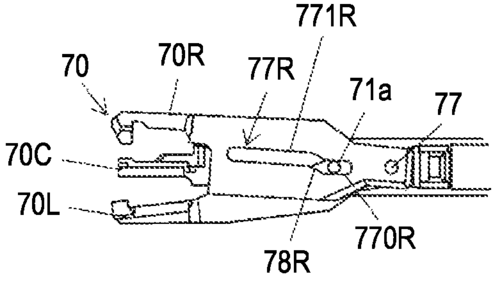
FIG. 12 is a view of a gripping portion according to the present embodiment.
Figure 13A:
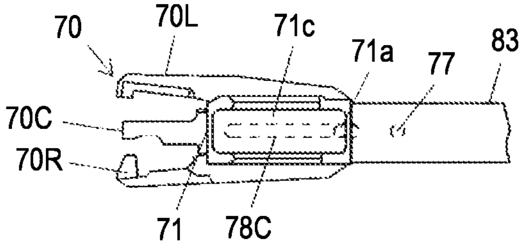
FIG. 13A is a view of a gripping portion according to the present embodiment.
Figure 13B:
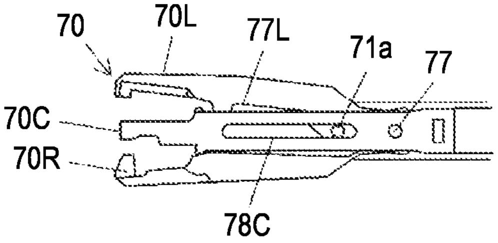
FIG. 13B is a view of a gripping portion according to the present embodiment.
Figure 14:
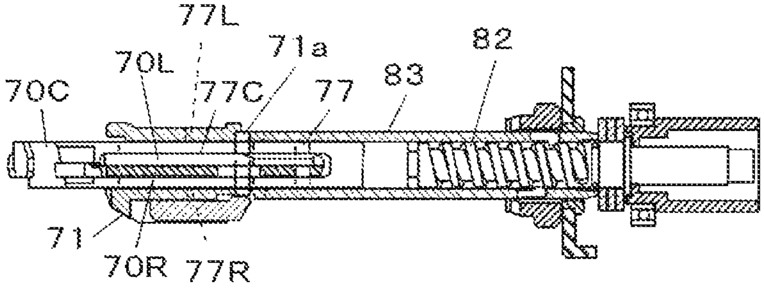
FIG. 14 is a view of a gripping portion according to the present embodiment.

FIGS. 10, 11, 12, 13A, 13B, and 14 are views of the gripping portion according to the embodiment. FIG. 10 is a top view of the interior of the gripping portion as viewed from above, FIG. 11 is a side view of the interior of the gripping portion as viewed from the side, and FIG. 12 is a bottom view of the interior of the gripping portion as viewed from below. Further, FIGS. 13A and 13B are top views of the gripping portion as viewed from above, and FIG. 14 is a side view of the interior of the binding unit.

The binding unit 7A is an example of a binding unit, and includes a gripping portion 70 that grips the wire W and a bending portion 71 configured to bend one end WS and the other end WE of the wire W toward the reinforcing bar S. In this example, the bending portion 71 is configured to bend one end WS and the other end WE of the wire W gripped by the gripping portion 70 toward the reinforcing bar S.

The gripping portion 70 constitutes a binding unit, and includes a fixed gripping member 70C, a first movable gripping member 70L, and a second movable gripping member 70R. The first movable gripping member 70L and the second movable gripping member 70R are arranged in the lateral direction via the fixed gripping member 70C. Specifically, the first movable gripping member 70L is disposed on one side along the axial direction of the wire W to be wound around the fixed gripping member 70C, and the second movable gripping member 70R is disposed on the other side.

The fixed gripping member 70C has a shape extending in a bar shape, and includes a shaft 77 that rotatably supports the first movable gripping member 70L and the second movable gripping member 70R. The first movable gripping member 70L and the fixed gripping member 70C are configured such that the wire W passes between the first movable gripping member 70L and one longitudinal end (distal end) that is one side of the fixed gripping member 70C. In addition, the fixed gripping member 70C includes the shaft 77 provided at the longitudinal other end (rear end) that is the other side thereof, and the rear end of the first movable gripping member 70L is rotatably supported by the shaft 77. The second movable gripping member 70R and the fixed gripping member 70C are configured such that the wire W passes between the second movable gripping member 70R and the distal end that is one side of the fixed gripping member 70C. The fixed gripping member 70C includes the shaft 77 provided at the rear end that is the other side thereof, and the rear end of the second movable gripping member 70R is rotatably supported by the shaft 77. The first movable gripping member 70L is configured such that the distal end (one end) of the other side is displaced in a direction coming in contact with and separating from the fixed gripping member 70C or the second movable gripping member 70R by the rotation operation with the shaft 77 as a fulcrum. Further, the second movable gripping member 70R is configured such that the distal end (one end) of the other side is displaced in a direction coming in contact with and separating from the fixed gripping member 70C or the first movable gripping member 70L by the rotation operation with shaft 77 as a fulcrum. The shaft 77 supporting the first movable gripping member 70L is the same as the shaft 77 supporting the second movable gripping member 70R in this example. The shaft 77 is orthogonal to the moving direction of the bending portion 71 indicated by arrows F and R, and extends in the direction (first direction) in which the wire W is fed (or returned). In this example, the direction indicated by the arrow F is a direction in which the end of the wire W is bent.

For example, the bending portion 71 has a cylindrical hollow structure, and includes an opening and closing pin 71*a* that opens and closes the first movable gripping member 70L and the second movable gripping member 70R. Further, the first movable gripping member 70L includes a first opening and closing guide hole (fitting portion) 77L serving as a first opening and closing guide hole that opens and closes the first movable gripping member 70L with the operation of the opening and closing pin 71*a*. Further, the second movable gripping member 70R includes a second opening and closing guide hole (fitting portion) 77R serving as a second opening and closing guide hole that opens and closes the second movable gripping member 70R with the operation of the opening and closing pin 71*a*.

The opening and closing pin 71*a* is an example of the moving member, and extends in the first direction by penetrating through the inside of the bending portion 71. The opening and closing pin 71*a* is fixed to the bending portion 71, and moves according to the movement of the bending portion 71 configured to bend the wire W. The opening and closing pin 71*a* coaxially extends on the first movable gripping member 70L and the second movable gripping member 70R, and linearly moves in a direction (second direction) orthogonal to the axial direction of the opening and closing pin 71*a*, which is an extending direction of the opening and closing pin 71*a*, in conjunction with the bending portion 71. The bending portion 71 has the shaft 77 on an extended line of the movement path of the opening and closing pin 71*a* due to the movement of the bending portion 71.

The opening and closing guide hole 77L is formed to extend in a longitudinal direction of the first movable gripping member 70L. In other words, the opening and closing guide hole 77L extends along the moving direction of the opening and closing pin 71*a*, and converts the linear movement of the opening and closing pin 71*a* into an opening and closing operation due to the rotation of the first movable gripping member 70L with the shaft 77 as a fulcrum. The opening and closing guide hole 77L is configured to extend along a longitudinal direction of the first movable gripping member 70L, to be bent outward midway, and extends along the longitudinal direction again. Specifically, the opening and closing guide hole 77L includes a first standby portion 770L that extends along the moving direction of the bending portion 71 by a first standby distance from one end, an opening and closing portion 78L that is bent outward from the first standby portion 770L and extends obliquely outward (forward), and a second standby portion 771L that extends along the moving direction of the bending portion 71 again by a second standby distance from the opening and closing portion 78L. By the configuration in which the opening and closing portion 78L extends by being bent obliquely outward from one end of the first standby portion 770L and is coupled to the second standby portion 771L, the first movable gripping member 70L is closed when the opening and closing pin 71*a* passes through the opening and closing portion 78L.

The opening and closing guide hole 77R is formed to extend in a longitudinal direction of the second movable gripping member 70R. In other words, the opening and closing guide hole 77R extends along the moving direction of the opening and closing pin 71*a*, and converts the linear motion of the opening and closing pin 71*a* into an opening and closing operation due to the rotation of the second movable gripping member 70R with the shaft 77 as a fulcrum. The opening and closing guide hole 77R is configured to extend along a longitudinal direction of the second movable gripping member 70R, to be bent outward midway, and extends along the longitudinal direction again. Specifically, the opening and closing guide hole 77R includes a first standby portion 770R that extends along the moving direction of the bending portion 71 by a first standby distance from one end, an opening and closing portion 78R that is bent outward from the first standby portion 770R and extends obliquely outward (forward), and a second standby portion 771R that extends along the moving direction of the bending portion 71 again by a second standby distance from the opening and closing portion 78R. By the configuration in which the opening and closing portion 78R extends by being bent obliquely outward from one end of the first standby portion 770R and is coupled to the second standby portion 771R, the second movable gripping member 70R is closed when the opening and closing pin 71*a* passes through the opening and closing portion 78R. Therefore, the fitting portion is formed so as to extend in a longitudinal direction of the movable gripping member, to bend outward between end portions of the fitting portion, and to extend again in the longitudinal direction.

The fixed gripping member 70C includes a mounting portion 77C constituted by a space into which the first movable gripping member 70L is positioned at one side and the second movable gripping member 70R is positioned at the other side. In addition, the fixed gripping member 70C includes a guide hole (fitting portion) 78C that guides a linear movement of the opening and closing pin 71*a*.

The bending portion 71 includes a cover portion 71*c* that vertically covers the fixed gripping member 70C along the direction of the opening and closing pin 71*a* extends. As illustrated in FIG. 13A, the bending portion 71 has a shape or configuration so that it covers the opening and closing guide hole 77L, the opening and closing guide hole 77R, the opening and closing portion 78L, the opening and closing portion 78R, and the guide hole 78C with the cover portion 71*c*. Therefore, the opening and closing guide hole 77L, the opening and closing guide hole 77R, the opening and closing portion 78L, the opening and closing portion 78R, and the guide hole 78C are not exposed.

In the gripping portion 70, the first movable gripping member 70L is inserted into the mounting portion 77C from one side of the fixed gripping member 70C, and the second movable gripping member 70R is inserted into the mounting portion 77C from the other side of the fixed gripping member 70C.

The first movable gripping member 70L and the second movable gripping member 70R vertically overlap with each other in the mounting portion 77C in a mutually slidable state, and as illustrated in FIG. 14, the opening and closing guide hole 77L and the opening and closing guide hole 77R overlap with each other.

The first movable gripping member 70L inserted into the mounting portion 77C of the fixed gripping member 70C is rotatably supported on the fixed gripping member 70C by the shaft 77. The second movable gripping member 70R is rotatably supported on the fixed gripping member 70C by the shaft 77.

The gripping portion 70, in which the first movable gripping member 70L and the second movable gripping member 70R are mounted to the fixed gripping member 70C through the shaft 77, is mounted to the bending portion 71 when the opening and closing pin 71*a* is inserted into the guide hole 78C, the opening and closing guide hole 77L, and the opening and closing guide hole 77R. The bending portion 71 constitutes a movable member 83, and is configured to be movable with respect to the gripping portion 70.

When the bending portion 71 moves in the forward direction indicated by the arrow F, the opening and closing pin 71*a* also moves in the forward direction with the movement of the bending portion. When the opening and closing pin 71*a* moves in the forward direction by a predetermined distance (longer than the first standby distance), the opening and closing pin 71*a* moves from the first standby portion 770L of the opening and closing guide hole 77L to the opening and closing portion 78L, and starts to push the opening and closing portion 78L. When the opening and closing portion 78L is pushed by the opening and closing pin 71*a*, the first movable gripping member 70L moves toward the fixed gripping member 70C by the rotation operation with the shaft 77 as a fulcrum, similarly, when the opening and closing pin 71*a* pushes the opening and closing portion 78R of the opening and closing guide hole 77R, the second movable gripping member 70R moves toward the fixed gripping member 70C by the rotation operation with the shaft 77 as a fulcrum.

As illustrated in FIGS. 29A, 29B, 29C, 30A, 30B, and 30C to be described below, when the first movable gripping member 70L moves in the direction away from the fixed gripping member 70C, the gripping portion 70 forms the feed path between the first movable gripping member 70L and the fixed gripping member 70C, the wire W passing through the feed path. In contrast, when the first movable gripping member 70L moves toward the fixed gripping member 70C, the wire W is gripped between the first movable gripping member 70L and the fixed gripping member 70C.

When the second movable gripping member 70R moves in a direction away from the fixed gripping member 70C, the gripping portion 70 forms a feed path through which the wire W passes between the second movable gripping member 70R and the fixed gripping member 70C. Then, when the other end WE of the wire W is bent by the bending portion 71 as will be described below, the wire W is gripped. When the second movable gripping member 70R moves toward the fixed gripping member 70C, the wire W may be supported or gripped between the second movable gripping member 70R and the fixed gripping member 70C.

The wire W sent by the first feed gear 30L and the second feed gear 30R and passing through the parallel guide 4A at the cutting discharge position P3 passes between the fixed gripping member 70C and the second movable gripping member 70R and is guided to the curl guide unit 5A. The wire W having the curling tendency at the curl guide unit 5A passes between the fixed gripping member 70C and the first movable gripping member 70L.

Therefore, a first gripping unit for gripping one end WS side of the wire W is constituted by the fixed gripping member 70C and the first movable gripping member 70L. Further, the fixed gripping member 70C and the second movable gripping member 70R constitute a second gripping unit for gripping the other end WE side of the wire W cut by the cutting unit 6A.

Since the first movable gripping member 70L and the second movable gripping member 70R may be mechanisms that open and close with respect to the bending portion 71 (movable member), contrary to the above example, the opening and closing pin (moving member) may be provided on the first movable gripping member 70L and the second movable gripping member 70R, and the opening and closing guide hole may be provided on the bending portion 71 (movable member).

Figure 15A:
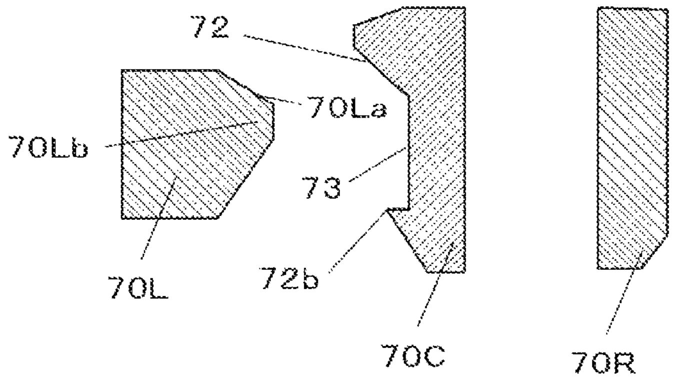
FIG. 15A is a view illustrating main parts of a gripping portion according to the present embodiment.
Figure 15B:
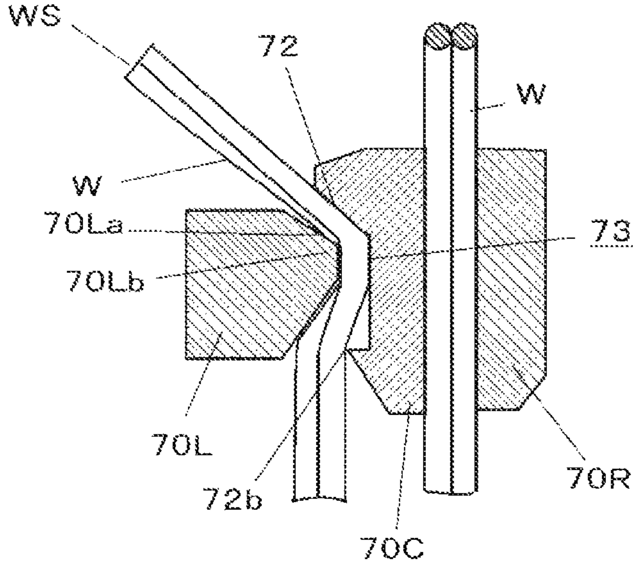
FIG. 15B is a view illustrating main parts of a gripping portion according to the present embodiment.

FIGS. 15A and 15B are views illustrating main parts of the gripping portion of this embodiment. The first movable gripping member 70L includes a protrusion 70Lb protruding toward the fixed gripping member 70C on a surface facing the fixed gripping member 70C. On the other hand, the fixed gripping member 70C includes a recess 73, into which the protrusion 70Lb of the first movable gripping member 70L is inserted, on a surface facing the first movable gripping member 70L. Accordingly, when the wire W is gripped with the first movable gripping member 70L and the fixed gripping member 70C, the wire W is bent toward the first movable gripping member 70L.

Specifically, the fixed gripping member 70C includes a preliminary bending portion 72. The preliminary bending portion 72 is configured such that a protrusion protruding toward the first movable gripping member 70L is provided at a downstream end along the feeding direction of the wire W fed in the forward direction on the surface facing the first movable gripping member 70L of the fixed gripping member 70C.

In order to grip the wire W between the fixed gripping member 70C and the first movable gripping member 70L and prevent the gripped wire W from being pulled out, the gripping portion 70 has the protrusion portion 72*b* and the recess portion 73 on the fixed gripping member 70C. The protrusion portion 72*b* is provided on the upstream end along the feeding direction of the wire W fed in the forward direction on the surface facing the first movable gripping member 70L of the fixed gripping member 70C and protrudes to the first movable gripping member 70L. The recess portion 73 is provided between the preliminary bending portion 72 and the protrusion portion 72*b* and has a recess shape in a direction opposite to the first movable gripping member 70L.

The first movable gripping member 70L has a recess portion 70La into which the preliminary bending portion 72 of the fixed gripping member 70C enters and a protrusion portion 70Lb which enters the recess portion 73 of the fixed gripping member 70C.

As a result, as illustrated in FIG. 15B, by the operation of gripping one end WS side of the wire W between the fixed gripping member 70C and the first movable gripping member 70L, the wire W is pressed by the preliminary bending portion 72 on the first movable gripping member 70L side, and one end WS of the wire W is bent in a direction away from the wire W gripped by the fixed gripping member 70C and the second movable gripping member 70R.

Gripping the wire W with the fixed gripping member 70C and the second movable gripping member 70R includes a state in which the wire W can move freely to some extent between the fixed gripping member 70C and the second movable gripping member 70R. This is because, in the operation of winding the wire W around the reinforcing bar S, it is necessary to move the wire W between the fixed gripping member 70C and the second movable gripping member 70R.

The bending portion 71 is an example of a bending unit which bends the wire W such that the end of the wire W is located closer to the binding target than a top of the wire W protruding most in a direction away from the binding target after binding of the binding target. The bending portion 71 bends the wire W gripped by the gripping portion 70 before the wire W is twisted by the gripping portion 70.

The bending portion 71 is provided around the gripping portion 70 so as to cover a part of the gripping portion 70, and is provided so as to be movable along the axial direction of the gripping portion 70. Specifically, the bending portion 71 approaches one end WS side of the wire W gripped by the fixed gripping member 70C and the first movable gripping member 70L and the other end WE side of the wire W gripped by the fixed gripping member 70C and the second movable gripping member 70R, and is horizontally movable in the direction in which one end WS side and the other end WE side of the wire W are bent and away from the bent wire W.

The bending portion 71 moves in the forward direction (see FIG. 1) indicated by an arrow F, so that one end WS side of the wire W gripped by the fixed gripping member 70C and the first movable gripping member 70L is bent toward the reinforcing bar S with the gripping position as the fulcrum. Further, the bending portion 71 moves in the forward direction indicated by the arrow F, whereby the other end WE side of the wire W between the fixed gripping member 70C and the second movable gripping member 70R is bent toward the reinforcing bar S with the gripping position as the fulcrum.

The wire W is bent by the movement of the bending portion 71, so that the wire W passing between the second movable gripping member 70R and the fixed gripping member 70C is pressed by the bending portion 71, and the wire W is prevented from coming off between the fixed gripping member 70C and the second movable gripping member 70R.

The binding unit 7A includes a length restricting unit 74 that restricts the position of one end WS of the wire W. The length restricting unit 74 is constituted by providing a member against which the one end WS of the wire W abuts in the feed path of the wire W that has passed between the fixed gripping member 70C and the first movable gripping member 70L. In order to secure a predetermined distance from the gripping position of the wire W by the fixed gripping member 70C and the first movable gripping member 70L, the length restricting unit 74 is provided in the first guide unit 50 of the curl guide unit 5A in this example.

The reinforcing bar binding machine 1A includes a binding unit driving mechanism 8A that drives the binding unit 7A. The binding unit driving mechanism 8A includes a motor 80, a rotary shaft 82 driven by the motor 80 via a speed reducer 81 that performs deceleration and torque amplification, a movable member 83 that is displaced by a rotation operation of the rotary shaft 82, and a rotation restricting member 84 that restricts the rotation of the movable member 83 interlocking with the rotation operation of the rotary shaft 82.

In the rotary shaft 82 and the movable member 83, by the screw portion provided on the rotary shaft 82 and the nut portion provided in the movable member 83, the rotation operation of the rotary shaft 82 is converted to the movement of the movable member 83 along the rotary shaft 82 in the forward and backward direction.

The movable member 83 is locked to the rotation restricting member 84 in the operation region where the wire W is gripped by the gripping portion 70, and then the wire W is bent by the bending portion 71, so that the movable member 83 moves in the forward and backward direction in a state where the rotation operation is restricted by the rotation restricting member 84. Further, the movable member 83 is rotated by the rotation operation of the rotary shaft 82 upon disengaging from the locking of the rotation restricting member 84.

In the gripping portion 70, the gripping member 70C, the first movable gripping member 70L, and the second movable gripping member 70R, between which the wire W is gripped, rotates in conjunction with the rotation of the movable member 83 and the bending portion 71.

The retreat mechanism 53*a* of the guide pin 53 is configured by a link mechanism that converts the movement of the movable member 83 in the forward and backward direction into displacement of the guide pin 53. The transmission mechanism 62 of the rotary blade portion 61 is configured by a link mechanism that converts the movement of the movable member 83 in the forward and backward direction into the rotation operation of the rotary blade portion 61.

Figure 16:
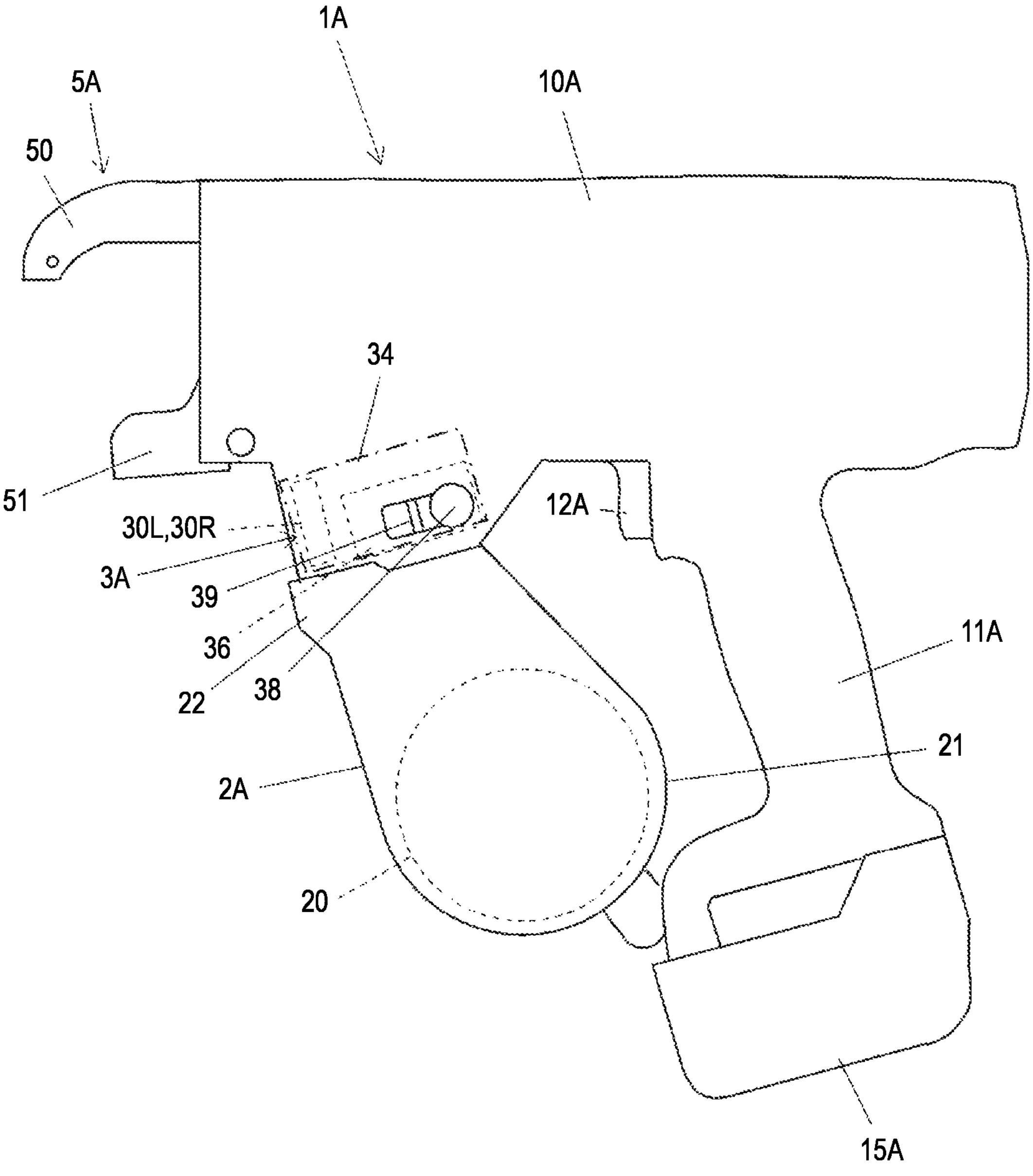
FIG. 16 is an external view illustrating an example of the reinforcing bar binding machine of the present embodiment.

FIG. 16 is an external view illustrating an example of the reinforcing bar binding machine of the present embodiment. The reinforcing bar binding machine 1A according to the present embodiment has a form used by a worker in hand and includes a main body 10A and a handle portion 11A. As illustrated in FIG. 1 and the like, the reinforcing bar binding machine 1A incorporates a binding unit 7A and a binding unit driving mechanism 8A in the main body 10A and has a curl guide unit 5A at one end side of the main body 10A in the longitudinal direction (first direction Y1). Further, the handle portion 11A is provided so as to protrude from the other end side in the longitudinal direction of the main body 10A to one direction (second direction Y2) substantially orthogonal (intersecting) with the longitudinal direction. Further, the wire feeding unit 3A is provided on the side along the second direction Y2 with respect to the binding unit 7A, the displacement unit 34 is provided on the other side along the first direction Y1 with respect to the wire feeding unit 3A, that is, on the side of the handle portion 11A with respect to the wire feeding unit 3A in the main body 10A, and the magazine 2A is provided on the side along the second direction Y2 with respect to the wire feeding unit 3A.

Therefore, the handle portion 11A is provided on the other side along the first direction Y1 with respect to the magazine 2A. In the following description, in the first direction Y1 along the direction in which the magazine 2A, the wire feeding unit 3A, the displacement unit 34, and the handle portion 11A are arranged, the side on which the magazine 2A is provided is called a front side, and the side on which the handle portion 11A is provided is called a back side. In the displacement unit 34, a second displacement member 36 is provided in a direction substantially orthogonal to the feeding direction of the wire W fed by the first feed gear 30L and the second feed gear 30R in the wire feeding unit 3A, behind the first feed gear 30L and the second feed gear 30R of the wire feeding unit 3A, and between the first feed gear 30L and the second feed gear 30R and the handle portion 11A. An operation button 38 for displacing the second displacement member 36, a release lever 39 for releasing locking and locking of the operation button 38 are provided between the first feed gear 30L and the second feed gear 30R and the handle portion 11A.

It is noted that a release function for releasing locking and locking may be mounted on the operation button 38 for displacing the second displacement member 36 (also serving as a release lever). That is, the displacement unit 34 includes the second displacement member 36 for displacing the first feed gear 30L and the second feed gear 30R of the wire feeding unit 3A toward and away from each other, and the operation button 38 which displaces the second displacement member 36 and protrudes outwardly from the main body 10A, and is positioned between the wire feeding unit 3A and the handle portion 11A in the main body 10A.

In this manner, by providing the mechanism for displacing the second feed gear 30R, between the second feed gear 30R and the handle portion 11A, behind the second feed gear 30R, as illustrated in FIG. 2, a mechanism for displacing the second feed gear 30R is not provided in the feed path of the wire W below the first feed gear 30L and the second feed gear 30R. In other words, the interior of the magazine 2A, which forms the feed path of the wire W, below the first feed gear 30L and the second feed gear 30R can be used as the wire loading space 22 which is the space for loading the wire W into the wire feeding unit 3A. That is, the wire loading space 22 for the wire feeding unit 3A can be formed inside the magazine 2A.

A trigger 12A is provided on the front side of the handle portion 11A, and the control unit 14A controls the feed motor 33*a* and the motor 80 according to the state of the switch 13A pressed by the operation of the trigger 12A. Further, a battery 15A is detachably attached to a lower portion of the handle portion 11A.

<Example of Operation of Reinforcing Bar Binding Machine in the Embodiment>

Figure 23:
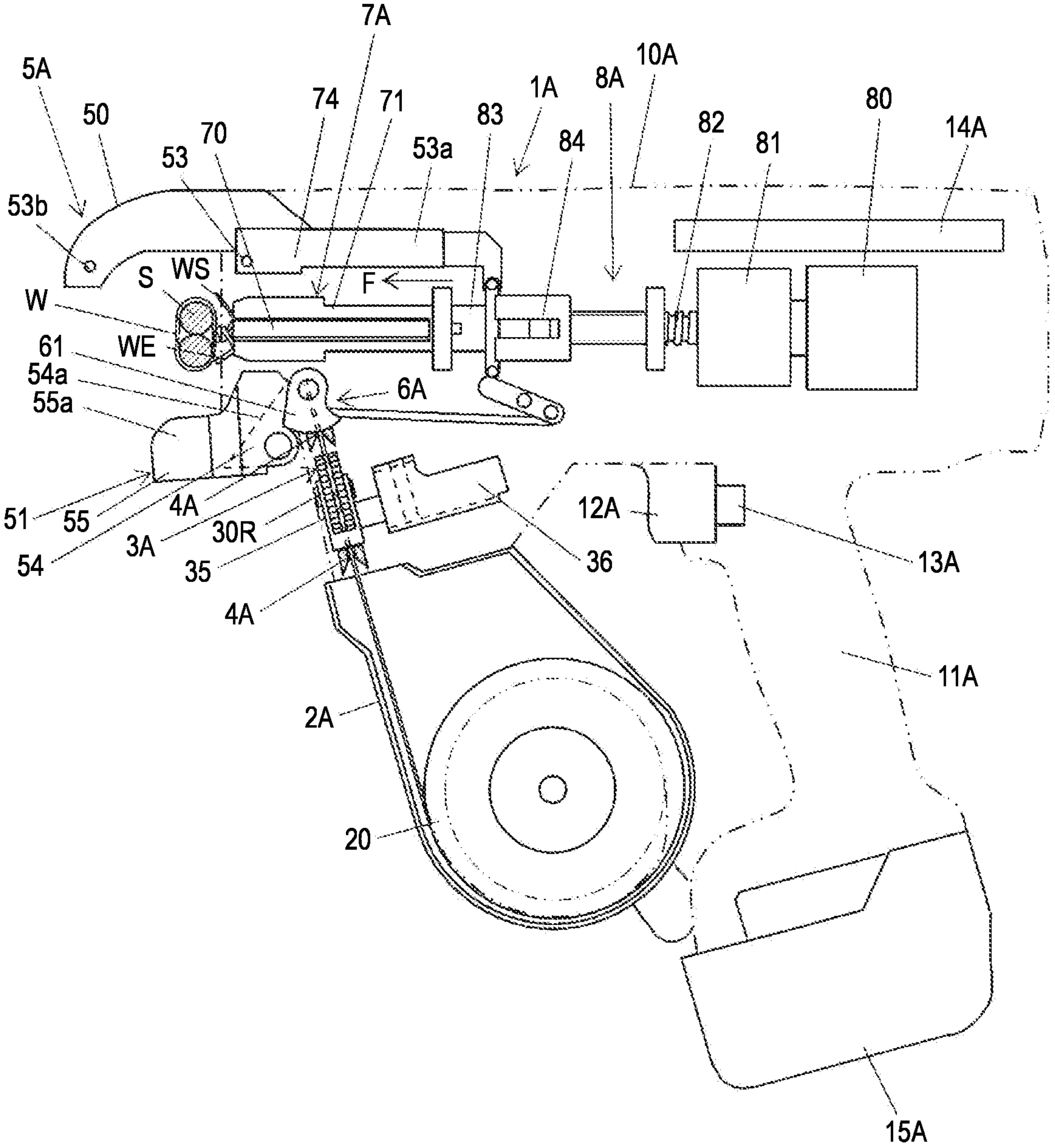
FIG. 23 is an explanatory view of an operation of the reinforcing bar binding machine of the present embodiment.
Figure 24:
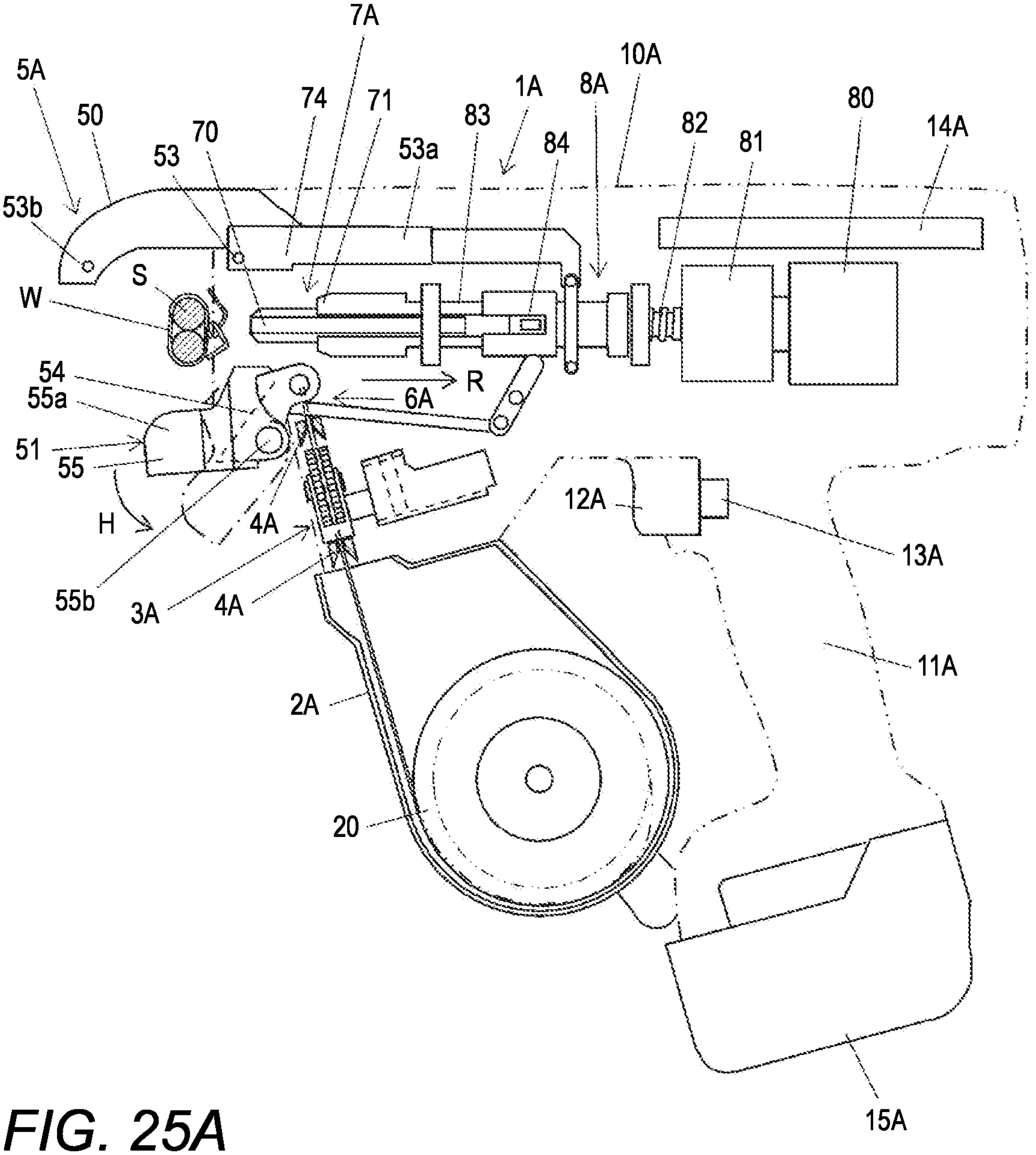
FIG. 24 is an explanatory view of an operation of the reinforcing bar binding machine of the present embodiment.
Figure 25A:
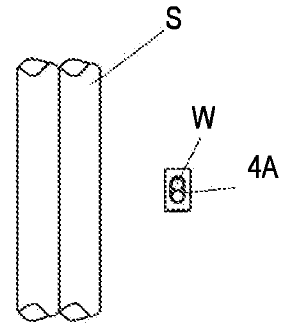
FIG. 25A is an explanatory view of an operation of winding a wire around a reinforcing bar.
Figure 25B:
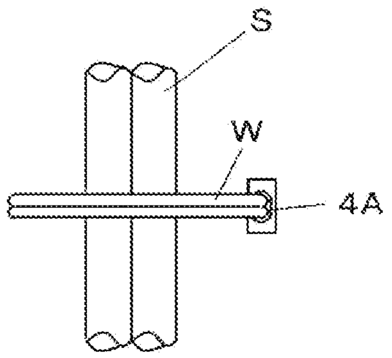
FIG. 25B is an explanatory view of an operation of winding a wire around a reinforcing bar.
Figure 25C:
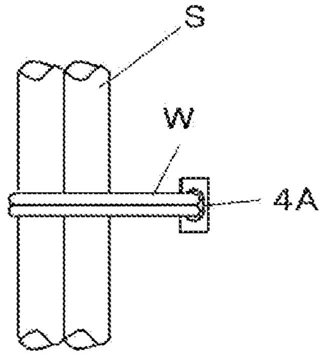
FIG. 25C is an explanatory view of an operation of winding a wire around a reinforcing bar.
Figure 26A:
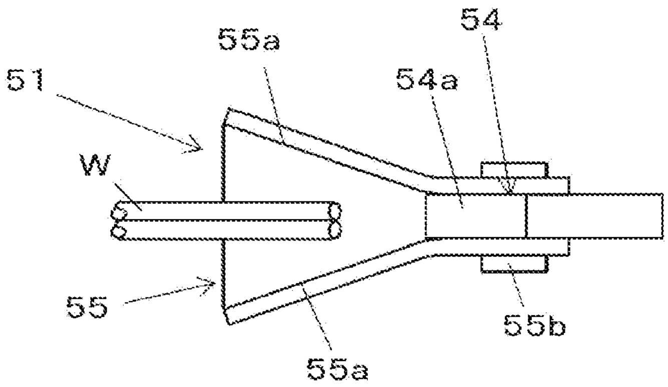
FIG. 26A is an explanatory view of an operation of forming a loop with a wire by a curl guide unit.
Figure 26B:
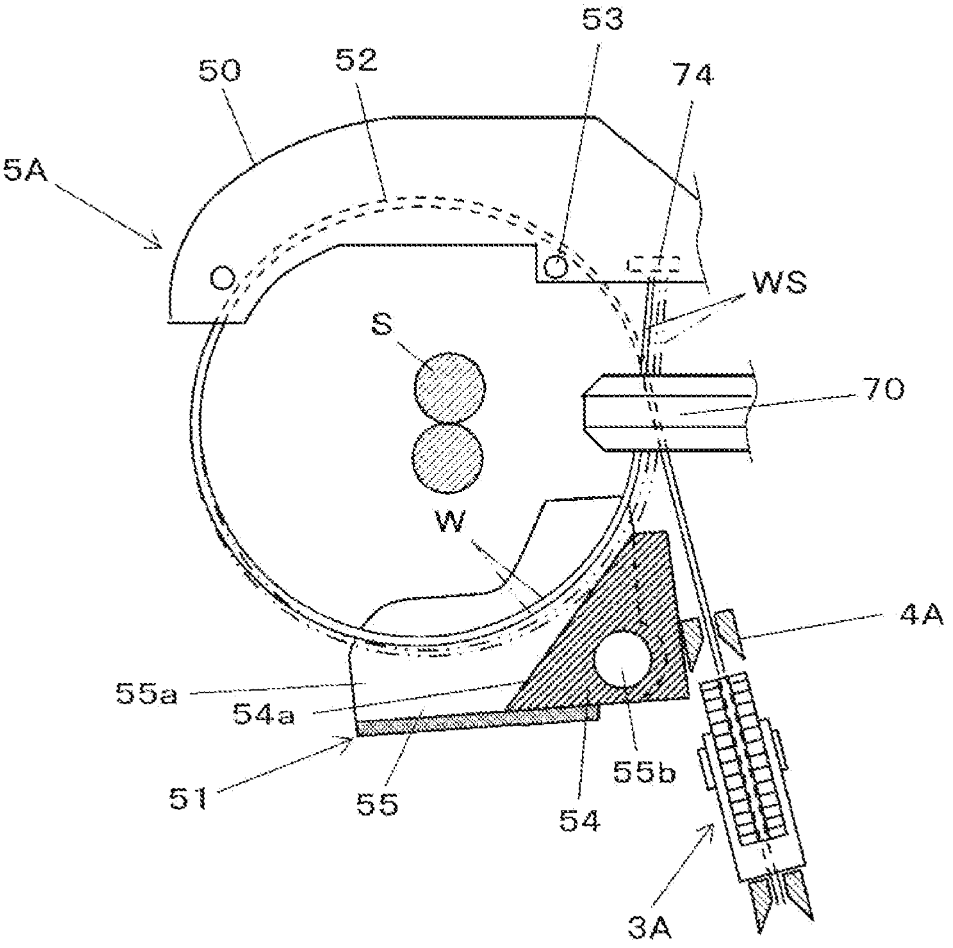
FIG. 26B is an explanatory view of an operation for forming a loop with a wire by a curl guide unit.
Figure 27A:
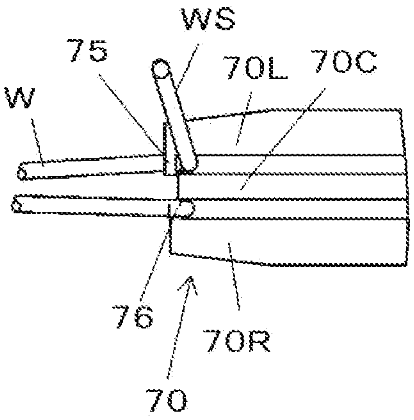
FIG. 27A is an explanatory view of an operation of bending a wire.
Figure 27B:
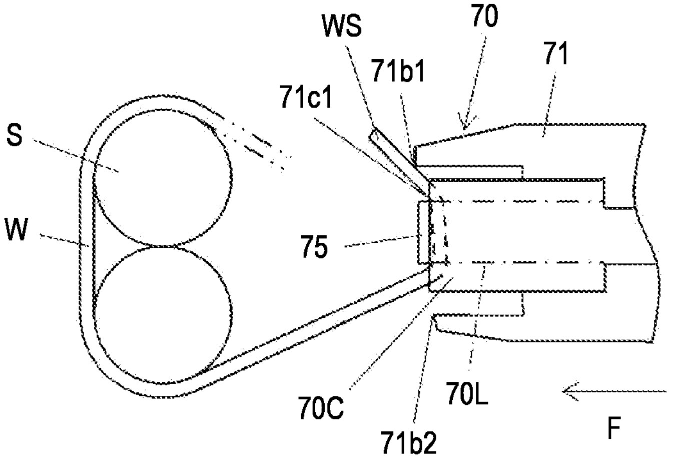
FIG. 27B is an explanatory view of an operation of bending the wire.
Figure 27C:
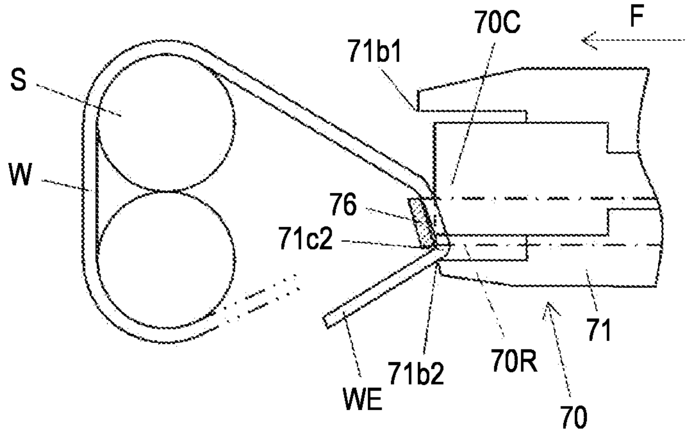
FIG. 27C is an explanatory view of an operation of bending the wire.

FIGS. 17 to 24 are diagrams for explaining the operation of the reinforcing bar binding machine 1A according to the present embodiment, and FIGS. 25A, 25B, and 25C are diagrams for explaining the operation of winding the wire around the reinforcing bar. FIGS. 26A and 26B are explanatory views of the operation of forming a loop with a wire by the curl guide unit, and FIGS. 27A, 27B, and 27C are explanatory views of the operation of bending the wire. Additionally, FIGS. 28A, 28B, 28C and 28D are explanatory views illustrating details of an example of an operation of gripping and twisting a wire.

Further, FIGS. 29A, 29B, 29C and FIGS. 30A, 30B, 30C are explanatory views illustrating details of an example of an operation of gripping and twisting a wire. Next, with reference to the drawings, the operation of binding the reinforcing bar S with the wire W by the reinforcing bar binding machine 1A of this embodiment will be described.

In order to load the wire W wound around the reel 20 housed in the magazine 2A, first, the operation button 38 in the wire feed position illustrated in FIG. 5A is pushed in the arrow T2 direction. When the operation button 38 is pushed in the direction of the arrow T2, the guide slope 39*c* of the release lever 39 is pushed, and the locking protrusion 39*a* comes off from the first locking recess 38*a*. As a result, the release lever 39 is displaced in the arrow U2 direction.

When the operation button 38 is pushed to the wire loading position, as illustrated in FIG. 4B, the release lever 39 is pushed by the spring 39*b* in the direction of the arrow U1, and the locking protrusion 39*a* is inserted into the second locking recess 38*b* of the operation button 38 and is locked. Therefore, the operation button 38 is held at the wire loading position.

When the operation button 38 is in the wire loading position, the second displacement member 36 is pressed by the operation button 38, and the second displacement member 36 displaces the second feed gear 30R about the shaft 36*a* as a fulcrum in a direction away from the first feed gear 30L. Therefore, the second feed gear 30R is separated from the first feed gear 30L, and the wire W can be inserted between the first feed gear 30L and the second feed gear 30R.

Figure 4C:
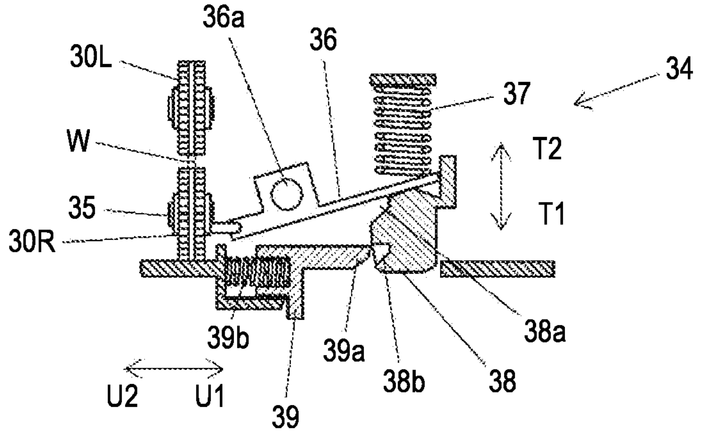
FIG. 4C is a view illustrating an example of a displacement unit of the present embodiment.

After loading the wire W, as illustrated in FIG. 4C, by pushing the release lever 39 in the direction of the arrow U2, the locking protrusion 39*a* comes off from the second locking recess 38*b* of the operation button 38. As a result, the second displacement member 36 is pressed by the spring 37, and the second displacement member 36 is displaced in the direction to press the second feed gear 30R against the first feed gear 30L about the shaft 36*a* as a fulcrum. Therefore, the wire W is sandwiched between the first feed gear 30L and the second feed gear 30R.

When the operation button 38 is pushed in the direction of the arrow T1 by the second displacement member 36 and is displaced to the wire feed position as illustrated in FIG. 4A, the locking protrusion 39*a* of the release lever 39 is locked to the first locking recess 38*a* of the operation button 38, and the operation button 38 is held at the wire feed position.

Figure 17:
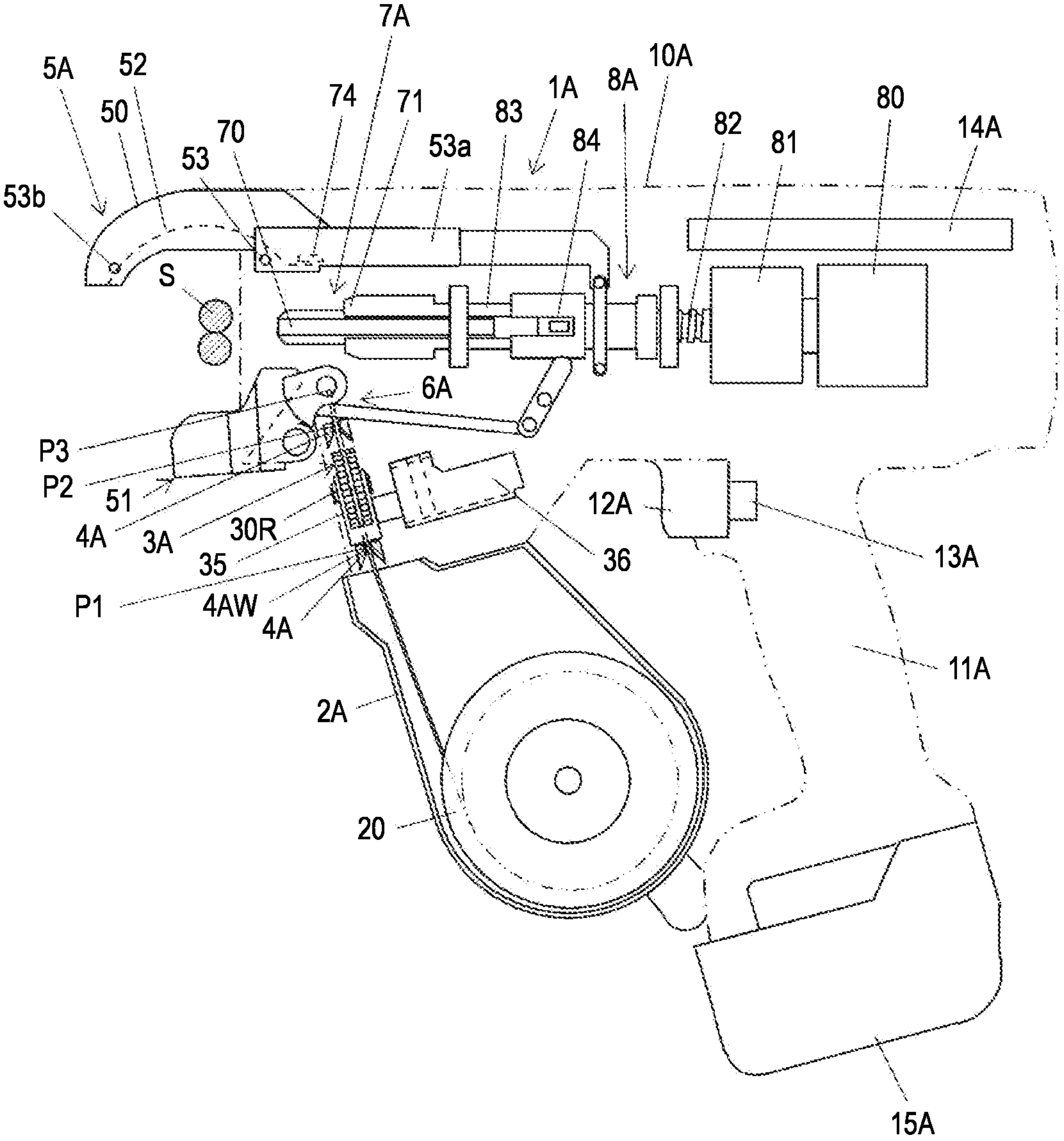
FIG. 17 is an explanatory view of an operation of the reinforcing bar binding machine of the present embodiment.

FIG. 17 illustrates the origin state after the loading of the wire, that is, the initial state in which the wire W has not yet been sent by the wire feeding unit 3A. In the origin state, the tip of the wire W stands by at the cutting discharge position P3. As illustrated in FIG. 17, the wire W waiting at the cutting discharge position P3 is arranged in parallel in a predetermined direction by passing through the parallel guide 4A (fixed blade portion 60) in which the two wires W are provided at the cutting discharge position P3, in this example.

The wires W between the cutting discharge position P3 and the magazine 2A are arranged in parallel in a predetermined direction by the parallel guide 4A at the intermediate position P2, the parallel guide 4A at the introduction position P1, the first feed gear 30L and the second feed gear 30R.

Figure 18:
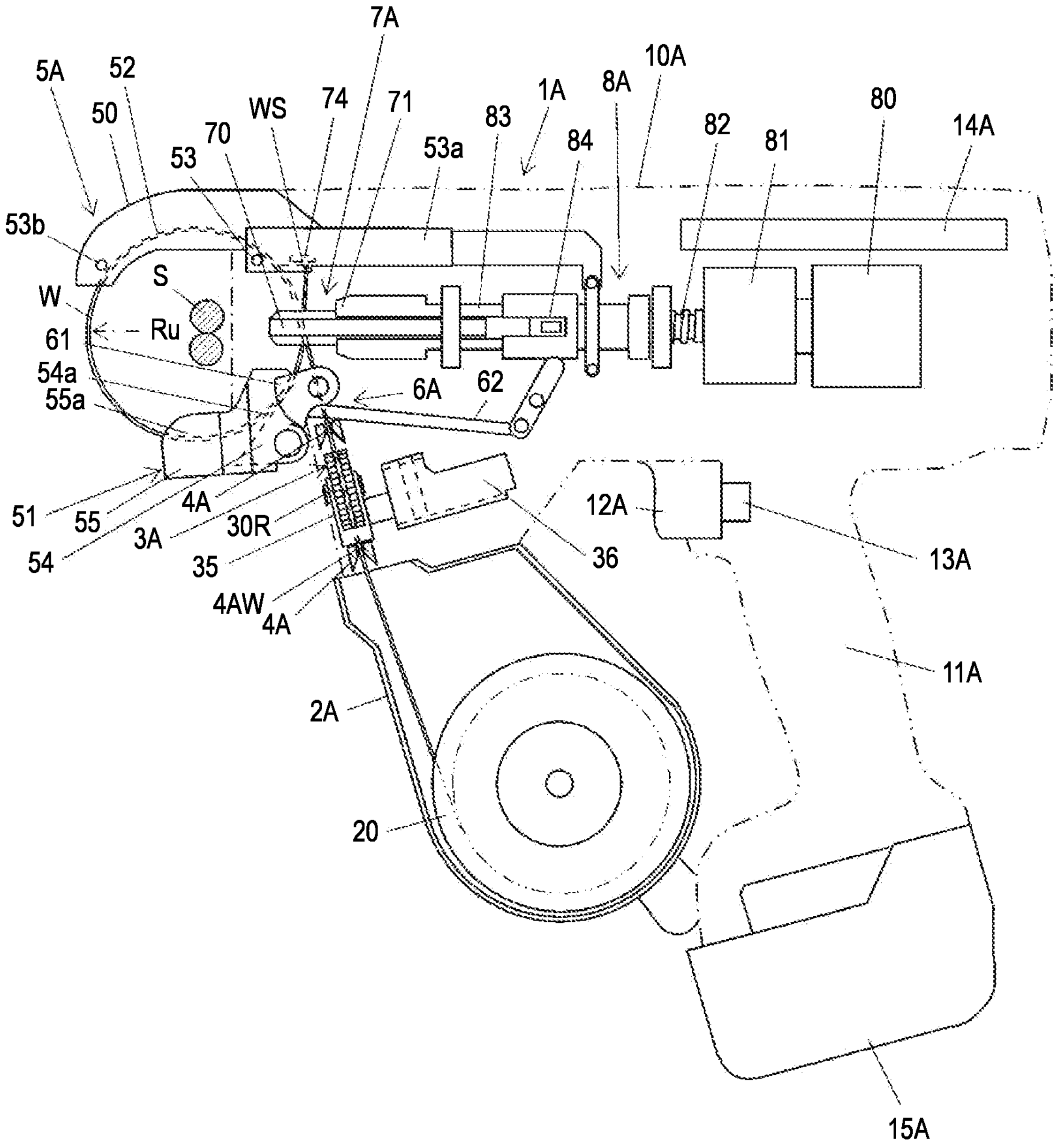
FIG. 18 is an explanatory view of an operation of the reinforcing bar binding machine of the present embodiment.

FIG. 18 illustrates a state in which the wire W is wound around the reinforcing bar S. When the reinforcing bar S is inserted between the first guide unit 50 and the second guide unit 51 of the curl guide unit 5A and the trigger 12A is operated, the feed motor 33*a* is driven in the normal rotation direction, and thus the first feed gear 30L rotates in forward direction and the second feed gear 30R rotates in the forward direction while following the first feed gear 30L.

Therefore, the two wires W are fed in the forward direction by the frictional force generated between the first feed gear 30L and the one wire W1, the frictional force generated between the second feed gear 30R and the other wire W2, and the frictional force generated between the one wire W1 and the other wire W2.

Two wires W entering between the first feed groove 32L of the first feed gear 30L and the second feed groove 32R of the second feed gear 30R, and two wires W discharged from the first feed gear 30L and the second feed gear 30R are fed in parallel with each other in a predetermined direction by providing the parallel guides 4A on the upstream side and the downstream side of the wire feeding unit 3A with respect to the feeding direction of the wire W fed in the forward direction.

Figure 28A:
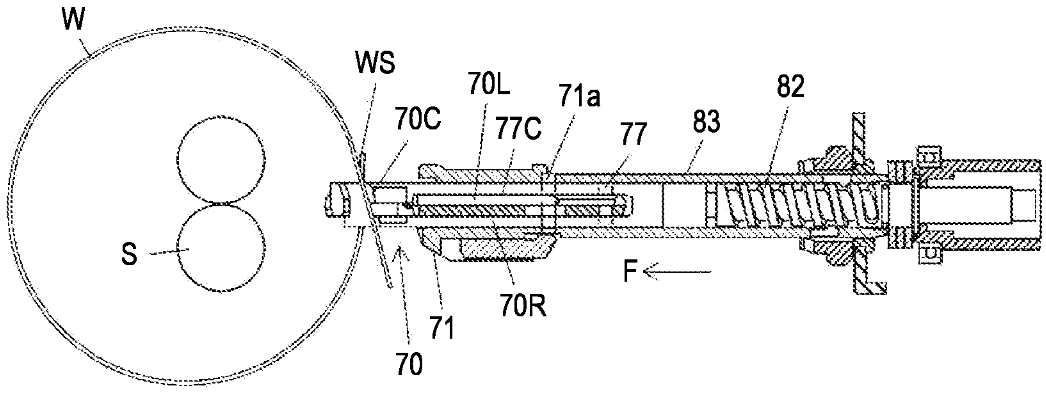
FIG. 28A is an explanatory view illustrating details of an example of an operation of gripping and twisting a wire.
Figure 29A:
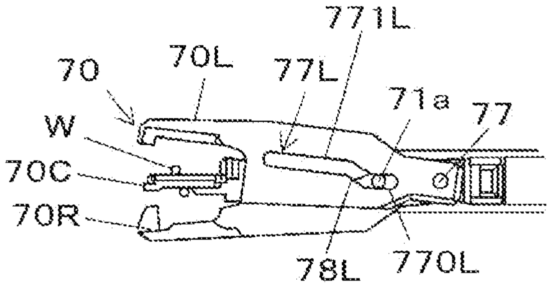
FIG. 29A is an explanatory view illustrating details of an example of an operation of gripping and twisting a wire.
Figure 30A:
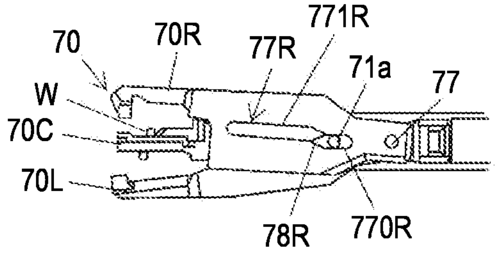
FIG. 30A is an explanatory view illustrating details of an example of an operation of gripping and twisting a wire.

As illustrated in FIGS. 28A, 29A, and 30A, when the wire W is fed in the forward direction, the wire W passes between the fixed gripping member 70C and the second movable gripping member 70R and passes through the guide groove 52 of the first guide unit 50 of the curl guide unit 5A. As a result, the wire W is curled so as to be wound around the reinforcing bar S. The two wires W introduced into the first guide unit 50 are held in a state of being arranged in parallel by the parallel guide 4A at the cutting discharge position P3. Further, since the two wires W are fed in a state of being pressed against the outer wall surface of the guide groove 52, the wires W passing through the guide groove 52 are also held in a state of being arranged in parallel in a predetermined direction.

As illustrated in FIG. 26A, the wire W fed from the first guide unit 50 is restricted to move along the axial direction Ru1 of the loop Ru formed by the wire to be wound therearound by the movable guide unit 55 of the second guide unit 51, to be guided to the fixed guide unit 54 by the wall surface 55*a*. In FIG. 26B, the movement of the wire W along the radial direction of the loop Ru which is guided to the fixed guide unit 54, is restricted by the wall surface 54*a* of the fixed guide unit 54, and the wire W is guided between the fixed gripping member 70C and the first movable gripping member 70L. Then, when the distal end of the wire W is fed to a position where it abuts against the length restricting unit 74, driving of the feed motor 33*a* is stopped.

A slight amount of wire W is fed in the forward direction until the distal end of the wire W abuts against the length restricting unit 74 and then the feeding is stopped, whereby the wire W wound around the reinforcing bar S is displaced from the state illustrated by the solid line in FIG. 26B in the direction expanding in the radial direction of the loop Ru as indicated by the two-dot chain line. When the wire W wound around the reinforcing bar S is displaced in the direction expanding in the radial direction of the loop Ru, one end WS side of the wire W guided between the fixed gripping member 70C and the first movable gripping member 70L by the gripping portion 70 is displaced backward. Therefore, as illustrated in FIG. 26B, the position of the wire W in the radial direction of the loop Ru is restricted by the wall surface 54*a* of the fixed guide unit 54, whereby the displacement of the wire W guided to the gripping portion 70 in the radial direction of the loop Ru is suppressed, and occurrence of gripping failure is suppressed. In the present embodiment, even when the one end WS side of the wire W guided between the fixed gripping member 70C and the first movable gripping member 70L is not displaced, and the wire W is displaced in a direction of spreading in the radial direction of the loop Ru, the displacement of the wire W in the radial direction of the loop Ru is suppressed by the fixed guide unit 54, thereby suppressing the occurrence of gripping failure.

As a result, the wire W is wound in a loop shape around the reinforcing bar S. At this time, as illustrated in FIG. 25B, the two wires W wound around the reinforcing bar S are held in a state in which they are arranged in parallel with each other without being twisted. When detecting that the movable guide unit 55 of the second guide unit 51 is opened by the output of the guide opening/closing sensor 56, the control unit 14A does not drive the feed motor 33*a* even when the trigger 12A is operated. Instead, notification is performed by a notifying unit (not illustrated) such as a lamp or a buzzer. This prevents occurrence of guidance failure of the wire W.

Figure 19:
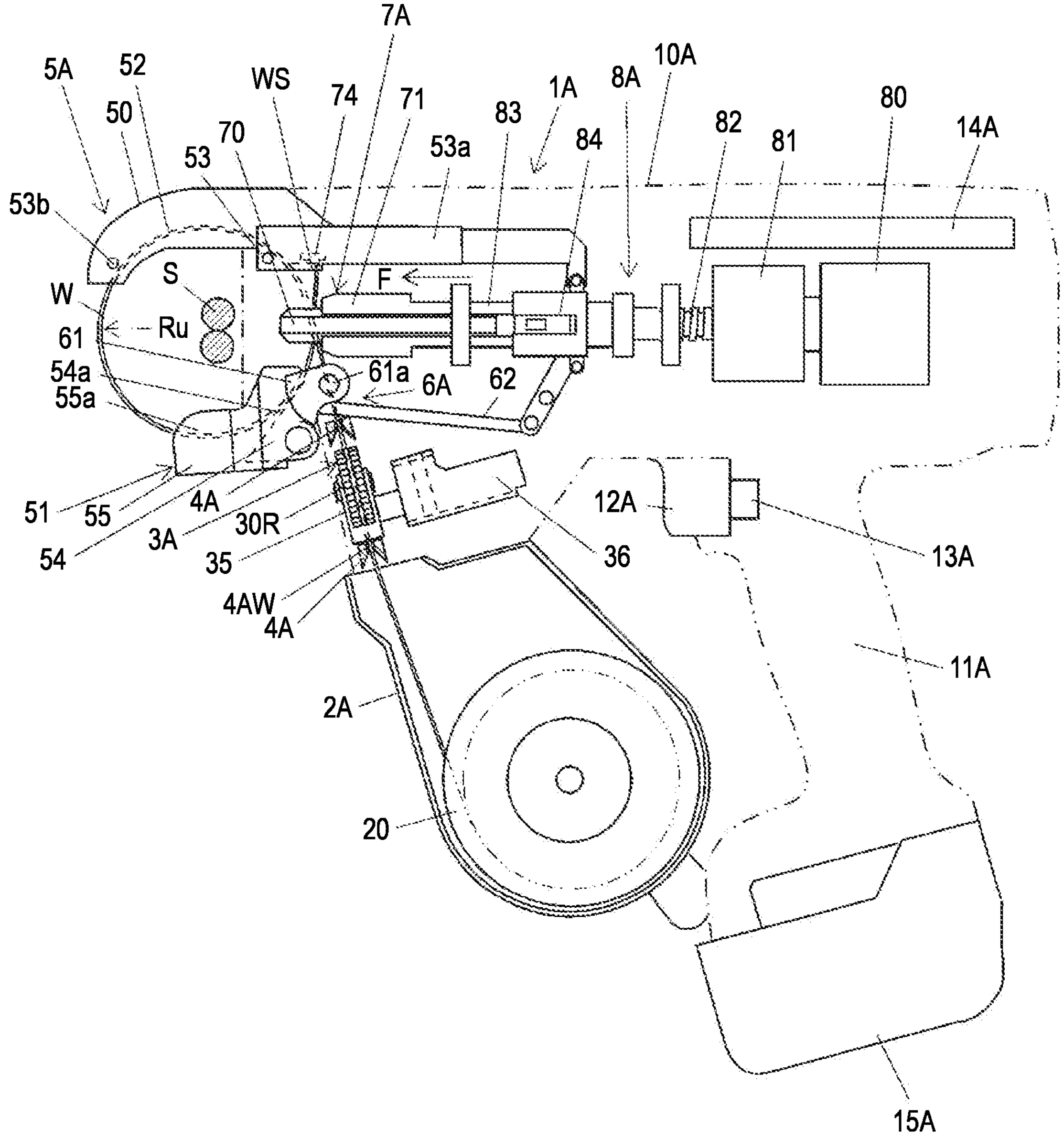
FIG. 19 is an explanatory view of an operation of the reinforcing bar binding machine of the present embodiment.
Figure 29B:
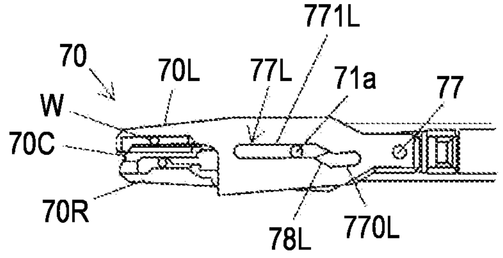
FIG. 29B is an explanatory view illustrating details of an example of an operation of gripping and twisting a wire.

FIG. 19 illustrates a state where the wire W is gripped by the gripping portion 70. After stopping the feeding of the wire W, the motor 80 is driven in the normal rotation direction, whereby the motor 80 moves the movable member 83 in the direction of the arrow F which is the forward direction. That is, in the movable member 83, the rotation operation interlocked with the rotation of the motor 80 is restricted by the rotation restricting member 84, and the rotation of the motor 80 is converted into a linear movement. As a result, the movable member 83 moves in the forward direction. In conjunction with the operation of the movable member 83 moving in the forward direction, the bending portion 71 moves in the forward direction. As illustrated in FIG. 29B, when the opening and closing pin 71*a* passes through the opening and closing portion 78L of the opening and closing guide hole 77L, the first movable gripping member 70L moves toward the fixed gripping member 70C by the rotation operation with the shaft 77 as a fulcrum. As a result, one end WS of the wire W is gripped.

Figure 30B:
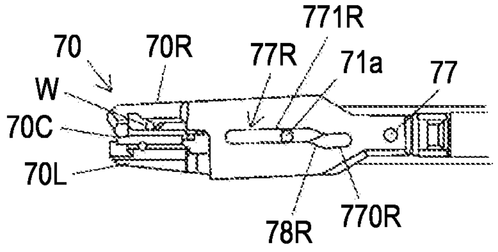
FIG. 30B is an explanatory view illustrating details of an example of an operation of gripping and twisting a wire.

Further, as illustrated in FIG. 30B, when the opening and closing pin 71*a* passes through the opening and closing portion 78R of the opening and closing guide hole 77R, the second movable gripping member 70R moves toward the fixed gripping member 70C by the rotation operation with the shaft 77 as a fulcrum. As the second movable gripping member 70R moves toward the fixed gripping member 70C, the wire W is gripped in a state of being movable in the extending direction.

Further, the operation of the movable member 83 moving in the forward direction is transmitted to the retreat mechanism 53*a*, and the guide pin 53 is retreated from the path through which the wire W moves.

Figure 20:
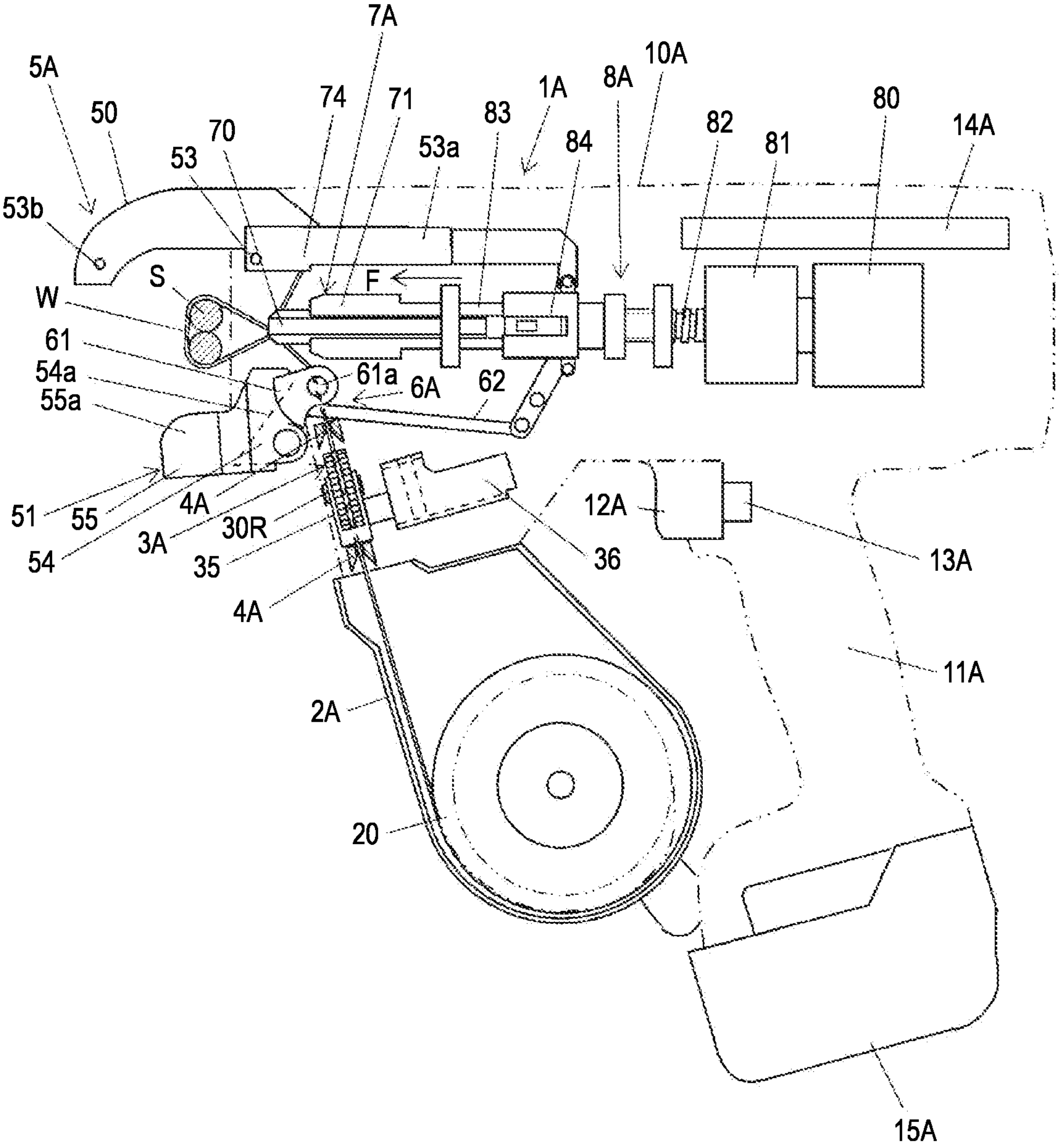
FIG. 20 is an explanatory view of an operation of the reinforcing bar binding machine of the present embodiment.

FIG. 20 illustrates a state where the wire W is wound around the reinforcing bar S. After the one end WS side of the wire W is gripped between the first movable gripping member 70L and the fixed gripping member 70C, and the feed motor 33*a* is driven in the reverse rotation direction, the first feed gear 30L rotates reversely and the second feed gear 30R rotates reversely following the first feed gear 30L.

Therefore, the two wires W are pulled back toward the magazine 2A and are fed in the opposite (backward) direction. In the operation of feeding the wire W in the backward direction, the wire W is wound so as to be in close contact with the reinforcing bar S. In this example, as illustrated in FIG. 25C, since two wires are arranged in parallel with each other, an increase in feed resistance due to twisting of the wires Win the operation of feeding the wire Win the opposite direction is suppressed. Further, in the case where the same binding strength is to be obtained between the case where the reinforcing bar S is bound with a single wire as in the conventional case and the case where the reinforcing bar S is bound with the two wires W as in this example, the diameter of each wire W can be made thinner by using two wires W. Therefore, it is easy to bend the wire W, and the wire W can be brought into close contact with the reinforcing bar S with a small force. Therefore, the wire W can be reliably wound around the reinforcing bar S in close contact with a small force. In addition, by using two thin wires W, it is easy to make the wire W in a loop shape, and it is also possible to reduce the load at the time of cutting the wire W. Along with this, it is possible to downsize each motor of the reinforcing bar binding machine 1A, and downsize the entire main body by downsizing the mechanical section. In addition, it is possible to reduce power consumption by reducing the size of the motor and reducing the load.

Figure 21:
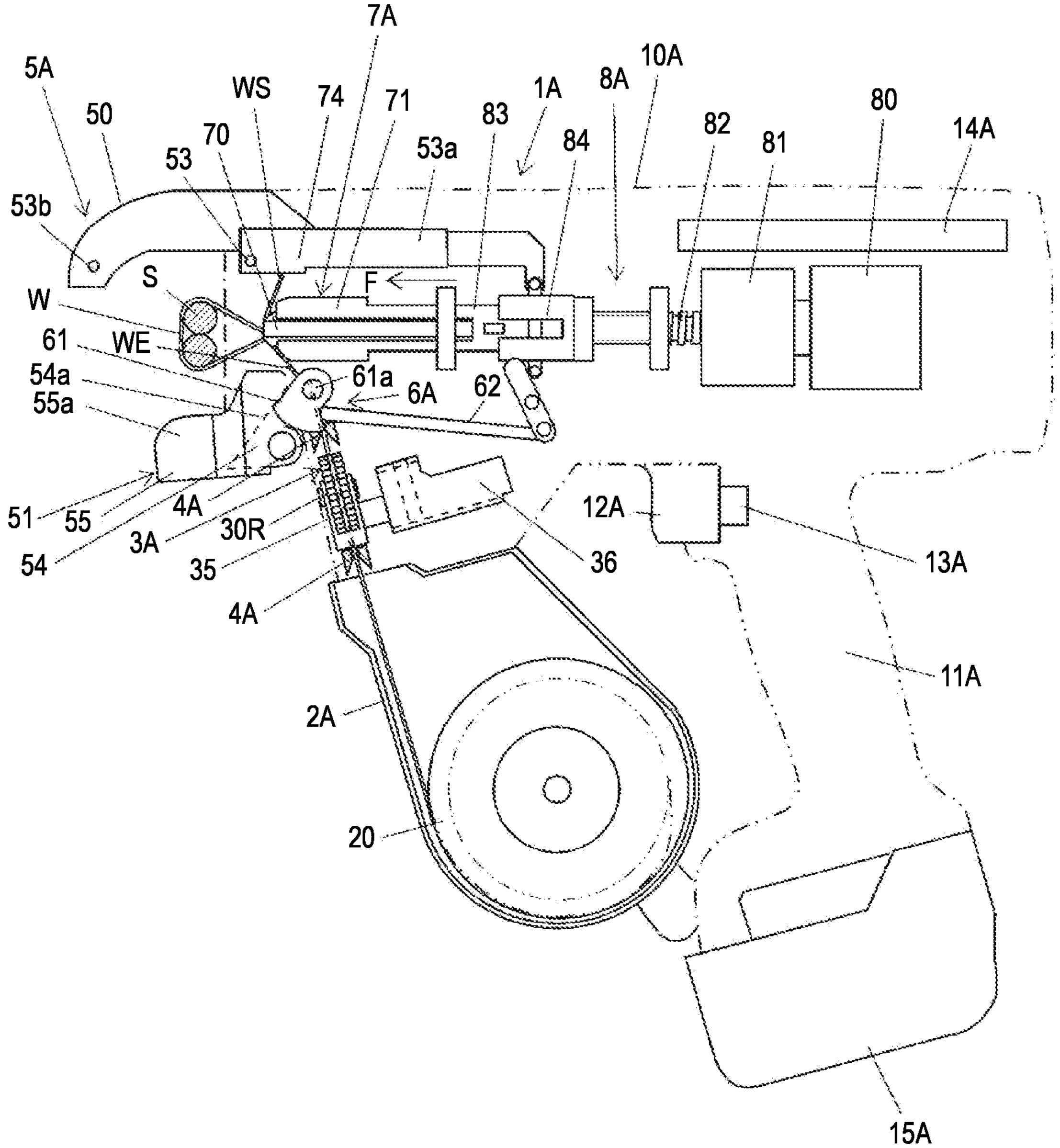
FIG. 21 is an explanatory view of an operation of the reinforcing bar binding machine of the present embodiment.

FIG. 21 illustrates a state in which the wire W is cut. After winding the wire W around the reinforcing bar S, and stopping the feeding of the wire W, the motor 80 is driven in the normal rotation direction, thereby moving the movable member 83 in the forward direction. In conjunction with the operation of the movable member 83 moving in the forward direction, the second movable gripping member 70R is displaced in a direction approaching the fixed gripping member 70C, and the wire W is gripped. In addition, the operation of the movable member 83 moving in the forward direction is transmitted to the cutting unit 6A by the transmission mechanism 62, and the other end WE side of the wire W gripped by the second movable gripping member 70R and the fixed gripping member 70C is cut by the operation of the rotary blade portion 61.

Figure 22:
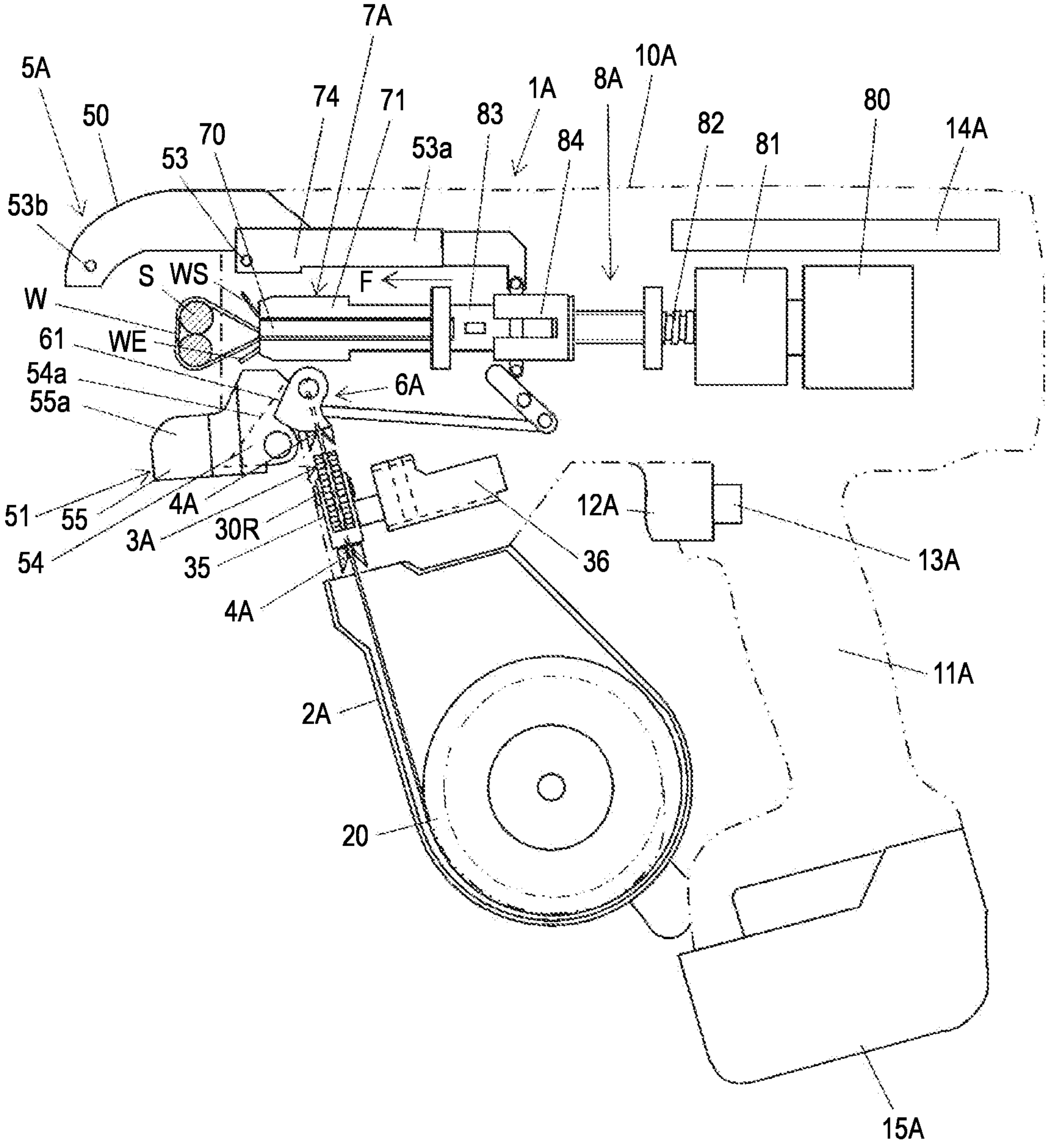
FIG. 22 is an explanatory view of an operation of the reinforcing bar binding machine of the present embodiment.
Figure 28B:
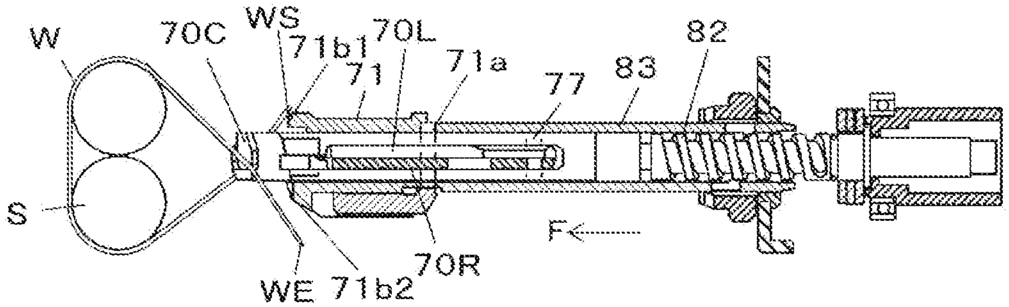
FIG. 28B is an explanatory view illustrating details of an example of an operation of gripping and twisting a wire.

FIG. 22 illustrates a state in which the end of the wire W is bent toward the reinforcing bar S. By moving the movable member 83 further in the forward direction after cutting the wire W, as illustrated in FIG. 28B, the bending portion 71 moves in the forward direction integrally with the movable member 83.

As illustrated in FIGS. 27B and 27C, the bending portion 71 moves in a direction approaching the reinforcing bar S which is a forward direction indicated by an arrow F, so that the bending portion includes a bending portion 71*b*1 which is brought into contact with one end WS side of the wire W gripped by the fixed gripping member 70C and the first movable gripping member 70L. Further, the bending portion 71 moves in the direction approaching the reinforcing bar S which is the forward direction indicated by the arrow F, so that the bending portion 71 includes a bending portion 71*b*2 which is brought in contact with the other end WE side of the wire W gripped by the fixed gripping member 70C and the second movable gripping member 70R.

Figure 28C:
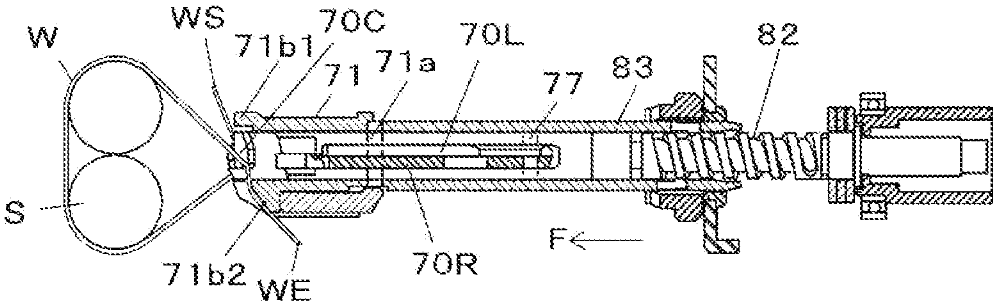
FIG. 28C is an explanatory view illustrating details of an example of an operation of gripping and twisting a wire.
Figure 29C:
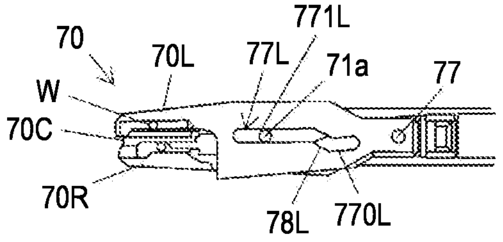
FIG. 29C is an explanatory view illustrating details of an example of an operation of gripping and twisting a wire.
Figure 30C:
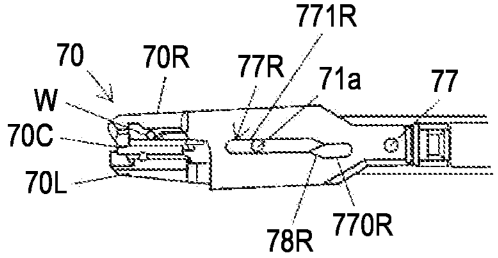
FIG. 30C is an explanatory view illustrating details of an example of an operation of gripping and twisting a wire.

When moving in the forward direction indicated by the arrow F at a predetermined distance, as illustrated in FIG. 28C, the bending portion 71 presses one end WS of the wire W gripped by the fixed gripping member 70C and the first movable gripping member 70L toward the reinforcing bar S at the bending portion 71*b*1 and bends toward the reinforcing bar S with the gripping position as a fulcrum. As the bending portion 71 further moves in the forward direction, as illustrated in FIG. 29C, the opening and closing pin 71*a* moves in the opening and closing guide hole 77L, and thus one end WS of the wire W is held between the first movable gripping member 70L and the fixed gripping member 70C in a state of being gripped. In addition, as the bending portion 71 further moves in the forward direction, as illustrated in FIG. 30C, the opening and closing pin 71*a* moves in the opening and closing guide hole 77R, and thus one end WE of the wire W is held between the second movable gripping member 70R and the fixed gripping member 70C in a state of being gripped.

As illustrated in FIGS. 27A and 27B, the gripping unit 70 includes a slip preventing portion 75 (the protrusion portion 70Lb may also serve as the slip preventing portion 75) protruding toward the fixed gripping member 70C on the distal end side of the first movable gripping member 70L. One end WS side of the wire W gripped by the fixed gripping member 70C and the first movable gripping member 70L is bent toward the reinforcing bar S with the slip preventing portion 75 as a fulcrum at the gripping position by the fixed gripping member 70C and the first movable gripping member 70L by moving the bending portion 71 in the forward direction indicated by the arrow F. In FIG. 27B, the second movable gripping member 70R is not illustrated.

Further, by moving the bending portion 71 by a predetermined distance in the forward direction indicated by the arrow F, the other end WE side of the wire W gripped by the fixed gripping member 70C and the second movable gripping member 70R is pressed to the reinforcing bar S by the bending portion 71*b*2 and is bent toward the reinforcing bar S side with the gripping position as a fulcrum.

As illustrated in FIGS. 27A and 27C, the gripping portion 70 is provided with a slip preventing portion 76 protruding toward the fixed gripping member 70C at the distal end side of the second movable gripping member 70R. The bending portion 71 is moved in the forward direction indicated by the arrow F, so that the other end WE of the wire W gripped by the fixed gripping member 70C and the second movable gripping member 70R is bent toward the reinforcing bar S at the gripping position by the fixed gripping member 70C and the second movable gripping member 70R with the slip preventing portion 76 as a fulcrum. In FIG. 27C, the first movable gripping member 70L is not illustrated.

Figure 28D:
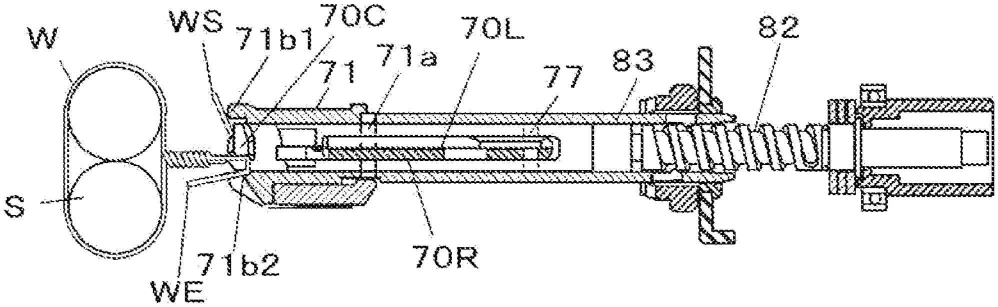
FIG. 28D is an explanatory view illustrating details of an example of an operation of gripping and twisting a wire.

FIG. 23 illustrates a state in which the wire W is twisted. After the end of the wire W is bent toward the reinforcing bar S side, the motor 80 is further driven in the normal rotation direction, whereby the motor 80 further moves the movable member 83 in the direction of the arrow F which is the forward direction. When the movable member 83 moves to a predetermined position in the direction of the arrow F, the movable member 83 comes out from the locking to the rotation restricting member 84, and the regulation of rotation by the rotation restricting member 84 of the movable member 83 is released. As a result, the motor 80 is further driven in the normal rotation direction, whereby the gripping portion 70 gripping the wire W rotates and twists the wire W as illustrated in FIG. 28D. The gripping portion 70 is biased rearward by a spring (not illustrated), and twists the wire W while applying tension thereon. Therefore, the wire W is not loosened, and the reinforcing bar S is bound with the wire W.

FIG. 24 illustrates a state where the twisted wire W is released. After the wire W is twisted, the motor 80 is driven in the reverse rotation direction, so that the motor 80 moves the movable member 83 in the backward direction indicated by the arrow R. That is, in the movable member 83, the rotation operation interlocked with the rotation of the motor 80 is restricted by the rotation restricting member 84, and the rotation of the motor 80 is converted into a linear movement. As a result, the movable member 83 moves in the backward direction. In conjunction with the operation of the movable member 83 moving in the backward direction, the first movable gripping member 70L and the second movable gripping member 70R are displaced in a direction away from the fixed gripping member 70C, and the gripping unit 70 releases the wire W. When the binding of the reinforcing bar S is completed and the reinforcing bar S is pulled out from the reinforcing bar binding machine 1A, conventionally, the reinforcing bar S may be caught by the guide unit and it may be difficult to remove, which deteriorates workability in some cases. On the other hand, by configuring the movable guide unit 55 of the second guide unit 51 to be rotatable in the arrow H direction, when the reinforcing bar S is pulled out from the reinforcing bar binding machine 1A, the movable guide unit 55 of the second guide unit 51 does not catch the reinforcing bar S, and thus workability is improved.

<Example of Action and Effect of Reinforcing Bar Binding Machine of the Embodiment>

In the configuration according to the related art in which the first movable gripping member and the second movable gripping member are opened and closed by parallel movement, the movement of the first movable gripping member and the second movable gripping member is guided by members such as grooves and pins. For this reason, when foreign matters such as dust enter the groove, movement of the pin is hindered, and thus there is a possibility that the first movable gripping member and the second movable gripping member can hardly move in a normal manner.

When the direction of the first movable gripping member and the second movable gripping member is changed due to overload or the like, the moving direction of the pin and the extending direction of the groove are deviated from each other, and thus there is a possibility that the first movable gripping member and the second movable gripping member can hardly move in a normal manner.

On the other hand, in the present embodiment, since the first movable gripping member 70L and the second movable gripping member 70R are displaced in a direction coming in contact with and separating from the fixed gripping member 70C by the rotation operation with the shaft 77 as a fulcrum, it is hardly influenced by the dust or overload.

Accuracy of the shaft 77 is easily improved compared to a configuration in which the pin slides in the groove, and wear resistance is high. For this reason, looseness of the first movable gripping member 70L and the second movable gripping member 70R with respect to the fixed gripping member 70C and looseness between the first movable gripping member 70L and the second movable gripping member 70R can be prevented. Thus, the wire W can reliably be gripped.

When the opening and closing direction of the first movable gripping member 70L and the second movable gripping member 70R is a left and right direction and the extending direction of the opening and closing pin 71*a* is an up and down direction, the fixed gripping member 70C has a shape in which the top and bottom and the left and right are opened by the mounting portion 77C and the guide hole 78C.

Therefore, when a member for covering the top and bottom and the left and right of the fixed gripping member 70C is provided, it is possible to prevent a decrease in strength of the fixed gripping member 70C. However, the left and right of the fixed gripping member 70C obstructs the opening and closing operation of the first movable gripping member 70L and the second movable gripping member 70R, and therefore cannot be covered. Therefore, in this example, the bending portion 71 is provided with a cover portion 71*c* for covering the top and bottom of the fixed gripping member 70C which does not obstruct the opening and closing operation of the first movable gripping member 70L and the second movable gripping member 70R. As a result, it is possible to prevent the decrease in strength of the fixed gripping member 70C by providing the mounting portion 77C and the guide hole 78C which are openings.

As illustrated in FIG. 13A, the bending portion 71 has a shape to cover the opening and closing guide hole 77L, the opening and closing guide hole 77R, the opening and closing portion 78L, the opening and closing portion 78R, and the guide hole 78C with the cover portion 71*c*. For this reason, the opening and closing guide hole 77L, the opening and closing guide hole 77R, the opening and closing portion 78L, the opening and closing portion 78R, and the guide hole 78C are not exposed. Accordingly, dust can be prevented from entering the guide hole 78C or the like.

Further, the shaft 77 is provided on an extended line of the moving path of the opening and closing pin 71*a*. Thereby, it is possible to reduce the length of the fixed gripping member 70C in the left and right direction along the direction in which the first movable gripping member 70L and the second movable gripping member 70R are opened and closed. In addition, the length of the first movable gripping member 70L and the second movable gripping member 70R in the left and right direction can also be reduced.

Further, since the shaft 77 is provided on the extended line of the moving path of the opening and closing pin 71*a*, it is prevented that the moving direction of the opening and closing pin 71*a* and the extending direction of the guide hole 78C are largely deviated from each other even when the overload is applied, and the first movable gripping member 70L and the second movable gripping member 70R can be normally operated.

Figure 31A:
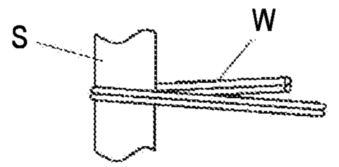
FIG. 31A is an operational effect example of the reinforcing bar binding machine of the present embodiment.
Figure 31B:
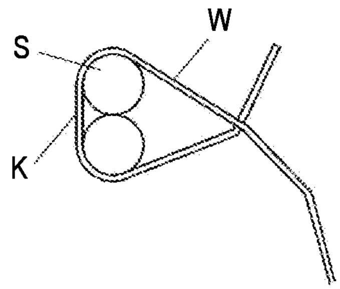
FIG. 31B is an operational effect example of the reinforcing bar binding machine of the present embodiment.
Figure 31C:
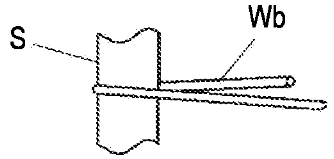
FIG. 31C is an example of the operation and problem of the reinforcing bar binding machine according to the related art.
Figure 31D:
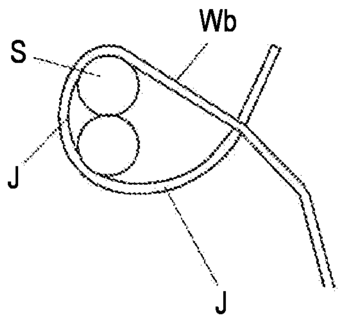
FIG. 31D is an example of the operation and problem of the reinforcing bar binding machine according to the related art.
Figure 32A:
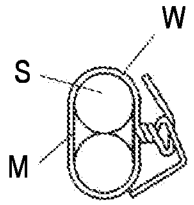
FIG. 32A is an operational effect example of the reinforcing bar binding machine of the present embodiment.
Figure 32B:
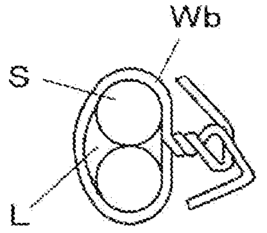
FIG. 32B is an example of the operation and problem of the reinforcing bar binding machine according to the related art.

FIGS. 31A, 31B, and 32A show examples of operational effects of the reinforcing bar binding machine of the present embodiment, and FIGS. 31C, 31D, and 32B are examples of the operation and problems of the conventional reinforcing bar binding machine. Hereinbelow, an example of the operational effects of the reinforcing bar binding machine according to the present embodiment as compared with the related art will be described with respect to the operation of binding the reinforcing bar S with the wire W.

As illustrated in FIG. 31C, in the conventional configuration in which one wire Wb having a predetermined diameter (for example, about 1.6 mm to 2.5 mm) is wound around the reinforcing bar S, as illustrated in FIG. 31D, since the rigidity of the wire Wb is high, unless the wire Wb is wound around the reinforcing bar S with a sufficiently large force, slack J occurs during the operation of winding the wire Wb, and a gap is generated between the wire and the reinforcing bar S.

On the other hand, as illustrated in FIG. 31A, in the present embodiment in which two wires W having a small diameter (for example, about 0.5 mm to 1.5 mm) are wound around the reinforcing bar S as compared with the conventional case, as illustrated in FIG. 31B, since the rigidity of the wire W is lower than that of the conventional wire, even if the wire W is wound around the reinforcing bar S with a lower force than the conventional case, slack in the wire W occurring during the operation of winding the wire W is suppressed, and the wire is surely wound around the reinforcing bar S at the linear portion K. Considering the function of binding the reinforcing bar S with the wire W, the rigidity of the wire W varies not only by the diameter of the wire W but also by the material thereof etc. For example, in the present embodiment, the wire W having a diameter of about 0.5 mm to 1.5 mm is described as an example. However, if the material of the wire W is also taken into consideration, between the lower limit value and the upper limit value of the diameter of the wire W, at least a difference of about tolerance may occur.

Further, as illustrated in FIG. 32B, in the conventional configuration in which one wire Wb having a predetermined diameter is wound around the reinforcing bar S and twisted, since the rigidity of the wire Wb is high, even in the operation of twisting the wire Wb, the slack of the wire Wb is not eliminated, and a gap L is generated between the wire and the reinforcing bar S.

On the other hand, as illustrated in FIG. 32A, in the present embodiment in which two wires W having a smaller diameter are wound around the reinforcing bar S and twisted as compared with the related art, the rigidity of the wire W is lower as compared with the conventional one, by the operation of twisting the wire W, the gap M between the reinforcing bar S and the wire can be suppressed small as compared with the conventional case, whereby the binding strength of the wire W is improved.

By using the two wires W, it is possible to equalize the reinforcing bar holding force as compared with the conventional case, and to suppress the deviation between the reinforcing bars S after the binding. In the present embodiment, two wires W are simultaneously fed, and the reinforcing bars S are bound using the two wires W fed simultaneously. Feeding the two wires W at the same time means that when one wire W and the other wire W are fed at substantially the same speed, that is, when the relative speed of the other wire W to one wire W is substantially 0. In this example, the meaning is not necessarily limited to this meaning. For example, even when one wire W and the other wire W are fed at different speeds (timings), the two wires W are advance in parallel in the feed path of the wire W in a state that the two wires W are arranged in parallel with each other, so, as long as the wire W is set to be wound around the reinforcing bar S in the parallel state, it means that two wires are fed at the same time. In other words, the total area of the cross-sectional area of each of the two wires W is a factor determining the reinforcing bar holding force, so even if the timings of feeding the two wires W are deviated, in terms of securing the reinforcing bar holding force, the same result can be obtained. However, compared to the operation of shifting the timing of feeding the two wires W, since it is possible to shorten the time required for feeding for the operation of simultaneously feeding the two wires W, it is preferable to feed the two wires W simultaneously, resulting in improvement of the binding speed. Therefore, the wire feeding unit feeds the two or more wires together.

Figure 33A:
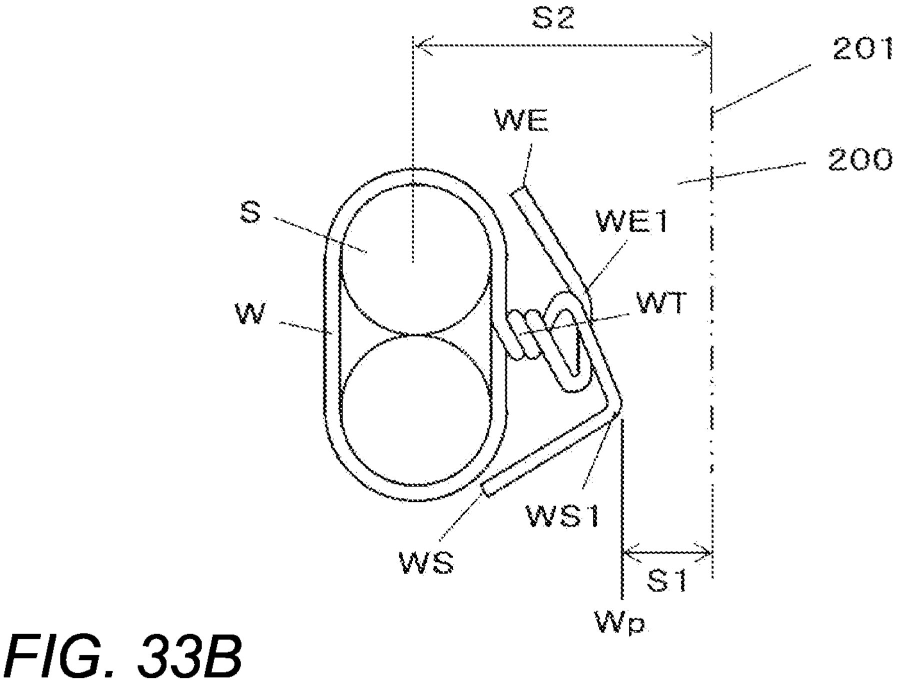
FIG. 33A is an operational effect example of the reinforcing bar binding machine of the present embodiment.
Figure 33B:
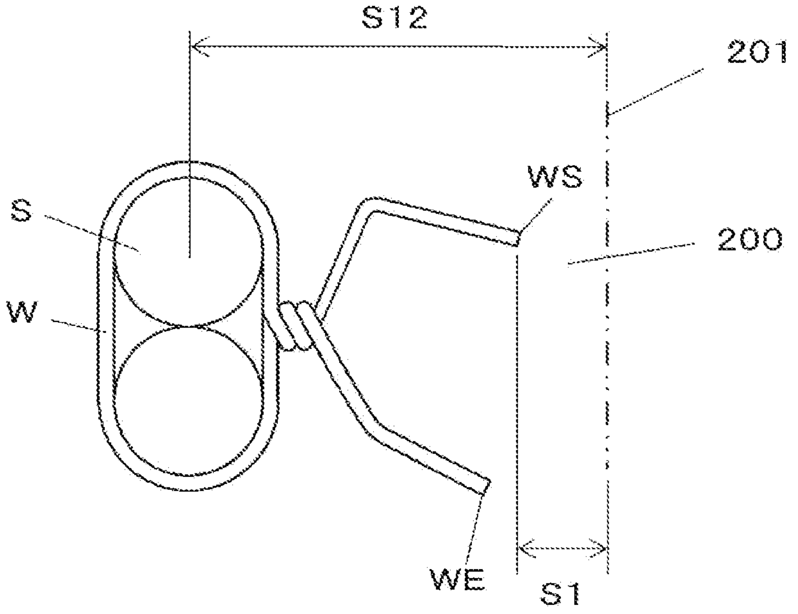
FIG. 33B is an example of the operation and problem of the reinforcing bar binding machine according to the related art.

FIG. 33A illustrates an example of the operational effect of the reinforcing bar binding machine of this embodiment, and FIG. 33B illustrates an example of an operation and a problem of the conventional reinforcing bar binding machine. Hereinbelow, an example of the operational effect of the reinforcing bar binding machine of the present embodiment as compared with the conventional one on the form of the wire W binding the reinforcing bar S will be described.

As illustrated in FIG. 33B, one end WS and the other end WE of the wire W are oriented in the opposite direction to the reinforcing bar S in the wire W bound to the reinforcing bar S in the conventional reinforcing bar binding machine. Therefore, one end WS and the other end WE of the wire W, which are the distal end side of the twisted portion of the wire W binding the reinforcing bar S largely protrude from the reinforcing bar S. If the distal end side of the wire W protrudes largely, there is a possibility that the protruding portion interferes with the operation and hinders work.

Also, after the reinforcing bars S are bound, the concrete 200 is poured into the place where the reinforcing bars S are laid. At this time, in order to prevent the one end WS and the other end WE of the wire W from protruding from the concrete 200, the thickness from the tip of the wire W bound to the reinforcing bar S, in the example of FIG. 33B, the thickness from the one end WS of the wire W to the surface 201 of the concrete 200 that has been poured is necessarily kept at a predetermined dimension S1. Therefore, in a configuration in which the one end WS and the other end WE of the wire W face the direction opposite to the reinforcing bar S, the thickness S12 from the laying position of the reinforcing bar S to the surface 201 of the concrete 200 becomes thick.

On the other hand, in the reinforcing bar binding machine 1A of the present embodiment, the wire W is bent by the bending portion 71 such that one end WS of the wire W wound around the reinforcing bar S is located closer to the reinforcing bar S than the first bent portion WS1 which is a bent portion of the wire W, and the other end WE of the wire W wound around the reinforcing bar S is located closer to the reinforcing bar S than the second bent portion WE1 which is a bent portion of the wire W. In the reinforcing bar binding machine 1A of the present embodiment, the wire W is bent by the bending portion 71 such that one of (i) the bent portion bent by the preliminary bending portion 72 in the operation of gripping the wire W by the first movable gripping member 70L and the fixed gripping member 70C and (ii) the bent portion bent by the fixed gripping member 70C and the second movable gripping member 70R in the operation of binding the wire W around the reinforcing bar S becomes the top portion of the wire W. The top portion is the most protruding portion in the direction in which the wire W is separate away from the reinforcing bar S.

As a result, as illustrated in FIG. 33A, the wire W bound to the reinforcing bar S in the reinforcing bar binding machine 1A according to the present embodiment has the first bent portion WS1 between the twisted portion WT and one end WS, and one end WS side of the wire W is bent toward the reinforcing bar S side so that one end WS of the wire W is located closer to the reinforcing bar S than the first bent portion WS1. The second bent portion WE1 is formed between the twisted portion WT and the other end WE of the wire W. The other end WE side of the wire W is bent toward the reinforcing bar S side so that the other end WE of the wire W is located closer to the reinforcing bar S side than the second bent portion WE1.

In the example illustrated in FIG. 33A, two bent portions, in this example, the first bent portion WS1 and the second bent portion WE1, are formed on the wire W. Of the two, in the wire W bound to the reinforcing bar S, the first bent portion WS1 protruding most in the direction away from the reinforcing bar S (the direction opposite to the reinforcing bar S) is the top portion Wp. Both of the one end WS and the other end WE of the wire W are bent so as not to protrude beyond the top portion Wp in the direction opposite to the reinforcing bar S.

In this manner, by setting one end WS and the other end WE of the wire W so as not to protrude beyond the top portion Wp constituted by the bent portion of the wire W in the direction opposite to the reinforcing bar S, it is possible to suppress a decrease in workability due to the protrusion of the end of the wire W. Since one end WS side of the wire W is bent toward the reinforcing bar S side and the other end WE side of the wire W is bent toward the reinforcing bar S side, the amount of protrusion on the distal end side from the twisted portion WT of the wire W is less than the conventional case. Therefore, the thickness S2 from the laying position of the reinforcing bar S to the surface 201 of the concrete 200 can be made thinner than the conventional one. Therefore, it is possible to reduce the amount of concrete to be used.

In the reinforcing bar binding machine 1A of the present embodiment, the wire W is wound around the reinforcing bar S by feeding in the forward direction, and one end WS side of the wire W wound and attached around the reinforcing bar S by feeding the wire Win the opposite direction is bent toward the reinforcing bar S side by the bending portion 71 in a state of being gripped by the fixed gripping member 70C and the first movable gripping member 70L. Further, the other end WE side of the wire W cut by the cutting unit 6A is bent toward the reinforcing bar S side by the bending portion 71 in a state of being gripped by the fixed gripping member 70C and the second movable gripping member 70R.

As a result, as illustrated in FIG. 27B, the gripping position by the fixed gripping member 70C and the first movable gripping member 70L is taken as a fulcrum 71*c*1, and as illustrated in FIG. 27C, the gripping position by the fixed gripping member 70C and the second movable gripping member 70R is taken as a fulcrum 71*c*2, the wire W can be bent. In addition, the bending portion 71 can apply a force that presses the wire W in the direction of the reinforcing bar S by displacement in a direction approaching the reinforcing bar S.

As described above, in the reinforcing bar binding machine 1A of the present embodiment, since the wire W is gripped securely at the gripping position and the wire W is bent with the fulcrums 71*c*1 and 71*c*2, it is possible that the force pressing the wire W is reliably applied to a desired direction (the reinforcing bar S side) without being dispersed to the other direction, thereby reliably bending the ends WS and WE sides of the wire W the desired direction (the reinforcing bar S side).

On the other hand, for example, in the conventional binding machine that applies a force in a direction in which the wire W is twisted in a state where the wire W is not gripped, the end of the wire W can be bent in a direction that twists the wire W. But a force to bend the wire W is applied in the state where the wire W is not gripped, so that the direction of bending the wire W is not fixed and the end of the wire W may face outward opposite to the reinforcing bar S in some cases.

However, in the present embodiment, as described above, since the wire W is firmly gripped at the gripping position and the wire W is bent with the fulcrums 71*c*1 and 71*c*2, the ends WS and WE sides of the wire W can reliably be directed to the reinforcing bar S side.

Further, if the end of the wire W is to be bent toward the reinforcing bar S side after twisting the wire W to bind the reinforcing bar S, there is a possibility that the binding place where the wire W is twisted is loosened and the binding strength decreases. Furthermore, when twisting the wire W to bind the reinforcing bar S and then trying to bend the wire end by applying a force in a direction in which the wire W is twisted further, there is a possibility that the binding place where the wire W is twisted is damaged.

On the other hand, in the present embodiment, one end WS side and the other end WE side of the wire W are bent toward the reinforcing bar S side before twisting the wire W to bind the reinforcing bar S, so that the binding place where the wire W is twisted does not become loosened and the binding strength does not decrease. Also, after twisting the wire W to bind the reinforcing bar S, no force is applied in the direction of twisting the wire W, so that the binding place where the wire W is twisted is not damaged.

Figure 34A:
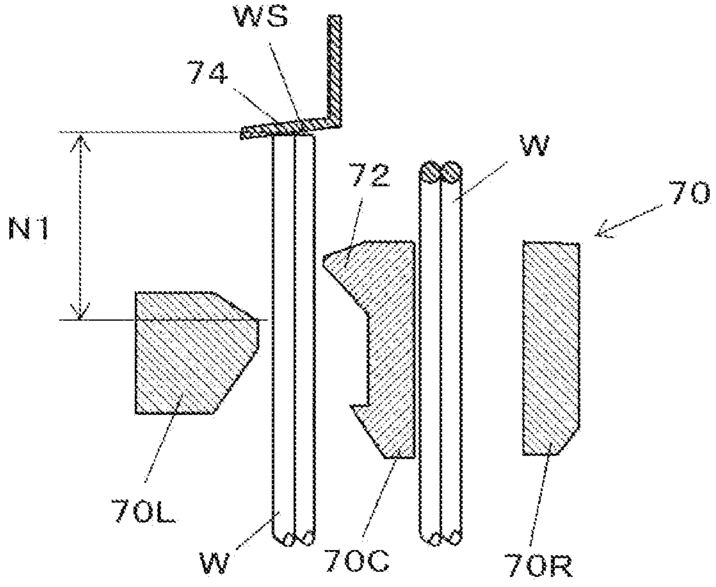
FIG. 34A is an operational effect example of the reinforcing bar binding machine of the present embodiment.
Figure 34B:
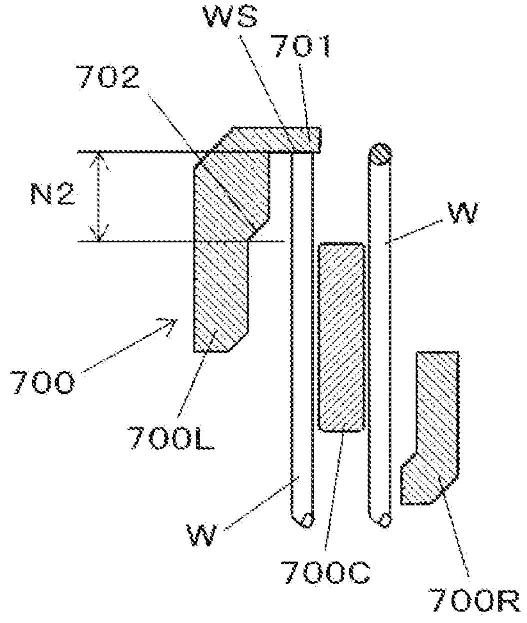
FIG. 34B is an example of the operation and problem of the reinforcing bar binding machine according to the related art.
Figure 35A:
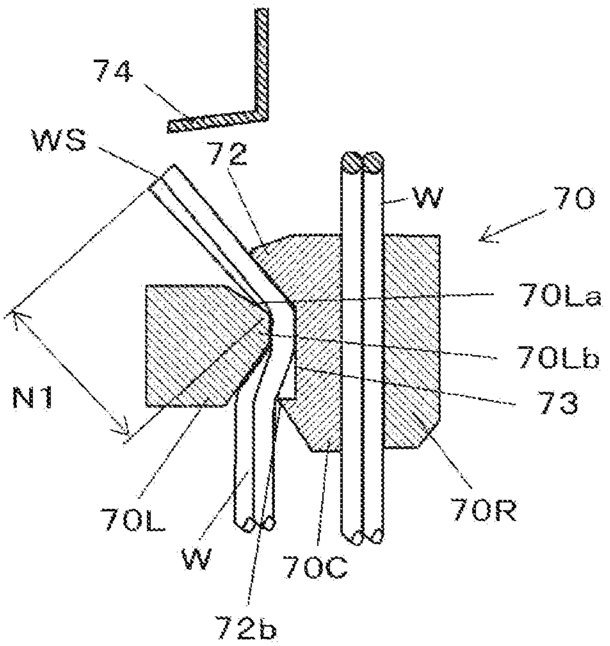
FIG. 35A is an operational effect example of the reinforcing bar binding machine of the present embodiment.
Figure 35B:
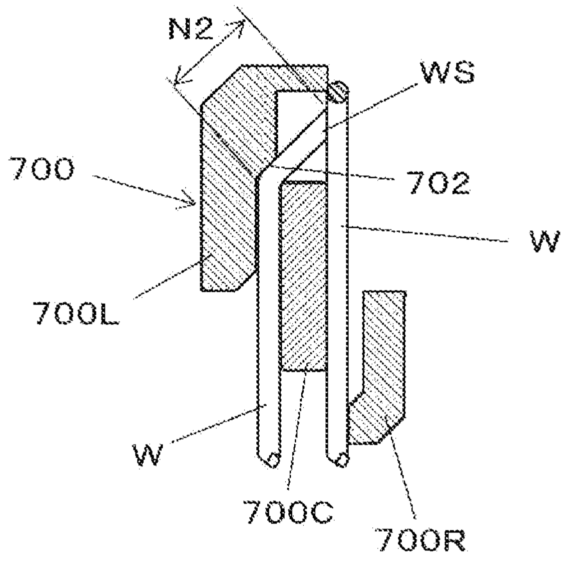
FIG. 35B is an example of the operation and problem of the reinforcing bar binding machine according to the related art.

FIGS. 34A and 35A show examples of operational effects of the reinforcing bar binding machine according to the present embodiment, and FIGS. 34B and 35B show examples of the operations and problems of the conventional reinforcing bar binding machine. Hereinbelow, an example of the operational effect of the reinforcing bar binding machine according to the present embodiment as compared with the conventional one will be described in terms of prevention of the wire W coming out from the gripping unit in the operation of winding the wire W around the reinforcing bar S.

As illustrated in FIG. 34B, the conventional gripping unit 700 of the reinforcing bar binding machine includes a fixed gripping member 700C, a first movable gripping member 700L, and a second movable gripping member 700R, and a length restricting unit 701 against which the wire W wound around the reinforcing bar S abuts is provided in the first movable gripping member 700L.

In the operation of feeding the wire W in the backward direction (pulling back) and winding it around the reinforcing bar S and the operation of twisting the wire W by the gripping unit 700, the wire W gripped by the fixed gripping member 700C and the first movable gripping member 700L is likely to come off when the distance N2 from the gripping position of the wire W by the fixed gripping member 700C and the first movable gripping member 700L to the length restricting unit 701 is short.

In order to make it difficult for the gripped wire W to come off, it is simply necessary to lengthen the distance N2. However, for this purpose, it is necessary to lengthen the distance from the gripping position of the wire Win the first movable gripping member 700L to the length restricting unit 701.

However, if the distance from the gripping position of the wire Win the first movable gripping member 700L to the length restricting unit 701 is increased, the size of the first movable gripping member 700L is increased. Therefore, in the conventional configuration, it is not possible to lengthen the distance N2 from the gripping position of the wire W by the fixed gripping member 700C and the first movable gripping member 700L to one end WS of the wire W.

On the other hand, as illustrated in FIG. 34A, in the gripping unit 70 of the present embodiment, the length restricting unit 74 where the wire W abuts is set to be a separate component independent from the first movable gripping member 70L.

This makes it possible to lengthen the distance N1 from the gripping position of the wire W in the first movable gripping member 70L to the length restricting unit 74 without increasing the size of the first movable gripping member 70L.

Therefore, even if the first movable gripping member 70L is not enlarged, it is possible to prevent the wire W gripped by the fixed gripping member 70C and the first movable gripping member 70L from coming off during the operation of feeding the wire W in the backward direction to wind around the reinforcing bar S and the operation of twisting the wire W by the gripping unit 70.

As illustrated in FIG. 35B, the conventional gripping unit 700 of the reinforcing bar binding machine is provided with, on the surface of the first movable gripping member 700L facing the fixed gripping member 700C, a protrusion protruding toward the fixed gripping member 700C and a recess into which the fixed gripping member 700C is inserted, thereby forming a preliminary bending portion 702.

As a result, in the operation of gripping the wire W by the first movable gripping member 700L and the fixed gripping member 700C, one end WS side of the wire W protruding from the gripping position by the first movable gripping member 700L and the fixed gripping member 700C is bent, and in the operation of feeding the wire W in the backward direction to wind around the reinforcing bar S and the operation of twisting the wire W by the gripping unit 700, the effect of preventing the wire W from coming off can be obtained.

However, since one end WS side of the wire W is bent inward toward the wire W passing between the fixed gripping member 700C and the second movable gripping member 700R, the bent one end WS side of the wire W may be caught in contact with the wire W to be fed in the backward direction for winding around the reinforcing bar S.

When the bent one end WS side of the wire W is caught by the wire W that is fed in the backward direction for winding around the reinforcing bar S, there is a possibility that the winding of the wire W becomes insufficient or the twisting of the wire W is insufficient.

On the other hand, in the gripping unit 70 of the present embodiment, as illustrated in FIG. 35A, on the surface facing the first movable gripping member 70L of the fixed gripping member 70C, a protrusion protruding toward the first movable gripping member 70L and a recess into which the first movable gripping member 70L is inserted are provided to form the preliminary bending portion 72.

Thus, by the operation of gripping the wire W with the first movable gripping member 70L and the fixed gripping member 70C, one end WS of the wire W protruding from the gripping position by the first movable gripping member 70L and the fixed gripping member 70C is bent, one end WS of the wire W is gripped at three points of protrusion formed by the preliminary bending portion 72 in the fixed gripping member 70C, a protrusion formed by the first movable gripping member 70L and entering the recess of the preliminary bending portion 72, and the other protrusion formed by the fixed gripping member 70C. Therefore, it is possible to obtain the effect of preventing the slip of the wire W by the operation of feeding the wire W in the reverse direction and winding it around the reinforcing bar S and the operation of twisting the wire W with the gripping portion 70.

One end WS side of the wire W is bent to the outside opposite to the wire W passing between the fixed gripping member 70C and the second movable gripping member 70R, so that it is suppressed that the bent one end WS side of the wire W is in contact with the wire W fed in the backward direction to wind around the reinforcing bar S.

Thus, in the operation of feeding the wire W in the backward direction to wind around the reinforcing bar S, it is prevented that the wire W comes off from the gripping unit 70, thereby surely winding the wire W, and in the operation of twisting the wire W, it is possible to reliably perform the binding of the wire W.

Next, existing problems of the guide constituting the feed path used to wind the wire around the reinforcing bar S will be described. In the reinforcing bar binding machine in which the wires are fed and wound around the reinforcing bar, and then twisted to bind the reinforcing bar, the looped wire is difficult to spread in the radial direction of the loop, so that the guide constituting the feed path used to wind the wire around the reinforcing bar is movable.

Meanwhile, in the reinforcing bar binding machine according to the related art having the configuration in which after the wires are fed in the forward direction and wound around the reinforcing bar, the wires are fed in the backward direction and cut by being wound around the reinforcing bar, and a position at which one end side and the other end side of the wire intersect with each other is twisted to bind the reinforcing bar, the feeding of the wire is temporarily stopped in order to switch the wire feeding direction.

When the feeding of the wire is temporarily stopped, a small amount of wire is fed in the forward direction until the feeding of the wire is stopped, and thus the wire wound around the binding target is displaced in a radial spreading direction. For this reason, the guide constituting the feed path for winding the wire around the reinforcing bar is fixed in the reinforcing bar binding machine according to the related art. Therefore, the reinforcing bar is caught by the guide unit and is hardly pulled out, so workability was bad.

Figure 36A:
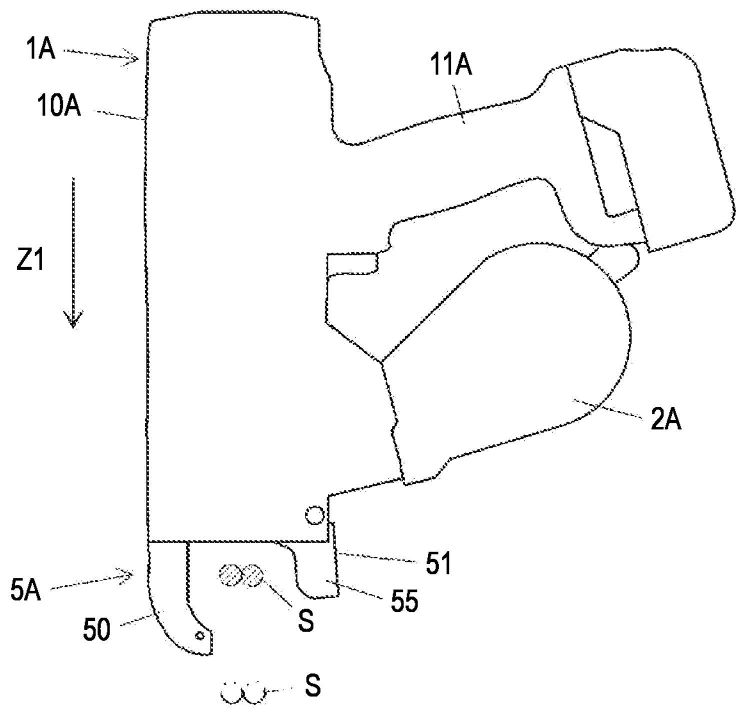
FIG. 36A is an operational effect example of the reinforcing bar binding machine of the present embodiment.
Figure 36B:
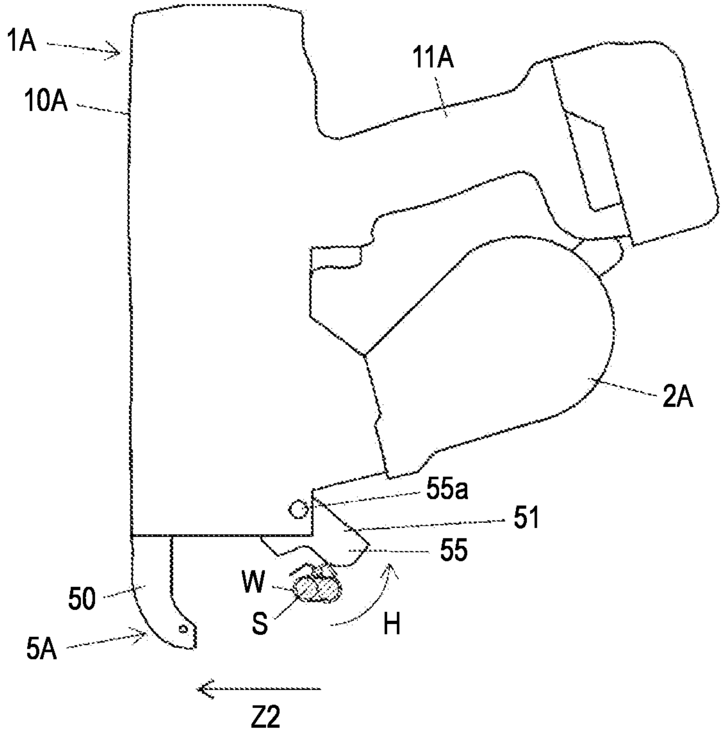
FIG. 36B is an operational effect example of the reinforcing bar binding machine of the present embodiment.

FIGS. 36A and 36B are examples of the operational effects of the reinforcing bar binding machine of the present embodiment. Hereinbelow, examples of the operational effects of the reinforcing bar binding machine of this embodiment with respect to the operation of inserting the reinforcing bars into the curl guide unit and the operation of pulling the reinforcing bar from the curl guide unit will be described. For example, in the case of binding the reinforcing bars S constituting the base with the wire W, in the work using the reinforcing bar binding machine 1A, the opening between the first guide unit 50 and the second guide unit 51 of the curl guide unit 5A faces downward.

When performing a binding operation, the opening between the first guide unit 50 and the second guide unit 51 is directed downward, and the reinforcing bar binding machine 1A is moved downward as indicated by an arrow Z1 as illustrated in FIG. 36A, the reinforcing bar S enters the opening between the first guide unit 50 and the second guide unit 51.

When the binding operation is completed and the reinforcing bar binding machine 1A is moved in the lateral direction indicated by the arrow Z2 as illustrated in FIG. 36B, the second guide unit 51 is pressed against the reinforcing bar S bound by the wire W, and the movable guide unit 55 on the distal end side of the second guide unit 51 rotates in the direction of the arrow H around the shaft 55*b* as a fulcrum.

Therefore, every time the wire W is bound to the reinforcing bar S, the binding work can be performed successively only by moving the reinforcing bar binding machine 1A in the lateral direction without lifting the reinforcing bar binding machine 1A every time. Therefore, (since it is sufficient to simply move the reinforcing bar binding machine 1A in the lateral direction as compared with moving the reinforcing bar binding machine 1A once upward and moving it downward) it is possible to reduce restrictions on the moving direction and the movement amount of the reinforcing bar binding machine 1A in the operation of pulling out the reinforcing bar S bound to the wire W, thereby improving working efficiency.

In addition, as illustrated in FIG. 26B, the fixed guide unit 54 of the second guide unit 51 is fixed without being displaced and capable of restricting the position in the radial direction Ru2 of the wire W in the binding operation described above. Accordingly, in the operation of winding the wire W around the reinforcing bar S, the position in the radial direction of the wire W can be restricted by the wall surface 54*a* of the fixed guide unit 54, and the displacement in the direction of the wire W guided to the gripping portion 70 can be suppressed, thereby suppressing occurrence of gripping failure. As described above, the reinforcing bar binding machine according to the related art in which the wires are wound around the reinforcing bar, and then twisted to bind the reinforcing bar has a configuration in which the looped wire is difficult to spread in the radial direction of the loop because there is no feeding for pulling back the wire and there is no operation of temporarily stopping the feeding of the wire and inverting the feeding direction. For this reason, a guide corresponding to the fixed guide unit of the present embodiment is unnecessary. However, even in such a reinforcing bar binding machine, when the fixed guide unit and the movable guide unit of the invention are applied, it is possible to suppress the radial expansion of the loop of the wire wound around the reinforcing bar.

In the following, an example of the operational effect of the reinforcing bar binding machine of the present embodiment with respect to the displacement unit 34 will be described. In the reinforcing bar binding machine 1A of the present embodiment, as illustrated in FIG. 2, the displacement unit 34 includes a second displacement member 36 in a direction substantially orthogonal to the feeding direction of the wire W, on the back side of the first feed gear 30L and the second feed gear 30R, that is, between the first feed gear 30L and the second feed gear 30R and the handle portion 11A. An operation button 38 for displacing the second displacement member 36, a release lever 39 for locking and unlocking the operation button 38 are provided between the first feed gear 30L and the second feed gear 30R and the handle portion 11A.

In this way, by providing the mechanism for displacing the second feed gear 30R between the second feed gear 30R and the handle portion 11A on the back side of the second feed gear 30R, there is no need to provide a mechanism for displacing the second feed gear 30R in the feed path of the wire W that is below the first feed gear 30L and the second feed gear 30R.

This makes it possible to dispose the magazine 2A close to the wire feeding unit 3A as compared with a configuration in which a mechanism for displacing a pair of feed gears is provided between the wire feeding unit and the magazine, thereby reducing the size of the device. Further, since the operation button 38 is not provided between the magazine 2A and the wire feeding unit 3A, the magazine 2A can be disposed close to the wire feeding unit 3A.

Furthermore, since the magazine 2A can be disposed close to the wire feeding unit 3A, as illustrated in FIG. 16, in the magazine 2A housing the cylindrical reel 20, a protrusion portion 21 which protrudes in accordance with the shape of the reel 20 can be disposed above the mounting position of the battery 15A. Therefore, the protrusion portion 21 can be disposed close to the handle portion 11A, and the size of the device can be reduced.

In addition, since a mechanism for displacing the second feed gear 30R is not provided in the feed path of the wire W below the first feed gear 30L and the second feed gear 30R, a wire loading space 22 for the wire feeding unit 3A is formed in the magazine 2A, and there is no constituent element which obstructs loading of the wire W, whereby loading of the wire W can be carried out easily.

In the wire feeding unit configured by a pair of feed gears, a displacement member for separating one feed gear from the other feed gear, and a holding member that holds the displacement member in a state in which one feed gear is separated from the other feed gear. In such a configuration, when one feed gear is pushed in a direction away from the other feed gear due to deformation of the wire W or the like, there is a possibility that the displacement member may be locked to the holding member so that one feed gear is held in a state separated from the other feed gear.

If one feed gear is held in a state separated from the other feed gear, the wire W cannot be pinched by the pair of feed gears, and the wire W cannot be fed.

On the other hand, in the reinforcing bar binding machine 1A of the present embodiment, as illustrated in FIG. 4A, the first displacement member 35 and the second displacement member 36 which are displacement members for separating the second feed gear 30R from the first feed gear 30L and the operation button 38 and the release lever 39 for releasing locking and unlocking in the state where the second feed gear 30R is separated from the first feed gear 30L are made independent components.

Figure 4D:
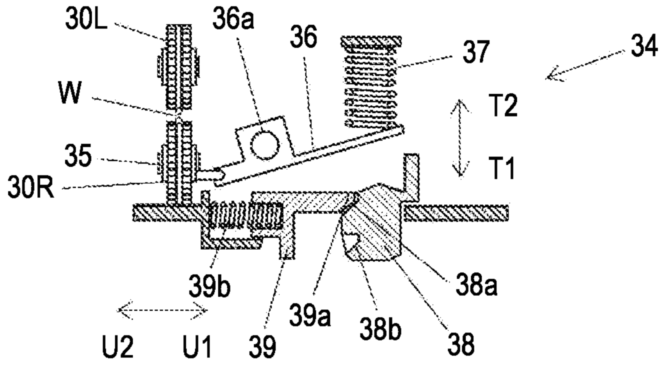
FIG. 4D is a view illustrating an example of a displacement unit of the present embodiment.

Accordingly, as illustrated in FIG. 4D, when the second feed gear 30R is pushed in a direction away from the first feed gear 30L due to deformation of the wire W or the like, the second displacement member 36 presses the spring 37 to be displaced, but it is not locked. Therefore, the second feed gear 30R can always be pressed in the direction of the first feed gear 30L by the force of the spring 37, and even if the second feed gear 30R is temporarily separated from the first feed gear 30L, the state in which the wire W is pinched by the first feed gear 30L and the second feed gear 30R can be restored, and the feeding of the wire W can be continued.

<Modified Example of Reinforcing Bar Binding Machine in the Embodiment>

As the reinforcing bar binding machine 1A of the present embodiment, the configuration is described in which two wires W are used, but the reinforcing bar S may be bound with one wire W or two or more wires W.

In the gripping portion 70, the first movable gripping member 70L and the second movable gripping member 70R are opened and closed at the same timing. On the other hand, since it is sufficient that the wire W is gripped between the first movable gripping member 70L and the fixed gripping member 70C in the operation of returning the wire W, the operation of the first movable gripping member 70L may be preceded by the operation of the second movable gripping member 70R. The operation timing of the first movable gripping member 70L and the second movable gripping member 70R can be controlled by the shape of the opening and closing guide hole 77L and the opening and closing guide hole 77R.

FIGS. 37A, 38B, 37C, 37D, and 37E are diagrams illustrating modified examples of the parallel guide of the present embodiment. In the parallel guide 4B illustrated in FIG. 37A, the cross-sectional shape of the opening 4BW, that is, the cross-sectional shape of the opening 4BW in a direction perpendicular to the feeding direction of the wire W is formed in a rectangular shape, and the longitudinal direction and the lateral direction of the opening 4BW are linear. In the parallel guide 4B, the length L1 in the longitudinal direction (or larger dimension) of the opening 4BW is slightly twice or more times longer than the diameter r of the wire W in a form in which the wires W are arranged along the radial direction, the length L2 in the lateral direction (or smaller dimension) is slightly longer than the diameter r of one wire W. In the parallel guide 4B in this example, the length L1 of the opening 4BW in the longitudinal direction is slightly twice longer than the diameter r of the wire W.

Figure 37A:
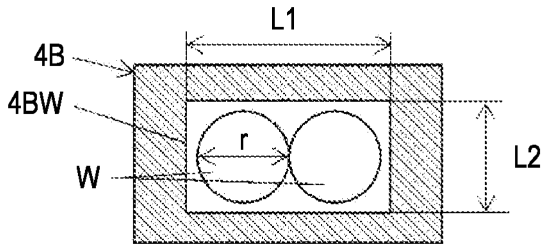
FIG. 37A is a view illustrating a modified example of the parallel guide of the present embodiment.
Figure 37B:
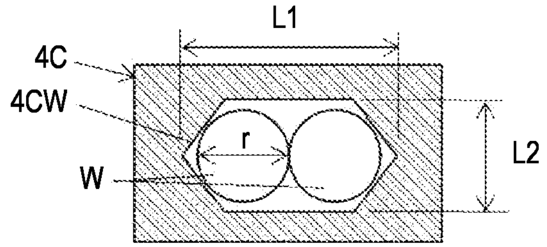
FIG. 37B is a view illustrating a modified example of the parallel guide of the present embodiment.

In the parallel guide 4C illustrated in FIG. 37B, the longitudinal direction of the opening 4CW is formed in a straight shape and the lateral direction is formed in a triangular shape. In the parallel guide 4C, in order that a plurality of wires W are arranged in parallel in the longitudinal direction of the opening 4CW and the wire W can be guided by the inclined plane in the lateral direction, the longitudinal length L1 of the opening 4CW is slightly twice or more times longer than the diameter r of the wire W in the form in which the wires W are arranged along the radial direction, and the lateral length L2 is slightly twice longer than the diameter r of the wire W.

Figure 37C:
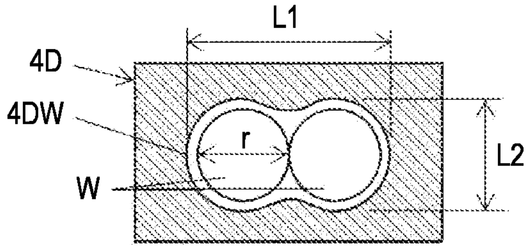
FIG. 37C is a view illustrating a modified example of the parallel guide of the present embodiment.

In the parallel guide 4D illustrated in FIG. 37C, the longitudinal direction of the opening 4DW is formed in a curved shape which is curved inward in a convex shape and the lateral direction is formed in a circular arc shape. That is, the opening shape of the opening 4DW is formed in a shape that conforms to the outer shape of the parallel wires W. In the parallel guide 4D, the length L1 in the longitudinal direction of the opening 4DW is slightly twice or more times longer than the diameter r of the wire W in the form in which the wires W are arranged along the radial direction, the length L2 in the lateral direction is slightly longer than the diameter r of one wire W. In the parallel guide 4D, in the present example, the length L1 in the longitudinal direction has a length slightly twice longer than the diameter r of the wire W.

Figure 37D:
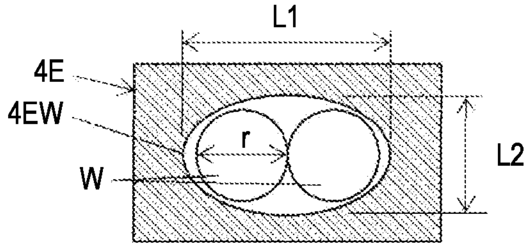
FIG. 37D is a view illustrating a modified example of the parallel guide of the present embodiment.

In the parallel guide 4E illustrated in FIG. 37D, the longitudinal direction of the opening 4EW is formed in a curved shape curved outward in a convex shape, and the lateral direction is formed in a circular arc shape. That is, the opening shape of the opening 4EW is formed in an elliptical shape. The parallel guide 4E has a length L1 in the longitudinal direction of the opening 4EW which is slightly twice or more times longer than the diameter r of the wire W in a form in which the wires W are arranged along the radial direction, and a length L2 in the lateral direction is slightly longer than the diameter r of one wire W. In this example, the parallel guide 4E has a length L1 in the longitudinal direction slightly twice longer than the diameter r of the wire W.

Figure 37E:
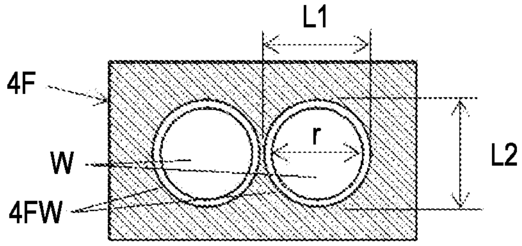
FIG. 37E is a view illustrating a modified example of the parallel guide of the present embodiment.

The parallel guide 4F illustrated in FIG. 37E includes a plurality of openings 4FW matching the number of wires W. Each wire W is passed through another opening 4FW one by one. In the parallel guide 4F, each opening 4FW has a diameter (length) L1 slightly longer than the diameter r of the wire W, and by the direction in which the openings 4FW are arranged, the direction in which a plurality of wires W are arranged in parallel is restricted.

Figure 38:
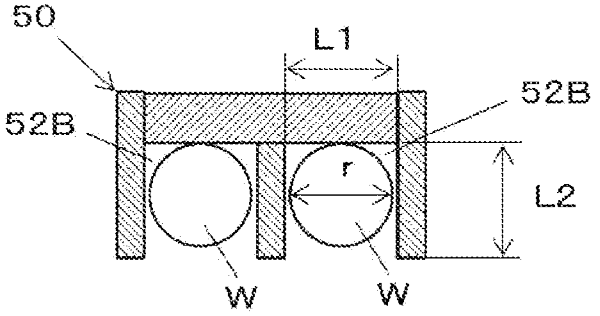
FIG. 38 is a view illustrating a modified example of the guide groove of the present embodiment.

FIG. 38 is a diagram illustrating a modified example of the guide groove of this embodiment. The guide groove 52B has a width (length) L1 and a depth L2 slightly longer than the diameter r of the wire W. Between one guide groove 52B through which one wire W passes and the other guide groove 52B through which the other wire W passes, a section wall portion is formed along the feeding direction of the wire W. The first guide unit 50 restricts the direction in which a plurality of wires are arranged in parallel with each other by the direction in which the plurality of guide grooves 52B are arranged.

Figure 39A:
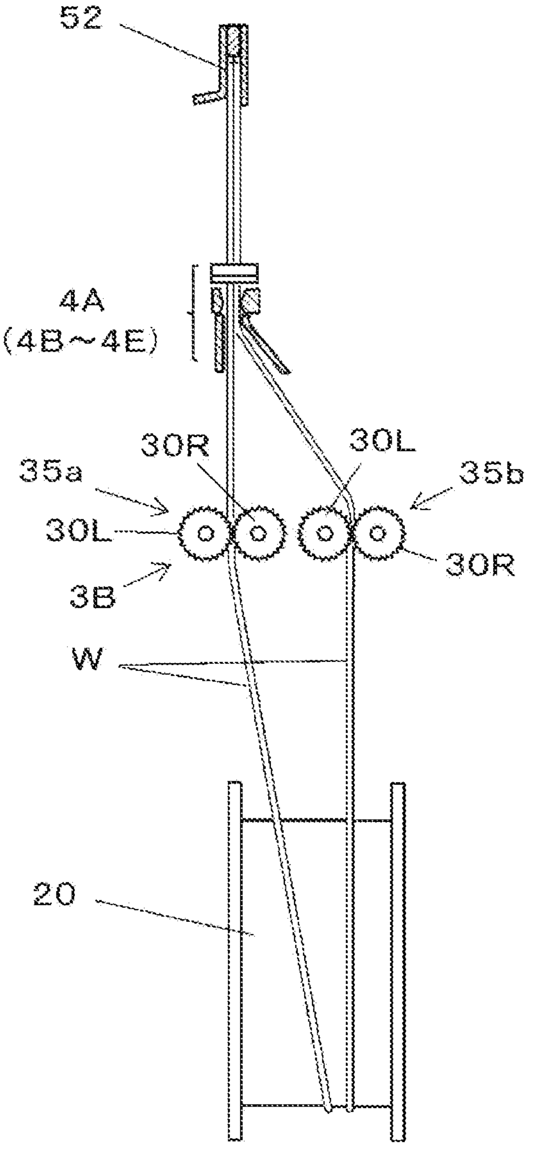
FIG. 39A is a view illustrating a modified example of the wire feeding unit of the present embodiment.
Figure 39B:
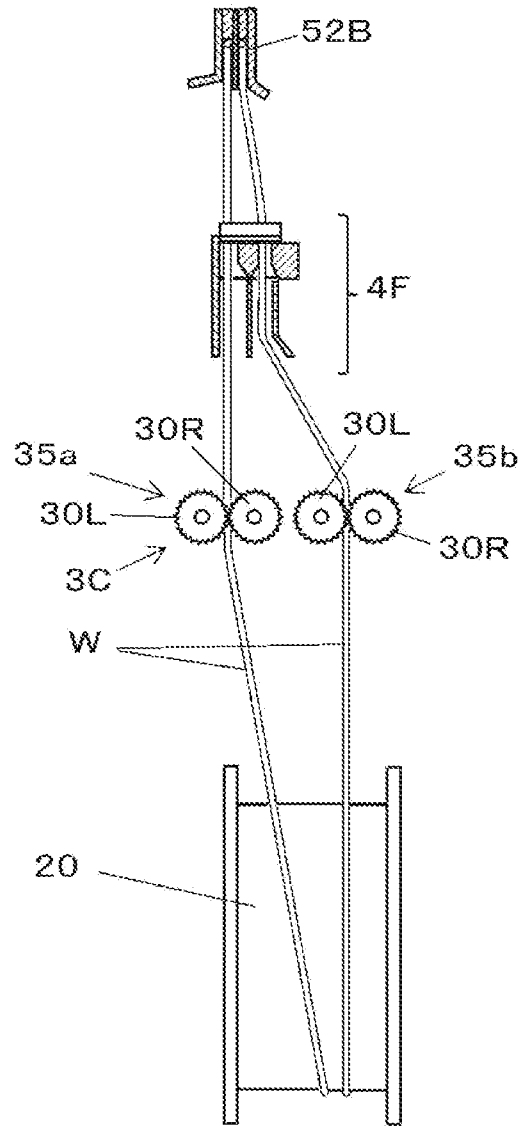
FIG. 39B is a view illustrating a modified example of the wire feeding unit of the present embodiment.

FIGS. 39A and 39B are diagrams illustrating modified examples of the wire feeding unit according to the present embodiment. The wire feeding unit 3B illustrated in FIG. 39A includes a first wire feeding unit 35*a* and a second wire feeding unit 35*b* that feed the wire W one by one. The first wire feeding unit 35*a* and the second wire feeding unit 35*b* are provided with a first feed gear 30L and a second feed gear 30R, respectively.

Each wire W fed one by one by the first wire feeding unit 35*a* and the second wire feeding unit 35*b* is arranged in parallel in a predetermined direction by the parallel guide 4A illustrated in FIG. 5A, 5B, or 5C, or the parallel guides 4B to 4E illustrated in FIG. 37A, 37B, 37C, or 37D, and the guide groove 52 illustrated in FIG. 6.

The wire feeding unit 3C illustrated in FIG. 39B includes a first wire feeding unit 35*a* and a second wire feeding unit 35*b* that feed the wire W one by one. The first wire feeding unit 35*a* and the second wire feeding unit 35*b* are provided with a first feed gear 30L and a second feed gear 30R, respectively.

Each of the wires W fed one by one by the first wire feeding unit 35*a* and the second wire feeding unit 35*b* is arranged in parallel in a predetermined direction by the parallel guide 4F illustrated in FIG. 37E and the guide groove 52B illustrated in FIG. 39B. In the wire feeding unit 30C, since the two wires W are independently guided, if the first wire feeding unit 35*a* and the second wire feeding unit 35*b* can be independently driven, it is also possible to shift the timing to feed the two wires W. Even if the operation of winding the reinforcing bar S is performed by starting the feeding of the other wire W from the middle of the operation of winding the reinforcing bar S with one of the two wires W, the two wires W are regarded to be fed at the same time. Also, although feeding of two wires W is started at the same time, when the feeding speed of one wire W is different from the feeding speed of the other wire W, the two wires W are regarded to be simultaneously fed as well.

In the reinforcing bar binding machine 1A of the present embodiment, the length restricting unit 74 is provided in the first guide unit 50 of the curl guide unit 5A, but may be provided in the first movable gripping member 70L or the like, or another location, as long as it is a component independent of the gripping portion 70, for example, a structure that supports the gripping portion 70.

Further, before the operation of bending the one end WS side and the other end WE side of the wire W toward the reinforcing bar S side by the bending portion 71 is completed, the rotation operation of the gripping portion 70 may be started, and thus the operation of twisting the wire W may be started. Further, after starting the operation of twisting the wire W by starting the rotation operation of the gripping portion 70, before the operation of twisting the wire W is completed, the operation of bending the one end WS side and the other end WE side toward the reinforcing bar S side by the bending portion 71 may be started and completed.

In addition, although the bending portion 71 is formed integrally with the movable member 83 as a bending unit, the gripping portion 70 and the bending portion 71 may be driven by an independent driving unit such as a motor. Further, instead of the bending portion 71, as a bending unit, a bending portion formed in a concave-convex shape, or the like may be provided in any of the fixed gripping member 70C, the first movable gripping member 70L, and the second movable gripping member 70R to apply a bending force by which the wire W is bent toward the reinforcing bar S in the operation of gripping the wire W.

Figure 40A:
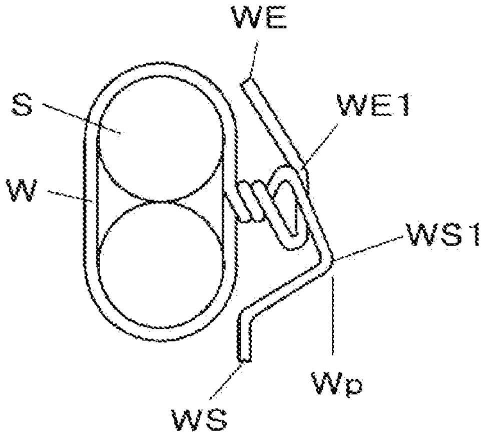
FIG. 40A is an explanatory view illustrating a modified example of the present embodiment.
Figure 40B:
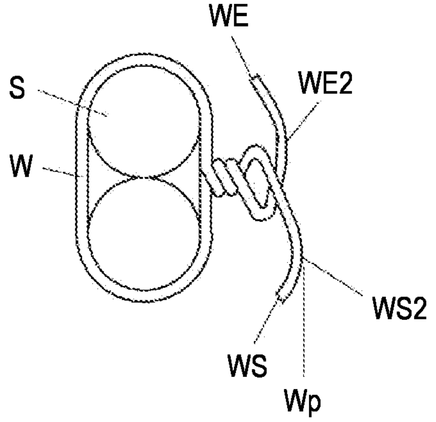
FIG. 40B is an explanatory view illustrating a modified example of the present embodiment.
Figure 40C:
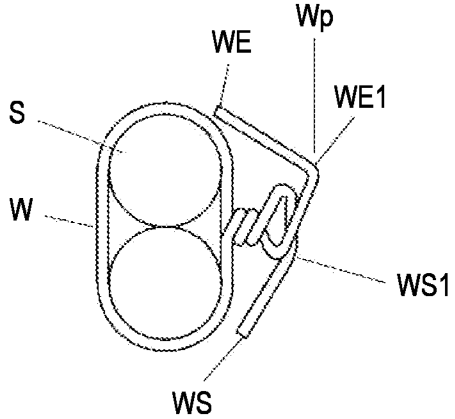
FIG. 40C is an explanatory view illustrating a modified example of the present embodiment.

FIGS. 40A, 40B, and 40C are explanatory views illustrating modified examples of the present embodiment. In the reinforcing bar binding machine 1A according to the present embodiment, the bending portion 71 allows the one end WS of the wire W to be located closer to the reinforcing bar S than the first bent portion WS1 of the wire W and allows the other end WE of the wire W wound around the reinforcing bar S to be located closer to the reinforcing bar S than the second bent portion WE1 of the wire W. In the example illustrated in FIG. 40A, since the first bent portion WS1, which is the most protruding portion in the direction opposite to the reinforcing bar S, is the top Wp, one end WS and the other end WE of the wire W may do not protrude in the direction opposite to the reinforcing bar S beyond the top Wp formed at the first bent portion WS1. For this reason, as illustrated in FIG. 40A, for example, if one end WS of the wire W is bent toward the reinforcing bar S at the first bent portion WS1, one end WS of the wire W may do not face the reinforcing bar S.

As illustrated in FIG. 40B, a bending unit may be provided such that the first bent portion WS2 and the second bent portion WE2 are bent in a curved shape. In this case, since the most protruding portion in the direction opposite to the reinforcing bar S is the first bent portion WS2, the first bent portion WS2 becomes the top Wp, and one end WS and the other end WE of the wire W may do not protrude in the direction opposite to the reinforcing bar S beyond the top Wp formed at the first bent portion WS1.

Further, as illustrated in FIG. 40C, one end WS of the wire W is bent toward the reinforcing bar S such that one end WS of the wire W is located closer to the reinforcing bar S than the first bent portion WS1. In addition, the other end WE of the wire W is bent toward the reinforcing bar S such that the other end WE of the wire W is located closer to the reinforcing bar S than the second bent portion WS2. Then, the second bent portion WE1 protruding most in the direction opposite to the reinforcing bar S in the wire W for binding the reinforcing bar S may be formed to be the top Wp, and both of one end WS and the other end WE of the wire W are bent so as not to protrude in the direction opposite to the reinforcing bar S beyond the top Wp.

Figure 41A:
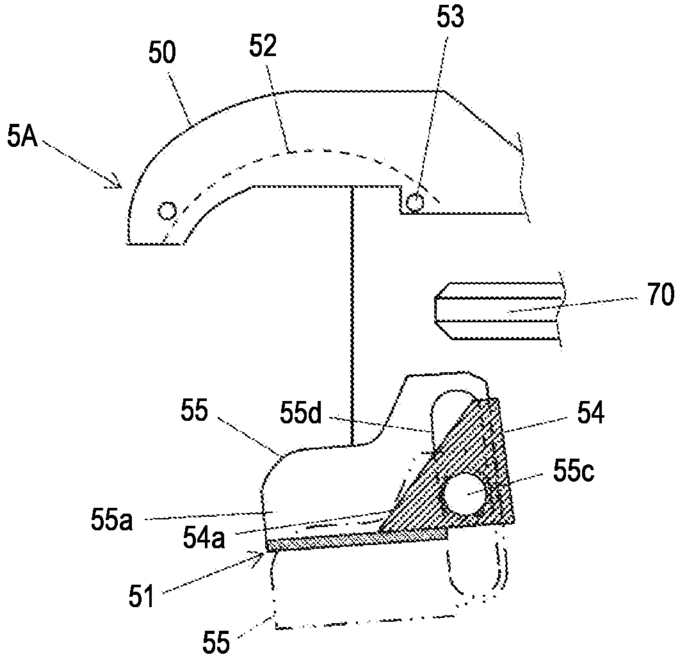
FIG. 41A is a view illustrating a modified example of the second guide unit of the present embodiment.
Figure 41B:
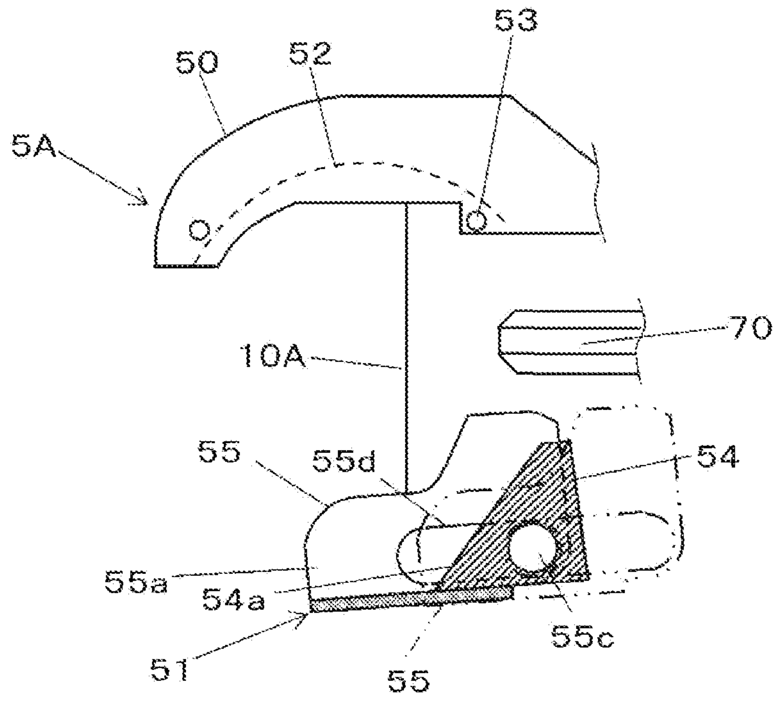
FIG. 41B is a view illustrating a modified example of the second guide unit of the present embodiment.

FIGS. 41A and 41B are views illustrating modified examples of the second guide unit of the present embodiment. The displacement direction of the movable guide unit 55 of the second guide unit 51 is restricted by the guide shaft 55*c* and the guide groove 55*d* along the displacement direction of the movable guide unit 55. For example, as illustrated in FIG. 41A, the movable guide unit 55 includes the guide groove 55*d* extending along the direction in which the movable guide unit 55 moves with respect to the first guide unit 50, that is, the direction in which the movable guide unit 55 moves closer to and away from the first guide unit 50. The fixed guide unit 54 includes the guide shaft 55*c* which is inserted into the guide groove 55*d* and is movable in the guide groove 55*d*. Consequently, the movable guide unit 55 is displaced from the guide position to the retreat position by the parallel movement in the direction in which the movable guide unit 55 comes into contact with and separates from the first guide unit 50 (up and down direction in FIG. 41A).

Further, as illustrated in FIG. 41B, a guide groove 55*d* extending in the forward and backward direction may be provided in the movable guide unit 55. As a result, the movable guide unit 55 is displaced from the guide position to the retreat position by movement in the forward and backward direction in which protruding from the front end, which is one end of the main body 10A, and retreating to the inside of the main body 10A are performed. The guide position in this case is a position where the movable guide unit 55 protrudes from the front end of the main body 10A so that the wall surface 55*a* of the movable guide unit 55 exists at a position where the wire W forming the loop Ru passes. The retreat position is a state in which all or a part of the movable guide unit 55 has entered the inside of the main body 10A. Further, a configuration may be adopted in which the movable guide unit 55 is provided with a guide groove 55*d* extending in an oblique direction along the direction of contacting and separating from the first guide unit 50 and in the forward and backward direction. The guide groove 55*d* may be formed in a straight line shape or a curved line shape such as a circular arc.

Figure 42:
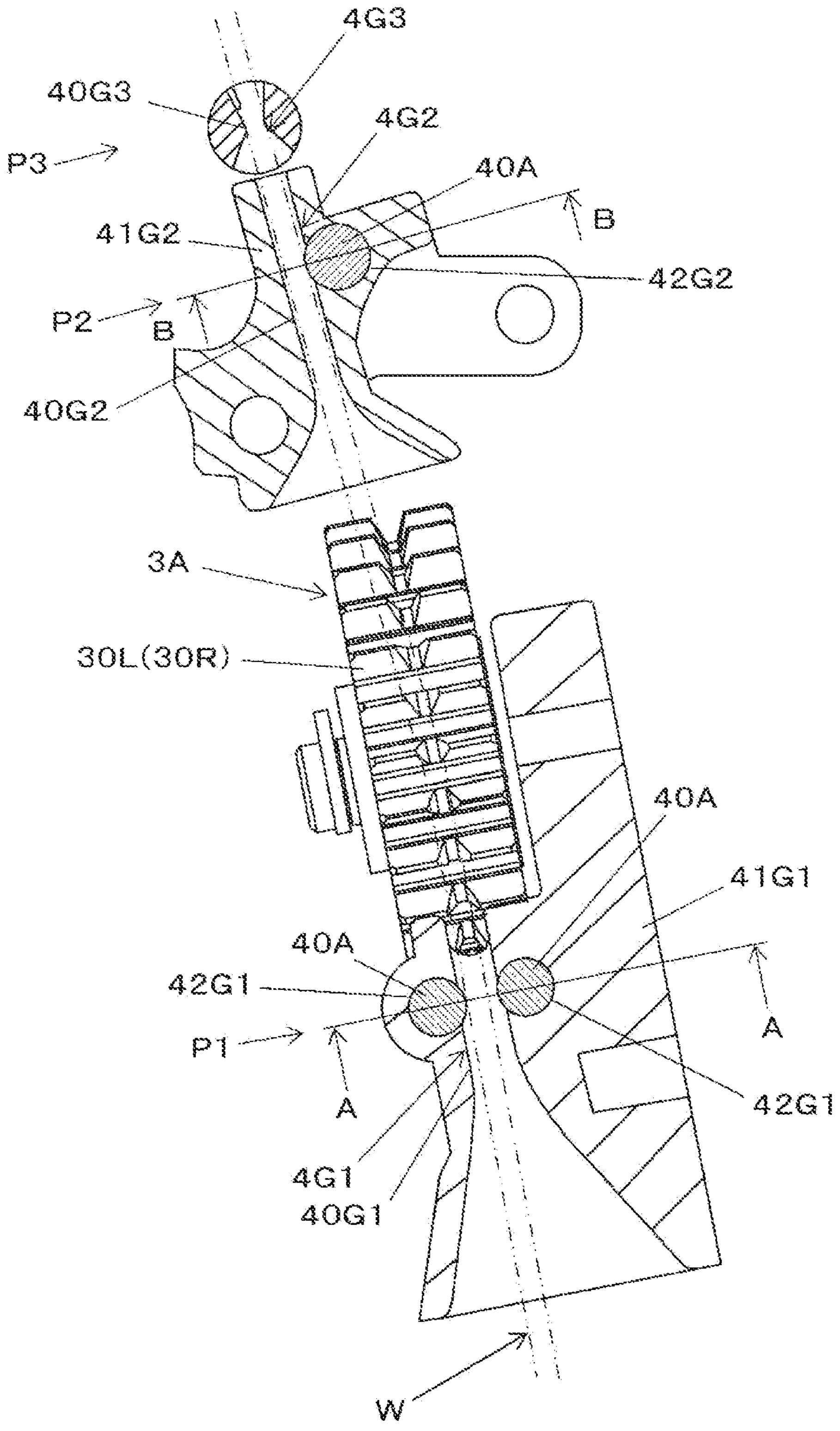
FIG. 42 is a view illustrating an example of a parallel guide according to another embodiment.
Figure 43A:
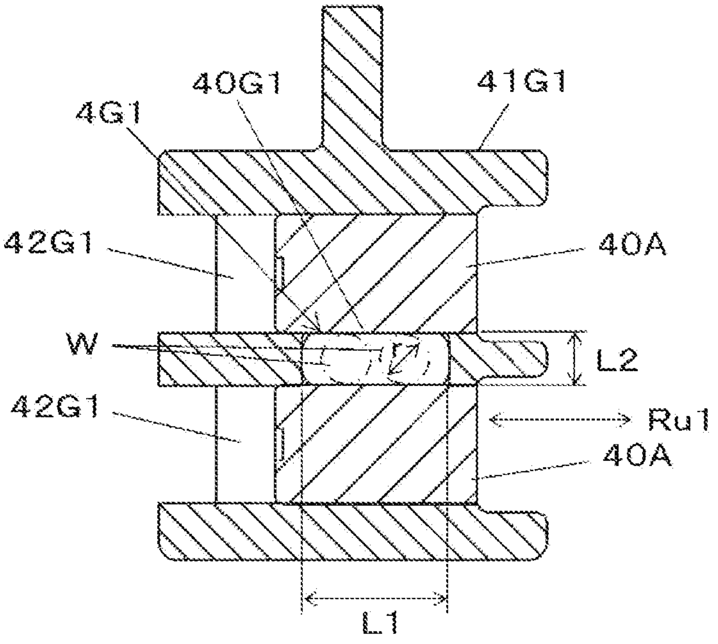
FIG. 43A is a view illustrating an example of a parallel guide according to another embodiment.
Figure 43B:
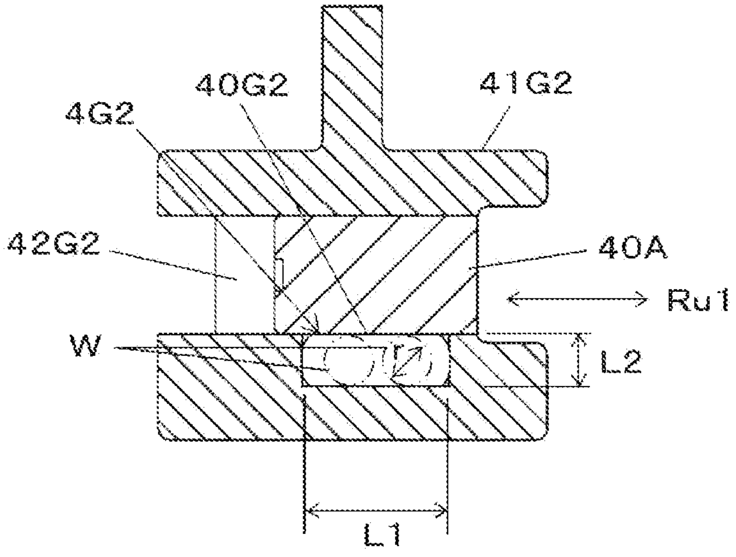
FIG. 43B is a view illustrating an example of a parallel guide according to another embodiment.
Figure 44:
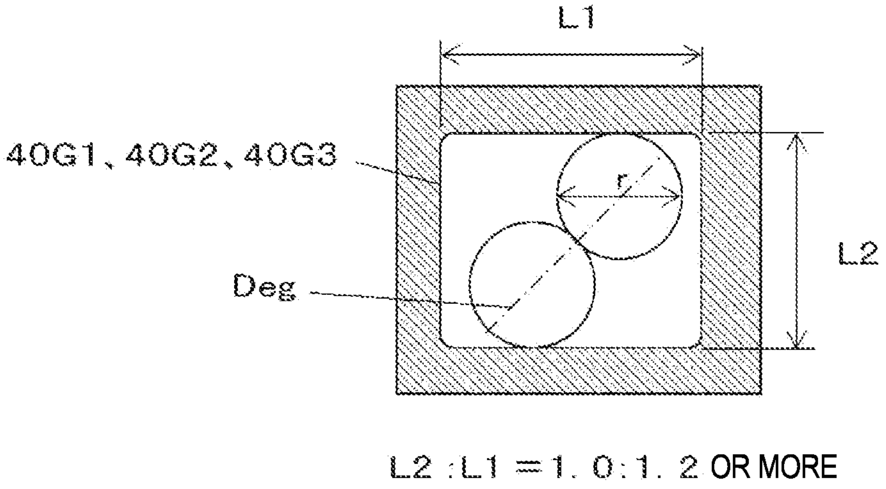
FIG. 44 is a view illustrating an example of a parallel guide according to another embodiment.
Figure 45:
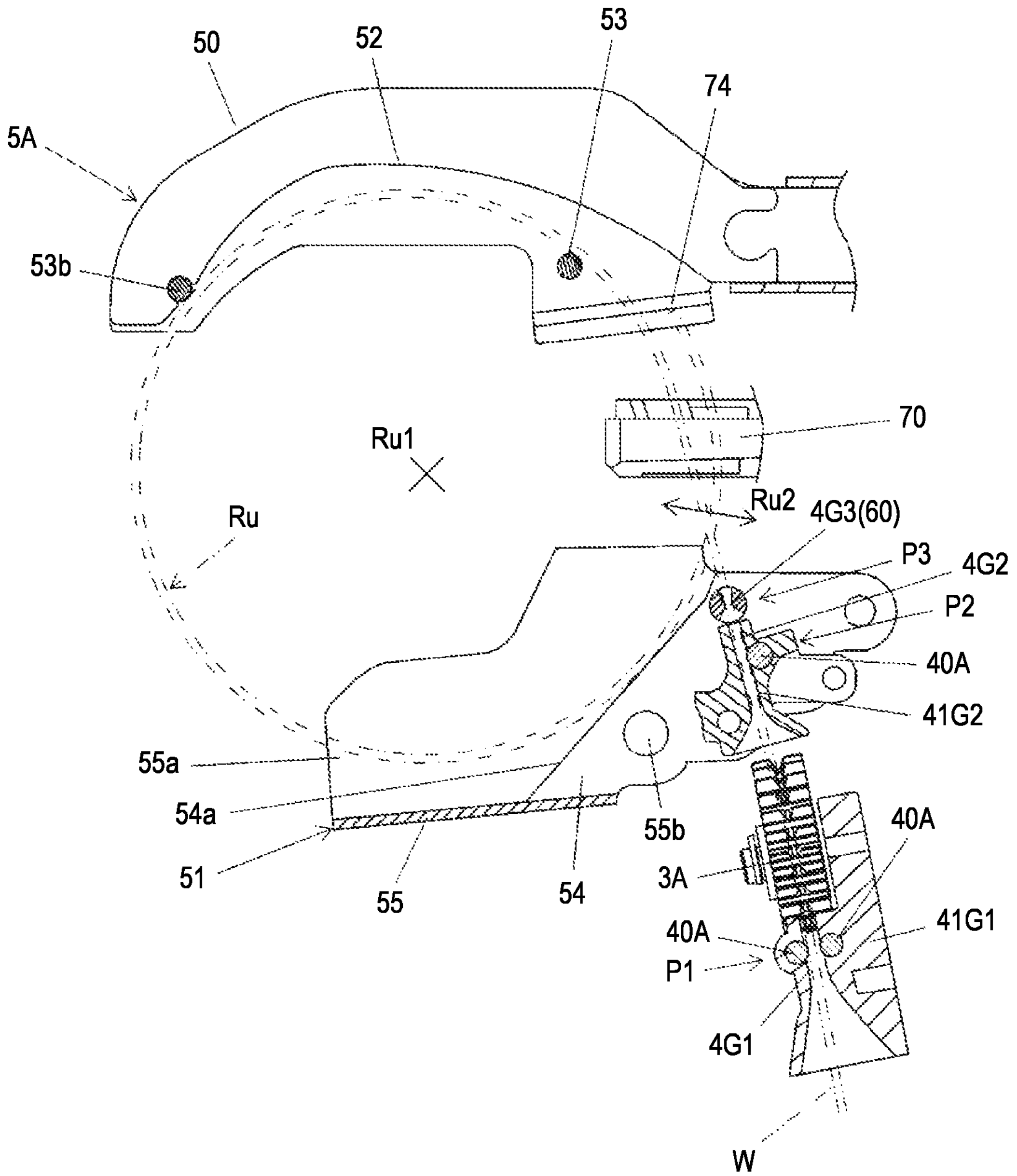
FIG. 45 is an explanatory view illustrating an example of an operation of a parallel guide according to another embodiment.

FIGS. 42, 43A, 43B, and 44 are views illustrating an example of a parallel guide according to another embodiment, wherein FIG. 43A is a cross-sectional view taken along line A-A in FIG. 42, FIG. 43B is a cross-sectional view taken along line B-B in FIG. 42, and FIG. 44 illustrates a modified example of the parallel guide according to another embodiment. In addition, FIG. 45 is an explanatory view illustrating an example of an operation of the parallel guide according to another embodiment.

The parallel guide 4G1 provided at the introduction position P1 and the parallel guide 4G2 provided at the intermediate position P2 are provided with a sliding member 40A that suppresses wear due to sliding of the wire W when the wire W passes through the guide. The parallel guide 4G3 provided at the cutting discharge position P3 has no sliding member 40A.

The parallel guide 4G1 is an example of a restricting unit constituting the feeding unit and is constituted by an opening (wire restricting unit) 40G1 penetrating along the feeding direction of the wire W. In order to restrict the radial direction orthogonal to the feeding direction of the wire W, as illustrated in FIGS. 43A and 44, the parallel guide 4G1 has the opening 40G1 having a shape in which a length L1 in one direction orthogonal to the feeding direction of the wire W is longer than a length L2 in the other direction orthogonal to the feeding direction of the wire W and the one direction.

In order to set the two wires W in a form of being arranged along the radial direction and restrict the direction in which the two wires W are arranged, the parallel guide 4G1 is configured such that the length L1 in the longitudinal direction of the opening 40G1 orthogonal to the feeding direction of the wire W is twice longer than the diameter r of the wire W and the length L2 in the lateral direction has a length slightly longer than the diameter r of one wire W. The parallel guide 4G1 is configured such that the longitudinal direction of the opening 40G1 is straight and the lateral direction is arcuate or straight.

The wire W shaped in a circular arc shape by the first guide unit 50 of the curl guide unit 5A is curled such that positions of two outside points and one inside point of the circular arc are restricted at three points of the parallel guide 4G2 provided at the intermediate position P2 and the guide pins 53 and 53*b* of the first guide unit 50, thereby forming a substantially circular loop Ru.

When the axial direction Ru1 of the loop Ru illustrated in FIG. 45, which is formed by the wire W, is taken as a reference, as indicated by a one-dot chain line Deg (a line extending through the axes of the wires) in FIG. 44, two wires W are fed when the inclination in the direction in which two wires W passing through the opening 40G1 of the parallel guide 4G1 are arranged (the inclination of the direction in which two wires W are arranged with respect to the side (the side extending in the longitudinal direction L1, with the direction of L1 of FIG. 44 also corresponding to the direction of Ru1) extending in the axial direction Ru1 of the loop Ru of the opening 40G1) exceeds 45 degrees, and thus there is a possibility that the wires W are twisted and intersect each other due to being fed in two wires.

Therefore, in parallel guide 4G1, in order to make the inclination of the direction in which the two wires W passing through the opening 40G1 of the parallel guide 4G1 are arranged be 45 degrees or less with respect to the axial direction Ru1 of the loop Ru formed by the wire W, the ratio of the length L2 in the lateral direction and the length L1 in the longitudinal direction of the opening 40G1 is determined. In this example, the ratio of the length L2 in the lateral direction and the length L1 in the longitudinal direction of the opening 40G1 is configured to be 1:1.2 or more. Considering the diameter r of the wire W, the length L2 in the lateral direction of the opening 40G1 of the parallel guide 4G1 exceeds 1 time the diameter r of the wire W and is configured with a length of 1.5 times or less. Note that the inclination of the direction in which the two wires W are arranged is more preferably 15 degrees or less.

The parallel guide 4G2 is an example of a restricting unit constituting the feeding unit and is constituted by an opening (wire restricting unit) 40G2 penetrating along the feeding direction of the wire W. As illustrated in FIG. 43B, the parallel guide 4G2, in order to restrict the direction of the wire W in the radial direction orthogonal to the feeding direction, is the opening 40G2 having a shape in which the length L1 in one direction orthogonal to the feeding direction of the wire W is longer than the length L2 in the other direction orthogonal to the feeding direction of the wire W and the one direction.

In order to set the two wires W in the form of being arranged along the radial direction and restrict the direction in which the two wires W are arranged, the parallel guide 4G2 is configured such that the length L1 in the longitudinal direction of the opening 40G2 orthogonal to the feeding direction of the wire W is longer than the diameter r of two wires W and the length L2 in the lateral direction has a length slightly longer than the diameter r of one wire W. In addition, the parallel guide 4G2 is configured such that the longitudinal direction of the opening 40G2 is straight, the lateral direction is arcuate or straight.

Even in the parallel guide 4G2, the ratio of the length L2 in the lateral direction and the length L1 in the longitudinal direction of the opening 40G2 is configured to 1:1.2 or more so that the inclination of the direction in which the two wires W are arranged is 45 degrees or less, preferably 15 degrees or less. Considering the diameter r of the wire W, the length L2 in the lateral direction of the opening 40G2 of the parallel guide 4G2 is configured to be greater than 1 time the diameter r of the wire W and 1.5 times or less.

The parallel guide 4G3 is an example of a restricting unit constituting the feeding unit and constitutes the fixed blade portion 60. Similarly to the parallel guide 4G1 and the parallel guide 4G2, the parallel guide 4G3 is an opening (wire restricting unit) 40G3 having a shape in which a length in the longitudinal direction orthogonal to the feeding direction of the wire W is twice longer than the diameter r of the wire W, and a length in the lateral direction is slightly longer than the diameter r of one wire W.

The parallel guide 4G3 has a ratio of 1:1.2 or more between a length of at least one part in the lateral direction of the opening 40G3 and a length of at least one part in the longitudinal direction of the opening 40G3 so that the inclination of the direction in which the two wires W are arranged is 45 degrees or less, preferably 15 degrees or less. Considering the diameter r of the wire W, the length in the lateral direction of the opening 40G3 of the parallel guide 4G3 is configured to be greater than 1 time of the diameter r of the wire W and 1.5 times or less, and the parallel guide 4G3 restricts the direction in which the two wires W are arranged.

The sliding member 40A is an example of a sliding unit. The sliding member 40A is made of a material called cemented carbide. The cemented carbide has higher hardness than the material constituting the guide main body 41G1 provided with the parallel guide 4G1 and the material constituting the guide main body 41G2 provided with the parallel guide 4G2. As a result, the sliding member 40A has higher hardness than the guide main body 41G1 and the guide main body 41G2. The sliding member 40A is constituted by a member called a cylindrical pin in this example.

The guide main body 41G1 and the guide main body 41G2 are made of iron. The hardness of the guide main body 41G1 and the guide main body 41G2 subjected to general heat treatment is about 500 to 800 in Vickers hardness. On the other hand, the hardness of the sliding member 40A made of cemented carbide is about 1500 to 2000 in terms of Vickers hardness.

In the sliding member 40A, a part of the circumferential surface is perpendicular to the feeding direction of the wire W at the opening 40G1 of the parallel guide 4G1 and is exposed from the inner surface in the longitudinal direction along the direction in which the two wires W are arranged. In the sliding member 40A, a part of the circumferential surface is perpendicular to the feeding direction of the wire W at the opening 40G2 of the parallel guide 4G2 and is exposed from the inner surface in the longitudinal direction along the direction in which the two wires W are arranged. The sliding member 40A is perpendicular to the feeding direction of the wire W and extends along the direction in which two wires W are arranged. It suffices for the sliding member 40A to have a part of the circumferential surface exposed on the same surface where there is no difference in level with the inner surface of the opening 40G1 of the parallel guide 4G1 in the longitudinal direction and the inner surface of the opening 40G2 of the parallel guide 4G2 in the longitudinal direction. Preferably, a part of the circumferential surface of the sliding member 40A protrudes from the inner surface in the longitudinal direction of the opening 40G1 of the parallel guide 4G1 and the inner surface in the longitudinal direction of the opening 40G2 of the parallel guide 4G2 and is exposed.

The guide main body 41G1 is provided with a hole portion 42G1 having a diameter to which the sliding member 40A is fixed by press fitting. The hole portion 42G1 is provided at a predetermined position where a part of the circumferential surface of the sliding member 40A press-fitted into the hole portion 42G1 is exposed on the longitudinal inner surface of the opening 40G1 of the parallel guide 4G1. The hole portion 42G1 extends orthogonally to the feeding direction of the wire W and along the direction in which the two wires W are arranged.

The guide main body 41G is provided with a hole portion 42G2 having a diameter to which the sliding member 40A is fixed by press fitting. The hole portion 42G2 is provided at a predetermined position where a part of the circumferential surface of the sliding member 40A press-fitted into the hole portion 42G2 is exposed on the inner surface of the opening 40G2 of the parallel guide 4G2 in the longitudinal direction. The hole portion 42G2 extends orthogonally to the feeding direction of the wire W and along the direction in which the two wires W are arranged.

The wire W, in which the loop Ru illustrated in FIG. 45 is formed by the curl guide unit 5A, can be moved in the radial direction Ru2 of the loop Ru by the operation fed by the wire feeding unit 3A. In the reinforcing bar binding machine 1A, the direction in which the wire W formed in the loop shape by the curl guide unit 5A is fed (the winding direction of the wire W wound around the reinforcing bar S in the curl guide unit 5A) and the direction in which the wire W is wound around the reel 20 are oriented to opposite. Therefore, the wire W can move in the radial direction Ru2 of the loop Ru by the operation fed by the wire feeding unit 3A. The radial direction Ru2 of the loop Ru is one direction orthogonal to the feeding direction of the wire W and orthogonal to the direction in which the two wires W are arranged. When the diameter of the loop Ru increases, the wire W moves outward with respect to the radial direction Ru2 of the loop Ru. When the diameter of the loop Ru becomes small, the wire W moves inward with respect to the radial direction Ru2 of the loop Ru.

The parallel guide 4G1 is configured such that the wire W drawn out of the reel 20 illustrated in FIG. 1 or the like passes through the opening 40G1. For this reason, the wire W passing through the parallel guide 4G1 slides on the inner surface of the opening 40G1 corresponding at the outer and inner positions with respect to the radial direction Ru2 of the loop Ru of the wire W illustrated in FIG. 45. When the outer surface and the inner surface of the inner surface of the opening 40G1 of the parallel guide 4G1 wear due to the sliding of the wire W, the wire W passing through the parallel guide 4G1 moves in the radial direction Ru2 of the loop Ru.

As a result, the wire W guided to the wire feeding unit 3A is moved away from between the first feed groove 32L of the first feed gear 30L and the second feed groove 32R of the second feed gear 30R, and it is difficult to guide the wire to the wire feeding unit 3A as illustrated in FIG. 3.

Therefore, in the parallel guide 4G1, a sliding member 40A is provided at a predetermined position on the outer surface and the inner surface of the inner surface of the opening 40G1 with respect to the radial direction Ru2 of the loop Ru by the wire W formed by the curl guide unit 5A. As a result, wear in the opening 40G1 is suppressed, and the wire W passing through the parallel guide 4G1 can be reliably guided to the wire feeding unit 3A.

Further, since the wire W, which is fed out from the wire feeding unit 3A and to which the loop Ru is formed by the curl guide unit 5A, passes through the parallel guide 4G2, the wire W slides mainly on the outer surface of the inner surface of the opening 40G2 with respect to the radial direction Ru2 of the loop Ru by the wire W formed by the curl guide unit 5A. When the outer surface of the inner surface of the opening 40G1 of the parallel guide 4G2 wears due to the sliding of the wire W, the wire W passing through the parallel guide 4G2 moves toward the outside of the radial direction Ru2 of the loop Ru. With this, it is difficult to guide the wire W to the parallel guide 4G3.

Therefore, the parallel guide 4G2 is provided with a sliding member 40A at a predetermined position on the outer surface with respect to the radial direction Ru2 of the loop Ru by the wire W formed by the curl guide unit 5A on the inner surface of the opening 40G2. As a result, wear at the predetermined position affecting the guidance of the wire W to the parallel guide 4G3 is suppressed, and the wire W passing through the parallel guide 4G2 can be reliably guided to the parallel guide 4G3.

When the sliding member 40A has the same surface shape with no difference in level as the inner surface of the opening 40G1 of the parallel guide 4G1 and the inner surface of the opening 40G2 of the parallel guide 4G2, it is considered that the inner surface of the opening 40G1 of the parallel guide 4G1 and the inner surface of the opening 40G2 of the parallel guide 4G2 may be slightly worn out. However, the sliding member 40A does not wear and remains as it is, and protrudes from the inner surface of the opening 40G1 and the inner surface of the opening 40G2 and is exposed. As a result, further wear of the inner surface of the opening 40G1 of the parallel guide 4G1 and the inner surface of the opening 40G2 of the parallel guide 4G2 is suppressed.

Figure 46:
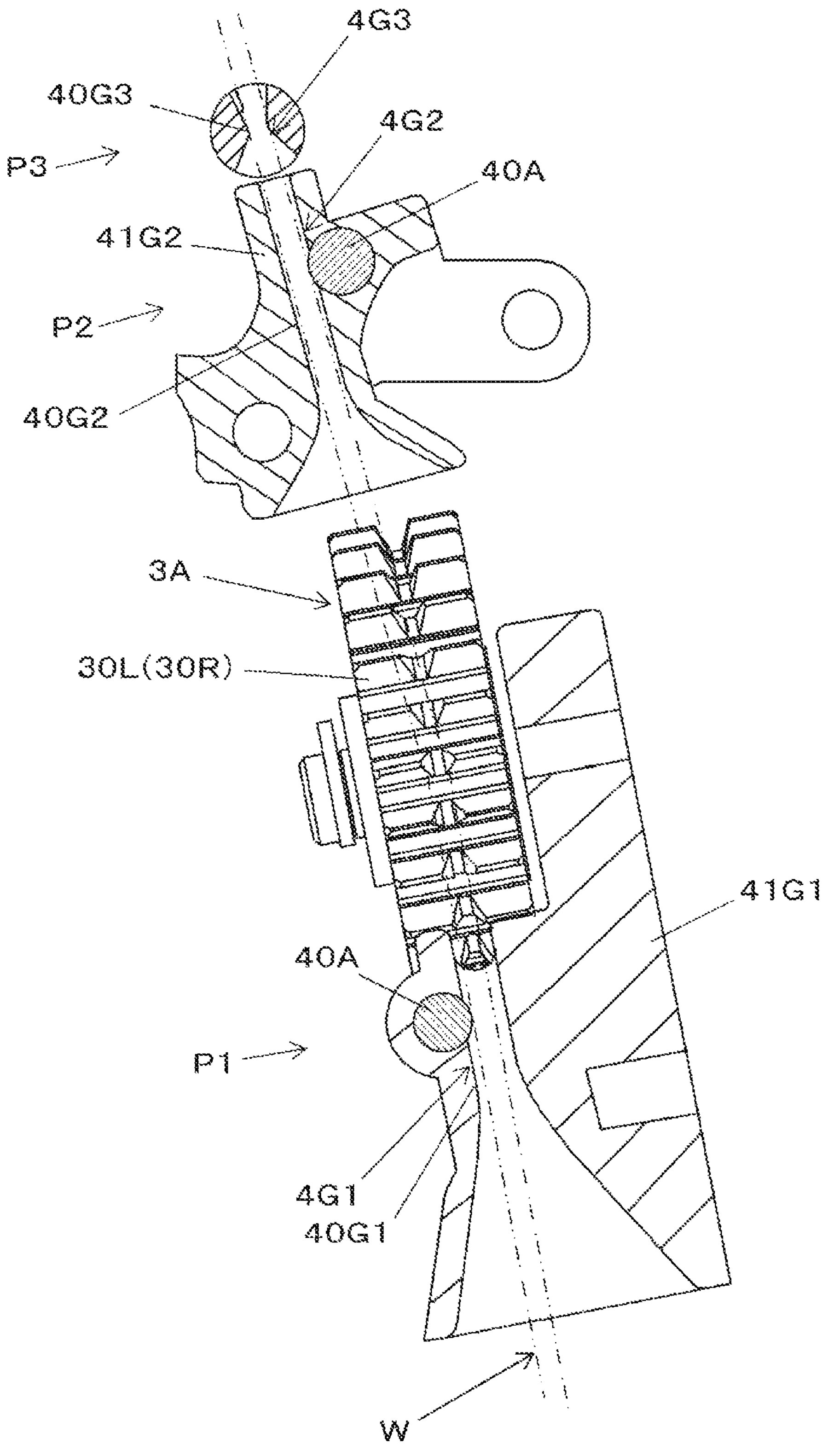
FIG. 46 is a view illustrating a modified example of a parallel guide according to another embodiment.

FIG. 46 is a diagram illustrating a modified example of the parallel guide of another embodiment. As illustrated in FIG. 1, the winding direction of the wire W on the reel 20 is different from the winding direction of the loop Ru by the wire W formed by the curl guide unit 5A. Therefore, in the parallel guide 4G1, the sliding member 40A may be provided only at a predetermined position on the inner surface of the inner surface of the opening 40G1 with respect to the radial direction Ru2 of the loop Ru by the wire W formed by the curl guide unit 5A.

Figure 47:
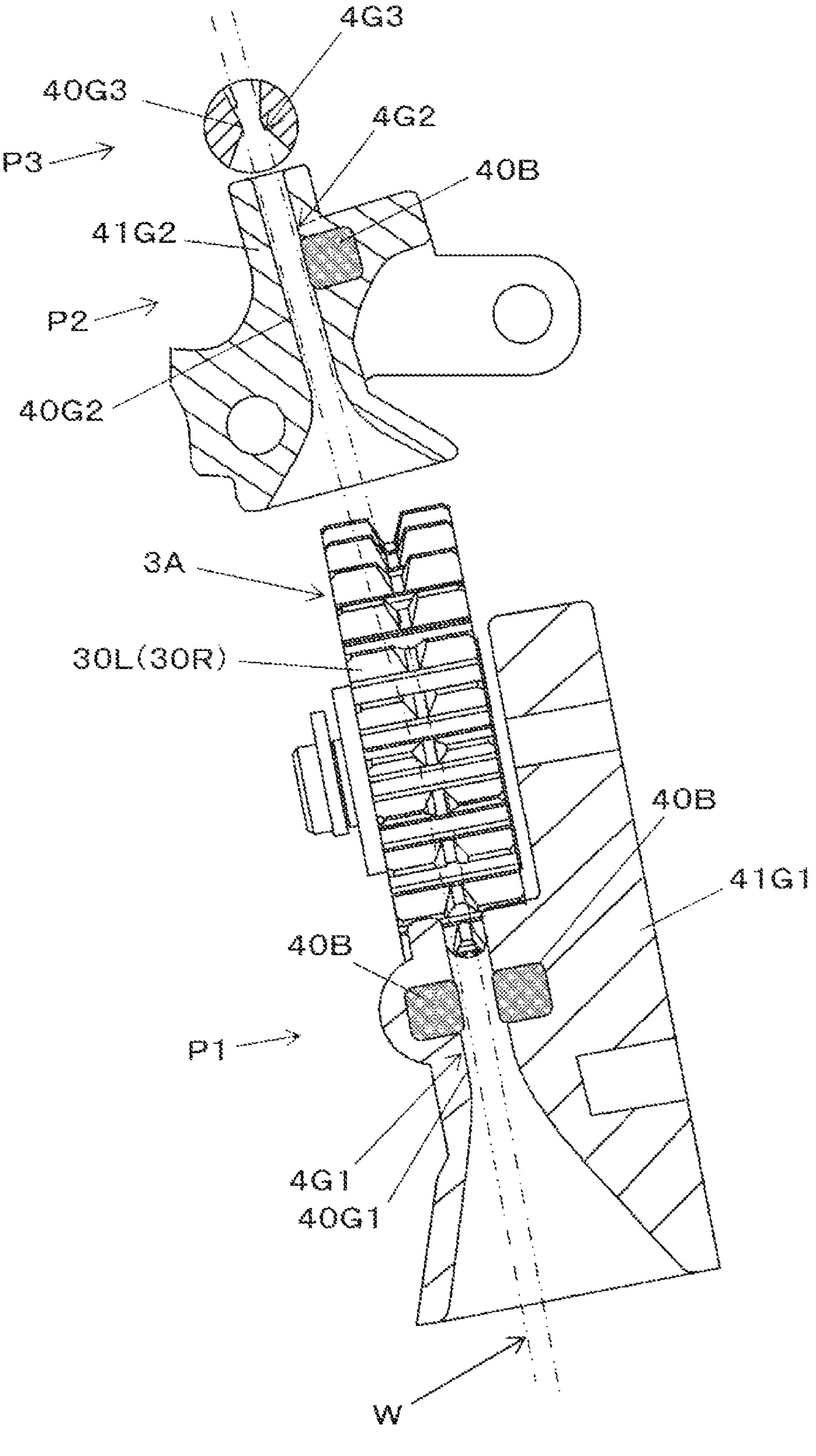
FIG. 47 is a view illustrating a modified example of a parallel guide according to another embodiment.

FIGS. 47 to 51 are diagrams illustrating modified examples of the parallel guide according to another embodiment. As illustrated in FIG. 47, the sliding unit is not limited to the above-described pin-shaped sliding member 40A having a circular cross section, but may be a sliding member 40B including a member having a polygonal cross section such as a rectangular parallelepiped shape, a cubic shape, or the like.

Figure 48:
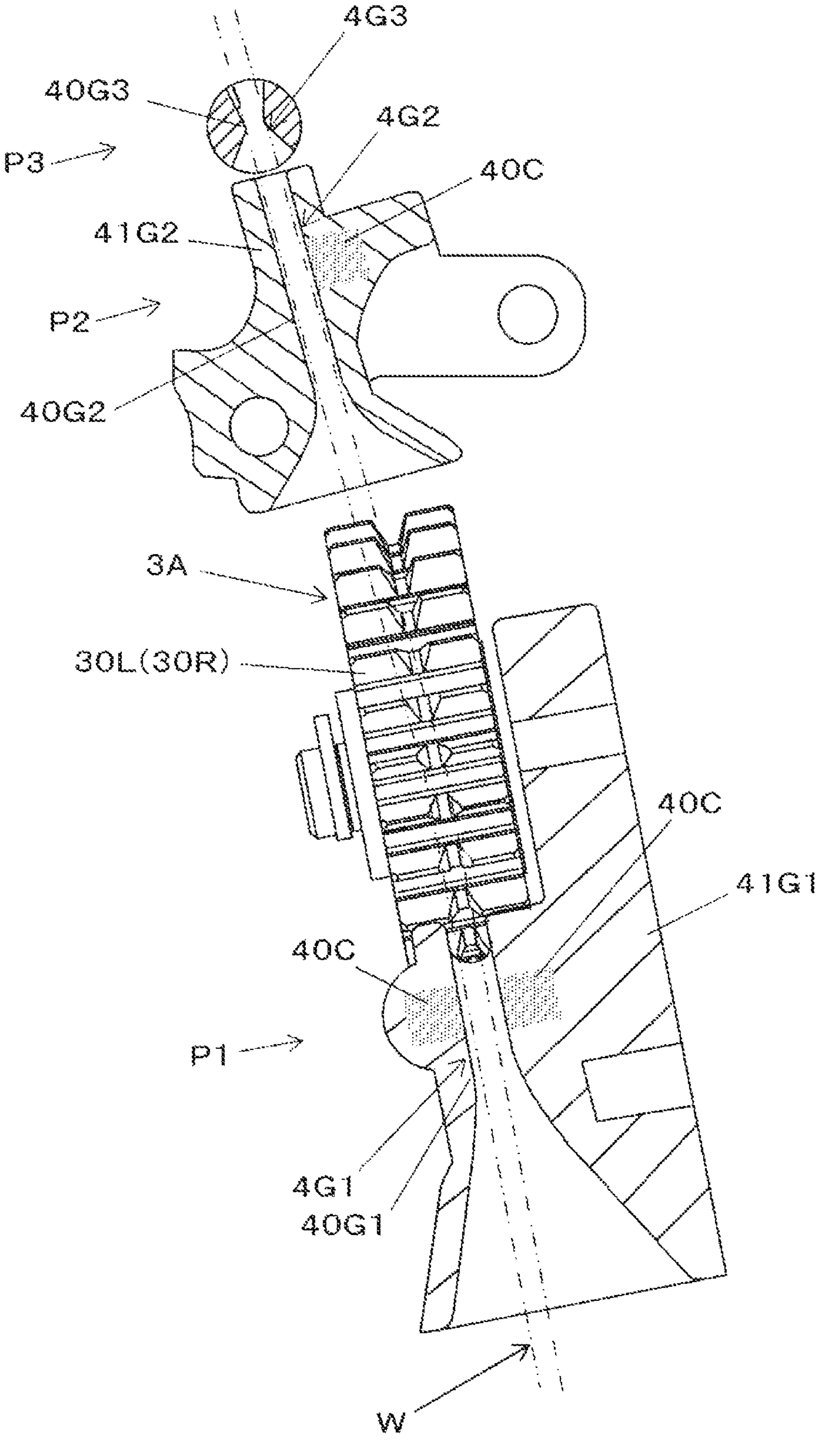
FIG. 48 is a view illustrating a modified example of a parallel guide according to another embodiment.
Figure 49:
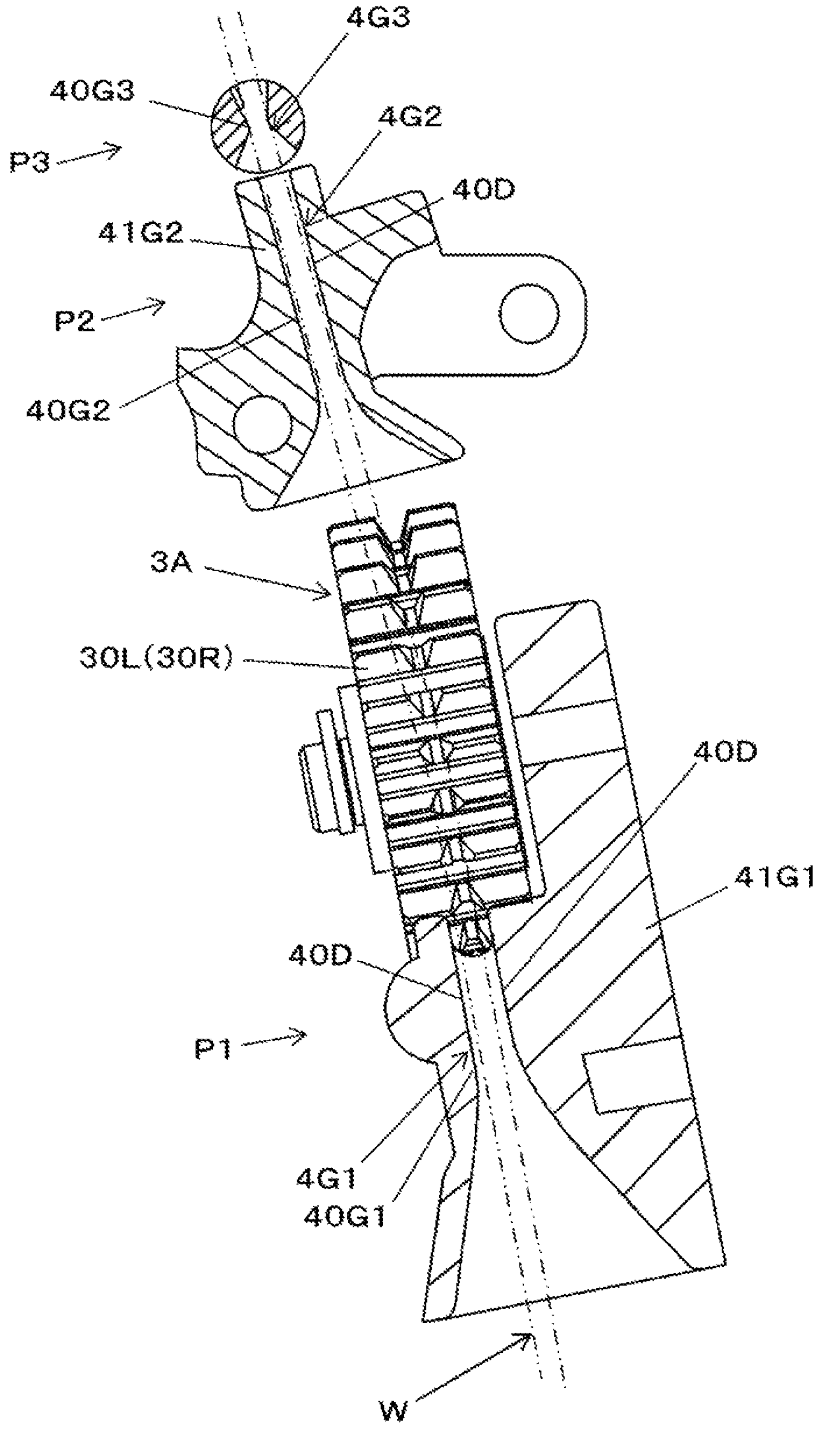
FIG. 49 is a view illustrating a modified example of a parallel guide according to another embodiment.

Further, as illustrated in FIG. 48, predetermined positions of the inner surface of the opening 40G1 of the parallel guide 4G1 and the inner surface of the opening 40G2 of the parallel guide 4G2 may be further hardened by quenching or the like than other positions so that the sliding unit 40C is configured. Further, the guide main body 41G1 constituting the parallel guide 4G1 and the guide main body 41G2 constituting the parallel guide 4G2 are made of a material having higher hardness than the parallel guide 4G3, or the like, and as illustrated in FIG. 49, the parallel guide 4G1 and the parallel guide 4G2 may be the sliding unit 40D as a whole.

Figure 50:
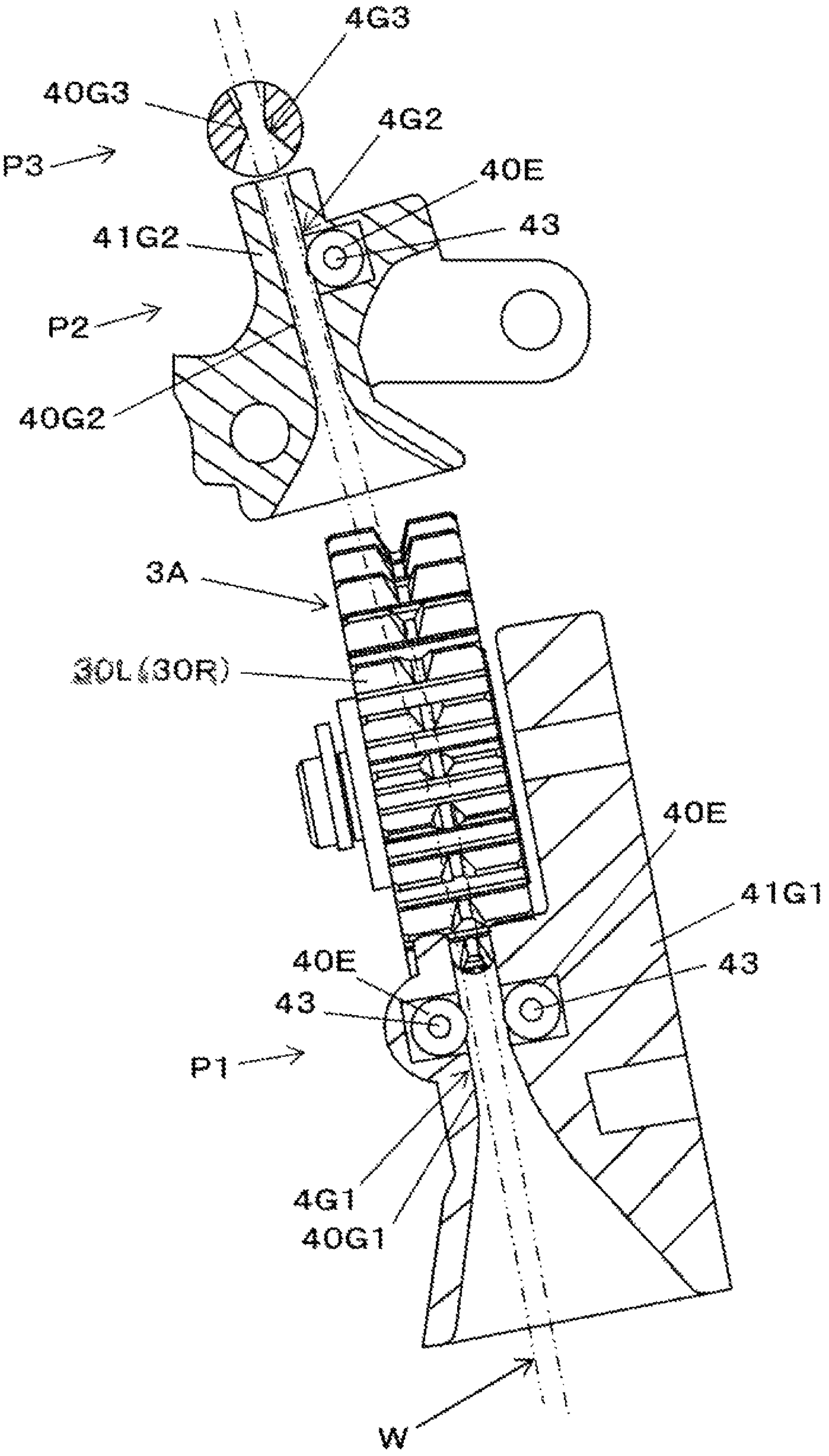
FIG. 50 is a view illustrating a modified example of a parallel guide according to another embodiment.

Further, as illustrated in FIG. 50, a roller 40E having a shaft 43 orthogonal to the feeding direction of the wire W and rotatable following the feeding of the wire W may be provided instead of the sliding unit. The roller 40E is rotated along with the feeding of the wire W, and the contact point with the wire W is changed, so that wear is suppressed.

Figure 51:
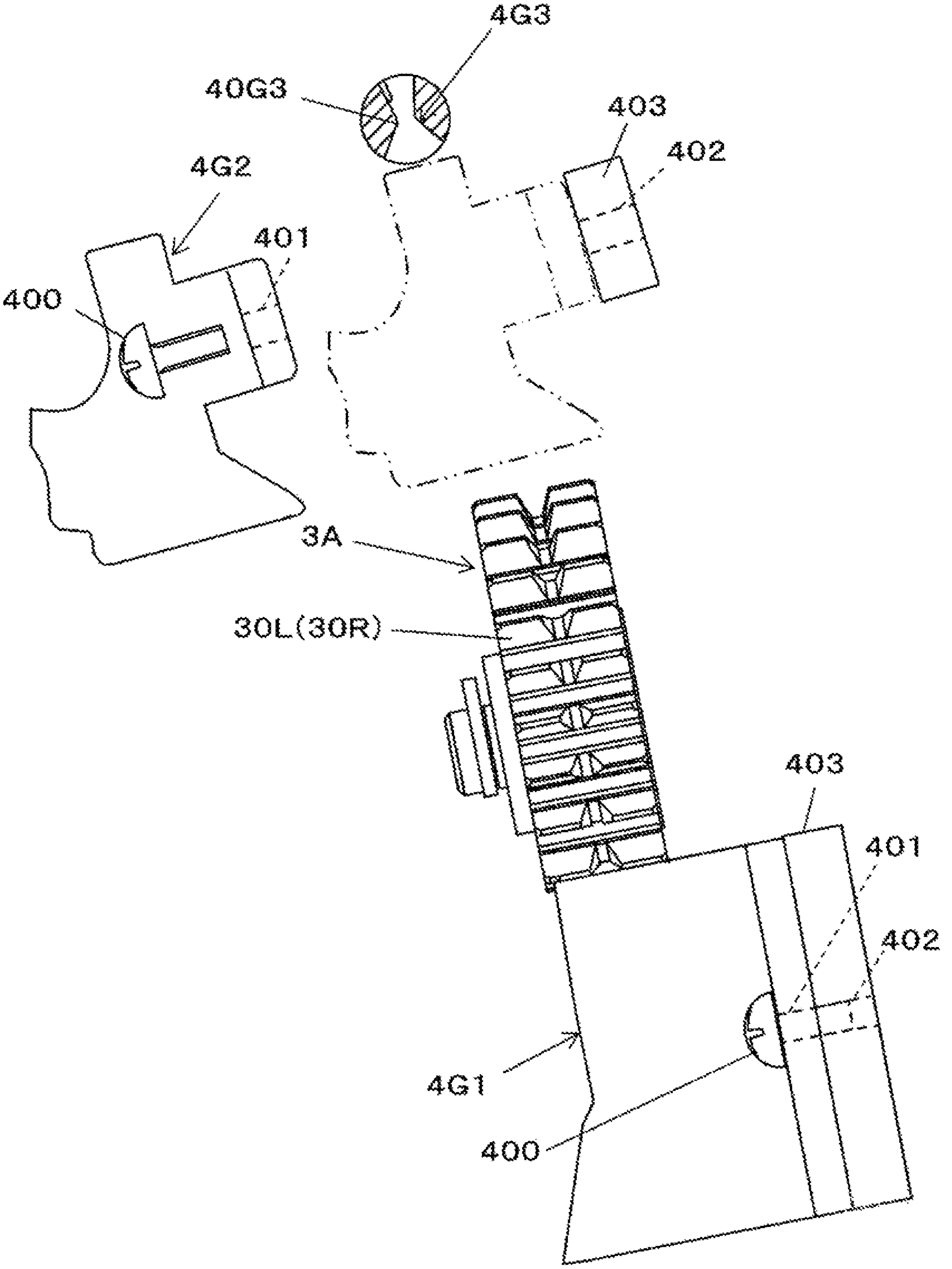
FIG. 51 is a view illustrating a modified example of a parallel guide according to another embodiment.

Further, as illustrated in FIG. 51, the parallel guide 4G1 and the parallel guide 4G2 are provided with hole portions 401Z into which the screws 400 as an example of detachable members are inserted. Further, the reinforcing bar binding machine 1A illustrated in FIG. 1 or the like includes a mounting base 403 having a screw hole 402 to which the screw 400 is fastened. The parallel guide 4G1 and the parallel guide 4G2 may be detachable by fixing and fixing releasing by fastening and removing the screw 400. Thus, even when the parallel guide 4G1 and the parallel guide 4G2 are worn out, replacement is possible.

Figure 52:
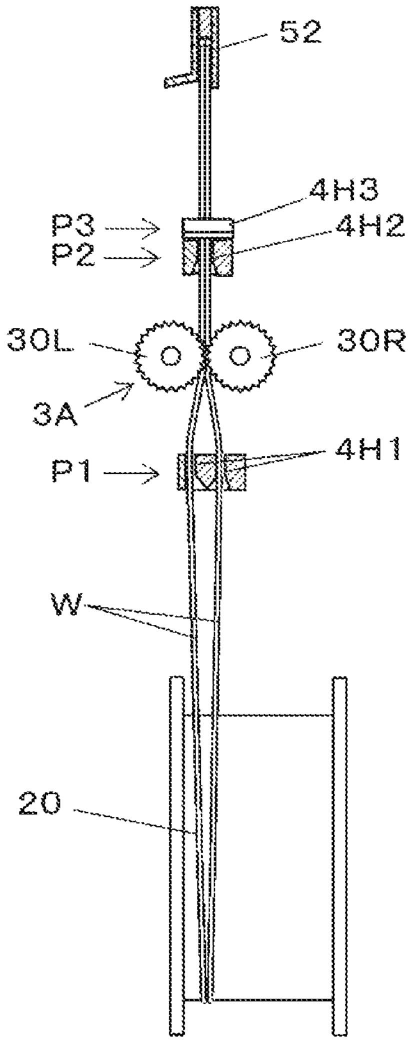
FIG. 52 is a view illustrating a modified example of a parallel guide according to another embodiment.

FIG. 52 is a diagram illustrating a modified example of the parallel guide of another embodiment. The parallel guide 4H1 provided at the introduction position P1 is provided with two hole portions (openings) matching the number of the wires W, and restricts the direction in which the wires W are arranged in parallel with each other in the arrangement direction of the hole portions. The parallel guide 4H1 may include any one of a sliding member 40A illustrated in FIGS. 42, 43A, 43B, 44 and 46, a sliding member 40B illustrated in FIG. 47, a sliding unit 40C illustrated in FIG. 48, a sliding unit 40D illustrated in FIG. 49, or the roller 40E illustrated in FIG. 50.

The parallel guide 4142 provided at the intermediate position P2 corresponds to any one of the parallel guide 4A illustrated in FIG. 4A and the like, the parallel guide 4B illustrated in FIG. 37A, the parallel guide 4C illustrated in FIG. 37B, the parallel guide 4D illustrated in FIG. 37C, or the parallel guide 4E illustrated in FIG. 37D.

Further, the parallel guide 4H2 may be a parallel guide 4G2 having the sliding member 40A illustrated in FIGS. 42, 43A, 43B, 44 and 46 as an example of the sliding unit. Further, the parallel guide 4H2 may be any one of a parallel guide 4G2 having the sliding member 40B illustrated in FIG. 47 as a modified example of the sliding unit, a parallel guide 4G2 having the sliding unit 40C illustrated in FIG. 48, a parallel guide 4G2 having the sliding unit 40D illustrated in FIG. 49, or a parallel guide 4G2 having the roller 40E illustrated in FIG. 50.

The parallel guide 4H3 provided at the cutting discharge position P3 is any one of the parallel guide 4A illustrated in FIG. 4A and the like, the parallel guide 4B illustrated in FIG. 37A, the parallel guide 4C illustrated in FIG. 37B, the parallel guide 4D illustrated in FIG. 37C, or the parallel guide 4E illustrated in FIG. 37D.

Figure 53:
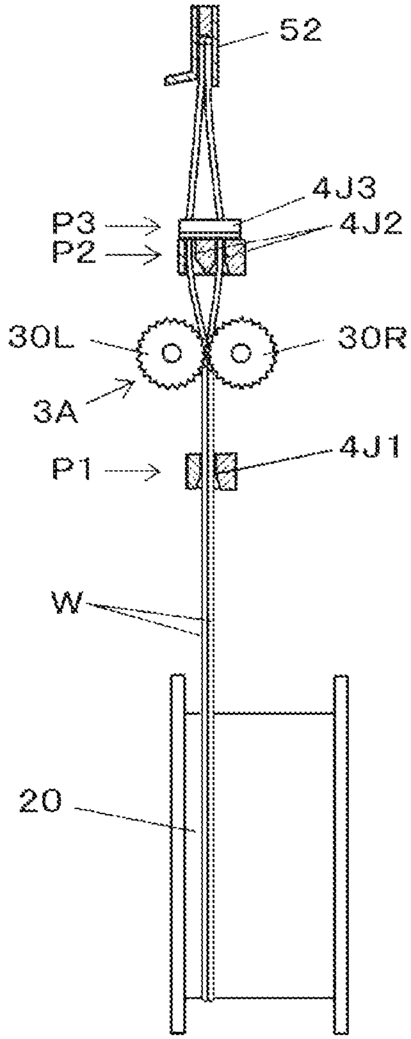
FIG. 53 is a view illustrating a modified example of a parallel guide according to another embodiment.

FIG. 53 is a diagram illustrating a modified example of the parallel guide of another embodiment. A parallel guide 4J1 provided at the introduction position P1 is any one of the parallel guide 4A illustrated in FIG. 4A and the like, the parallel guide 4B illustrated in FIG. 37A, the parallel guide 4C illustrated in FIG. 37B, the parallel guide 4D illustrated in FIG. 37C, or the parallel guide 4E illustrated in FIG. 37D.

Further, the parallel guide 4J1 may be a parallel guide 4G2 having the sliding member 40A illustrated in FIGS. 42, 43A, 43B, 44 and 46 as an example of a sliding unit. Further, the parallel guide 4J1 may be any one of a parallel guide 4G2 having the sliding member 40B illustrated in FIG. 47 as a modified example of the sliding unit, a parallel guide 4G2 having the sliding unit 40C illustrated in FIG. 48, a parallel guide 4G2 having the sliding unit 40D illustrated in FIG. 49, or a parallel guide 4G2 having the roller 40E illustrated in FIG. 50.

A parallel guide 4J2 provided at the intermediate position P2 is configured by two hole portions matching the number of the wires W, and restricts the direction in which the wires W are arranged in parallel with each other in the arrangement direction of the parallel guide 4J2. The parallel guide 4J2 may include any one of the sliding member 40A illustrated in FIGS. 42, 43A, 43B, 44 and 46, the sliding member 40B illustrated in FIG. 47, the sliding unit 40C illustrated in FIG. 48, the sliding unit 40D illustrated in FIG. 49, or the roller 40E illustrated in FIG. 50.

A parallel guide 4J3 provided at the cutting discharge position P3 is any one of the parallel guide 4A illustrated in FIG. 4A and the like, the parallel guide 4B illustrated in FIG. 37A, the parallel guide 4C illustrated in FIG. 37B, the parallel guide 4D illustrated in FIG. 37C, or the parallel guide 4E illustrated in FIG. 37D.

FIGS. 54 to 59 are explanatory views illustrating configurations and operations of a gripping portion according to another embodiment, and the description will be given with respect to another embodiment of the direction in which one end WS of the wire W is bent.

The wire W shaped in a circular arc shape by the first guide unit 50 of the curl guide unit 5A is wound such that position of two outside points and one inside point of the circular arc are restricted at three points of a fixed blade portion 60 constituting the parallel guide 4A at a cutting and discharging position P3 and the guide pins 53 and 53*b* of the first guide unit 50, thereby forming a substantially circular loop Ru.

In the operation of feeding the wire W in the backward direction with the wire feeding unit 3A and winding it around the reinforcing bar S, the wire W moves in a direction in which the diameter of the loop Ru becomes smaller.

In the embodiment described above, as illustrated in FIG. 35A, the end WS of the wire W was bent outward opposite to the wire W passing between the fixed gripping member 70C and the second movable gripping member 70R by the preliminary bending portion 72. As a result, the end WS of the wire W was retreated from the moving path of the wire W by the operation of winding the wire W around the reinforcing bar S. In the embodiment illustrated in FIGS. 54 and 55, when the end WS of the wire W is bent outward opposite to the wire W passing between the fixed gripping member 70C and the second movable gripping member 70R, the wire is bent inward in the radial direction of the loop Ru formed by the wire W. In the embodiment illustrated in FIGS. 56 and 57, when the end WS of the wire W is bent outward opposite to the wire W passing between the fixed gripping member 70C and the second movable gripping member 70R, the wire is bent inward in the radial direction of the loop Ru formed by the wire W. For this reason, the gripping portion 70 is provided with a preliminary bending portion 72*a* that bends the wire W in a predetermined direction, in which the end WS of the wire W is retreated, from the moving path Ru3 of the wire W through which the wire W moves in the direction in which the diameter of the loop Ru of the wire W wound around the reinforcing bar S is reduced.

Figure 54:
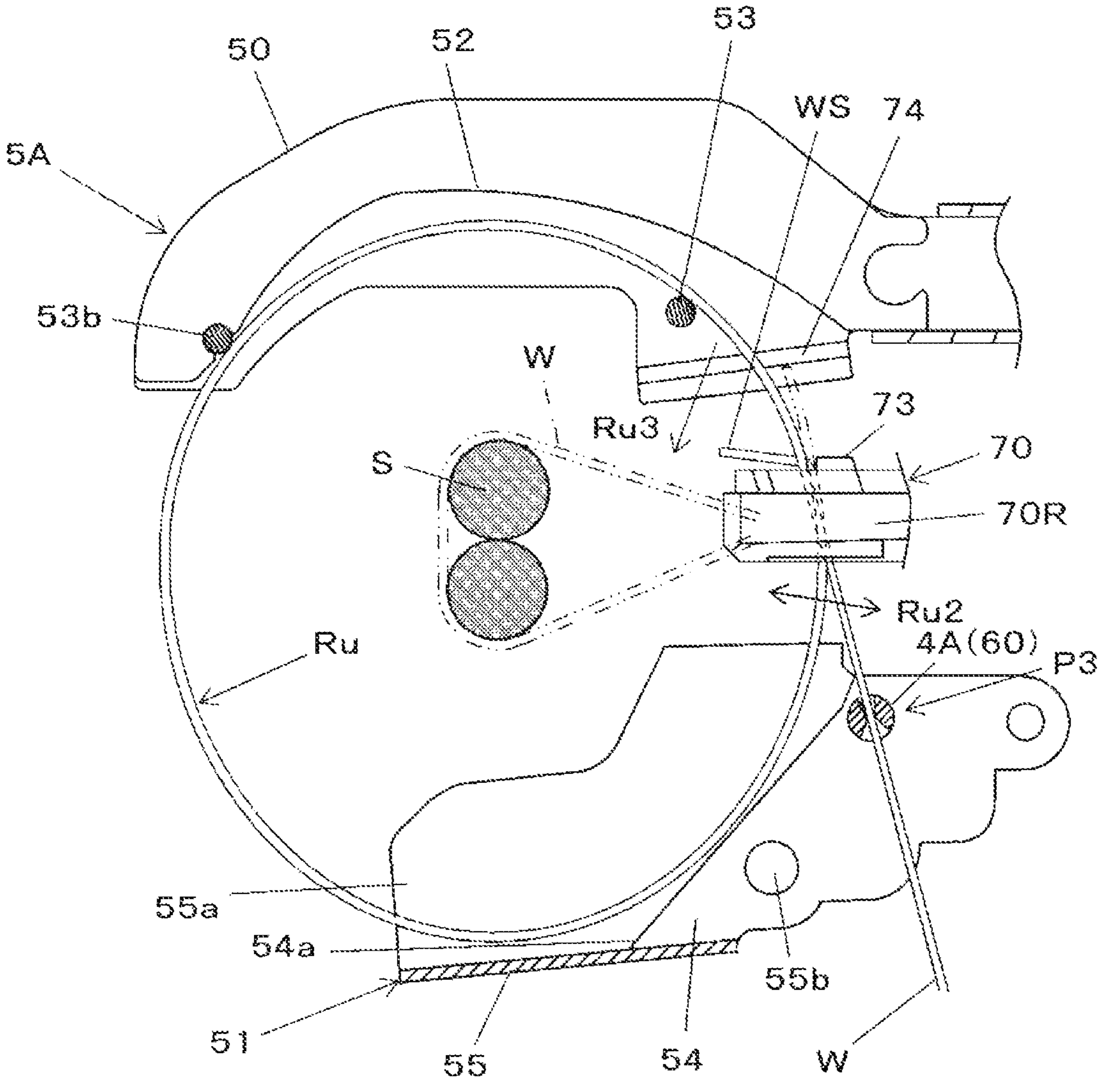
FIG. 54 is an explanatory view illustrating a configuration and an operation of a gripping portion according to another embodiment.
Figure 55:
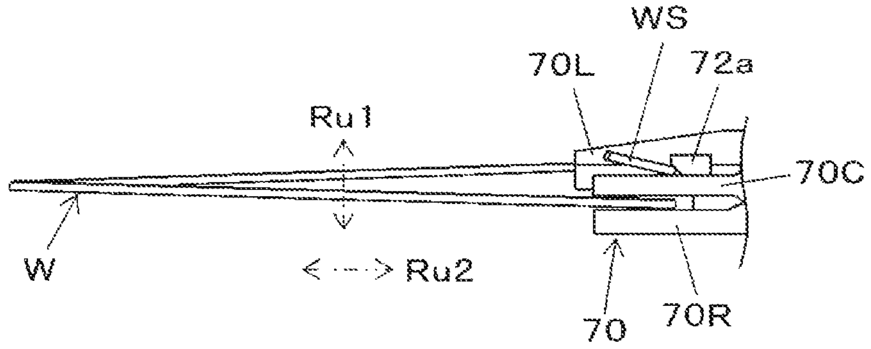
FIG. 55 is an explanatory view illustrating a configuration and an operation of a gripping portion according to another embodiment.

In FIGS. 54 and 55, the preliminary bending portion 72*a* is provided on the surface of the fixed gripping member 70C that faces the first movable gripping member 70L, and protrudes in the direction in which the wire W is bent inward with respect to the radial direction of the loop Ru formed by the wire W and the direction Ru2 along a direction orthogonal to the feeding direction of the wire W of the parallel guide 4A.

Thus, in the operation of gripping the wire W with the first movable gripping member 70L and the fixed gripping member 70C, the end WS of the wire W is bent inward with respect to the radial direction of the loop Ru formed by the wire W and the direction Ru2 along a direction orthogonal to the feeding direction of the wire W of the parallel guide 4A. Further, as illustrated in FIG. 35A, the end WS of the wire W can be bent outward opposite to the wire W passing between the fixed gripping member 70C and the second movable gripping member 70R with respect to the axial direction Ru1 of the loop Ru formed by the wire W.

Therefore, the end WS of the wire W passing between the first movable gripping member 70L and the fixed gripping member 70C does not interfere with the wire W passing between the fixed gripping member 70C and the second movable gripping member 70R in the operation of winding the wire W around the reinforcing bar S, and thus the end WS of the wire W is prevented from being caught in the wire W.

Figure 56:
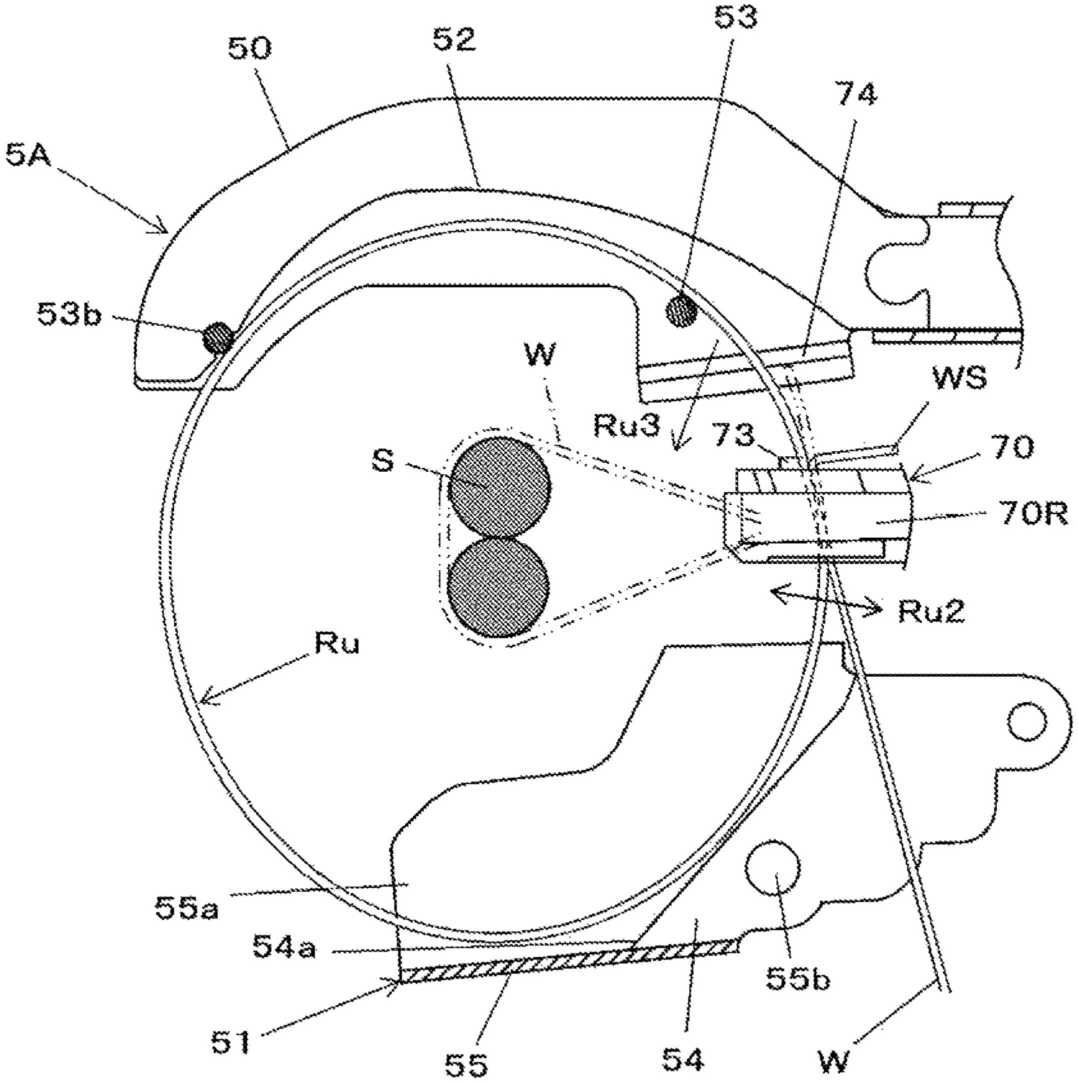
FIG. 56 is an explanatory view illustrating a configuration and an operation of a gripping portion according to another embodiment.
Figure 57:
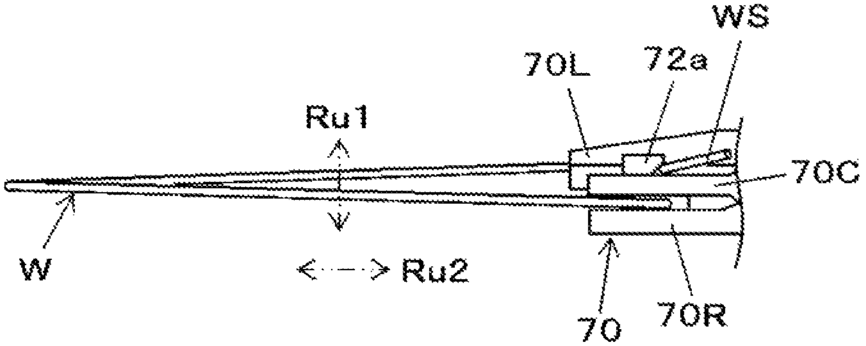
FIG. 57 is an explanatory view illustrating a configuration and an operation of a gripping portion according to another embodiment.

In FIGS. 56 and 57, the preliminary bending portion 72*a* is provided on the surface of the fixed gripping member 70C that faces the first movable gripping member 70L, and protrudes in the direction in which the wire W is bent outward with respect to the radial direction of the loop Ru formed by the wire W and the direction Ru2 along a direction orthogonal to the feeding direction of the wire W of the parallel guide 4A.

Thus, in the operation of gripping the wire W with the first movable gripping member 70L and the fixed gripping member 70C, the end WS of the wire W is bent inward with respect to the radial direction of the loop Ru formed by the wire W and the direction Ru2 along a direction orthogonal to the feeding direction of the wire W of the parallel guide 4A. Further, as illustrated in FIG. 35A, the end WS of the wire W can be bent outward opposite to the wire W passing between the fixed gripping member 70C and the second movable gripping member 70R with respect to the axial direction Ru1 of the loop Ru formed by the wire W.

Therefore, the end WS of the wire W passing between the first movable gripping member 70L and the fixed gripping member 70C does not interfere with the wire W passing between the fixed gripping member 70C and the second movable gripping member 70R in the operation of winding the wire W around the reinforcing bar S, and thus the end WS of the wire W is prevented from being caught in the wire W.

Figure 58:
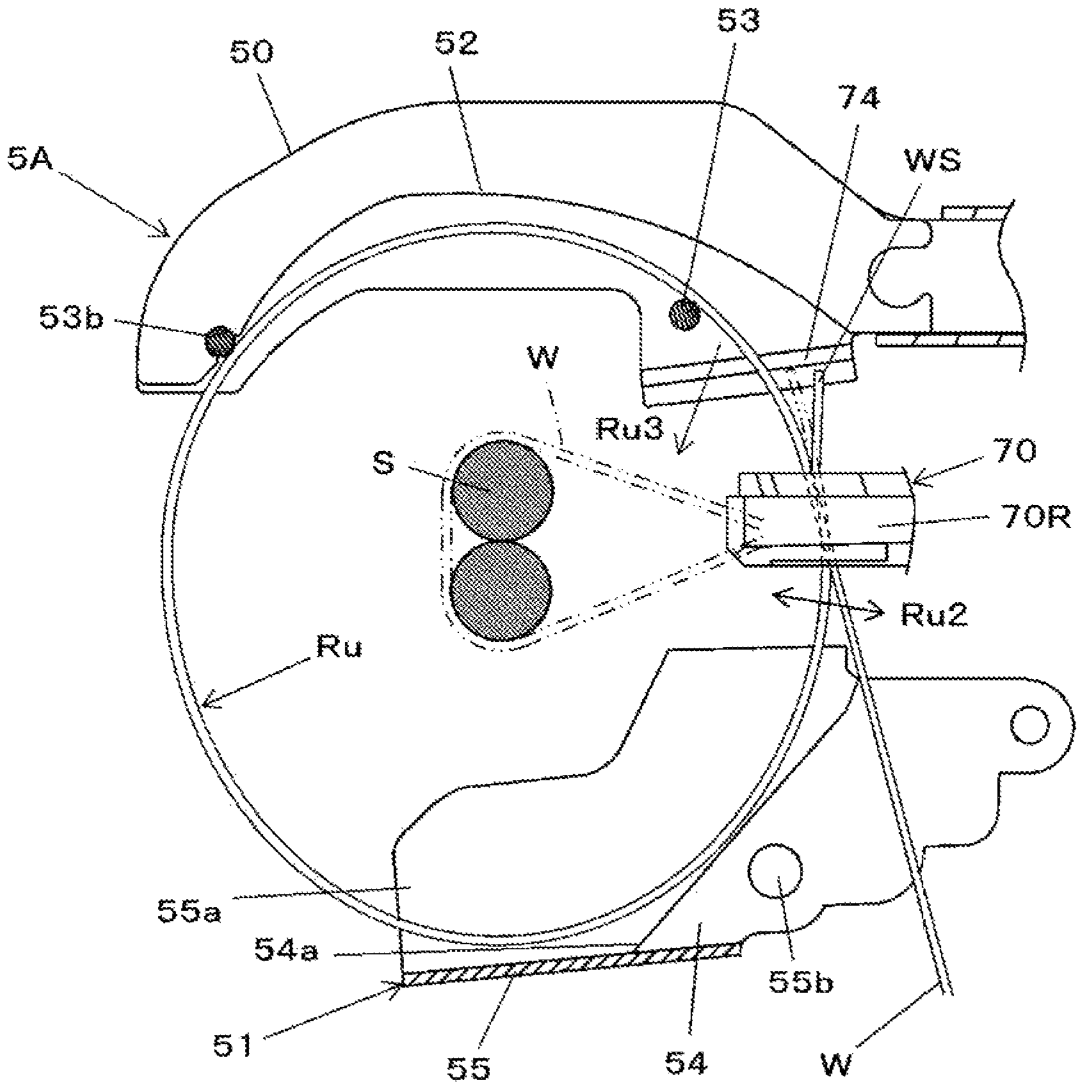
FIG. 58 is an explanatory view illustrating a configuration and an operation of a gripping portion according to another embodiment
Figure 59:
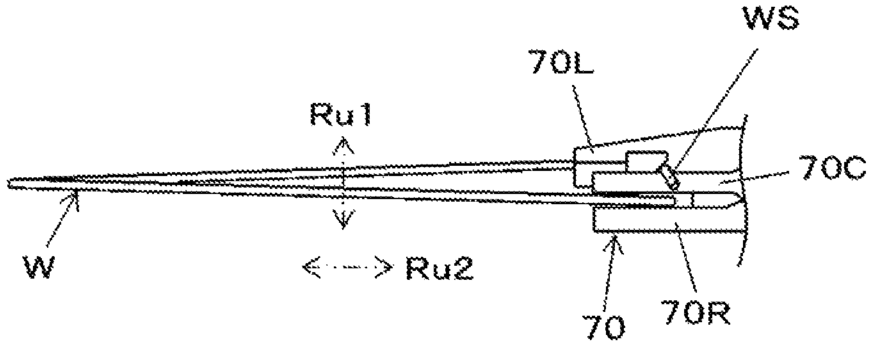
FIG. 59 is an explanatory view illustrating a configuration and an operation of a gripping portion according to another embodiment.

In the embodiment illustrated in FIGS. 54 to 57, if the end WS of the wire W can be retreated from the moving path of the wire W by the operation of winding the wire W around the reinforcing bar S, the end WS of the wire W may be bent toward the wire W passing between the fixed gripping member 70C and the second movable gripping member 70R. In FIGS. 58 and 59, a length restricting portion 74 is formed such that the end WS of the wire W is guided outside with respect to the radial direction of the loop Ru formed by the wire W and the direction Ru2 along a direction orthogonal to the feeding direction of the wire W of the parallel guide 4A, and restricts the position of one end WS of the wire W provided in the first guide unit 50 of the curl guide unit 5A.

Thus, when the wire is fed and the end WS of the wire W abuts on the length restricting portion 74, the end WS of the wire W is guided outside with respect to the radial direction of the loop Ru formed by the wire W and the direction Ru2 along a direction orthogonal to the feeding direction of the wire W of the parallel guide 4A.

Therefore, since the end WS of the wire W passing between the first movable gripping member 70L and the fixed gripping member 70C has a shape capable of bending toward the wire W passing between the fixed gripping member 70C and the second movable gripping member 70R in the axial direction Ru1 of the loop Ru formed by the wire W with no interference, the end WS of the wire W is prevented from being caught in the wire W in the operation of winding the wire W around the reinforcing bar S.

Figure 60:
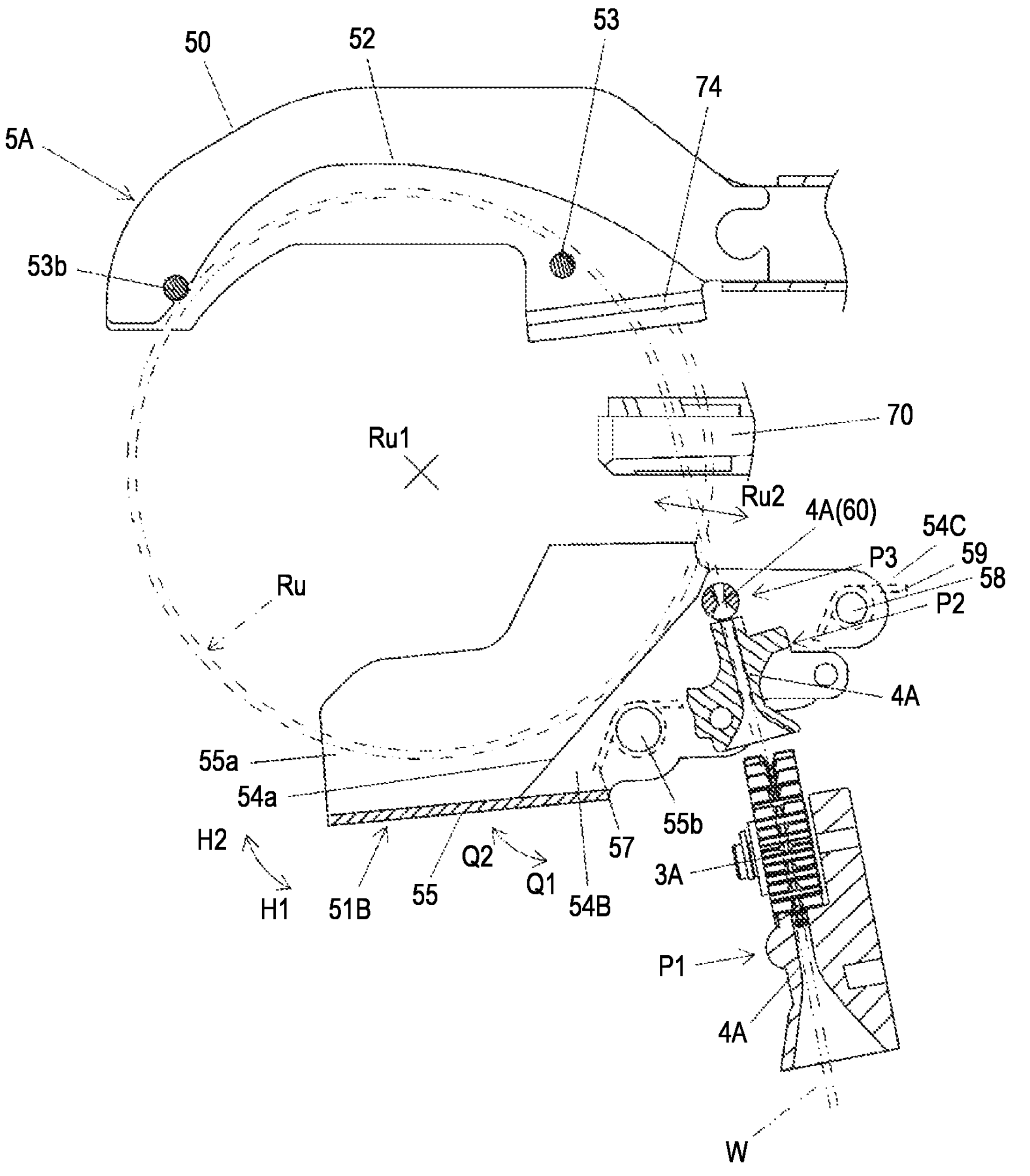
FIG. 60 is a view illustrating an example of a second guide unit according to another embodiment.

FIG. 60 is a view illustrating an example of a second guide unit according to another embodiment. The second guide unit 51B includes a base guide unit 54B a serving as a third guide unit for restricting the radial position of the loop Ru2 formed by the wire W fed from the first guide unit 50 and a movable guide unit 55 serving as a fourth guide unit for restricting the position along the axial direction Ru1 of the loop Ru.

The base guide unit 54B restricts the position of radial direction Ru2 of the loop Ru formed by the wire W, by the wall surface 54*a* provided outside the radial direction Ru2 of the loop Ru formed by the wire W.

The movable guide unit 55 includes a wall surface 55*a* that is provided on the distal end of the second guide unit 51B, and the wall surface 55*a* is formed on both sides along the axial direction Ru1 of the loop Ru formed by the wire W sent from the first guide unit 50. Thus, the position of the axial direction Ru1 of the loop Ru formed by the wire W is restricted by the wall surface 55*a* of the movable guide unit 55, and the wire W is guided to the base guide unit 54B by the movable guide unit 55.

The movable guide unit 55 is supported on the base guide unit 54B by a shaft 55*b* rotating along the axial direction Ru1 of the loop Ru formed by the wire W. By a rotation operation of rotating about the shaft 55*b* as a fulcrum as indicated by arrows H1 and H2, the movable guide unit 55 is opened and closed between a guide position at which the wire sent from the first guide unit 50 can be guided to the second guide unit 51B and a retreat position at which the reinforcing bar binding machine 1A is retreated by being pulled out from the reinforcing bar S.

The movable guide unit 55 is urged in a direction indicated by an arrow H2 in which the distance between the distal end side of the first guide unit 50 and the distal end side of the second guide unit 51B approaches by the urging portion such as a torsion coil spring 57, and is held in the guide position illustrated in FIG. 36A by the force of the torsion coil spring 57. In addition, when the movable guide unit 55 is pushed to the reinforcing bar S by the operation of pulling out the reinforcing bar binding machine 1A from the reinforcing bar S, the movable guide unit 55 rotates in a direction indicated by an arrow H1 and is opened from the guide position to the retreat position illustrated in FIG. 36B.

The second guide unit 51B includes a retreat mechanism (rotation mechanism) 54C by which the base guide unit 54B is displaced and retreated in a direction separating from the first guide unit 50. The retreat mechanism 54C includes a shaft 58 that supports the base guide unit 54B and a spring 59 that holds the base guide unit 54B at a predetermined guide position.

The base guide unit 54B is supported so as to be displaceable in a direction indicated by arrows Q1 and Q2 by an operation of rotating about the shaft 58 as a fulcrum. The spring 59 is an example of an urging portion (urging portion), and is configured with a torsion coil spring, for example. The spring 59 has a larger spring load than the torsion coil spring 57. The base guide unit 54B is held at the guide position illustrated in FIG. 60, by the spring 59.

FIGS. 61 to 64 are explanatory views illustrating an example of an operation of the second guide unit according to another embodiment. The wire W shaped in a circular arc shape by the first guide unit 50 of the curl guide unit 5A is wound such that position of two outside points and one inside point of the circular arc are restricted at three points of a fixed blade portion 60 constituting the parallel guide 4G3 at a cutting and discharging position P3 and the guide pins 53 and 53*b* of the first guide unit 50, thereby forming a substantially circular loop Ru.

Figure 61:
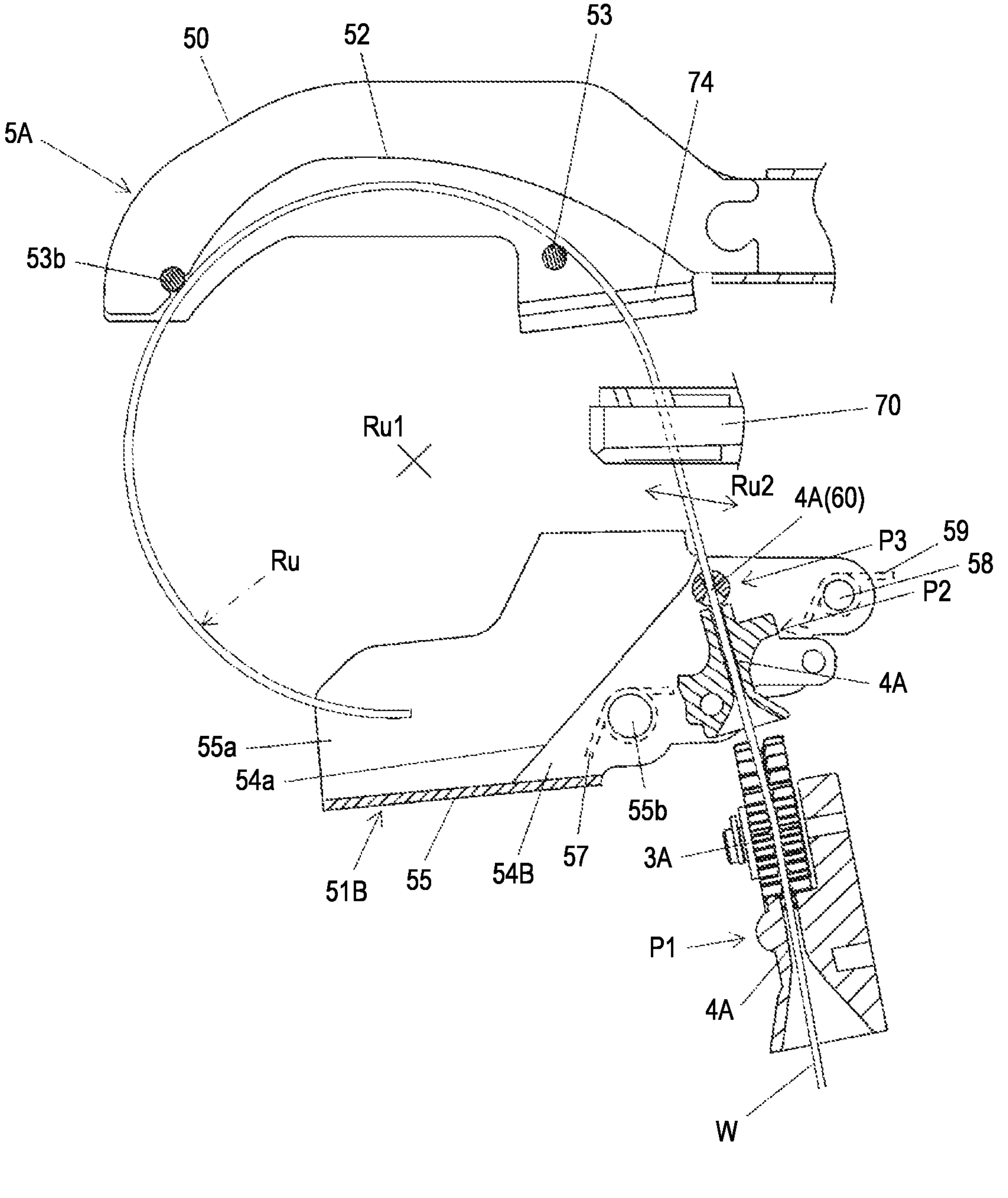
FIG. 61 is a view illustrating an example of a second guide unit according to another embodiment.

Thus, as illustrated in FIG. 61, the distal end of the wire W enters the movable guide unit 55, the position in the axial direction Ru1 of the loop Ru formed by the wire W is restricted by the wall surface 55*a* of the movable guide unit 55, and the wire W is guided to the base guide unit 54B by the movable guide unit 55.

Figure 62:
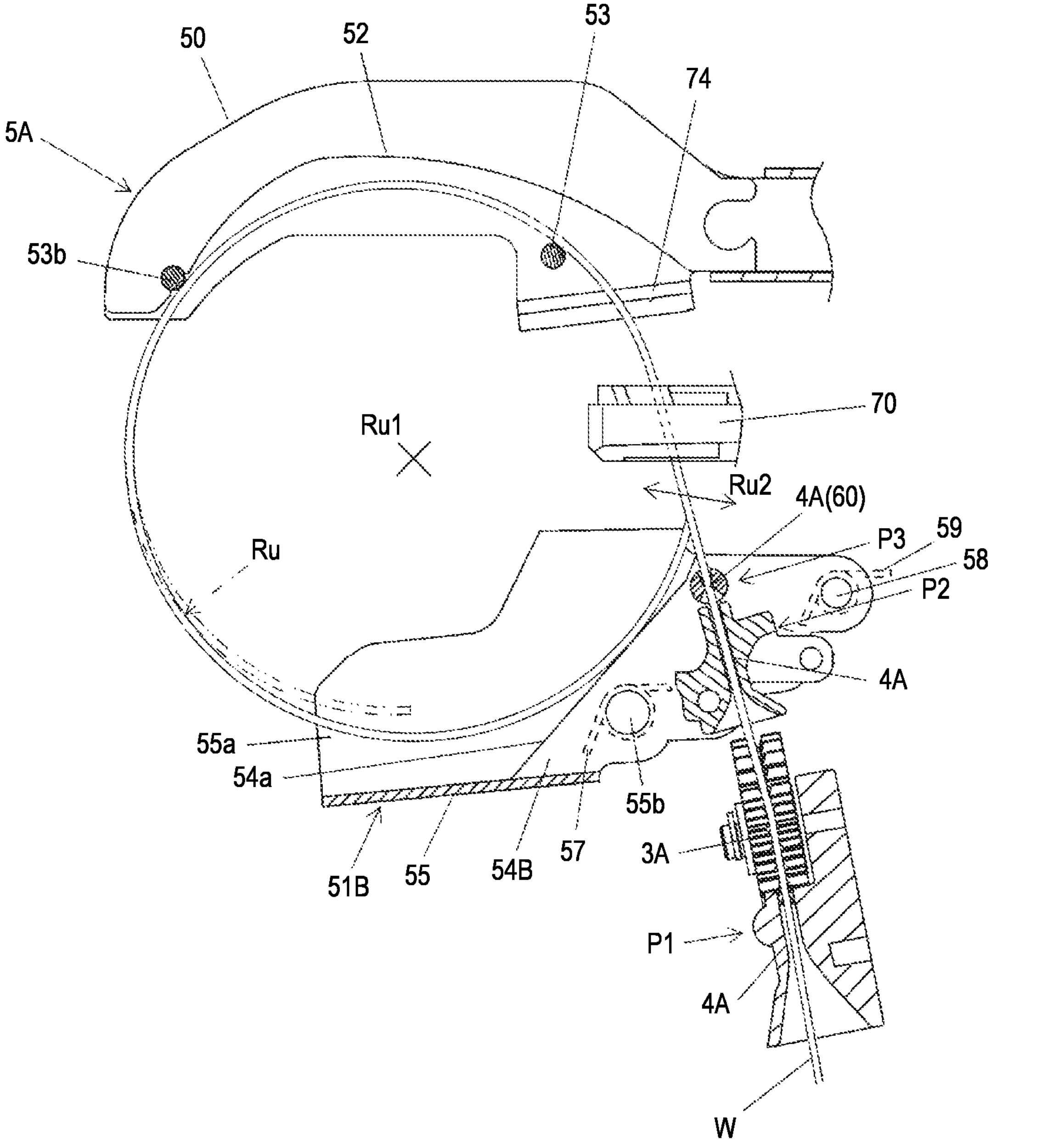
FIG. 62 is a view illustrating an example of a second guide unit according to another embodiment.

When the wire W is fed by the wire feeding unit 3A, as illustrated in FIG. 62, the wire W is guided to the base guide unit 54B by the movable guide unit 55. Even when the loop Ru formed by the wire W expands outward in the radial direction Rut and the wire W is in contact with the base guide unit 54B, the base guide unit 54B is held in the fixed state by the force of the spring 59 at the guide position.

Figure 63:
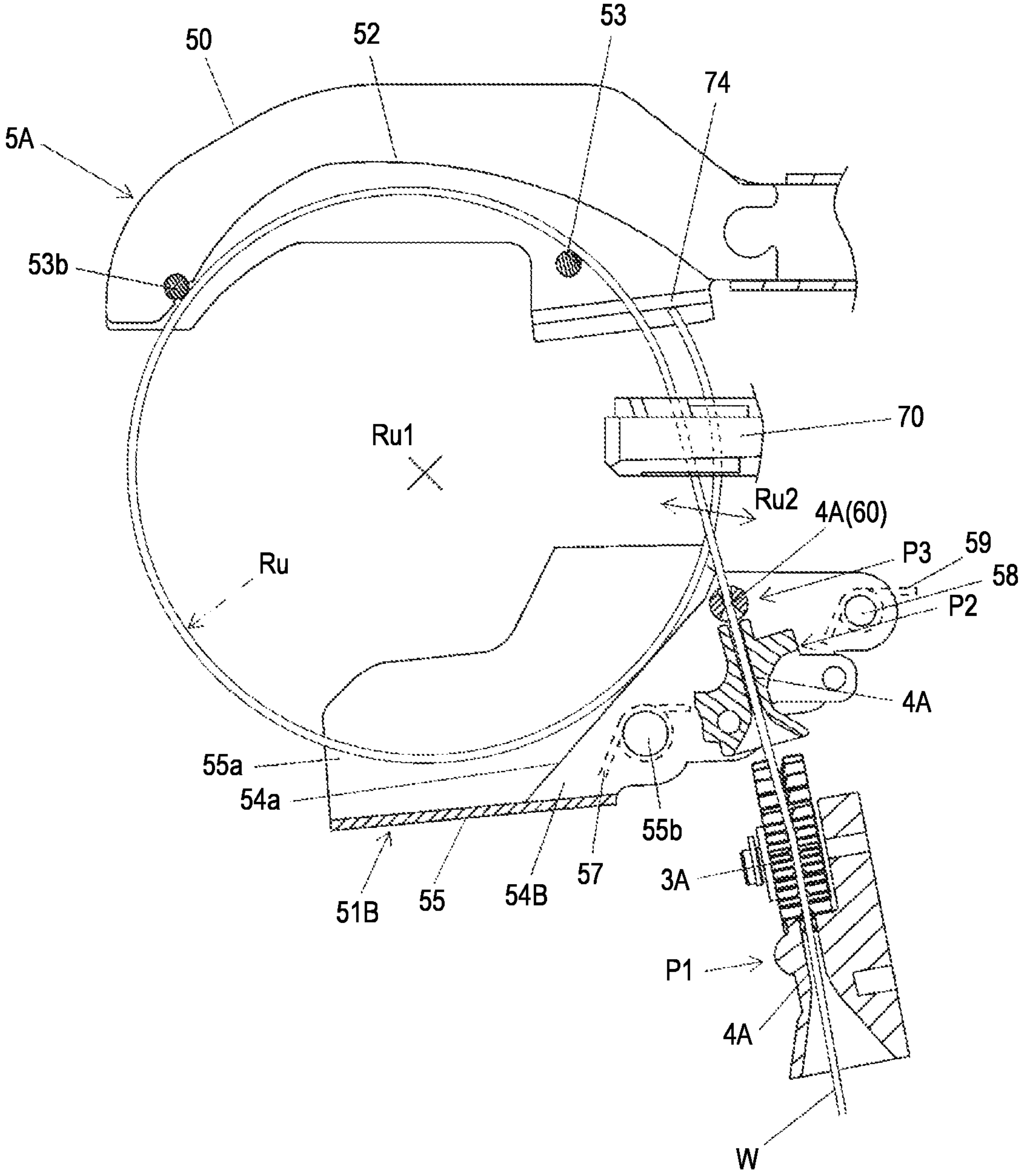
FIG. 63 is an explanatory view illustrating an example of an operation of a second guide unit according to another embodiment.
Figure 64:
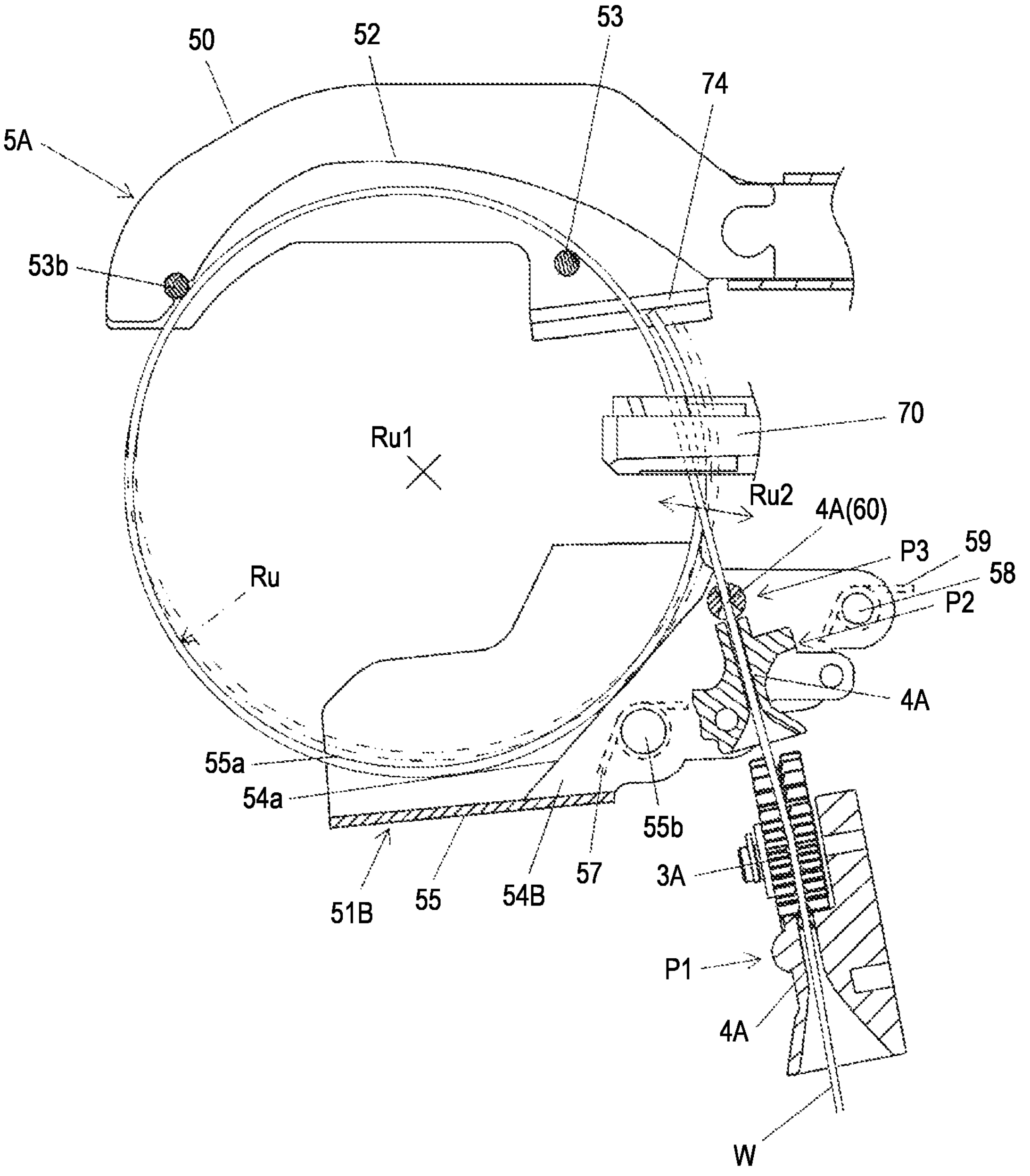
FIG. 64 is an explanatory view illustrating an example of an operation of a second guide unit according to another embodiment.

When the wire W is further fed, as illustrated in FIG. 63, the distal end of the wire W abuts on the length restricting portion 74. When a predetermined amount of wire W is further fed until the feeding of the wire W is stopped, as illustrated in FIG. 64, the position of the distal end of the wire W is restricted by the length restricting portion 74, and thus the loop Ru formed by the wire W expands outward in the radial direction Ru2 while the distal end of the wire W moves forward along the length restricting portion 74. However, the base guide unit 54B is held in the fixed state by the force of the spring 59 at the guide position.

As described above, in the operation of forming the loop Ru with the wire W sent from the first guide unit 50, even when the wire W abuts on the base guide unit 54B, the base guide unit 54B is held in the fixed state at the guide position.

Further, even in the case where the movable guide unit 55 is pushed to the reinforcing bar S in the operation of pulling out the reinforcing bar binding machine 1A from the reinforcing bar S and thus the movable guide unit 55 is opened from the guide position to the retreat position, the base guide unit 54B is held in the fixed state at the guide position.

However, when an unexpected external force is applied, the base guide unit 54B rotates in the direction indicated by the arrow Q1 about the shaft 58 as a fulcrum against the urging force of the spring 59, and thus being released from the external force. When being released from the external force, the base guide unit 54B is pressed by the spring 59 to rotate in the direction indicated by the arrow Q2, and returns to the guide position.

Thus, by the retreat mechanism 54C provided in the base guide unit 54B, it is possible to reduce the load without hindering the formation of the loop Ru of the wire W wound around the reinforcing bar S in the case where external force or the like is applied. Particularly, as the shaft 55*b* of the movable guide unit 55 and the shaft 58 of the base guide unit 54B are in parallel with each other, the base guide unit 54B can be retreated by the large external force applied to the movable guide unit 55, for example, the force applied to the movable guide 55.

By the configuration in which the movable guide unit 55 is opened in the direction of the arrow H1 by the force of the hand and the base guide unit 54B can be opened in the direction of the arrow H1, the movable range of the second guide unit 51B can be increased. This facilitates maintenance or removal of wire jams or the like. The base guide unit 54B may be retractable by the linear motion described with reference to FIGS. 41A and 41B.

Figure 65:
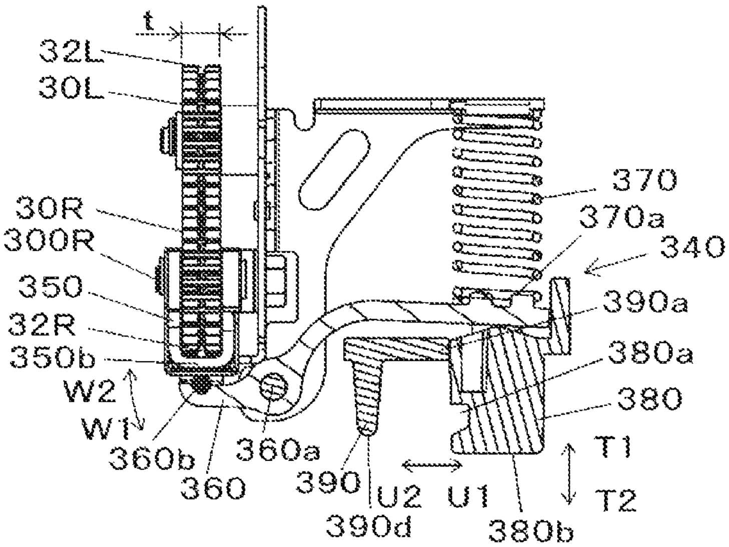
FIG. 65 is a view illustrating an example of a displacement portion according to another embodiment.
Figure 66:
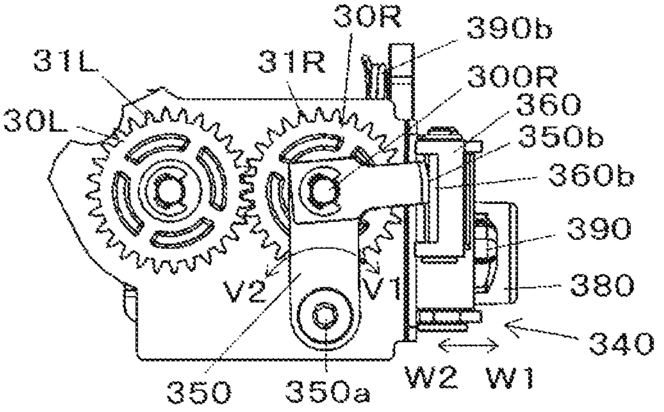
FIG. 66 is a view illustrating an example of a displacement portion according to another embodiment.
Figure 67:
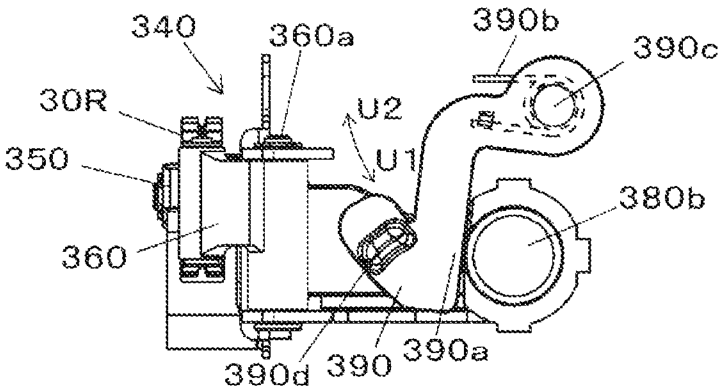
FIG. 67 is a view illustrating an example of a displacement portion according to another embodiment.
Figure 68:
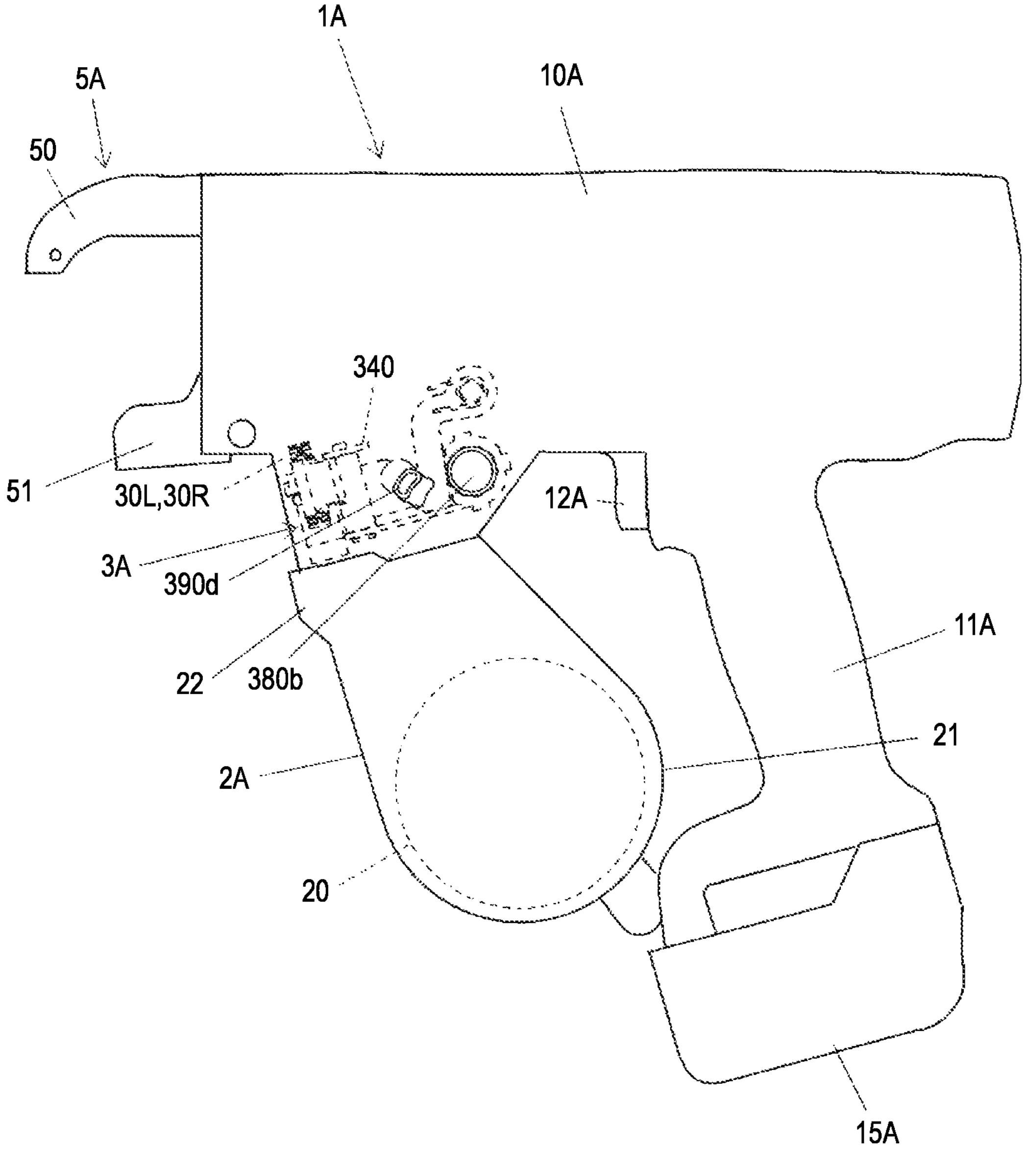
FIG. 68 is an external view illustrating an example of a reinforcing bar binding machine according to another embodiment.

FIGS. 65 to 67 are views illustrating an example of a displacement unit of another embodiment, and FIG. 68 is an external view illustrating an example of a reinforcing bar binding machine of another embodiment. A displacement unit 340 is an example of a displacement unit, and includes a first displacement member 350 that is displaced in directions indicated by arrows V1 and V2 by a rotation operation with a shaft 350*a* as a fulcrum, and displaces a second feed gear 30R in a direction separating from a first feed gear 30L. Furthermore, the displacement unit 340 includes a second displacement member 360 for displacing the first displacement member 350.

The first displacement member 350 is a long plate-like member and has one end side rotatably supported to the shaft 350*a* and the other end side to which the second feed gear 30R is rotatably supported by a shaft 300R. It is noted that the shape of the first displacement member 350 is not limited to the long plate-like member. Furthermore, the first displacement member 350 includes a pressed portion 350*b* pressed from the second displacement member 360 in the range of a thickness t along the axial direction of the second feed gear 30R supported via the shaft 300R, preferably, in the vicinity of a position of a second feed groove 32R.

The pressed portion 350*b* is disposed so as to extend toward a radial direction of the second feed gear 30R from the shaft 300R. The pressed portion 350*b* has a U shape and is attached to the shaft 300R so as to sandwich the second feed gear 30R with the U-shaped opening. It is noted that the shape of the pressed portion 350*b* is not limited to the U shape.

The second displacement member 360 is rotatably supported to a shaft 360*a* and is displaced in directions indicated by arrows W1 and W2 by a rotation operation with the shaft 360*a* as a fulcrum. The second displacement member 360 includes a pressing portion 360*b*, which presses the pressed portion 350*b* of the first displacement member 350, at one end side at which the shaft 360*a* is sandwiched. The pressing portion 360*b* presses the pressed portion 350*b* in the range of the thickness t along the axial direction of the second feed gear 30R, preferably, in the vicinity of the position of the second feed groove 32R.

The first displacement member 350 is displaced with a rotation operation with the shaft 350*a* as a fulcrum and the second displacement member 360 is displaced with a rotation operation with the shaft 360*a* as a fulcrum, but their shafts are not parallel to each other. The pressing portion

360*b* is configured by a convex arc along the rotation operation with the shaft 360*a* as a fulcrum. Furthermore, the pressed portion 350*b* is configured by a convex arc along a rotation operation with the shaft 300R as a fulcrum. As a result, contact points between the pressing portion 360*b* and the pressed portion 350*b* are suppressed from being largely deviated by the rotation operations of the first displacement member 350 and the second displacement member 360.

Moreover, in the first displacement member 350, at least the pressed portion 350*b* or the entire is configured by iron, and in the second displacement member 360, at least the pressing portion 360*b* or the entire is configured by iron. As a result, abrasion of a contact point between the pressing portion 360*b* and the pressed portion 350*b* is suppressed.

The second displacement member 360 includes a spring abutting portion 370*a*, which is abutted by a spring 370 configured by a compression coil spring for example, at the other end side at which the shaft 360*a* is sandwiched. The spring 370 is urged in a direction of pushing the spring abutting portion 370*a*. Therefore, one end side of the second displacement member 360, that is, the pressing portion 360*b* enters a state of pressing the pressed portion 350*b* by urging force of the spring 370.

The spring 370 presses the second displacement member 360 and the pressing portion 360*b* of the second displacement member 360 presses the pressed portion 350*b* of the first displacement member 350, so that the second feed gear 30R is pressed in the direction of the first feed gear 30L.

As a result, two wires W are sandwiched by a first feed groove 32L of the first feed gear 30L and a second feed groove 32R of the second feed gear 30R. Furthermore, a tooth portion 31L of the first feed gear 30L and a tooth portion 31R of the second feed gear 30R mesh with each other.

The displacement unit 340 includes an operation button 380 for pressing the second displacement member 360 against the urging force of the spring 370. Furthermore, the displacement unit 340 includes a release lever 390 for fixing the operation button 380 in a predetermined state, that is, a state in which the operation button 380 presses the second displacement member 360, and releasing the fixing.

The operation button 380 is an example of an operation member, and is provided at a position facing the spring 370 via the second displacement member 360. In the operation button 380, an operation part 380*b* protrudes outward from one side surface of a main body 10A, and is movably supported to the main body 10A in a pushing direction with respect to the main body 10A indicated by an arrow T1 and in a direction of protruding from the main body 10A indicated by an arrow T2. The operation part 380*b* of the operation button 380 is pushed in the direction of the arrow T1 in which the main body 10A is pushed, so that the operation button 380 and the second displacement member 360, by which the spring 370 is sandwiched, are rotated in the direction of the arrow T1.

The operation button 380 includes an locking recess 380*a* to which the release lever 390 is locked at a wire loading position where the wire W can be loaded by separating the first feed gear 30L and the second feed gear 30R. The locking recess 380*a* is configured by providing a recess at a front side of the operation button 380 so as to face the release lever 390 in the present example.

The release lever 390 is an example of a release member, and is supported so as to be movable in directions indicated by arrows U1 and U2 intersecting the movement direction of the operation button 380 by a rotation operation with a shaft 390*c* as a fulcrum.

The release lever 390 includes a locking protrusion 390*a* engaged with the locking recess 380*a* formed in the operation button 380 when the operation button 380 is pressed to a predetermined state. Accordingly, when the operation button 380 is pressed to the predetermined state, the operation button 380 is fixed at the position by the release lever 390. The release lever 390 includes an operation part 390*d* for releasing the fixing. The operation part 390*d* protrudes outward from one side surface of the main body 10A. The release lever 390 operates the operation part 390*d* to move in a direction of separating from the operation button 380, so that the locking protrusion 390*a* disengages from the locking recess 380*a*.

The release lever 390, for example, is urged in the direction of the arrow U1 toward the operation button 380 by a spring 390*b* configured by a torsion coil spring, so that the locking protrusion 390*a* abuts the operation button 380.

Figure 69:
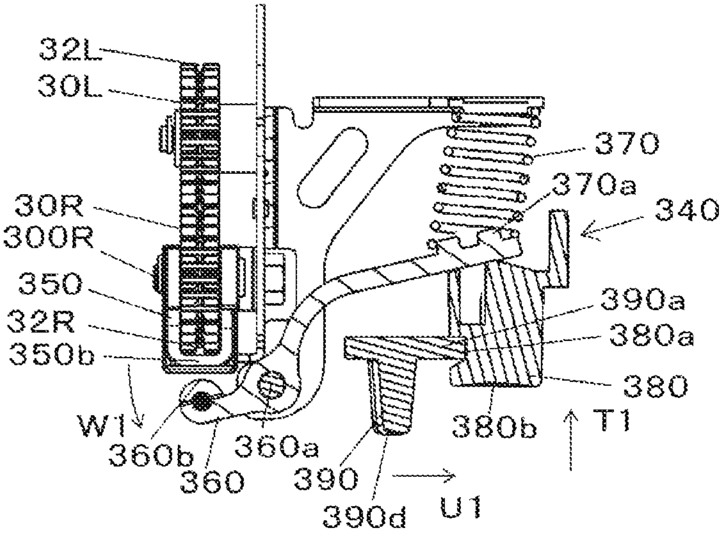
FIG. 69 is an explanatory view illustrating an example of an operation of a displacement portion according to another embodiment.
Figure 70:
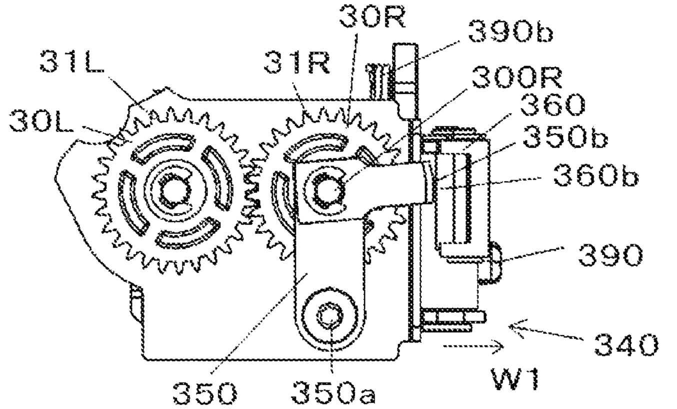
FIG. 70 is an explanatory view illustrating an example of an operation of a displacement portion according to another embodiment.
Figure 71:
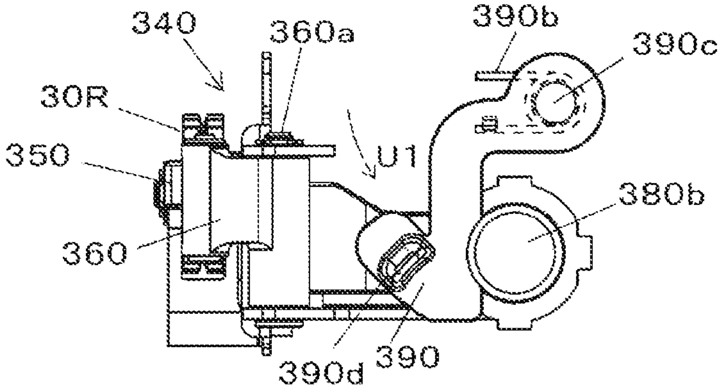
FIG. 71 is an explanatory view illustrating an example of an operation of a displacement portion according to another embodiment.

FIGS. 69 to 71 are explanatory views illustrating an example of an operation of the displacement unit of another embodiment and illustrate an operation of releasing pressing of the second feed gear 30R When the operation button 380 is pushed in the direction of the arrow T1, the second displacement member 360 is rotated in the direction of the arrow W1 with the shaft 360*a* as a fulcrum while compressing the spring 370. As a result, the pressing portion 360*b* of the second displacement member 360 is separated from the pressed portion 350*b* of the first displacement member 350.

When the operation button 380 is pushed in the direction of the arrow T1 to a position at which the locking recess 380*a* faces the locking protrusion 390*a* of the release lever 390, the release lever 390 is rotated by restoring force of the spring 390*b* in the direction of the arrow U1 with the shaft 390*c* as a fulcrum by the spring 390*b*. As a result, the locking protrusion 390*a* of the release lever 390 enters the locking recess 380*a* of the operation button 380, so that the operation button 380 is held in the state of pressing the second displacement member 360. Thus, at the time of loading of the wire W, it is not necessary to continuously push the operation button 380.

Figure 72:
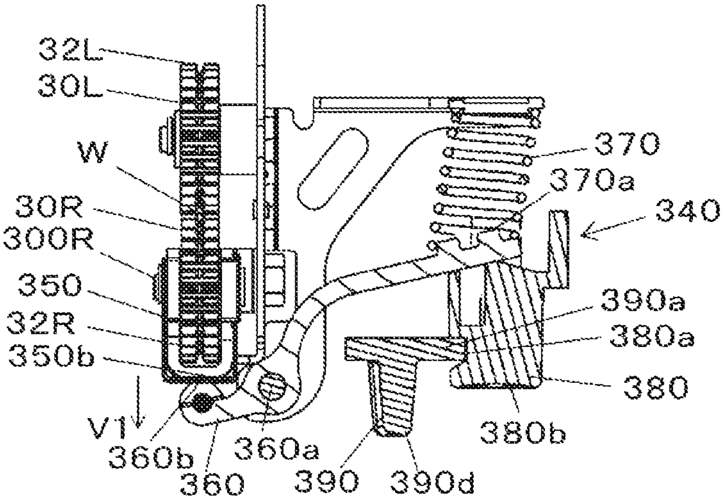
FIG. 72 is an explanatory view illustrating an example of an operation of a displacement portion according to another embodiment
Figure 73:
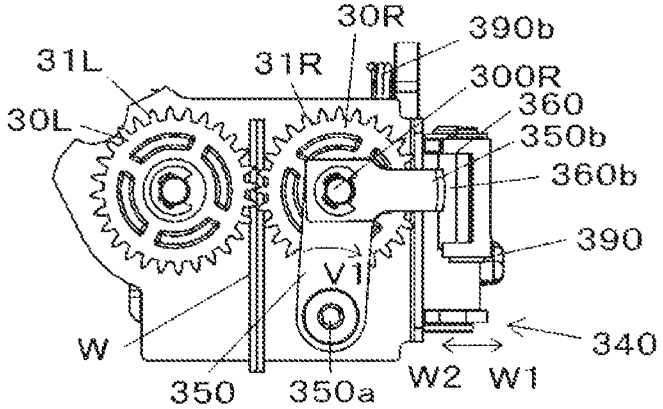
FIG. 73 is an explanatory view illustrating an example of an operation of a displacement portion according to another embodiment.
Figure 74:
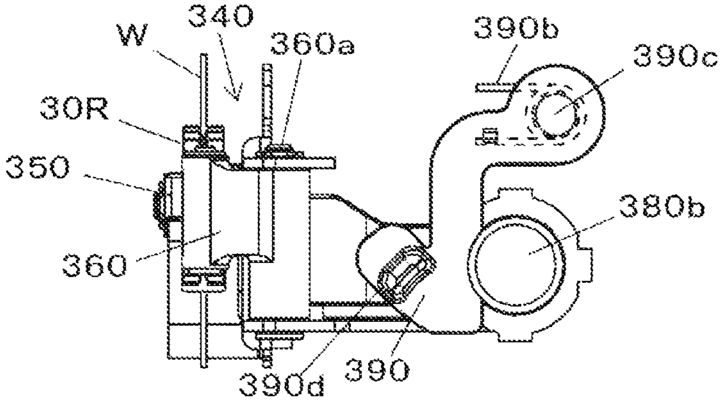
FIG. 74 is an explanatory view illustrating an example of an operation of a displacement portion according to another embodiment.

FIGS. 72 to 74 are explanatory views illustrating an example of an operation of the displacement unit of another embodiment and illustrate an operation of loading the wire W between the first feed gear 30L and the second feed gear 30R. In the state in which the pressing portion 360*b* of the second displacement member 360 is separated from the pressed portion 350*b* of the first displacement member 350, the first displacement member 350 for supporting the second feed gear 30R can be freely rotated with the shaft 350*a* as a fulcrum.

As a result, when two wires W arranged in parallel are inserted between the first feed gear 30L and the second feed gear 30R, the first displacement member 350 is rotated in the direction of the arrow V1 with the shaft 350*a* as a fulcrum, so that the second feed gear 30R is separated from the first feed gear 30L. Thus, the two wires W arranged in parallel are inserted between the first feed groove 32L of the first feed gear 30L and the second feed groove 32R of the second feed gear 30R.

Figure 75:
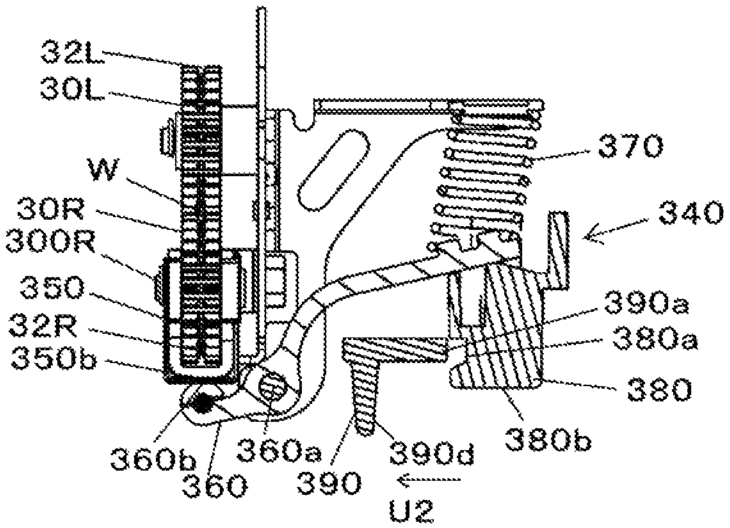
FIG. 75 is an explanatory view illustrating an example of an operation of a displacement portion according to another embodiment.
Figure 76:
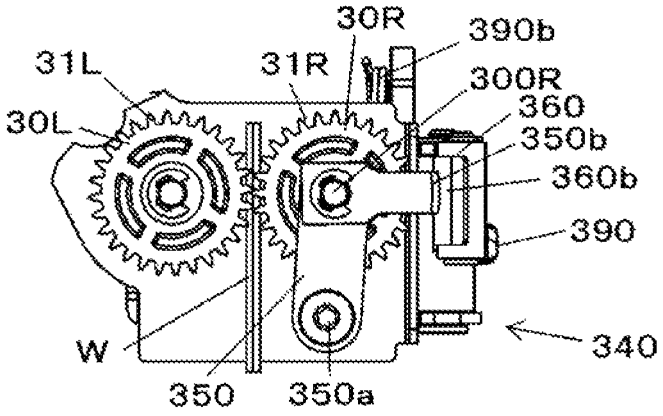
FIG. 76 is an explanatory view illustrating an example of an operation of a displacement portion according to another embodiment.
Figure 77:
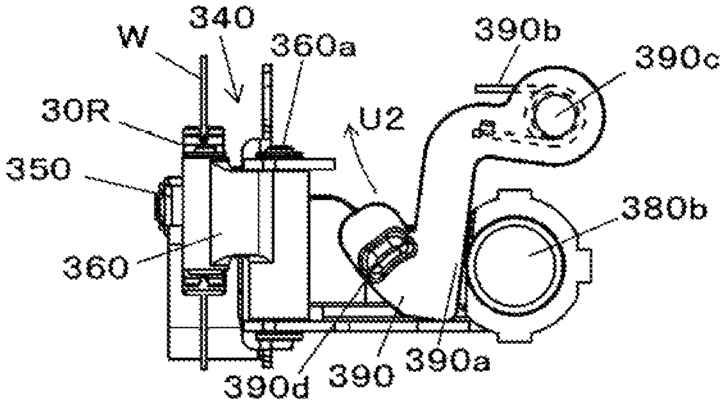
FIG. 77 is an explanatory view illustrating an example of an operation of a displacement portion according to another embodiment.

FIGS. 75 to 77 are explanatory views illustrating an example of an operation of the displacement unit of another embodiment and illustrate an operation of releasing holding of the operation button 380. After the wire W is inserted between the first feed gear 30L and the second feed gear 30R, the release lever 390 is rotated in the direction of the arrow U2 with the shaft 390*c* as a fulcrum. As a result, the locking protrusion 390*a* of the release lever 390 is pulled out from the locking recess 380*a* of the operation button 380.

Figure 78:
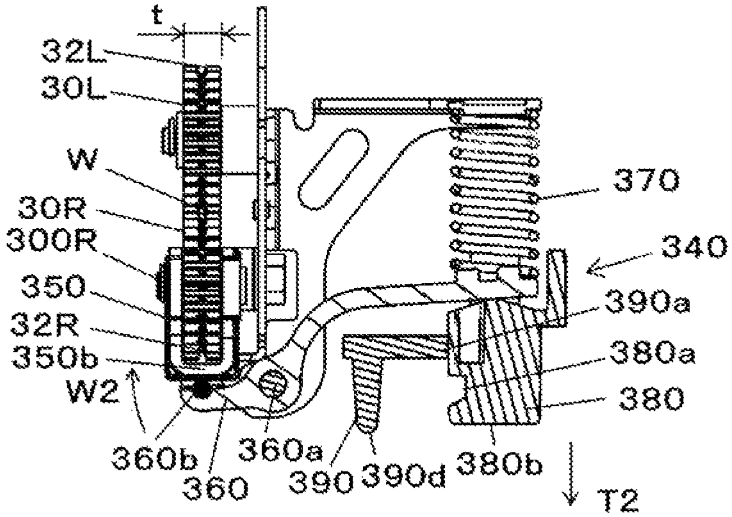
FIG. 78 is an explanatory view illustrating an example of an operation of a displacement portion according to another embodiment.
Figure 79:
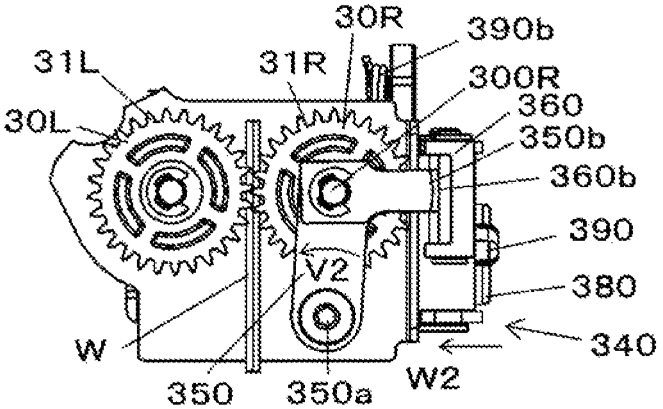
FIG. 79 is an explanatory view illustrating an example of an operation of a displacement portion according to another embodiment.
Figure 80:
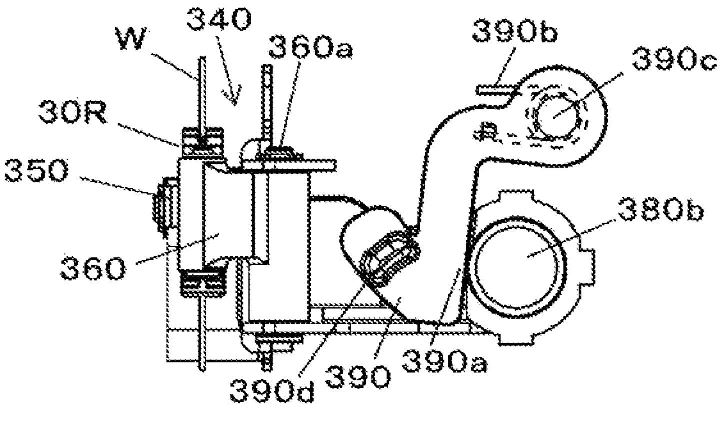
FIG. 80 is an explanatory view illustrating an example of an operation of a displacement portion according to another embodiment.

FIGS. 78 to 80 are explanatory views illustrating an example of an operation of the displacement unit of another embodiment and illustrate an operation of pressing the second feed gear 30R to the first feed gear 30L. When the locking protrusion 390*a* of the release lever 390 is pulled out from the locking recess 380*a* of the operation button 380 by operating the release lever 390, the second displacement member 360 is rotated by restoring force of the spring 370 in the direction of the arrow W2 with the shaft 360*a* as a fulcrum.

When the second displacement member 360 is rotated in the direction of the arrow W2, the pressing portion 360*b* of the second displacement member 360 presses the pressed portion 350*b* of the first displacement member 350, so that the first displacement member 350 is rotated in the direction of the arrow V2 with the shaft 350*a* as a fulcrum and the second feed gear 30R is pressed in the direction of the first feed gear 30L by the force of the spring 370.

As a result, in the state in which the two wires W are arranged in parallel, the two wires W are sandwiched by the first feed groove 32L of the first feed gear 30L and the second feed groove 32R of the second feed gear 30R. The tooth portion 31L of the first feed gear 30L and the tooth portion 31R of the second feed gear 30R mesh with each other.

Moreover, the second displacement member 360 is rotated in the direction of the arrow W2, so that the operation button 380 moves in the direction of the arrow T2.

The pressed portion 350*b* of the first displacement member 350 is pressed by the pressing portion 360*b* of the second displacement member 360, so that force for pressing the vicinity of the position of the second feed groove 32R is transferred via the shaft 300R and the second feed gear 30R is pressed in the direction of the first feed gear 30L.

As a result, the second feed gear 30R is suppressed from being inclined with respect to the first feed gear 30L, so that biased load is suppressed from being applied to the first feed gear 30L and the second feed gear 30R.

Thus, biased abrasion of the first feed gear 30L and the second feed gear 30R is suppressed. Furthermore, the wire W is suppressed from being pulled out from the first feed groove 32L of the first feed gear 30L and the second feed groove 32R of the second feed gear 30R.

Figure 81:
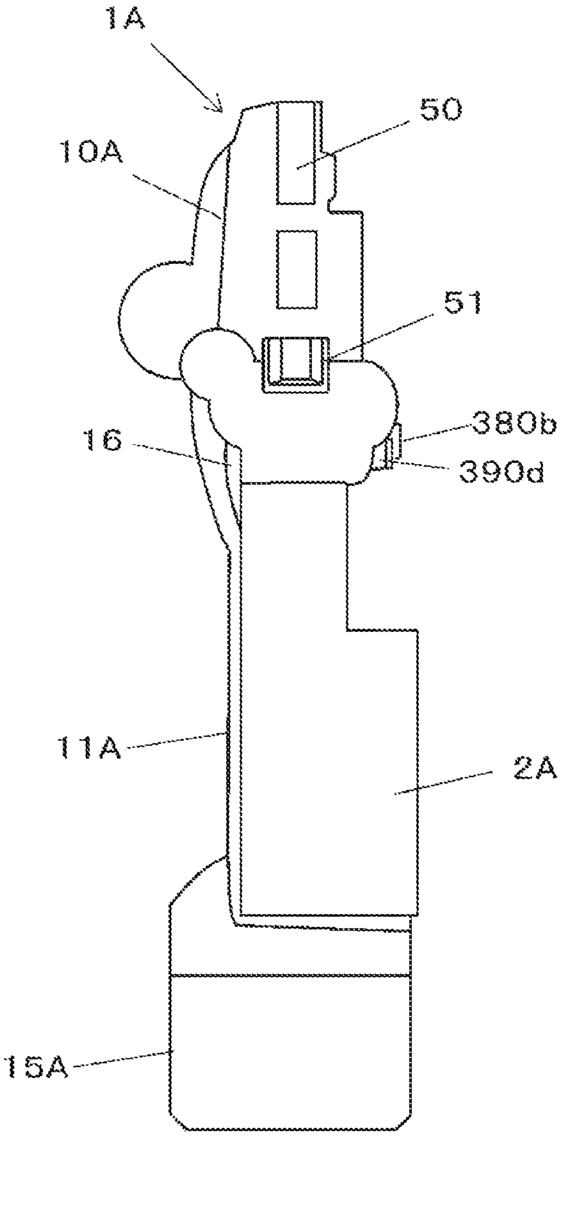
FIG. 81 is an external view illustrating an example of a reinforcing bar binding machine according to another embodiment.

FIG. 81 is an external view illustrating an example of a reinforcing bar binding machine of another embodiment. The operation part 380*b* of the operation button 380 and the operation part 390*d* of the release lever 390 are provided above a magazine 2A at one side surface of the main body 10A and a front side of a trigger 12A. A finger abutment part 16 for abutting fingers is provided above the magazine 2A at the other side surface of the main body 10A and the front side of the trigger 12A.

As a result, when a handle part 11A is held by a single hand, it is possible to operate the operation part 380*b* of the operation button 380 by a single hand in the state of sandwiching the operation part 380*b* of the operation button 380 and the finger abutment part 16. Furthermore, it is possible to operate the operation part 390*d* of the release lever 390 by a single hand in the state of sandwiching the operation part 390*d* of the release lever 390 and the finger abutment part 16. Thus, it is possible to operate the operation button 380 and the release lever 390 without placing a reinforcing bar binding machine 1A at a work place and the like.

It is noted that since it is sufficient if it is a mechanism which can be fixedly held and released between the operation button 380 and the release lever 390, a mechanism of a locking member having an locking protrusion shape at the operation button 380 side and an locking recess shape at the release lever 390 side may be provided.

In another modified example of the present embodiment, instead of a configuration of simultaneously feeding a plurality of wires W, a configuration may be adopted in which after the wires W are wound around a reinforcing bar S one by one so as to wind the plurality of wires, the plurality of wires are fed in a reverse direction and wound around the reinforcing bar S.

It is noted that the present invention can also be applied to a binding machine that binds pipes or the like as a binding object with a wire.

Hereinafter, another embodiment of the binding machine will be described. FIGS. 82 to 103 are for explaining another embodiment.

<Configuration> Hereinafter, the Configuration Will be Described.

For example, as illustrated in the side view of FIG. 82 and the front view of FIG. 83, a reinforcing bar binding machine (binding machine) 1B is used to bind an (binding) object (hereinafter, referred to as the reinforcing bar S) such as a reinforcing bar or wire at a construction site. This reinforcing bar binding machine 1B makes it possible to bind the reinforcing bar S by curling a wire W (or imparting an arc-like bending property) and feeding to form a loop Ru surrounding the periphery of the reinforcing bar S, and tightening the loop Ru.

Hereinafter, the reinforcing bar binding machine 1B will be described.

The above-mentioned reinforcing bar binding machine 1B has a main body (binding machine main body) 10B and a handle portion 11B.

Further, in the following description, with respect to direction, it is based on the state illustrated in FIG. 82 (the state where the reinforcing bar binding machine 1B is raised). Also, the longitudinal direction (a direction corresponding to the left-right direction in FIG. 82) of the main body 10B is set as a front-rear direction, and a predetermined direction out of the directions orthogonal to the longitudinal direction of the main body 10B (a direction corresponding to the up-down direction in FIG. 82) is set as an up-down direction (or height direction), and the direction orthogonal to the front-rear direction and the up-down direction is the left-right direction (or the width direction). Further, one end side of the longitudinal direction of the main body 1B is referred to as the front side or the distal end side, the other end side in the longitudinal direction of the main body 10B (the side opposite to the reinforcing bar S, that is, the right side of FIG. 82) is referred to as the rear side or the rear end side. Further, the upper side of FIG. 82 is referred to as the upper side with respect to the main body 10B and the lower side of FIG. 82 (a direction in which the handle portion 11B extends) is set as the lower side with respect to the main body 10B. Further, the inner side of the sheet surface (the left side of FIG. 83) of FIG. 82 is set as the right side of the main body 10B, and the front side of the sheet surface (the right side of FIG. 83) of FIG. 82 is set as the left side of the main body 10B.

The handle portion 11B is provided so as to extend from substantially the middle portion in the longitudinal direction of the main body 10B toward substantially a downward direction. The handle portion 11B is provided with a trigger 12B and a lock switch 800, and at the same time, is capable of attaching/detaching a battery pack 15B to a lower portion thereof. In addition, when the lock switch 800 is released and the trigger 12B is pulled in the state where the power switch is turned on, the reinforcing bar binding machine 1B is operated and the binding operation is performed.

Further, in the front side of the handle portion 11B, a housing unit (magazine) 110 used to set a reel 120 wound the (binding) wire W used for binding the reinforcing bar S is provided. In this case, the wire W of a coil shape is used with respect to the reel 120. The reel 120 is configured in which one or more wires W are pulled out simultaneously. The reel 120 wound with the wire W is set to be detachable with respect to the housing unit 110. In this case, the attaching/detaching direction of the reel 120 with respect to the housing unit 110 is the axial direction of the reel 120.

Further, as illustrated in the internal structure view of FIG. 84, the main body 10B is provided with a wire feeding unit 160 for feeding the wire W wound on the reel 120 toward the binding unit 150 provided at the distal end side of the main body 10B. In this case, the wire feeding unit 160 is provided at the lower portion of the distal end side of the main body 10B. Further, the housing unit 11 is provided at a lower portion of the wire feeding unit 160. The housing unit 11 is mounted between the distal end of the main body 10B and the lower end of the handle portion 11B in an erected state.

The housing unit 110 is not necessarily mounted to the main body 10B in the erected state. For example, if the wire W can be conveyed to the main body 10B from the housing unit 110, the housing unit 110 may be configured separately from the main body 10B.

As described above, by providing the wire feeding unit 160 and the housing unit 110 at the lower portion of the front side of the main body 10B (for example, as compared with the case where the housing unit 110 is provided at the rear end side of the main body 10B), the weight balance of the reinforcing bar binding machine 1B is improved, the reinforcing bar binding machine 1B is made easy to handle, and the path of the wire W becomes more curved, so that the loop Ru of the wire W can be made easily.

Figure 85:
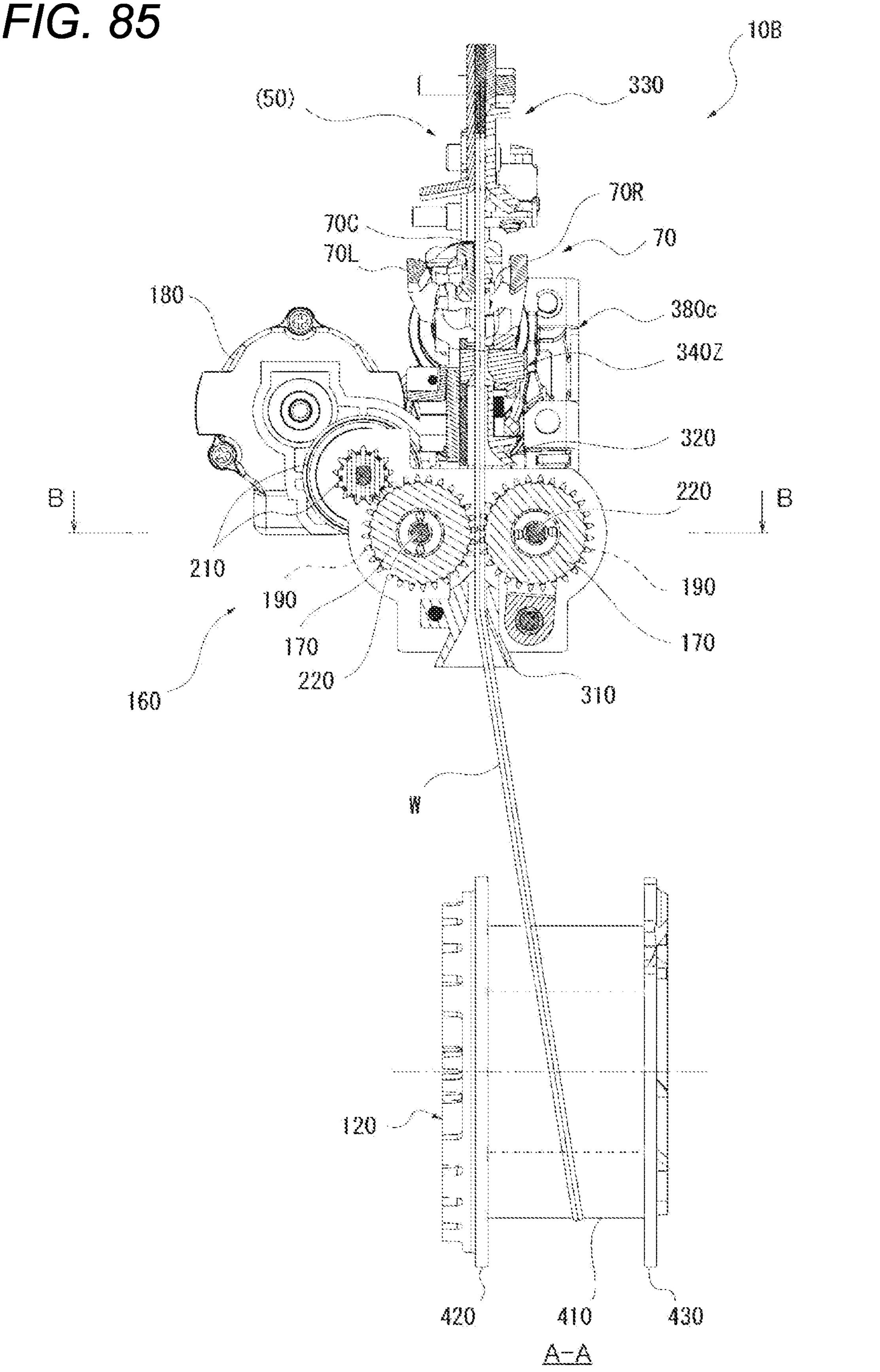
Figure 86:
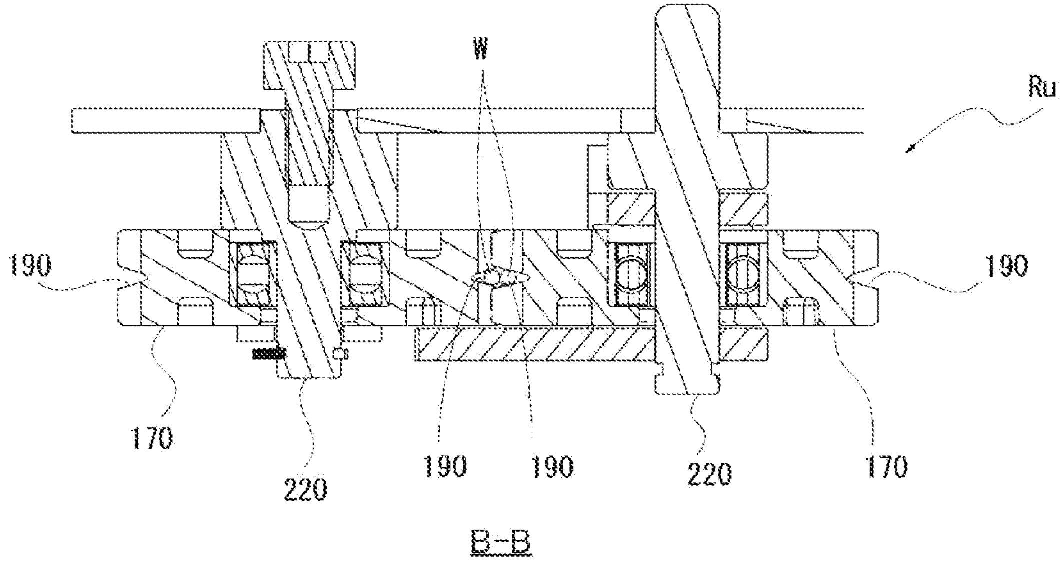

As illustrated in the views of FIGS. 85 and 86, the wire feeding unit 160 includes at least a pair of feed gears (feeding members) 170 for feeding the wire W and a feed motor 180 for rotationally driving one of a pair of feed gears 170. The feed gear 170 is provided in a pair, for example, in such a manner that the wires W are interposed between the right and left sides. In the pair of left and right feed gears 170, one side is set as a drive wheel, and the other side is set as a driven wheel. The feed gear 170 which is set as a driven wheel may be a tension roller or the like capable of being pushed away from the feed gear 170 set as a drive wheel at a close distance with a desired pressing force.

A V-shaped feed mechanism (notched portion) 190 for receiving and frictionally driving the wire W is provided at the center portion in the thickness direction of the outer periphery of the feed gear 170, and an engaging groove extending in the circumferential direction is formed. Further, an intermediate gear 210 or the like may be provided between the feed gear 170 and an output gear mounted on the output shaft of the feed motor 180, as appropriate.

Also, by forwardly rotating the feed gear 170 by the feed motor 180, the wire W can be moved substantially upward and fed to the binding unit 150. In addition, the feed motor 180 reverses the feed gear 170, thereby the wire W that was fed out can be moved substantially downward and pulled back to the housing unit 110 from the binding unit 150. In this case, as illustrated in FIG. 84, a rotary shaft 220 of the feed gear 170 is inclined in a forward inclined state with respect to a horizontal direction, and the wire W is fed toward the substantially forward inclined direction.

Further, the binding unit 150 is provided with an abutting portion 250 that can be brought into contact with the reinforcing bar S. In addition, the binding unit 150 is provided with a curl guide unit (curve forming portion) 5A for making the wire W fed by the wire feeding unit 160 into the loop Ru. The curl guide unit 5A is configured to have a first guide unit 50 and a second guide unit 51 which are provided vertically in pairs with the abutting portion 250 interposed therebetween.

The first guide unit 50 has a curl groove portion (guide groove) for curling the wire W (or for imparting an arc shaped curvature property to the wire W) on its inner peripheral side. The second guide unit 51 has a receiving groove for receiving the wire W curled by the first guide unit 50 on its inner peripheral side. In addition, the wire W is made to pass through the first guide unit 50 and the second guide unit 51 in the counterclockwise direction in the drawings, thereby forming the loop Ru. In addition, a passing portion is formed between the first guide unit 50 and the second guide unit 51 (gap), and the reinforcing bar S passes toward the abutting portion 250 through the passing portion.

Further, as illustrated in FIG. 85, the main body 10B is provided with parallel guides (wire guides) 310, 320, and 330 for guiding or restricting the position of the wire W at the entering side and exiting side of the wire feeding unit 160, and at least a base portion of the first guide unit 50, respectively. The parallel guides 310, 320, and 330 form the feeding unit. Among them, the parallel guide 310 disposed on the entering side of the wire feeding unit 160 is used to guide the wire W from the reel 120 to the wire feeding unit 160. The parallel guide 32 disposed on the exiting side of the wire feeding unit 160 is used to guide the wire W from the wire feeding unit 160 to a cutting unit 340Z. The cutting unit 340Z is provided for cutting the portion of the wire W that has become the loop Ru from other portions, and is configured to have a fixed blade and a movable blade. Further, it is possible for at least the parallel guide 330 disposed at the base portion of the first guide unit 50 to curl the wire W in a loop shape.

Figure 89:
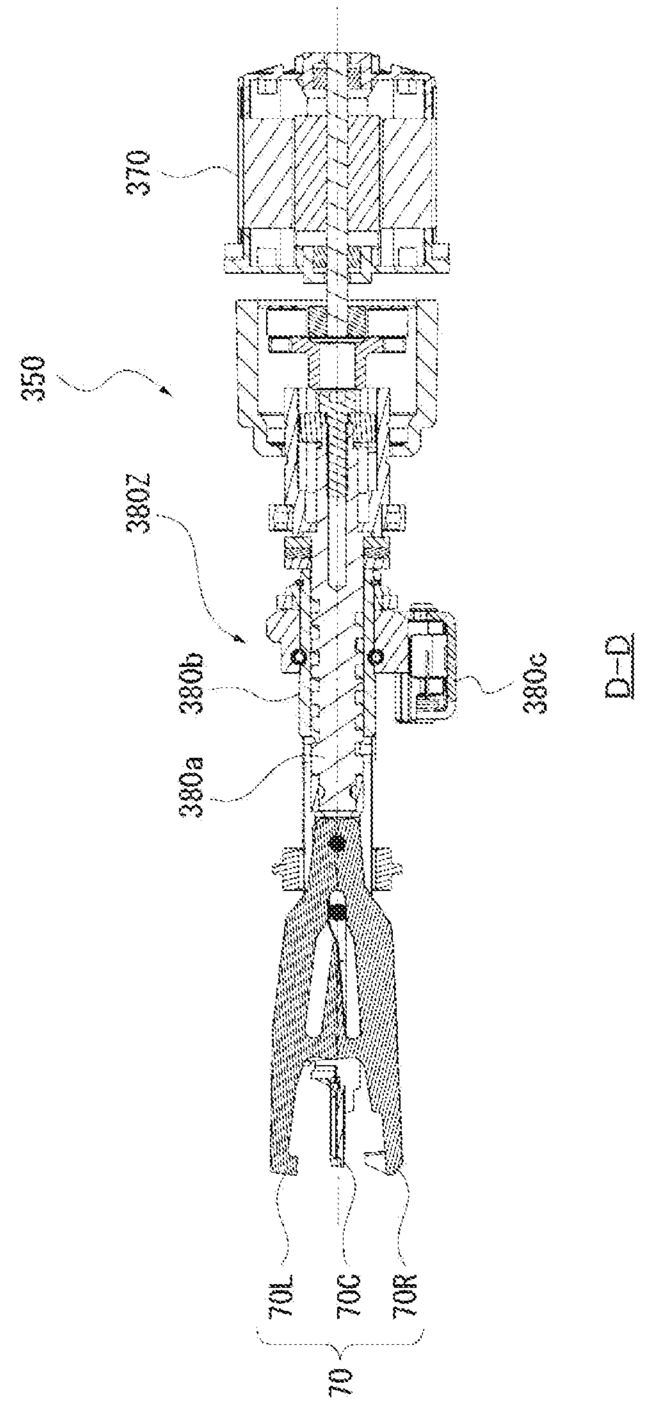

In addition, the abutting portion 250 (see FIG. 82) of the distal end side of the main body 10B is located on both sides of the loop Ru of the wire W in an axial direction and is provided in a pair, left and right at a predetermined interval. In the main body 10B, at a position between the right and left abutting portions 250, a twisting unit 350 which enables the wire W to be tightened with respect to the reinforcing bar S by twisting and tightening the wire W made into the loop Ru as illustrated in the side view of FIG. 87, the plan view of FIG. 88, and the cross-sectional plan view of FIG. 89 is provided. The twisting unit 350 is provided with a gripping portion 70 for fitting, releasing, or holding the wire W, a twisting motor 370Z for twisting (rotating) the gripping portion 70 by a predetermined number of times, and an operating mechanism 380Z for opening operations, or twisting or retreating operations of the gripping portion 70 with respect to the wire W.

As illustrated in FIG. 89, the gripping portion 70 is provided with a fixed gripping member (center hook) 70C and a pair of left and right first movable gripping member (hook) 70L and second movable gripping member (hook) 70R and it is made possible to be configured to have a left and right wire guiding portion for passing each of the overlapped portions of the wire W made into the loop Ru. Further, the operating mechanism 380Z for opening and closing the gripping portion 70 mainly includes a screw shaft 380*a*, a sleeve (movable member) 380*b* screwed and coupled to the outer circumferential side of the screw shaft 380*a*, and a screw mechanism having a rotation restricting portion 380*c* for applying a rotation restriction to the sleeve 380*b* or releasing the rotation restriction.

The operating mechanism 380Z is interposed between the gripping portion 70 and the twisting motor (motor) 370. The operating mechanism 380Z performs opening and closing operations, or twisting operation of the gripping portion 70 by utilizing the relative displacement of the sleeve 380*b* in the longitudinal direction with respect to the screw shaft 380*a* due to the rotation of the screw shaft 380*a*. Further, the operating mechanism 380Z can be operated in conjunction with the cutting unit 340Z or the parallel guide 330 of the base portion of the first guide unit 50, and the like using interlocking mechanisms 340*a* and 330*a* (see FIG. 87).

In addition, when the wire W is twisted, the operating mechanism 380Z closes the gripping portion 70 (the first movable gripping member 70L and the second movable gripping member 70R thereof) to hold an overlapped portion of the wire W made into the loop Ru, and then twists it. After the loop Ru of the wire W is completely twisted, the operating mechanism 380Z waits with the gripping portion 70 (left and right first movable gripping member 70L and second movable gripping member 70R) in an open state. The configuration of the gripping portion 70 is as illustrated in FIGS. 10, 11, 12, 13A, and 13B described above. In addition, the operation of the gripping portion 70 is as illustrated in FIGS. 29A, 29B, 29C, 30A, 30B, and 30C described above.

The wire feeding unit 160, the twisting unit 350, and the like are controlled by a control device 390Z (see FIG. 84) installed inside the main body 10B.

Figure 90:
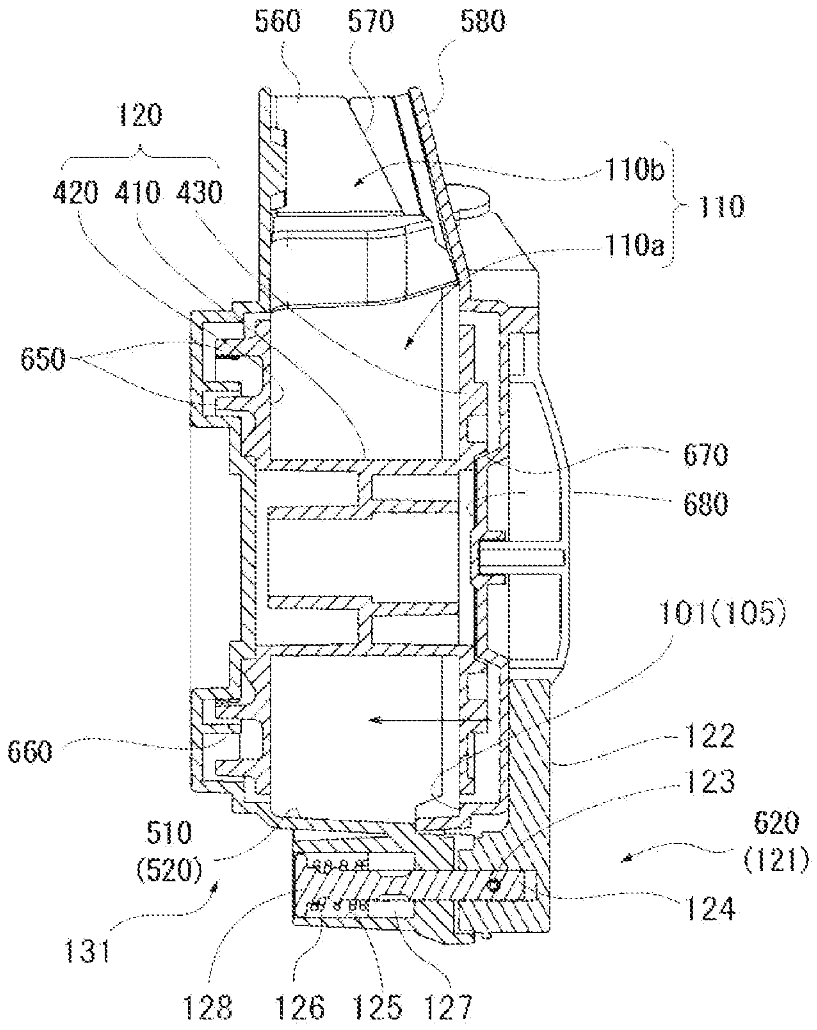

Also, as illustrated in FIG. 90, the reel 120 is provided with a tubular hub portion 410 which functions as a winding center for the wire W and a pair of flange portions 420 and 430 integrally provided at both axial end portions (or periphery) of the hub portion 410. The flange portions 420 and 430 are formed in a substantially disc shape having a larger diameter than the hub portion 410 and are provided concentrically with the hub portion 410. It is preferable for the pair of flange portions 420 and 430 to have the same diameter, or the flange portion 420 positioned on the inner side (side opposite to an opening 570 or a cover 580 to be described below on the left side in the drawing) of the housing unit 110 based on the attaching and detaching direction of the reel 120 with respect to the housing unit 110 may have a smaller diameter than that of the flange portion 430 located on the front side (side of the opening 570 or the cover 580 on the right side in the drawing). A reinforcement rib, a thickness reduction portion, and the like can be appropriately formed on the flange portions 420 and 430 (see FIG. 87 and etc.). Further, the reel 120 is preferably formed of a resin having excellent resistance to wear and bending such as ABS resin, polyethylene, and polypropylene.

Further, the reel 120 is not driven to rotate specifically inside the housing unit 110 but is made to be rotated (driven) in accordance with the pulling of the wire W. To this end, a rotary shaft portion (or a rotary guide unit) for supporting the rotation of the reel 120 is provided between the reel 120 and the housing unit 110.

Figure 82:
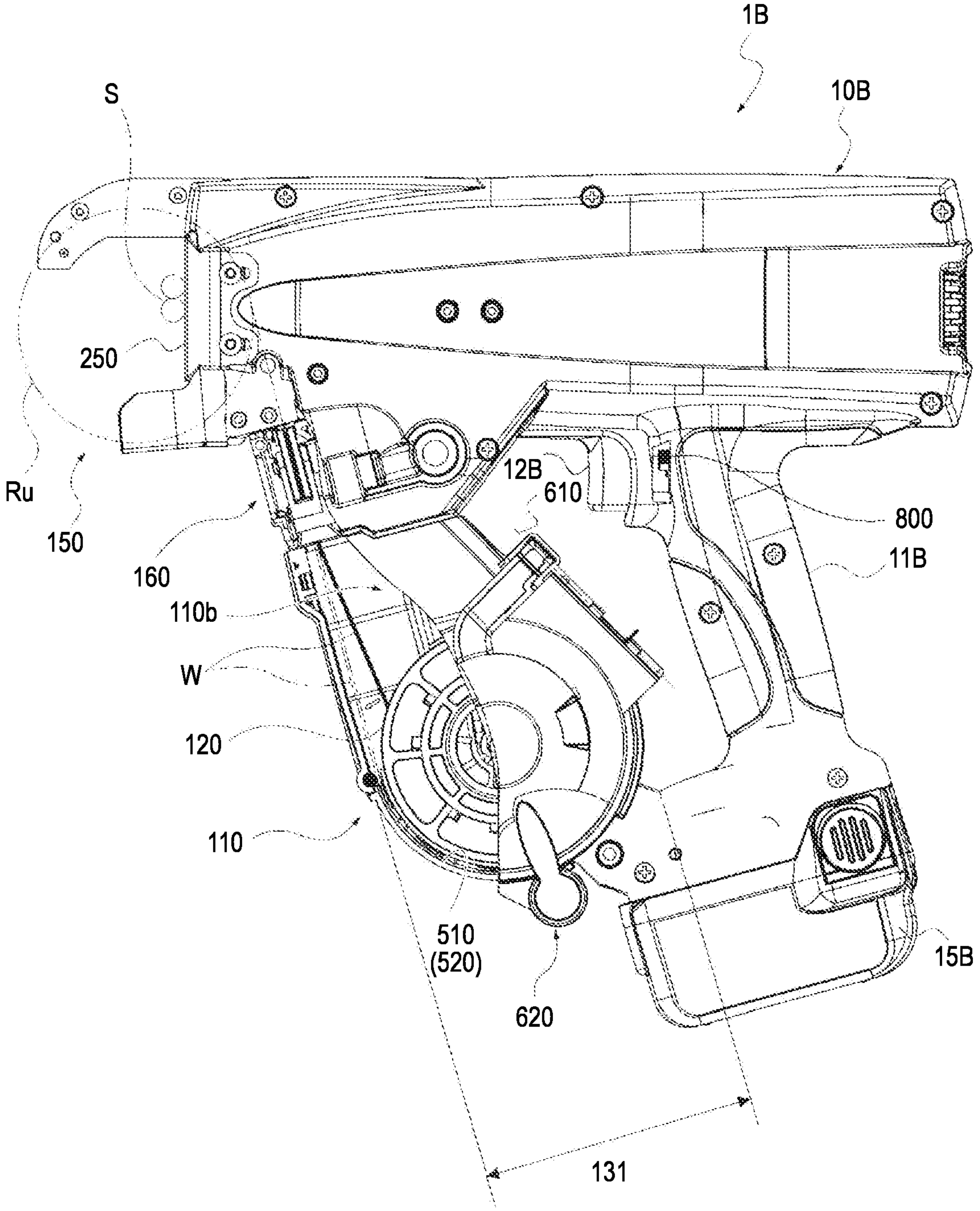

In this case, the wire W is pulled substantially upward by the rotation of the reel 120 in a clockwise direction from a position of the front portion of the lower side of the reel 120 (see FIG. 82). Further, the reel 120 is arranged in an offset state at one side of the left and right direction (for example, at the left side of the machine (see right side of FIG. 90) so as to be handled by a right-handed person). In particular, the reel 120 is made to be completely offset in the lateral direction with respect to the first guide unit 50. However, the reel 120 may made to offset in the side opposite to the above with respect to the main body 10B or the wire feeding unit 160.

Further, the embodiments of the aforementioned basic or overall configurations has the following configurations.

Figure 91:
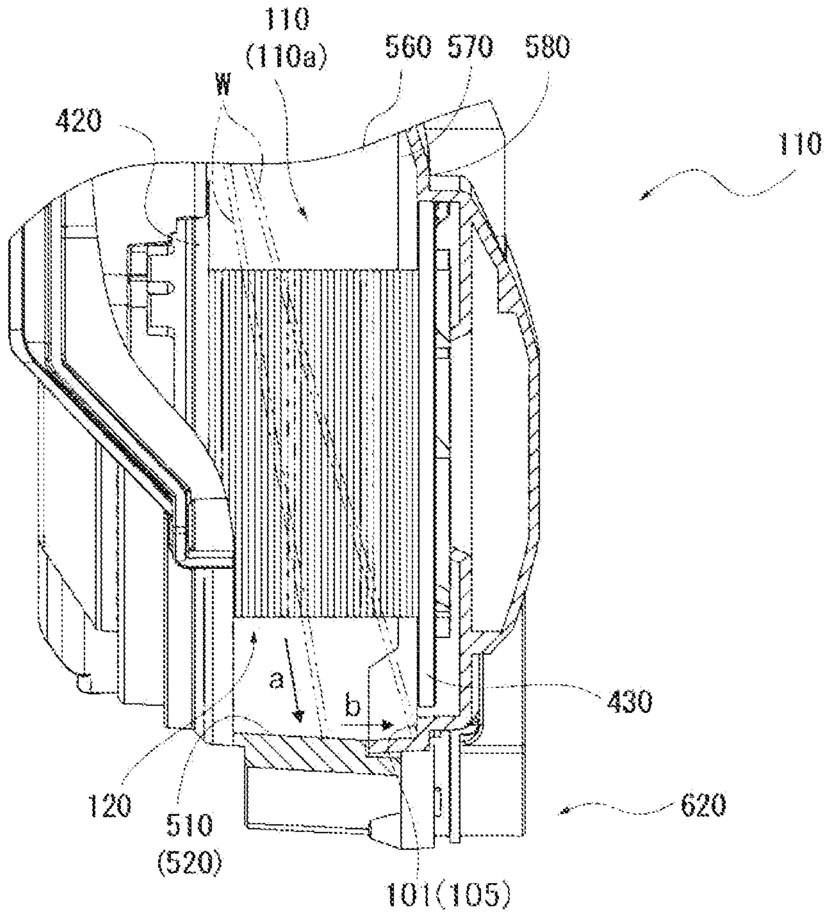

(1) The main body 10B is provided with a housing unit 110 capable of housing and installing the reel 120 around which the wire W is wound. The reinforcing bar binding machine 1B includes a wire feeding unit 160 that feeds out the wire W from the reel 120 housed in the housing unit 110. Further, as illustrated in FIG. 91, a wire movement restriction unit 101 is provided on the inner wall 510 to prevent a situation in which the wire W slackened in the housing unit 110 comes into contact with the inner wall 510 of the housing unit 110 (see arrow a) and laterally moves in the axial direction of the reel 120 along the inner wall 510 (see arrow b) (at a predetermined position or the like).

Here, the inner wall 510 of the housing unit 110 indicates the entire inner surface of the wall constituting the housing unit 110. Among them, the wire movement restriction unit 101 is particularly provided for a portion affected by slackness of the wire W inside the housing unit 110. More specifically, when the reel 120 is housed in (the reel housing unit 110*a* thereof) the housing unit 110, the peripheral wall 520 of the reel housing unit 110*a* located on the outer peripheral side of the reel 120, particularly the peripheral wall 520 in the width direction, which are opposed to the peripheral edge portions of the flange portions 420 and 430, and the peripheral portion thereof. The peripheral wall 520 of the reel housing unit 110*a* is a (partial) cylindrical surface or the like having a diameter somewhat larger than the diameter of the pair of flange portions 420 and 430.

The lateral movement of the wire W is caused by offsetting the reel 120 to one side with respect to the main body 10B and the wire feeding unit 160 in the left-right direction, and mainly moves in the offset direction (for example, to the right side). The wire movement restriction unit 101 may be of any type, but is preferably as follows.

(2) The wire movement restriction unit 101 may be a protrusion 105 protruding from the inner wall 510 toward the inside of the housing unit 110.

Here, the wire movement restriction unit 101 is provided at least at the position of the peripheral wall 520 of the inner wall 510 of the housing unit 110. The protrusion 105 serving as the wire movement restriction unit 101 may protrude from the wall surface of the peripheral wall 520 toward the inside of the housing unit 110 and may be any as long as the lateral movement of the wire W can be restricted. The protrusion 105 is provided at a position where the wire W laterally moved along the peripheral wall 520 abuts (hooks), and has a shape and height difference such that the wire W is reliably caught. For this reason, the lateral movement of the wire W that has laterally moved is further reliably prevented by the protrusion 105. The protrusion 105 may be, for example, a protrusion, a single or a plurality of bar-like protrusions, a protruding wall, or the like.

The protrusion 105 is provided at a position which is offset in the offset direction of the reel 120 in a portion 131 (see FIGS. 82 and 93A) at which the slackened wire W makes the strongest contact with the inner wall 510 of the housing unit 110 in the housing unit 110.

(3) The wire movement restriction unit 101 is provided on the inner wall 510 located on the side opposite to the wire feeding unit 160 via the reel 120.

Here, the expression "located on the side opposite to the wire feeding unit 160 via the reel 120" is a position which is farther from the wire feeding unit 160 than the hub section 410 in the inner wall 510. More specifically, it is the position around the bottom of the inner wall 510 (the lower position in FIG. 91), and the like. The reason why the wire movement restriction unit 101 is located at a position far from the wire feeding unit 160 is that it is a part that easily becomes a part in which the wire W slackened inside the housing unit 110 comes into contact with the inner wall 510 at the earliest time or a part 131 that comes into strongest contact with the inner wall 510.

(4) The housing unit 110 can house the reel 120 having the hub portion 410 serving as the winding core of the wire W, and the pair of flange portions 420 and 430 provided at both end sides of the hub portion 410. The inner wall 510 has a peripheral wall 520 facing the hub portion 410 when the reel 120 is housed. The wire movement restriction unit 101 protrudes toward the reel 120 from the wall surface at the end portion of the peripheral wall 520 or in the vicinity thereof.

Here, although the wire movement restriction unit 101 can be provided from an arbitrary position on the end portion of the peripheral wall 520 or in the vicinity thereof it is preferably as follows.

(5) The wire movement restriction unit 101 is formed so as to protrude toward the flange portions 420 and 430 from the wall surface at or near the end portion of the peripheral wall 520.

Here, the wire movement restriction unit 101 can be provided for one or both of the flange portions 420 and 430. In this case, the wire movement restriction unit 101 is provided on the side of the flange portion 430.

(6) The wire movement restriction unit 101 may be an upright wall extending from the wall surface of the peripheral wall 520 and having a length that does not reach the flange portions 420 and 430.

Here, the wire movement restriction unit 101 may have any length within a range that does not reach the flange portions 420 and 430, but it is preferable to arrange them with a slight clearance that does not cause interference with the peripheral edge portion of the flange portions 420 and 430 to face each other. It is more preferable that the gap be smaller than the diameter of the wire W. The upright wall as the wire movement restriction unit 101 is a wall which is provided in the peripheral wall 520 and extends inward of the housing unit 110, and constitutes a stepped portion with respect to the peripheral wall 520 of the inner wall 510. It is preferable that the upright wall extends in the circumferential direction of the reel 120. The distal end portion of the upright wall has an arc shape slightly larger in diameter than the flange portions 420 and 430 and slightly smaller in diameter than the peripheral wall 520 constituting the inner wall 510 of the case 560.

(7) Hereinafter, a specific configuration of the housing unit 110 will be described. The housing unit 110 includes a member such as a case 560 that can house the reel 120, and a cover 580 that can open and close an opening 570 for mounting the reel 120 provided in the case 560.

Here, the case 560 is a so-called magazine or the like, and is a protective member or the like for protecting the wire W pulled out from the reel 120 or the reel 120. The case 560 has at least a substantially cylindrical recess portion (reel housing unit 110*a*) capable of housing the reel 120 therein.

A portion (wire passage 110*b*) for guiding the wire W withdrawn from the reel 120 to the wire feeding unit 160 (the input side parallel guide 310) is provided on the upper side of the cylindrical reel housing unit 110*a* in the case 560 (see FIG. 82). The wire passage 110*b* is formed integrally with the reel housing unit 110*a* and constitutes a space (free space) through which the wire W can freely pass. In this case, the wire passage 110*b* has a lateral shape of an upper narrowing (or downward spreading) gradually contracting from the reel housing unit 110*a* toward the wire feeding unit 160. The case 560 is a resin case integrally formed with the main body 10B. Like the reel 120, the case 560 is preferably formed of a resin having excellent resistance against abrasion and bending such as ABS resin, polyethylene, polypropylene, or the like.

The opening 570 may be provided on either side of the case 560 on the right and left sides. In this case, it is provided on the offset side (the left side of the device).

On the other hand, the cover 580 is a so-called magazine cover or the like, and is made of a resin having an edge portion of substantially the same shape as the opening 570 of the case 560 (that is, a shape in which the lower side is a circle and the upper side is an upper side narrowed). The cover 580 is mounted so as to open and close with respect to the case 560 centering on the hinge portion 610 (see FIG. 82). The hinge portion 610 is provided at a position on the rear side of the housing unit 110. An urging spring for urging the cover 580 in the opening direction with respect to the case 560 is interposed in the hinge portion 610. Like the case 560 and the reel 120, the cover 580 is preferably made of a resin having excellent resistance to abrasion and bending, such as ABS resin, polyethylene, polypropylene, or the like.

Between the case 560 and the cover 580, there is provided a lock device 620 (see FIGS. 82 and 93B) for holding the cover 580 in a closed state. In this case, the lock device 620 may be provided at any position, but it will be preferably described later.

In the case where the housing unit 110 includes the case 560 and the cover 580, the peripheral wall 520 can be provided so as to straddle the case 560 and the cover 580, and the wire movement restriction unit 101 (protrusion 105) is set with respect to the position in the peripheral wall 520 at which the mating portion (the position of the edge portion of the opening 570 of the case 560) between the case 560 and the cover 580 is avoided. In FIG. 91, the wire movement restriction unit 101 (protrusion 105) is formed at a position on the front side (the right side in the figure) of the housing unit 110, that is, on the side of the cover 580, than the mating portion between the cover 580 and the case 560.

As illustrated in FIG. 90, between the outer surface of the flange portion 420 of the reel 120 positioned on the back side of the housing unit 110 and the side surface of the reel housing unit 110*a* of the case 560, large and small concentric guide ribs 650, 660 and the like are provided to protrude therefrom. Similarly, between the outer surface of the flange portion 430 of the reel 120 positioned on the front side of the housing unit 110 and the inner surface of the cover 580, circular guide recesses 670 and guide protrusions 680 and the like are formed.

Figure 92:
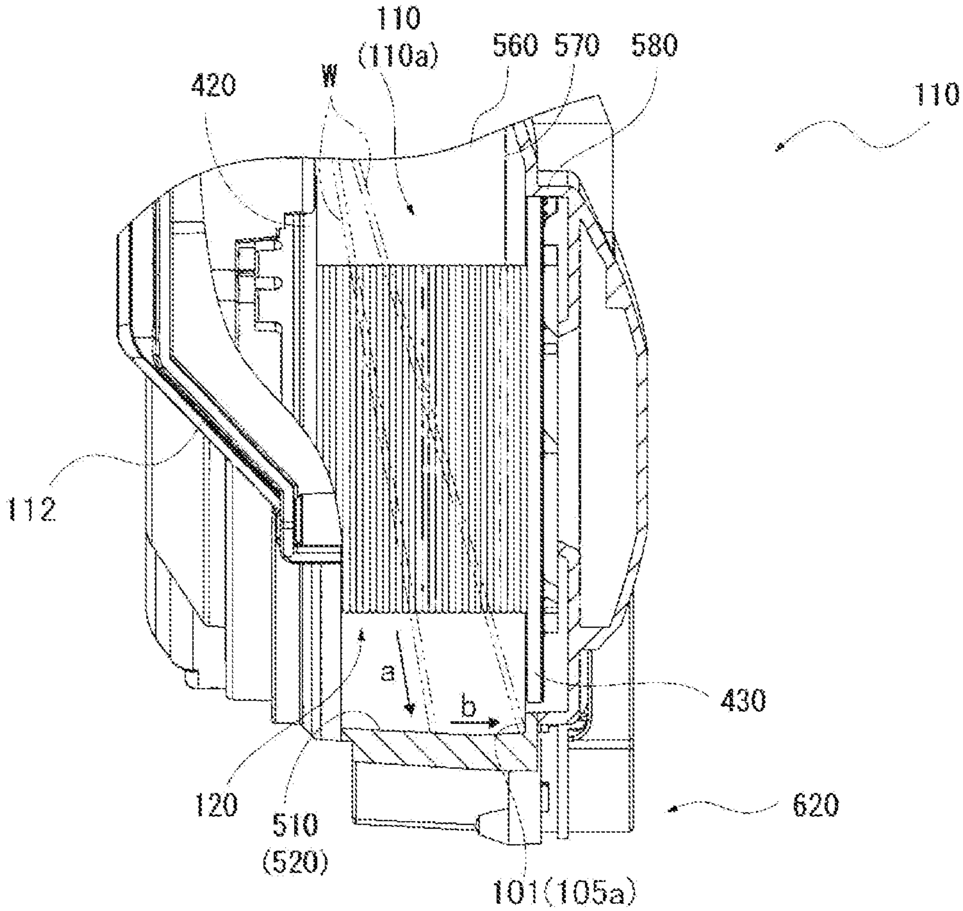

Alternatively, as another embodiment, as illustrated in FIG. 92, the wire movement restriction unit 101 may be provided on the inner wall 510 (particularly, the peripheral wall 520) on the side of the case 560.

Here, the wire movement restriction unit 101 of the case 560 is formed as a protrusion 105*a* similar to the above. The wire movement restriction unit 101 of the case 560 is assumed to have a shape and a height difference such that the wire W loosened inside the housing unit 110 is surely caught in the lateral direction, like the wire movement restriction unit 101 (the protrusion 105) provided in the cover 580 of FIG. 91. The protrusion 105*a* is provided at a position on the outer peripheral side of the flange portion 430 positioned on the front side with respect to the housing unit 110, or a position slightly slighter than the position on the back side of the housing unit 110. When the lateral movement direction of the wire W is reversed, the position on the outer circumferential side of the flange portion 420 positioned on the back side with respect to the housing unit 110 can be provided on the slightly front position of the housing unit 110.

In FIG. 92, the wire movement restriction unit 101 (the protrusion 105*a*) is located closer to the inner side of the housing unit 110 (the left side in the drawing) than the mating portion between the cover 580 and the case 560 constituting the inner wall 510 of the housing unit 110, respectively. Further, the edge portion of the cover 580 is brought into contact with the outer side surface (the side surface on the right side in the drawing) of the wire movement restriction unit 101 (the protrusion 105*a*).

Further, in addition to the mating portion between the case 560 and the cover 580, a configuration similar to each of the wire movement restriction units 101 (the protrusions 105, 105*a*) may be provided as appropriate so that troubles do not occur due to entry of the wire W between the case 560 and the reel 120, or between the cover 580 and the reel 120.

(8) When the reel 120 is housed, the wire movement restriction unit 101 extends from the inner wall 510 on the side of the case 560 or on the cover 580 side to the flange portion 430 on the side closer to the opening 570 out of the pair of flange portions 420 and 430 may be formed with a upright wall protruding toward the flange portion 430.

(9) Further, as illustrated in FIG. 93A (also referring to FIGS. 93B and 93C), in a part of the mating portion between the case 560 and the cover 580, the oblique portions 111 and 112 may be formed in a direction crossing the wire W slackened inside the housing unit 110. In FIGS. 93B and 93C, (a) is attached to the oblique portions 111 and 112 on the side of the case 560 (i.e., 111 (*a*), 112 (*a*)), and (b) is attached to the oblique portion 111 on the side of the cover 580 (i.e., 111 (*b*), 112 (*b*)) so as to be distinguishable.

Here, the mating portion between the case 560 and the cover 580 is the position of (the edge of) the opening 570 of the case 560. In this case, the opening 570 (mating portion) is basically set at the position of the flange portion 430 of the reel 120 positioned on the front side with respect to the housing unit 110 or in the vicinity thereof.

Further, at least one (oblique portion 111 in this case) of the oblique portions 111 and 112 is inserted between the case 560 and the cover 580 or between the case 560 and the cover 580 to prevent the wire W from flying out to the outside (entrance prevention unit or fly-out prevention unit).

The oblique portions 111 and 112 are inclined with respect to the circumferential direction and the axial direction of the reel 120. The oblique portions 111 and 112 (in particular, the oblique portion 111) are not particularly inclined with respect to the thickness direction of the case 560, and are not designed to change the thickness of the case 560. The inclination angle of the oblique portions 111 and 112 is set to be approximately 30? to 60?, preferably 45?, or the like with respect to the axial direction of the reel 120.

(10) At this time, at least one of the oblique portions 111 and 112 preferably has an inclination toward the back side of the housing unit 110 as it moves away from the wire feeding unit 160, provided for a portion 131 at which the slackened wire W comes into contact with the inner wall of the housing unit 110 or a vicinity thereof.

In this case, the oblique portion 111 positioned on the lower side of FIG. 93A is inclined downwardly and gradually toward the back side (the side opposite to the opening 570) of the case 560. As a result, at least below the oblique portion 111, the mating portion between the case 560 and the cover 580 is partially displaced to the back side of the housing unit 110 than the position of the inner surface of the flange portion 430 of the reel 120 positioned on the front side of the housing unit 110, and the position of the wire movement restriction unit 101. Then, the lower oblique portion 111 is provided for a portion 131 (refer to FIG. 82) where the slackened wire W is most strongly in contact with the inner wall 510 of the housing unit 110 or in the vicinity thereof. More specifically, as illustrated in FIG. 93B, the lower oblique portion 111 is provided at a position between the hinge portion 610 and the lock device 620 on the lower side of the case 560 and on the rear side.

The oblique portion 111 can be provided in combination with the wire movement restriction unit 101 (the protrusions 105, 105*a*). In addition, the oblique portion 112 is appropriately provided for adjusting the shape of the mating portion between the case 560 and the cover 580.

(11) As illustrated in FIG. 93A (see also FIG. 90), the case 560 may have a pressing mechanism 121 that elastically presses and holds the cover 580 toward the case 560.

Here, the pressing mechanism 121 includes means for preventing the wire W from entering between the case 560 and the cover 580 and preventing the wire W from flying out of between the case 560 and the cover 580 to the outside (means for preventing entrance or fly-out prevention unit). The pressing mechanism 121 may be provided on the hinge portion 610 or the like, but in this case, it is provided integrally with the lock device 620.

As illustrated in FIG. 90, the lock device 620 includes a lock lever 122 for pressing the cover 580 from the outside, a rotary shaft 124 attached to the end portion of the lock lever 122 with a pin 123 or the like, and a shaft hole 125 which houses and supports the rotary shaft 124 to be movable and rotatable in the axial direction of the reel 120. When incorporating the pressing mechanism 121 in the lock device 620, the urging unit 126 for urging the lock lever 122 toward the cover 580 is further provided.

The lock lever 122 extends along the surface of the cover 580. The cover 580 is provided with a pressing portion 580*b* (see FIG. 94B) pressed by the lock lever 122. The rotary shaft 124 and the shaft hole 125 extend in the axial direction of the reel 120. The shaft hole 125 is a stepped hole provided in the peripheral portion of the case 560, and the side of the cover 580 is a small-diameter portion having substantially the same diameter as the rotary shaft 124, and is a large-diameter portion in which the side opposite to the cover 580 is larger than the rotary shaft 124. The lock lever 122 is attached so as to be rotatable around the rotary shaft 124 with respect to the end portion of the rotary shaft 124 inserted into the shaft hole 125 and protruding toward the cover 580 side.

The urging unit 126 is a coil spring inserted between the rotary shaft 124 and the large-diameter portion of the shaft hole 125. The coil spring is interposed between the stepped portion between the small-diameter portion and the large-diameter portion of the shaft hole 125 or the rib 127 formed at the stepped portion and the flange 128 formed at the end portion of the rotary shaft 124 (on the opposite side to the lock lever 122) in a compressed state (compression spring).

The pressing mechanism 121 can be provided in combination with the oblique portion 111 and the wire movement restriction unit 101 (the protrusions 105 and 105*a*) as appropriate.

(12) The pressing mechanism 121 presses and holds the portion 131 corresponding to the inner wall 510 where the slackened wire W comes into contact with in the housing unit 110 or the vicinity thereof in the cover 580.

Here, the portion 131 where the slackened wire W (the strongest) comes into contact with the inner wall 510 of the housing unit 110 is a peripheral portion of the reel housing unit 110*a* positioned on the lower side of the housing unit 110. Since the reel housing unit 110*a* is located on the lower side of the reinforcing bar binding machine 1B, the slackened wire W easily faces due to its own weight, and also the wire W pulled back by the wire feeding unit 160 is located there. Therefore, the portion 131 where the slackened wire W comes into contact with (the strongest) with the inner wall 510 of the housing unit 110 is located in the vicinity of the peripheral wall 520 (a portion below the lower half portion) in the reel housing unit 110*a*, in particular, the bottom portion of the peripheral wall 520 or the like. In this case, the pressing mechanism 121 presses and holds the position of the lowermost part of the cover 580 or the periphery thereof.

(13) As illustrated in FIGS. 94B to 94E (mainly referring to FIG. 94E), as a stop position restricting unit for preventing the lock lever 122 from stopping at the intermediate position between the lock position and the release position, the stop preventing portion 141 and 142 are provided.

Here, guide surfaces 143 and 144 for guiding the rotation of the lock lever 122 are provided between the case 560 and the base portion of the lock lever 122, respectively. In the guide surfaces 143 and 144, mountain-like protrusions 145 and 146 are formed so as to get over each other at a position which is a boundary between the lock position and the release position. The mountain-like protrusions 145 and 146 clearly divide the lock position and the release position and prevent the lock lever 122 from being inadvertently displaced between the lock position and the release position. The guide surfaces 143 and 144 and the protrusions 145 and 146 constitute a guide unit of the lock lever 122. Unstable shaped portions 147 are provided as stop preventing portions 141 and 142 on top portions of the protrusions 145 and 146.

Here, the guide surfaces 143 and 144 are formed in a flat circular shape or a ring shape having a surface perpendicular to the rotary shaft 124 of the lock lever 122. One or a plurality of mountain-like protrusions 145 and 146 are provided with respect to the guide surfaces 143 and 144 in a circumferential direction at a required interval. In this case, four places are provided in the circumferential direction.

Further, as illustrated in FIG. 94F, the top portions (stop preventing portions 141 and 142) of the protrusions 145 and 146 can be flat portions parallel to the guide surfaces 143 and 144. However, since the flat portions have a stable shape, if the apexes of the protrusions 145 and 146 are made long flat portions, the lock lever 122 may be stably stopped at the positions of the tops of the protrusions 145 and 146. In this way, when the lock lever 122 stops at the position of the top portion of the protrusions 145 and 146, the lock lever 122 floats from the case 560, so that the cover 580 is slightly opened with respect to the case 560 to form a gap, and there is a possibility that the wire W is blown out of the gap.

Therefore, an unstable shape portion 147 is provided as the stop prevention portions 141 and 142 at the tops of the protrusions 145 and 146. For example, the unstable shape portion 147 may be provided so that the tops of the protrusions 145 and 146 are rounded portions, the tops of the protrusions 145 and 146 are pointed tip portions, tops of the protrusions 145 and 146 are short flat portions or the tops of the protrusions 145 and 146 are inclined portions (the inclination is less inclined than those of the protrusions 145 and 146) or the like.

Further, in place of the unstable shape portion 147 at the top of the protrusions 145 and 146, or in addition to the unstable shape portion 147, between the tip portion of the lock lever 122 and the pressing portion 580*b* of the cover 580, the lock lever 122 can provide another stop prevention portion capable of stopping at an intermediate position between the locking position and the releasing position. Another stop preventing portion between the tip portion of the lock lever 122 and the pressing portion 580*b* of the cover 580 may be, for example, a pointed peak portion or the like.

Operation

The operation of this embodiment will be described below.

As illustrated in FIGS. 82 and 84, the reinforcing bar binding machine 1B mounts the reel 120 on which the wire W is wound in the housing unit 110 and rotates the reel 120 clockwise from the position of the lower front portion of the reel 120. The wire W is in a usable state by being pulled upward and passing through the wire feeding unit 160, the first guide unit 50 of the curl guide unit 5A, and the like.

In order to mount the reel 120 to the housing unit 110, first, the lock device 620 is released, the cover 580 is opened with respect to the case 560, the reel 120 is mounted in the case 560, and the cover 580 is closed to the case 560 after mounting the reel 120, and the cover 580 is locked by the lock device 620. Therefore, the reel 120 around which the wire W is wound and the wire W pulled out from the reel 120 are housed and protected with respect to the case 560.

Further, the power switch of the main body 10B is turned on, the lock switch 800 is released, the reinforcing bar S is brought into contact with the abutting portion 250 of (the binding unit 150 of) the main body 10B, and the trigger 12B is pulled. Thus, the binding machine 1B is operated and the reinforcing bars S are bound.

At this time, when the trigger 12B is pulled, first, as illustrated in FIG. 95, the wire W is fed by the feed gear 170 of the wire feeding unit 160 by a specified amount toward the upper first guide unit 50, the wire W is curled so as to be directed forward and downward by the first guide unit 50 (the curl groove). The tip of the curled wire W turns in the counterclockwise direction and jumps into the second guide unit 51 and is guided by the second guide unit 51 to pass through the inside of the grip portion 70 of the twist portion 350 and the periphery of the reinforcing bar S, and strikes against the base portion of the first guide unit 50 by the loop Ru enclosing the periphery of the reinforcing bar S (wire feeding process).

Next, the twisted portion 350 is operated, and the position of the tip of the wire W in which the parallel guide 330 at the base portion of the first guide unit 50 becomes the loop Ru is restricted via the interlocking mechanism 330*a* (see FIG. 87) or the like, and the tip portion of the wire W is held by the grip portion 70 (wire gripping process).

Further, as illustrated in FIG. 96, the feed gear 170 of the wire feeding unit 160 reversely rotates to pull back the wire W downward by a predetermined amount (wire returning process). By pulling back the wire W, it is possible to minimize the amount of the wire W used for one binding and to increase the number of times of binding. In addition, the winding shape of the wire W that binds the reinforcing bar S is small and is in a well-formed state. However, when the wire W is pulled back, slackness of the wire W may occur inside the housing unit 110. In addition, the slackness of the wire W may be caused, for example, when the reel 120 excessively rotates due to rotational inertia at the time of drawing out the wire W, or the case where the reel 120 is excessively rotated little by little due to the vibration occurring in the reinforcing bar binding machine 1B or the like.

Subsequently, as illustrated in FIG. 97, the cutting unit 340Z is operated to cut the wire W (wire cutting process).

Thereafter, as illustrated in FIG. 98, the gripping portion 70 of the twisted portion 350 is twisted to twist the wire W, and the gripping portion 70 advances so as to reduce the loop Ru and to set the twisted portion of the wire W to the reinforcing bar S, and bundling is performed by tightening (wire twisting process).

Finally, as illustrated in FIG. 99, the gripping portion 70 is withdrawn from the reinforcing bar S and the binding is terminated by releasing the twisted portion of the wire W (wire releasing process).

Effect

According to this embodiment, the following effects can be obtained.

Effect 1

The wire W slackened inside the housing unit 110 bulges so as to spread to the outside of the reel 120 inside the housing unit 110 and comes into contact with the inner wall 510 of the housing unit 110 (arrow a). Further, when the wire W bulges, the wire W comes into close contact with the inner wall 510 of the housing unit 110. When the wire W is further slackened from this state, the wire W seeks a further escape place (as illustrated by arrow b in FIG. 91) and moves laterally in the axial direction of the reel 120 along the inner wall 510 of (the reel housing unit 110*a* of) the housing unit 110 (while bulging).

As a result, for example, as illustrated in FIGS. 100 and 101, when no countermeasures are taken, the wire W is moved by the lateral movement (arrow b) so that the wire W is inserted between (the inner wall 510 of) the housing unit 110 and (the flange portion 430 on the near side) of the reel 120, and the wire W entered between the housing unit 110 and the reel 120 further passes between the housing unit 110 and the reel 120, and finally may fly out from the housing unit 110 to the outside.

Therefore, as illustrated in FIG. 91, the wire movement restriction unit 101 is provided on the inner wall 510 of the housing unit 110 so that the lateral movement of the wire W is restricted by the wire movement restriction unit 101. This makes it possible to reliably prevent a fault due to the lateral movement of the wire W (for example, entry of the wire W between the housing unit 110 and the reel 120, flying out of the wire W to the outside, etc.). That is, the wire movement restriction unit 101 can effectively cope with a fault caused by slackness of the wire W in the housing unit 110.

Effect 2

At this time, the wire movement restriction unit 101 is used as the protrusion 105 so that the lateral movement of the wire W is stopped at the position of the protrusion 105 set in advance. This makes it possible to reliably restrict the lateral movement of the wire W to a predetermined position with a simple configuration. In addition, since the configuration of the protrusion 105 is simple, it is easy to provide the protrusion 105 with respect to a position that is optimal for restricting the lateral movement of the wire W, which is convenient for providing the wire movement restriction unit 101.

Effect 3

The wire movement restriction unit 101 is provided on the inner wall 510 located on the side opposite to the wire feeding unit 160 via the reel 120. This makes it possible to effectively provide the wire movement restriction unit 101 with respect to the position where slackness easily occurs in the wire W on the side opposite to the wire feeding unit 160.

Effect 4

The housing unit 110 can house the reel 120 having the hub portion 410 serving as the winding core of the wire W and the pair of flange portions 420 and 430 provided on both end sides of the hub portion 410. The inner wall 510 has a peripheral wall 520 facing the hub portion 410 when the reel 120 is housed. The wire movement restriction unit 101 is protruded from the wall surface at the end portion of the peripheral wall 520 or in the vicinity thereof toward the reel 120. Accordingly, the lateral movement of the wire W slackened from the reel 120 can be restricted at the end portion of the peripheral wall 520 or the vicinity thereof by the wire movement restriction unit 101 provided to project toward the reel 120.

Effect 5

The wire movement restriction unit 101 protrudes from the wall surface at the end portion of the peripheral wall 520 or the vicinity thereof toward the flange portions 420 and 430. Accordingly, the lateral movement of the wire W slackened from the reel 120 can be restricted at the position just before the flange portions 420 and 430 by the wire movement restriction unit 101 provided to protrude toward the flange portions 420 and 430.

Effect 6

The wire movement restriction unit 101 is an upright wall extending from the wall surface of the peripheral wall 520 and having a length that does not reach the flange portions 420 and 430. Thus, it is possible to prevent the upright wall from interfering with the flange portions 420 and 430, while setting the upright wall to a height at which the wire W reliably catches. Further, by using the wire movement restriction unit 101 as an upright wall, it is possible to effectively control the lateral movement of the wire W. In particular, by setting the upright wall to extend in the circumferential direction of the reel 120, it is possible to receive the lateral movement of the wire W in a wide range in the circumferential direction.

Effect 7

The housing unit 110 is provided with a case 560 and a cover 580. Therefore, by mounting the reel 120 on the case 560 and closing the cover 580, the reel 120 can be reliably housed and held in the housing unit 110, while protecting the wire W from being exposed to the outside.

When the housing unit 110 is constituted by the case 560 and the cover 580, between the cover 580 and the reel 120 (see FIGS. 101 and 102), or between the case 560 and the cover 580 (see FIG. 102), there is a possibility that the wire W may fly out from between the case 560 and the cover 580.

FIGS. 100 and 101 illustrates an example in which, since there is no wire movement restriction unit 101, the wire W laterally moves without stopping until the wire W reaches the mating portion between the case 560 and the cover 580.

Further, in FIG. 102, since there is no wire movement restriction unit 101 for preventing the wire W from entering the mating portion between the case 560 and the cover 580, the wire W is stopped until the wire W reaches the mating portion between the case 560 and the cover 580, the wire W is stopped at the position of the mating portion between the case 560 and the cover 580 by the protrusion 580*a* provided on the edge portion of the cover 580, and thus, the wire W easily enters the mating portion between the case 560 and the cover 580.

However, as illustrated in FIG. 91, even in the case where the housing unit 110 has the case 560 and the cover 580, it is possible to set the inner wall 510 of the housing unit 110 at an appropriate position (for example, the position on the side of the cover 580). On the other hand, if the wire movement restriction unit 101 (the protrusion 105) is provided in advance so as to function properly, it is possible to prevent the wire W from entering each portion and the wire W from flying out.

Further, as illustrated in FIG. 92, the wire movement restriction unit 101 such as the protrusion 105*a* may be provided on the inner wall 510 on the side of the case 560. As a result, the lateral movement of the wire W slackened inside the housing unit 110 is restricted by the position of the wire movement restriction unit 101 in the case 560. Thus, it is possible to prevent a situation in which the slackened wire W transfers from the case 560 to the cover 580, and the case 560 enters the mating portion between the case 560 and the cover 580. As a result, it is possible to limit the component provided with the wire movement restriction unit 101 to only the case 560, simplify the structure of the housing unit 110, facilitate the manufacturing of the housing unit 110, and the like.

Furthermore, by providing the wire movement restriction unit 101 on the inner wall 510 on the side of the case 560 so as to restrict the lateral movement of the wire W at the position of the wire movement restriction unit 101 of the case 560, the loose wire W does not reach the mating portion between the case 560 and the cover 580. Therefore, the wire W widens and enters (interposes) the mating portion between the case 560 and the cover 580, and the wire W that has entered the mating portion flies out from the mating portion, or the wire W comes into contact with the case 560 and the reel 120 so as not to enter between the case 560 and the cover 580. As a result, for example, it is possible to prevent malfunction (or poor binding) of the reinforcing bar binding machine 1B due to pinching of the wire W, buckling of the wire W, and the like can.

Effect 8

When the reel 120 is housed, the wire movement restriction unit 101 is formed of an upright wall provided to protrude from the inner wall 510 on the side of the case 560 or the cover 580 to the opening 570 of the pair of flange portions 420 and 430 toward the flange portion 430. This makes it possible to prevent entry of the wire W between the flange portion 430 on the side close to the opening 570 and the inner wall 510 on the side of the case 560 or the cover 580 side.

Effect 9

As illustrated in FIG. 93A (to FIG. 93C), oblique portions 111 and 112 are provided at the mating portion between the case 560 and the cover 580 (in particular, the oblique portion 111). As a result, a part of the mating portion between the case 560 and the cover 580 is displaced in the axial direction of the reel 120 by the oblique portions 111 and 112, so that all of the mating portions of the case 560 and the cover 580 are not present in the same plane perpendicular to the axial direction of the reel 120. As a result, for example, a part of the mating portion (for example, the lower part of the mating part or the like) is shifted to the back side of the housing unit 110, and the mating portion between the case 560 and the cover 580 can be made away from the wire movement regulating unit 101 (105, 105*a*). Therefore, it is possible to provide a structure in which it is difficult for the wire W to enter the mating portion between the case 560 and the cover 580, or to fly out from the mating portion between the case 560 and the cover 580.

Further, for example, as illustrated in FIG. 103, in the case where a small stepped portion 710 or the like is generated due to dimensional accuracy in the mating portion between the case 560 and the cover 580, when the oblique portion 111 is not provided, there is no part that triggers the transversely moved wire W to get over the small stepped portion 710. Therefore, for example, the wire W is caught by the small stepped portion 710 of the mating portion between the case 560 and the cover 580, and the wire W caught by the small stepped portion 710 widens the gap between the mating portions, and the wire W that has entered the gap may fly out from the mating portion.

However, as illustrated in FIG. 93A, by providing the oblique portion 111 extending in the direction intersecting with the wire W slackened inside the housing unit 110, in the case as described above, even if the wire W is temporarily caught by the small stepped portion 710 of the mating portion between the case 560 and the cover 580, since the oblique portion 111 functions as a starting point for moving the wire W, the wire W gets over the small stepped portion 710 from the position of the oblique portion 111, so that it can laterally move to the wire movement restriction unit 101. Therefore, the wire W is caught by the small stepped portion 710 of the mating portion between the case 560 and the cover 580, or the wire W caught by the small stepped portion 710 widens the gap of the mating portion, it is possible to prevent such a fault that the wire W flies out from the mating portion to the outside.

In the above description, if the lock device 620 and the pressing mechanism 121 are provided, the wire W is inserted between the case 560 and the cover 580 (the cover 580) for a short time from when the wire W is caught by the small stepped portion 710 to when it gets over the oblique portion 111, the lock device 620 and the pressing mechanism 121 prevent the lock device 620 and the pressing mechanism 121 from entering the mating portion, and thus, a synergistic effect can be obtained.

Effect 10

At this time, at least one of the oblique portions 111 and 112 may be provided to partially displaceable the mating portion to the back side of the part 110 with respect to the portion 131 in which the slackened wire W comes into contact with the inner wall of the housing unit 110 or the vicinity thereof. At least one of the oblique portions 111 and 112 may have an inclination toward the inner side of the housing unit 110 as the distance from the wire feeding unit 160 increases. By making at least one of the oblique portions 111 and 112 as described above, it is possible to prevent the wire W from entering the mating portion between the case 560 and the cover 580 or the wire W from flying out of from the mating portion between the case 560 and the cover 580.

Effect 11

As illustrated in FIG. 94A (FIG. 90), a pressing mechanism 121 is provided so that the cover 580 is elastically pressed and held toward the case 560. In this manner, by constantly keeping the cover 580 elastically contacted to the case 560 with a required force, the play is suppressed between the cover 580 and the case 560, and it is possible to press so that the gap between the cover 580 and the case 560 does not spread by the force exerted from the slackened wire W. As a result, it is possible to effectively prevent the slackened wire W from entering the gap between the cover 580 and the case 560 or flying out of the gap to the outside.

Moreover, even in the case where the small stepped portion 710 is present in the mating portion between the case 560 and the cover 580, the pressing mechanism 121 can prevent the slackened wire W from entering the gap between the cover 580 and the case 560, and it is effective to prevent it from flying out of the gap to the outside.

Furthermore, by providing the pushing mechanism 121 in the lock device 620, it is possible to integrate them and install the pushing mechanism 121 without difficulty between the cover 580 and the case 560. It is structurally possible to provide the pressing mechanism 121 to the hinge portion 610 or the like.

Effect 12

Further, the pressing mechanism 121 is provided in a portion 131 of the cover 580 where the wire W slackened inside the housing unit 110 comes into contact with the inner wall 510 or in the vicinity thereof. This makes it possible to effectively dispose the pressing mechanism 121 with respect to a position where the gap between the cover 580 and the case 560 is most likely to be opened, and it is possible to reliably and efficiently press the gap between the cover 580 and the case 560 so as not to be widened by the pressing mechanism 121.

Effect 13

In order to prevent the lock lever 122 from stopping at the intermediate position between the lock position and the release position, the stop prevention units 141 and 142 are provided. As a result, since the lock lever 122 stops at the intermediate position between the locked position and the released position, for example, it is possible to reliably prevent a fault in which the cover 580 slightly opens to the case 560 to form a gap, and the wire W comes out of the gap from the gap.

For example, in the unstable shape part 147, the tops of the protrusions 145 and 146 are formed as rounded parts, the tops of the protrusions 145 and 146 are formed as pointed tip parts, or the tops of the protrusions 145 and 146 are formed as short flat portions, or the tops of the protrusions 145 and 146 are formed as the inclined portions (the inclination is less than that of the protrusions 145 and 146). Thus, the lock lever 122 can be securely positioned at either the locked position or the released position.

Further, instead of the unstable shape portion 147 at the top of the protrusions 145 and 146, or in addition to the unstable shape portion 147, between the tip portion of the lock lever 122 and the pressing portion 580*b* of the cover 580, another stopping prevention unit capable of preventing the lock lever 122 from stopping at the intermediate position between the locking position and the releasing position may be provided. Another stop preventing portion between the tip portion of the lock lever 122 and the pressing portion 580*b* of the cover 580 is, for example, a pointed peak portion or the like. Thus, the lock lever 122 can be securely moved between the locked position and the released position.

Although the embodiment of the present invention has been described in detail with reference to the drawings, the embodiment is merely an example of the present invention. Therefore, the present invention is not limited only to the configuration of the embodiment, and it goes without saying that changes in design etc. without departing from the gist of the present invention are included in the present invention. In addition, for example, when a plurality of configurations is included in each embodiment, it goes without saying that a possible combination of these configurations is included even if not specifically described. Further, in the case where a plurality of embodiments and modifications are disclosed as embodiments of the present invention in the embodiment, even if not described, possible ones among combinations of configurations spanning these are included. In addition, the constitution depicted in the drawings is naturally included even if not particularly mentioned. Furthermore, when there is the term "etc.", it is used in the sense that it includes equivalent ones. In addition, when there are terms such as "almost", "about", "degree", etc., they are used in the sense that they include ranges and precision that are accepted in common sense.

Some or all of the above embodiments can be described as follows.

Additional Note 1

A binding machine comprising:
a housing that is capable of drawing out a wire;
a wire feeding unit that feeds the wire drawn out of the housing,
a curl guide that curls the wire fed by the wire feeding unit and winds around a binding object; and
a binding unit that grips and twists the wire wound around the binding object by the curl guide,
wherein the binding unit includes:
a first movable gripping member and a second movable gripping member that are rotatably supported on an axis extending in a first direction on the other end side such that one end side is movable in a direction toward and away from each other; and
a moving member that extends in the first direction and that is movable in a second direction orthogonal to the first direction,
wherein each of the first movable gripping member and the second movable gripping member has a fitting portion such that the moving member is fitted to the fitting portion and the fitted moving member is movable in the second direction.

Additional Note 2

The binding machine according to (1), wherein the fitting portion is formed so as to extend along a longitudinal direction of the first movable gripping member and the second movable gripping member.

Additional Note 3

The binding machine according to (2), wherein the fitting portion is formed so as to extend along the longitudinal direction of the first movable gripping member and the second movable gripping member, to bend outward between end portions of the fitting portion, and to extend again along the longitudinal direction.

Additional Note 4

The binding machine according to any one of (1) to (3), wherein the fitting portion is a groove.

Additional Note 5

The binding machine according to any one of (1) to (3), wherein the fitting portion is a hole penetrating through the first movable gripping member and the second movable gripping member.

Additional Note 6

The binding machine according to any one of (1) to (5), wherein the binding unit includes a fixed gripping member extending in the second direction, and the first movable gripping member and the second movable gripping member are provided on both sides of the fixed gripping member via the fixed gripping member, one end side of the first movable gripping member is configured to be movable in a direction toward and away from the fixed gripping portion by rotation, and one end side of the second movable gripping member is configured to be movable in a direction toward and away from the fixed gripping portion by rotation.

Additional Note 7

The binding machine according to (6), wherein the fixed gripping member has a fitting portion which is movable in the second direction by fitting the moving member fitted to the fitting portion of the first movable gripping member and the fitting portion of the second movable gripping member.

Additional Note 8

The binding machine according to (7), wherein the fitting portion of the fixed gripping member is a groove extending in the second direction.

Additional Note 9

The binding machine according to (7), wherein the fitting portion of the fixed gripping member is a hole which passes through the fixed gripping portion and which extends in the second direction.

Additional Note 10

The binding machine according to any one of (6) to (9), wherein the shaft is provided on the fixed gripping member.

Additional Note 11

A binding machine comprising:

a housing that is capable of drawing out a wire;

a wire feeding unit that feeds the wire drawn out of the housing;

a curl guide that curls the wire fed by the wire feeding unit and winds around a binding object; and a binding unit that grips and twists the wire wound around the binding object at the curl guide unit, wherein the binding unit includes:

a first movable gripping member and a second movable gripping member that are rotatably supported on an axis extending in a first direction on the other end side such that one end side is movable in a direction toward and away from each other; and a movable member that is movable in a second direction orthogonal to the first direction, wherein the first movable gripping member and the second movable gripping member has an opening and closing shaft portion which extends in the first direction, the movable member has a fitting portion into which the opening and closing shaft portion is fitted, and the fitting portion is configured such that the movable member is movable in the second direction in a state in which the opening and closing shaft portion is fitted in to the fitting portion.

Additional Note 12

A binding machine comprising:

a housing that is capable of drawing out a wire;

a wire feeding unit that feeds the wire drawn out of the housing;

a curl guide that curls the wire fed by the wire feeding unit and winds around a binding object; and a binding unit that grips and twists the wire wound around the binding object at the curl guide, wherein the binding unit includes:

a fixed gripping member;

a movable gripping member that is rotatably supported by the fixed gripping member with an axis extending in a first direction at the other end side so as to be movable in a direction in which one end side approaches the fixed gripping member and in a direction away from the fixed gripping member, and a moving member that extends in the first direction and that is movable in a second direction orthogonal to the first direction, wherein the movable gripping member has a fitting portion to which the moving member is fitted and the fitted moving member is movable in the second direction.

Although the content described in the Additional Note expresses a part or the whole of the above embodiment, supplementary explanation will be given below with reference to the appendix. FIG. 104 is a diagram illustrating an example of a binding unit described in Additional Note 1, and FIG. 105 is a diagram illustrating an example of a binding unit having a fitting unit described in Additional Note 5. The binding unit 7B includes a first movable gripping member 70L1 and a second movable gripping member 70R1 as a pair of gripping members. The first movable gripping member 70L1 and the second movable gripping member 70R1 are rotatable (rotatable) with respect to the shaft 773 as a fulcrum.

When the direction in which the shaft 773 which is the axial direction of the shaft 773 extends is the first direction and the direction orthogonal to the first direction is the second direction, the first movable gripping member 70L1 and the second movable gripping member 70R1 extends along the second direction. The first direction is indicated by an arrow P1, and the second direction is indicated by an arrow P2.

The first movable gripping member 70L1 and the second movable gripping member 70R1 are arranged so that one end side in the longitudinal direction along the second direction can move in directions away from each other (also referred to as approaching and separation), a shaft 773 extending in the first direction, and the other end sides thereof are rotatably supported by the base member 772. The shaft 773 is a columnar member and protrudes in the first direction from the base member 772.

The binding unit 7B includes an opening and closing pin 71*a*1 (a moving member) that extends in the first direction and is movable in the second direction. The opening and closing pin 71*al* is attached to the above-mentioned bending portion (bending portion) 71. The bending portion 71 extends in the second direction and forms a space into which a part of the first movable gripping member 70L1 and the second movable gripping member 70R1 enter inside such as a substantially cylindrical shape, a rectangular cylindrical shape. The opening and closing pin 71*a*1 protrudes in the first direction toward the space inside the bending portion 71.

The first movable gripping member 70L1 has an opening and closing guide hole (fitting portion) 77L1 to which the opening and closing pin 71*a*1 is fitted. The opening and closing guide hole 77L1 extends along the longitudinal direction of the first movable gripping member 70L1 as described in Additional Note 2. In addition, the opening and closing guide hole 77L1 is a hole that passes through the first movable holding member 70L1 as described in Additional Note 5.

The second movable gripping member 70R1 includes an opening and closing guide hole (fitting portion) 77R1 to which the opening and closing pin 71*a*1 is fitted. The opening and closing guide hole 77R1 extends along the longitudinal direction of the second movable gripping member 70R1 as described in Additional Note 2. In addition, the opening and closing guide hole 77R1 is a hole that passes through the second movable holding member 70R1 as described in Additional Note 5. As described in Additional Note 3, the configuration in which a part of the fitting portion provided on the first movable gripping member 70L1 and the second movable gripping member 70R1 bends outward is described in FIG. 10 and the like, as described above.

The opening and closing pin 71*a*1 passes through the opening and closing guide hole 77L1, passes through the first movable holding member 70L1, passes through the opening and closing guide hole 77R1, and passes through the second movable holding member 70R1.

When the bending portion 71 moves in the second direction, the opening and closing pin 71*a*1 moves in the second direction along the opening and closing guide hole 77L1. Further, the opening and closing pin 71*a*1 moves in the second direction along the opening and closing guide hole 77L1.

When the bending portion 71 moves in the direction of the arrow P2*f* which is one direction along the second direction, the first movable gripping member 70L1 and the second movable gripping member 70R1 move the shaft 773 about the fulcrum. When the bending portion 71 moves in the direction of the arrow P2*r* which is the other direction along the second direction, the first movable gripping member 70L1 and the second movable gripping member 70R1 move the shaft 773 toward the fulcrum.

FIG. 106 is a diagram illustrating an example of a binding unit having a fitting portion described in Additional Note 4. The binding unit 7B includes a first movable gripping member 70L2 and a second movable gripping member 70R2 as a pair of gripping members. FIG. 104 illustrates a structure in which the first movable gripping member 70L2 and the second movable gripping member 70R2 are rotatably supported (rotatable) with the shaft 773 as a fulcrum.

The first movable gripping member 70L2 has an opening and closing guide groove (fitting portion) 77L2 to which the first opening and closing pin 710*a*1 is fitted. The opening and closing guide groove 77L2 extends along the longitudinal direction of the first movable holding member 70L2. Further, as described in Additional Note 4, the opening and closing guide groove 77L2 is a groove through which the first movable gripping member 70L2 does not penetrate.

The second movable gripping member 70R2 includes an opening and closing guide groove (fitting portion) 77R2 to which the second opening and closing pin 710*a*2 is fitted. The opening and closing guide groove 77R2 extends along the longitudinal direction of the second movable holding member 70R2. In addition, the opening and closing guide hole 77R2 is a groove through which the second movable holding member 70R2 does not pass as described in Additional Note 4.

In the bending portion 71, the first opening and closing pin 710*a*1 and the second opening and closing pin 710*a*2 are coaxially provided. The first opening and closing pin 710*a*1 and the second opening and closing pin 710*a*2 protrude in the first direction toward the space inside the bending portion 71 and extend in the first direction, respectively.

When the bending portion 71 moves in the second direction, the first opening and closing pin 710*a*1 moves in the second direction along the opening and closing guide groove 77L2. Further, the second opening and closing pin 710*a*2 moves in the second direction along the opening and closing guide groove 77R2.

FIGS. 107 and 108 are diagrams illustrating an example of the binding unit described in Additional Note 11. The binding unit 7C includes a fixed gripping member 70C3, a first movable gripping member 70L3, and a second movable gripping member 70R3.

The first movable gripping member 70L3 and the second movable gripping member 70R3 are arranged in the lateral direction via the fixed gripping member 70C3. The first movable gripping member 70L3 is rotatable (rotatable) with respect to the fixed gripping member 70C3 with the shaft 773*a* as a fulcrum. The second movable gripping member 70R3 is rotatable (rotatable) with respect to the fixed gripping member 70C3 with the shaft 773*a* as a fulcrum.

When the direction in which the shaft 773*a* which is the axial direction of the shaft 773*a* extends is the first direction and the direction orthogonal to the first direction is the second direction, the fixed gripping member 70C3 and the first movable gripping member 70L3 and the second movable gripping member 70R3 extend along the second direction.

The first movable gripping member 70L3 is movable in such a manner that one end in the longitudinal direction along the second direction can move in a direction away from (towards and away from) one end side of the fixed gripping member 70C3. The shaft 773*a* extending in the first direction and the other end side rotatably supported by the fixed gripping member 70C3. The second movable gripping member 70R3 has an shaft 773*a* extending in the first direction such that one end side of the second movable gripping member 70R3 in the second direction in the longitudinal direction can move in a direction away from the one end side of the fixed gripping member 70C, and the other end side is rotatably supported by the fixed gripping member 70C3. The shaft 773*a* is a columnar member and protrudes in the first direction from the fixed gripping member 70C3.

Therefore, the first movable gripping member 70L3 is rotatably supported by the fixed gripping member 70C3 on the other end side by the shaft 773*a* so that one end side can move in the direction approaching and closing from the one end side of the fixed gripping member 70C3. The second movable gripping member 70R3 is rotatably supported on the fixed gripping member 70C3 at the other end thereof by a shaft 773*a* so that one end side can move in the direction approaching and closing from the one end side of the fixed gripping member 70C3.

The binding unit 7B includes an opening and closing pin (opening and closing shaft portion) 70Lp extending in the first direction. The opening and closing pin 70Lp is attached to the first movable opening and closing holding member 70L3 and the second movable opening and closing holding member 70R3 (not illustrated), and protrudes in the first direction from the first movable opening and closing holding member 70L3 and the second movable opening and closing holding member 70R3. The opening and closing pin 70Lp passes through an arc-shaped locus, by the rotation of the first movable opening and closing holding member 70L3 and the second movable opening and closing holding member 70R3 with the shaft 773*a* as a fulcrum.

The binding unit 7B includes a movable member 711 movable in the second direction. The movable member 711 is the aforementioned bending portion. The movable member 711 includes an opening and closing guide hole (fitting portion) 712 to which the opening and closing pin 70Lp is fitted.

The opening and closing guide hole 712 extends along the longitudinal direction of the movable member 711. Specifically, the opening and closing guide hole 712 includes a first standby portion 712*a* extending in the first standby distance along the moving direction of the movable member 711, a second standby portion 712 *b* extending along the moving direction of the movable member 711, and an opening and closing portion 712*c* extending to be bent obliquely outward from one end of the first standby portion 712*a* and connected to the second standby portion 712*b*. Although not illustrated, the opening and closing guide hole into which the opening and closing pin 70Lp provided in the second movable holding member 70LR3 is fitted has the same configuration.

When the movable member 711 moves in the second direction, the opening and closing guide hole 712 moves in the second direction. When the opening and closing part 712*c* of the opening and closing guide hole 712 passes the position of the opening and closing pin 70Lp, the opening and closing pin 70Lp is displaced by the shape of the opening and closing part 712*c*.

As a result, when the movable member 711 moves in the direction of the arrow P2*f* which is one direction along the second direction, as illustrated in FIG. 86, one end side of the first movable gripping member 70L3 rotates in the direction of approaching the fixed gripping member 70C3 with the shaft 773*a* as a fulcrum. Further, one end side of the second movable gripping member 70R3 rotates in the direction of approaching the fixed gripping member 70C3 with the shaft 773*a* as a fulcrum.

Figure 83:
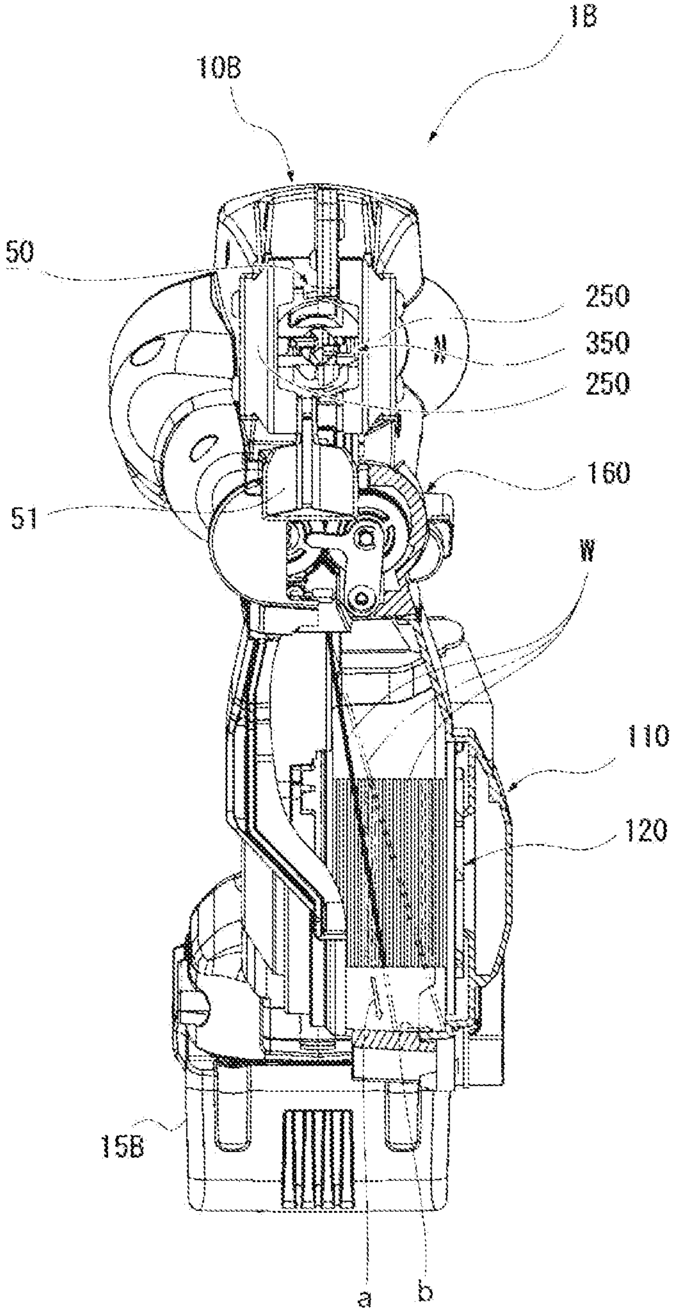

When the bending portion 71 moves in the direction of the arrow P2*r* which is the other direction along the second direction, as illustrated in FIG. 83, one end side of the first movable gripping member 70L3 rotates in the direction of being separates from the fixed gripping member 70C3 with the shaft 773*a* as a fulcrum. Further, one end side of the second movable gripping member 70R3 rotates in the direction of being separated from the fixed gripping member 70C with the shaft 773*a* as a fulcrum.

Further, in the binding unit described with reference to FIGS. 107 and 108, a pair of movable gripping members may be provided as in Additional Note 1.

FIGS. 109 and 110 are diagrams illustrating an example of a binding unit described in Additional Note 12. The binding unit 7D includes a movable gripping member 70L4 and a fixed gripping member 70C4 as a pair of gripping members. The movable gripping member 70L4 is rotatable (rotatable) with respect to the fixed gripping member 70C4 with the shaft 773*b* as a fulcrum.

When the direction in which the shaft 773*b* which is the axial direction of the shaft 773*b* extends is set as the first direction and the direction orthogonal to the first direction is set as the second direction, the movable gripping member 70L4 and the fixed gripping member 70C4 extend in the second direction. The first direction is indicated by an arrow P1, and the second direction is indicated by an arrow P2.

The other end side of the movable gripping member 70L4 is rotatably supported by the fixed gripping member 70C4 such that one end side in the longitudinal direction along the second direction is movable in a direction away from (towards and away from) the direction of approaching one end side of the fixed gripping member 70C4. The shaft 773*b* is a columnar member and protrudes in the first direction from the fixed gripping member 70C4.

The binding unit 7D includes an opening and closing pin 71*a*4 (a moving member) that extends in the first direction and is movable in the second direction. The opening and closing pin 71*a*4 is attached to the above-mentioned bending portion 71. The bending portion 71 extends in the second direction and is formed with a space having a substantially cylindrical shape, a square tubular shape, or the like, in which a part of the movable gripping member 70L4 and a part of the fixed gripping member 70C4 enter. The opening and closing pin 71*a*4 protrudes in the first direction toward the space inside the bending portion 71.

The movable gripping member 70L4 has an opening and closing guide hole (fitting portion) 77L4 to which the opening and closing pin 71*a*4 is fitted. The opening and closing guide hole 77L4 extends along the longitudinal direction of the first movable gripping member 70L3. Specifically, the opening and closing guide hole 77L4 has a first standby portion 77L4*a* extending along the moving direction of the bending portion 71 by the first standby distance, a second standby portion 77L4*b* extending along the moving direction of the bending portion 71 by a second standby distance, and an opening and closing portion 77L4*c* which extends to be bent obliquely outward from one end of the first standby section 77L4*a* and is connected to the second standby portion 77L4*b*.

When the bending portion 71 moves in the second direction, the opening and closing pin 71*a*4 moves in the second direction along the opening and closing guide hole 77L4.

When the bending portion 71 moves in the direction of the arrow P2*f* which is one direction along the second direction, one end side of the movable gripping member 70L4 rotates in the direction of approaching the fixed gripping member 70C4 with the shaft 773*b* as a fulcrum. When the bending portion 71 moves in the direction of the arrow P2*r* that is the other direction along the second direction, one end side of the movable gripping member 70L4 rotates in the direction of being separated from the fixed gripping member 70C4 with the shaft 773*b* as a fulcrum. In the binding unit described with reference to FIGS. 109 and 110, the movable gripping member may be provided with an opening and closing shaft portion, and the moving member (bending portion) may be provided with a fitting portion as described in Additional Note 11.

This application is based upon and claims the benefit of priority from Japanese Patent Application No. 2015-145263 filed on Jul. 22, 2015 and Japanese Patent Application Nos. 2016-135748 and 2016-136070 filed on Jul. 8, 2016, the entire contents of which are incorporated herein by reference.

REFERENCE SIGNS LIST

1A . . . reinforcing bar binding machine,
2A . . . magazine,
20 . . . reel,
3A . . . wire feeding unit (feeding unit),
4A . . . parallel guide (feeding unit),
5A . . . curl guide unit (feeding unit),
6A . . . cutting unit,
7A . . . binding portion (binding unit),
8A . . . binding unit driving mechanism,
30L . . . first feed gear,
30R . . . second feed gear,
31L . . . tooth portion,
31La . . . tooth bottom circle,
32L . . . first feed groove,
32La . . . first inclined surface,
32Lb . . . second inclined surface,
31R . . . tooth portion,
31Ra . . . tooth bottom circle,
32R . . . second feed groove,
32Ra . . . first inclined surface,
32Rb . . . second inclined surface,
33 . . . driving unit,
33*a* . . . feed motor,
33*b* . . . transmission mechanism,
34 . . . displacement portion,
50 . . . first guide unit,
51 . . . second guide unit,
52 . . . guide groove,
53 . . . guide pin,
53*a* . . . retreat mechanism,
54 . . . fixed guide unit,
54*a* . . . wall surface,
55 . . . movable guide unit,
55*a* . . . wall surface,
55*b* . . . shaft,
60 . . . fixed blade portion,
61 . . . rotary blade portion,
61*a* . . . shaft,
62 . . . transmission mechanism,
70 . . . gripping portion,
70C . . . fixed gripping member,
70L . . . first movable gripping member,
70R . . . second movable gripping member,
71 . . . bending portion,
71*a* . . . opening and closing pin (moving member),
77 . . . shaft,
77C . . . mounting portion,
77L . . . opening and closing guide hole (first opening and closing guide hole, fitting portion),
77R . . . opening and closing guide hole (second opening and closing guide hole, fitting portion),
78C . . . guide hole (fitting portion),
78L, 78R . . . opening and closing portion,
80 . . . motor,
81 . . . reduction gear,
82 . . . rotary shaft,
83 . . . movable member,
101 . . . restriction portion,
105 . . . protrusion,
110 . . . housing unit,
111 . . . oblique portion,
120 . . . reel,
121 . . . pressing mechanism,
131 . . . contacting point,
141 . . . stop preventing portion,
142 . . . stop preventing portion,
410 . . . hub portion,
420 . . . flange portion,
430 . . . flange portion,
510 . . . inner wall portion,
520 . . . peripheral wall portion,
560 . . . case,
570 . . . opening,
580 . . . cover,
W . . . wire

The invention claimed is:

1. A binding machine comprising:
a housing that is configured to house a wire reel including two or more wires;
a wire feeding unit that is configured to feed the two or more wires from the housing in parallel with each other while allowing the two or more wires to be movable relative to each other in a direction orthogonal to a feeding direction;
a curl guide that is configured to wind the two or more wires fed from the wire feeding unit in a loop around a binding object; and
a binding unit including a gripping member, the binding unit configured to grip and twist the two or more wires wound around the binding object to bind the binding object.

2. The binding machine according to claim 1,
wherein the wire feeding unit includes a first feeding member and a second feeding member, which feed the two or more wires between the first feeding member and the second feeding member,
wherein the first and second feeding members respectively include first and second facing surfaces which face each other and form a pinching portion to pinch the two or more wires between the first and second facing surfaces,
wherein the first and second facing surfaces are displaceable in the feeding direction to feed the two or more wires pinched therebetween, and
wherein the pinching portion controls a direction of movement of the two or more wires in a direction orthogonal to the feeding direction while maintaining axes of the two or more wires parallel to each other and parallel to the feeding direction.

3. The binding machine according to claim 1, further comprising:
a restricting guide that is positioned between the housing and the curl guide and that is configured to restrict a direction of movement of the two or more wires, and
wherein the restricting guide restricts the direction of movement of the two or more wires and is configured so as to arrange the two or more wires in parallel.

4. The binding machine according to claim 3, wherein the restricting guide includes a wire introducing portion at an inlet side and through which the two or more wires enter the restricting guide, and a wire restricting portion which restricts the direction of movement of the two or more wires entering from the wire introducing portion, and wherein the wire introducing portion includes a larger opening than an opening of the wire restricting portion to facilitate entry of the two or more wires into the wire introducing portion.

5. The binding machine according to claim 4, wherein the opening of the wire restricting portion is formed such that a length in a first direction orthogonal to the feeding direction is larger than a length in a second direction orthogonal to the feeding direction and orthogonal to the first direction.

6. The binding machine according to claim 5, wherein the length in the first direction is larger than twice a diameter of one wire of the two or more wires, and the length in the second direction is larger than the diameter of the one wire and is smaller than twice the diameter of the one wire.

7. The binding machine according to claim 6, wherein the length of the opening of the wire restricting portion in the second direction is smaller than 1.5 times the diameter of the one wire.

8. The binding machine according to claim 5, wherein in the opening of the wire restricting portion, the length in the first direction is at least 1.2 times the length in the second direction.

9. The binding machine according to claim 5, wherein the opening of the wire restricting portion is configured such that an inclination of a line extending through axes of the two or more wires in the opening is 45 degrees or less with respect to the length of the opening extending in the first direction when the two or more wires are inserted therein.

10. The binding machine according to claim 9, wherein the opening of the wire restricting portion is configured such that the inclination is 15 degrees or less.

11. The binding machine according to claim 5, wherein the wire restricting portion is configured to restrict relative movement of the two or more wires such that the two or more wires are maintained in parallel with axes of the two or more wires parallel to each other.

12. The binding machine according to claim 3, wherein the restricting guide is located between the housing and the wire feeding unit.

13. The binding machine according to claim 3, wherein the restricting guide is located between the wire feeding unit and the curl guide.

14. The binding machine according to claim 13, further comprising:

a blade unit located between the wire feeding unit and the curl guide and configured to cut the wires wound around the binding object, and wherein the restricting guide is located between the wire feeding unit and the blade unit.

15. The binding machine according to claim 13, further comprising:

a blade unit located between the wire feeding unit and the curl guide and configured to cut the wires wound around the binding object, wherein the restricting guide is located in or near the blade unit.

16. The binding machine according to claim 13, further comprising:

a blade unit located between the wire feeding unit and the curl guide and configured to cut the wires wound around the binding object, wherein the restricting guide is located between the blade unit and the curl guide.

17. The binding machine according to claim 1, further including:

a restricting guide positioned between the housing and the curl guide, wherein the restricting guide is configured to restrict lateral movement of the two or more wires relative to each other in a direction orthogonal to the feeding direction.

18. The binding machine according to claim 17, wherein the restricting guide includes an opening having a first dimension in a first direction orthogonal to the feeding direction and a second dimension orthogonal to both the first direction and the feeding direction, and wherein the first dimension is at least twice a diameter of one wire of the two or more wires and the second dimension is less than twice the diameter of the one wire.

19. The binding machine according to claim 18, wherein the wire feeding unit and the binding unit form a single loop of the two or more wires simultaneously wound around the binding object, and the two or more wires of the single loop are gripped and twisted to bind the binding object.

20. The binding machine according to claim 19, wherein the feeding unit is configured to reverse the feeding direction of the wire after forming of the single loop about the binding object to tighten the single loop of the two or more wires.

21. The binding machine according to claim 1, wherein the wire feeding unit includes a first feeding member having a first groove thereon and a second feeding member having a second groove thereon, and wherein the wire feeding unit is configured to feed the two or more wires with a first wire of the two or more wires positioned in said first groove and a second wire of the two or more wires positioned in said second groove.

* * * * *